(12) United States Patent
Guilloux et al.

(10) Patent No.: US 10,983,365 B2
(45) Date of Patent: Apr. 20, 2021

(54) METHOD OF MODIFYING AN DIOPTRIC FUNCTION OF AN OPHTHALMIC LENS SURFACE

(71) Applicant: Essilor International, Charenton le Pont (FR)

(72) Inventors: Cyril Guilloux, Charenton le Pont (FR); Aude Contet, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 744 days.

(21) Appl. No.: 15/310,644

(22) PCT Filed: May 14, 2015

(86) PCT No.: PCT/EP2015/060735
§ 371 (c)(1),
(2) Date: Nov. 11, 2016

(87) PCT Pub. No.: WO2015/173379
PCT Pub. Date: Nov. 19, 2015

(65) Prior Publication Data
US 2017/0108710 A1    Apr. 20, 2017

(30) Foreign Application Priority Data

May 15, 2014    (EP) ..................................... 14305715

(51) Int. Cl.
*G02C 7/02*     (2006.01)
*G02C 7/06*     (2006.01)

(52) U.S. Cl.
CPC ............. *G02C 7/028* (2013.01); *G02C 7/027* (2013.01); *G02C 7/061* (2013.01)

(58) Field of Classification Search
CPC . G02B 3/04; G02B 3/10; G02C 7/024; G02C 7/027; G02C 7/028; G02C 7/061; G02C 7/063; Y10S 425/808
(Continued)

(56) References Cited

U.S. PATENT DOCUMENTS

| 2010/0145489 A1* | 6/2010 | Esser | G02C 7/027 700/97 |
| 2013/0335699 A1* | 12/2013 | De Rossi | G02C 7/025 351/159.42 |

FOREIGN PATENT DOCUMENTS

| EP | 0 132 955 | 2/1985 |
| EP | 2 270 578 | 1/2011 |
| WO | WO 00/72051 | 11/2000 |

* cited by examiner

*Primary Examiner* — Marin Pichler
*Assistant Examiner* — Mitchell T Oestreich
(74) *Attorney, Agent, or Firm* — Oblon, McClelland, Maier & Neustadt, L.L.P.

(57) ABSTRACT

A method implemented by computer means of modifying an initial dioptric function of an initial ophthalmic lens surface, for manufacturing an ophthalmic lens, the method comprising:
  an initial surface providing step (S1), during which an initial surface Sini associated with a first coordinate system is provided, said initial surface Sini comprising a plurality of surface points P1, each surface point P1 having a mean sphere Sph(P1) and a cylinder Cyl(P1), said initial surface Sini providing said initial dioptric function,
  a modifying surface selection step (S2), during which a number n of nonzero modifying surfaces $Smod_1, \ldots, Smod_n$ is selected, said modifying surfaces $Smod_1, \ldots, Smod_n$ being associated with a second
(Continued)

coordinate system, the modifying surface $Smod_i$ comprising a plurality of surface points $P_{i1}, \ldots P_{ij}, \ldots, P_{im_i}$, each surface point $P_{ij}$ having a mean sphere $Sph(P_{ij})$ and a cylinder $Cyl(P_{ij})$, n, i, j, $m_i$ being integers with $n \geq 1$, $1 \leq i \leq n$, $1 \leq j \leq m_i$ and $m_i \geq 1$, an orientation step (S3), during which the relative position and orientation of the first coordinate system and the second coordinate system is determined, a combining step (S4), during which the initial surface Sini and the n modifying surfaces are combined to obtain a functionalized ophthalmic lens surface according to the expression:

$$Sfunc = Sini + \Sigma_{i=1}^{i=n} alpha_i \cdot Smod_i$$

wherein the normalized sphere standard deviation of the normalized sphere values $Sph'_{Smodi}$ of a normalized modifying surface $SNmod_i$ is smaller than or equal to 0.2, with:

the normalized modifying surface $SNmod_i$ corresponding to the modifying surface $Smod_i$ to which the best sphero-toric surface has been subtracted, and the normalized sphere values over the normalized modifying surface $SNmod_i$ at a point $P_{ij}$ of $Smod_i$ having the coordinate (x,y,z) being:

$$Sph'_{Smodi}(x, y) = \frac{\lfloor SphN_{S\,mod_i}(x, y) - \min(SphN_{S\,mod_i}) \rfloor}{[\max(SphN_{S\,mod_i}) - \min(SphN_{S\,mod_i})]}$$

$SphN_{Smod,i}(x,y)$ being the sphere over the normalized modifying surface $SNmod_i$, at the point of $SNmod_i$ having the coordinate (x,y), $\max(SphN_{Smod,i})$ being the greatest value of sphere over the normalized modifying surface $SNmod_i$, $\min(SphN_{Smod,i})$ being the smallest value of sphere over the normalized modifying surface $SN_{modi}$, $alpha_i$ being a nonzero weighting coefficient.

14 Claims, 108 Drawing Sheets

(58) Field of Classification Search
USPC ............... 359/159.42; 425/808; 264/2.5; 351/159.42, 159.72, 159.74
See application file for complete search history.

METHOD OF MODIFYING AN DIOPTRIC FUNCTION OF AN OPHTHALMIC LENS SURFACE

RELATED APPLICATIONS

This is a U.S. national stage application under 35 USC § 371 of International application No. PCT/EP2015/060735 filed on May 14, 2015. This application claims the priority of European application no. 14305715.6 filed May 15, 2014, the entire content of which is hereby incorporated by reference.

FIELD OF THE INVENTION

The present invention relates to a method implemented by computer means of modifying an initial dioptric function of an initial ophthalmic lens surface, for manufacturing an ophthalmic lens.

BACKGROUND OF THE INVENTION

The discussion of the background of the invention herein is included to explain the context of the invention. This is not to be taken as an admission that any of the material referred to was published, known or part of the common general knowledge at the priority date of any of the claims.

Usually, a person needing to wear spectacles and having thus a prescription filled by an ophthalmologist or optometrist goes to the shop of an optician. The optician orders a pair of optical lenses corresponding to the prescription of the wearer.

The pair of optical lenses sent to the optician are designed and manufactured according to optical criteria.

Recent improvements in the field of ophthalmic lenses, have allowed providing customized optical lenses, such customization going beyond the wearer's prescription. Further parameters than the wearer's prescription may be considered when designing and manufacturing the pair of ophthalmic lenses.

To meet new needs or specifications of the wearer, methods of optimization of optical lenses depending on the setting of segmentation/customization are usually used. Therefore, when the lens provider wants to implement product customization, he needs to compute a set of new "optical design targets" that will be used to generate the optical function to reach when optimizing the optical lens.

This method has the disadvantage of not being easily transferable to each optical design or products. Indeed, such method requires optimizing as many optical designs as existing products.

SUMMARY OF THE INVENTION

One object of the present invention is to provide a method for implementing an "effective" change of optical design adapted to a given need of the wearer, without requiring repetitive work (design time) and optimization time of each design.

To this end, one aspect of the invention is directed to a method, for example implemented by computer means, of modifying an initial dioptric function of an initial ophthalmic lens surface, for manufacturing an ophthalmic lens, the method comprising:

an initial surface providing step, during which an initial surface Sini associated with an first coordinate system is provided, said initial surface Sini comprising a plurality of surface points P1, each surface point P1 having a mean sphere Sph(P1) and a cylinder Cyl(P1), said initial surface Sini providing said initial dioptric function, a modifying surface selection step, during which a number n of nonzero modifying surfaces $Smod_1, \ldots, Smod_n$ is selected, said modifying surfaces $Smod_1, \ldots, Smod_n$ being associated with a second coordinate system, the modifying surface $Smod_i$ comprising a plurality of surface points $P_{i1}, \ldots P_{ij}, P_{imi}$, each surface point $P_{ij}$ having a mean sphere $Sph(P_{ij})$ and a cylinder $Cyl(P_{ij})$, n, i, j, $m_i$ being integers with $n \geq 1$, $1 \leq i \leq n$, $1 \leq j \leq m_i$ and $m_i \geq 1$, an orientation step, during which the relative position and orientation of the first coordinate system and the second coordinate system is determined, a combining step, during which the initial surface Sini and the n modifying surfaces are combined to obtain a functionalized ophthalmic lens surface according to the expression:

$$Sfunc = Sini + \Sigma_{i=1}^{i=n} alpha_i \cdot Smod_i$$

wherein the normalized sphere standard deviation of the normalized sphere values $Sph'_{Smodi}$ of a normalized modifying surface $SNmod_i$ is smaller than or equal to 0.2, with:

the normalized modifying surface $SNmod_i$ corresponding to the modifying surface $Smod_i$ to which the best spherotoric surface has been subtracted, and the normalized sphere values over the normalized modifying surface $SNmod_i$ at a point $P_{ij}$ of $Smod_i$ having the coordinate (x,y,z) being:

$$Sph'_{S_{modi}}(x, y) = \frac{\lfloor SphN_{S\ mod_i}(x, y) - \min(SphN_{S\ mod_i}) \rfloor}{[\max(SphN_{S\ mod_i}) - \min(SphN_{S\ mod_i})]}$$

$SphN_{Smod,i}(x,y)$ being the sphere over the normalized modifying surface $SNmod_i$, at the point of $SNmod_i$ having the coordinate (x,y), $\max(SphN_{Smod,i})$ being the greatest value of sphere over the normalized modifying surface $SNmod_i$, $\min(SphN_{Smod,i})$ being the smallest value of sphere over the normalized modifying surface $SN_{modi}$, $alpha_i$ being a nonzero weighting coefficient.

Advantageously, a low standard deviation means that the values (Modified design) are very dense around the average value. In other words, the modifying surface affects the initial design homogeneously over the entire surface. Thus, the modifying surface slightly distorts the original design. In practice, here it means that the modification of the initial design are limited to a small part of the initial surface, the rest being unchanged.

The method according to an embodiment of the invention, proposes providing n modifying surfaces that are to be combined with the initial surface so as to customize the optical function of the optical lens.

Each modifying surface or a specific combination of modifying surfaces allow when added to the initial surface to add a specific optical function to the initial optical function.

The method according to embodiments of the invention may be implemented:
  at the lens designer side, during the optimization process of the optical lens, or
  at the lens manufacturer side, for example by modifying the manufacturing data.

Advantageously, the method according to the invention allows:

time saving when customizing the design, only a few modifying surface required to be optimized, flexibility of the customization and segmentation becomes a real option computation at the lab, indeed the method according to the invention allows simply adding the modifying surface to the initial surface.

According to further embodiments which can be considered alone or in combination:

the normalized sphere standard deviation of the normalized sphere values Sph'$_{Smodi}$ of a normalized modifying surface SNmod$_i$ is smaller than or equal to 0.15; and/or the standard deviation of the normalized sphere values Sph'$_i$ along a central line of the normalized modifying surface is smaller than or equal to 0.3, preferably smaller than or equal to 0.2, more preferably smaller than or equal to 0.1; and/or the area of the normalized modifying surface SNmod$_i$ having normalized sphere values Sph'$_i$ smaller than 0.2 represents less than 25% of the total surface area of the normalized modifying surface SNmod$_i$, preferably less than 15% of the total surface area of the normalized modifying surface SNmod$_i$; and/or the area of the normalized modifying surface SNmod$_i$ having a normalized cylinder values Cyl'$_{Smodi}$ greater than 0.6 represent less than 25% of the total surface area of the normalized modifying surface SNmod$_i$, preferably less than 15% of the total surface area of the normalized modifying surface SNmod$_i$, with the normalized cylinder values over the normalized modifying surface at a point P$_{ij}$ of Smod$_i$ having the coordinate (x,y,z) being:

$$Cyl'_{S\ mod\ i}(x, y) = \frac{[CylN_{S\ mod_i}(x, y, z) - \min(CylN_{S\ mod_i})]}{[\max(CylN_{S\ mod_i}) - \min(CylN_{S\ mod_i})]}$$

CylN$_{Smod,i}$(x,y,z) being the cylinder over the normalized modifying surface SNmod$_i$ at the point SNmod$_i$ having the coordinate (x,y), max(CylN$_{Smod,i}$) being the greatest value of sphere over the normalized modifying surface SNmod$_i$, and min(CylN$_{Smodi}$) being the smallest value of sphere over the normalized modifying surface SNmod$_i$; and/or the average value of the normalized cylinder Cyl'$_{Smodi}$ over the normalized modifying surface SNmod$_i$ is smaller than or equal to 0.35, preferably smaller than or equal to 0.3; and/or the first coordinate system comprising an origin, wherein the normalized modifying surface SNmod$_i$ is calculated considering a disk of 60 mm diameter centered on the origin of the initial coordinate system; and/or the origin of the initial coordinate system is located on the optical center of the lens when the ophthalmic lens is a single vision lens, or is located in the middle of the micro-engravings when the ophthalmic lens is a multifocal lens; and/or during the combining step, a sphero-toric surface is further added to the initial surface Sini to obtain the functionalized ophthalmic lens surface; and/or the method further comprises a weighting coefficient determining step during which the value of the weighting coefficient alpha$_i$ is determined based on a wearer parameter of the ophthalmic lens; and/or the ophthalmic lens is a progressive lens; and/or the ophthalmic lens comprising a far vision control point and a near vision control point, wherein Sigma=$\Sigma_{i=1}^{i=n}$alpha$_i$·Smod$_i$ forms a surface gathering a plurality of surface points alpha$_i$ P2$_1$, . . . , P2$_q$, each surface point P2$_j$ having a mean sphere Sph(P2$_j$) and a cylinder Cyl(P2$_j$), with q, j being integers, and 1≤j≤q, wherein for any surface points (P3) of the surface Sigma located in a vicinity of the far vision control point, the mean sphere and the cylinder are such that Sph(P3)<0.12 and Cyl(P3)<0.12; and/or for any surface points of the surface Sigma located in a vicinity of the near control point, the mean sphere and the cylinder are such that Sph(P3)<0.12 and Cyl(P3)<0.12.

Another aspect of the invention relates to a method of manufacturing an ophthalmic lens comprising at least:

an ophthalmic lens determining step during which the surfaces of the ophthalmic lens and relative positions of the ophthalmic lens surfaces are determined, a machining step during which the ophthalmic lens is manufactured, wherein during the ophthalmic lens determining step, the dioptric function of at least one of the ophthalmic lens surfaces is modified according to the method of the invention.

Another aspect of the invention relates to an ophthalmic lens calculating device adapted to implement a method according to the invention, comprising:

an order request receiving mean adapted to receive an ophthalmic lens order request comprising at least the wearer's ophthalmic prescription and at least one additional function to add to said ophthalmic lens, an initial surface determining mean adapted to determine the initial surface Sini and relative positions of an ophthalmic lens based on the order request, a modifying surface providing mean adapted to provide at least one modifying surface Smod$_i$ and at least one nonzero weighting coefficient alpha$_i$ corresponding to the at least one desired additional function to add to said ophthalmic lens, a calculation mean adapted to combine the initial surface Sini and the at least one modifying surface Smod$_i$.

The ophthalmic lens calculating device according to an embodiment of the invention may further comprise communication mean adapted to communicate with at least one distant entity to provide the modifying surface Smod$_i$ and/or the corresponding weighting coefficient alpha$_i$.

Another aspect of the invention relates to an ophthalmic lens adapted for correcting a wearer's vision, the ophthalmic lens having a first surface and a second surface, the first surface is adapted for being positioned closest to the wearer's eye when the lens is worn by the wearer, said ophthalmic lens comprising:

a distance-vision region having a first refractive power;

a near-vision region having a second refractive power; and an intermediary region joining the distance-vision region and the near-vision region and having a refractive power that varies gradually, wherein the surface S$_{ini}$ of the first or second surface is a composite surface that comprises a progressive Surface, the surface S$_{ini}$ provides an initial dioptric function and wherein the surface S$_{ini}$ further includes at least one modifying surface S$_{modi}$, wherein the normalized sphere standard deviation of the normalized sphere values Sph'$_{Smodi}$ of a normalized modifying surface SNmod$_i$ is smaller than or equal to 0.2, with:

the normalized modifying surface SNmod$_i$ corresponding to the modifying surface Smod$_i$ to which the best spherotoric surface has been subtracted, and the normalized sphere values over the normalized modifying surface SNmod$_i$ at a point P$_{ij}$ of Smod$_i$ having the coordinate (x,y,z) being:

$$Sph'_{S_{modi}}(x, y) = \frac{\lfloor SphN_{S\ mod_i}(x, y, z) - \min(SphN_{S\ mod_i}) \rfloor}{[\max(SphN_{S\ mod_i}) - \min(SphN_{S\ mod_i})]}$$

SphN$_{Smod,i}$(x,y) being the sphere over the normalized modifying surface SNmod$_i$, at the point of SNmod$_i$ having the coordinate (x,y), max(SphN$_{Smod,i}$) being the greatest value of sphere over the normalized modifying surface SNmod$_i$, min(SphN$_{Smod,i}$) being the smallest value of sphere over the normalized modifying surface SN$_{modi}$.

According to a further aspect, the invention relates to a computer program product comprising one or more stored sequences of instructions that are accessible to a processor and which, when executed by the processor, causes the processor to carry out the steps of the method according to the invention.

Another aspect of the invention relates to a computer readable medium carrying one or more sequences of instructions of the computer program product according to an embodiment of the invention.

Another aspect of the invention relates to a program which makes a computer execute the method according to an embodiment of the invention.

Another aspect of the invention relates to a computer-readable storage medium having a program recorded thereon; where the program makes the computer execute the method according to an embodiment of the invention.

Another aspect of the invention relates to a device comprising a processor adapted to store one or more sequence of instructions and to carry out at least one of the steps of the method according to an embodiment of the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

BRIEF DESCRIPTION OF THE DRAWINGS

Embodiments of the invention will now be described, by way of example only, and with reference to the following drawings in which.

DETAILED DESCRIPTION OF THE DRAWINGS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

In the sense of the invention the "surface design" designates the set of parameters that allow defining the surface of a face of an ophthalmic lens or optical lens member. For example the surface design may comprise the surface equation, position and orientation of the surface of a face of an ophthalmic lens or optical lens member, such equation, position and orientation being defined in a coordinate system.

In the context of the present invention the term "optical lens member" can refer to a lens blank or a semi-finished lens.

In the context of the present invention the term "ophthalmic lens" can refer to an uncut lens, a semi-finished lens, or a spectacle lens adapted for a wearer.

Figure 1:
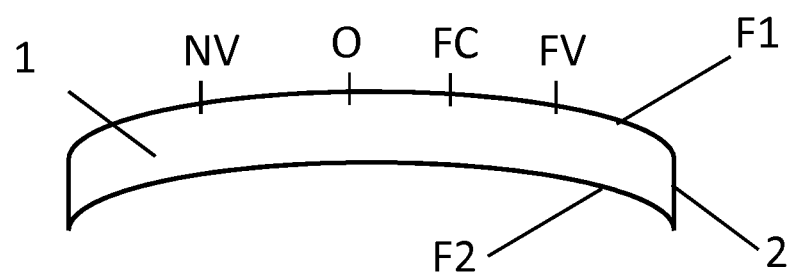
FIG. 1 is a general profile view of an optical lens.

As represented on FIG. 1 an ophthalmic lens 1 has a first optical face F1 and a second optical face F2. The first and second optical faces are connected by an external periphery surface 2.

Between the first and second optical faces, a refringent transparent medium is constituted which is usually homogenous. The lens can be a finished spectacles eyeglass, the two faces F1 and F2 of which have definitive shapes.

At least one of the first and second faces comprises a zone of optical interest, the zone of optical interest comprising at least:

a far vision control point FV, a near vision control point NV, a main line M starting from one end of the zone of optical interest, ending on the opposite end of the zone of optical interest and passing through the far and near vision control points.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in diopters.

Similarly, a maximum curvature $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in diopters.

It can be noticed that when the surface is locally spherical, the local minimum radius of curvature $R_{min}$ and the local maximum radius of curvature $R_{max}$ are the same and, accordingly, the minimum and maximum curvatures $CURV_{min}$ and $CURV_{max}$ are also identical. When the surface is aspherical, the local minimum radius of curvature $R_{min}$ and the local maximum radius of curvature $R_{max}$ are different.

From these expressions of the minimum and maximum curvatures $CURV_{min}$ and $CURV_{max}$, the minimum and maximum spheres labeled $SPH_{min}$ and $SPH_{max}$ can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and } SPH_{max} = (n-1) * CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and } SPH_{max} = (1-n) * CURV_{max} = \frac{1-n}{R_{min}}$$

where n is the index of the constituent material of the lens.

As is well known, a mean sphere $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

The characteristics of any aspherical face of the lens may be expressed by the local mean spheres and cylinders.

Figure 2:
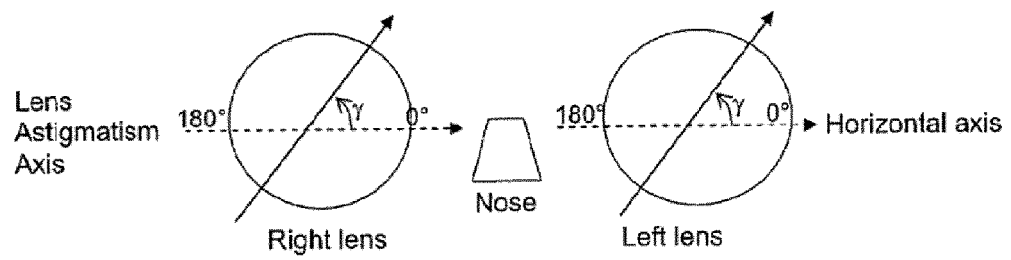
FIG. 2 illustrates the astigmatism axis γ of a lens in the TABO convention.

For an aspherical surface, a local cylinder axis $\gamma_{AX}$ may further be defined. FIG. 2 illustrates the astigmatism axis $\gamma$ as defined in the TABO convention and FIG. 3 illustrates the cylinder axis $\gamma_{AX}$ in a convention defined to characterize an aspherical surface.

The cylinder axis $\gamma_{AX}$ is the angle of the orientation of the maximum curvature $CURV_{max}$ with relation to a reference axis and in the chosen sense of rotation. In the above defined convention, the reference axis is horizontal (the angle of this reference axis is 0°) and the sense of rotation is counter-clockwise for each eye, when looking at the wearer ($0° \leq \gamma_{AX} \leq 180°$). An axis value for the cylinder axis $\gamma_{AX}$ of +45° therefore represents an axis oriented obliquely, which when looking at the wearer, extends from the quadrant located up on the right to the quadrant located down on the left.

Figure 3:
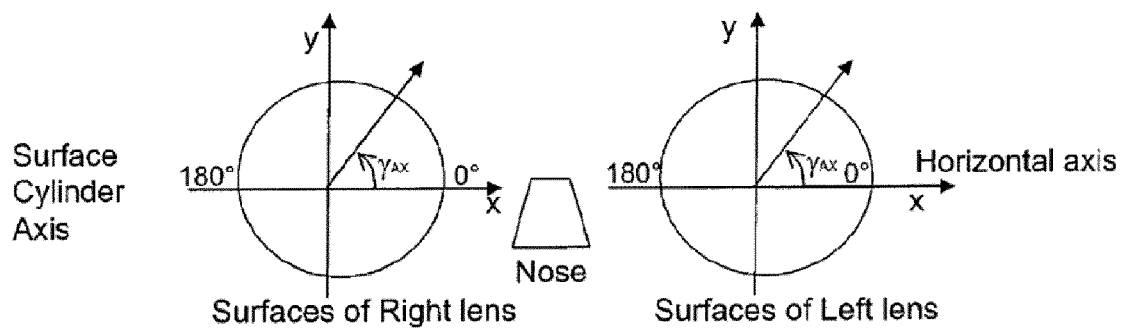
FIG. 3 illustrates the cylinder axis $\gamma_{AX}$ in a convention used to characterize an aspherical surface.
Figure 4:
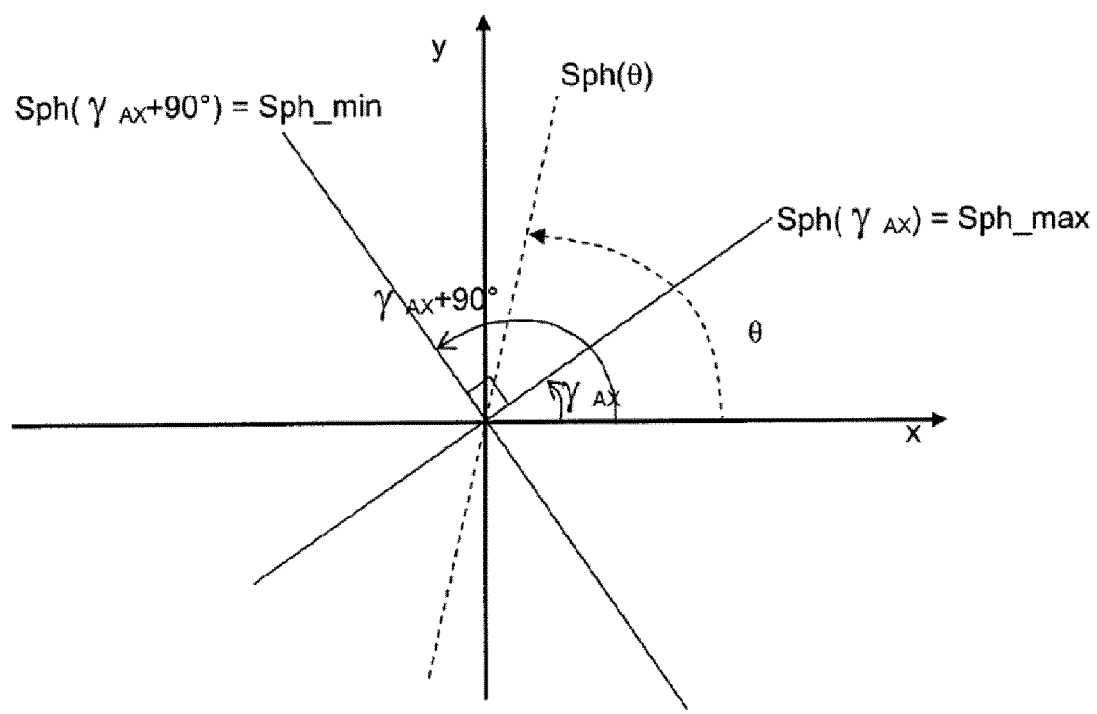
FIG. 4 illustrates the local sphere along any axis.

In addition, based on the knowledge of the value of the local cylinder axis $\gamma_{AX}$, Gauss formula enables to express the local sphere SPH along any axis θ, θ being a given angle in the referential defined in FIG. 3. The axis θ is shown in FIG. 4.

$$SPH(\theta)=SPH_{max}\cos^2(\theta-\gamma_{AX})+SPH_{min}\sin^2(\theta-\gamma_{AX})$$

As expected, when using the Gauss formula, $SPH(\gamma_{AX})=SPH_{max}$ and $SPH(\gamma_{AX}+90°)=SPH_{min}$.

The Gauss formula can also be expressed in term of curvature so that the curvature CURV along each axis forming an angle θ with the horizontal axis by:

$$CURV(\theta)=CURV_{max}\cos^2(\theta-\gamma_{AX})+CURV_{min}\sin^2(\theta-\gamma_{AX})$$

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

Figure 5:
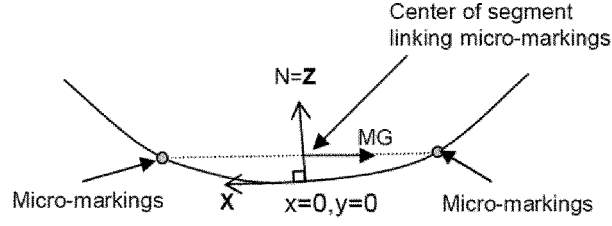
FIGS. 5 and 6a show referential defined with respect to micro-markings, for a surface bearing micro-markings and for a surface not bearing the micro-markings respectively.

Whenever a lens is characterized by reference to one of its aspherical surfaces, a referential is defined with respect to micro-markings as illustrated in FIGS. 5 and 6, for a surface bearing micro-markings and for a surface not bearing the micro-markings respectively.

Progressive lenses comprise micro-markings that have been made mandatory by a harmonized standard ISO 8980-2. Temporary markings may also be applied on the surface of the lens, indicating diopter measurement positions (sometimes referred to as control points) on the lens, such as for far vision FV and for near vision NV, a prism reference point O and a fitting cross FC for instance, as represented schematically in FIG. 1. It should be understood that what is referred to herein by the terms far vision control point and near vision control point can be any one of the points included in the orthogonal projection on the first surface of the lens, of respectively the FV and NV temporary markings provided by the lens manufacturer. If the temporary markings are absent or have been erased, it is always possible for a skilled person to position such control points on the lens by using a mounting chart and the permanent micro-markings.

The micro-markings also make it possible to define a coordinate system for both surfaces of the lens.

FIG. 5 illustrates a coordinate system for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 3.

Figure 6A:
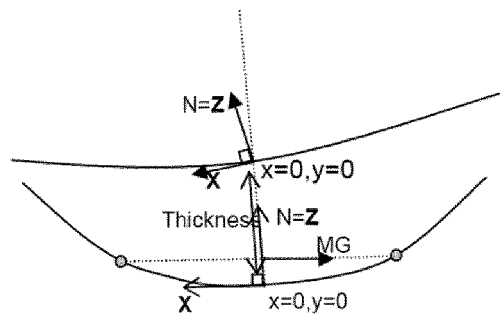

FIG. 6a illustrates a coordinate system for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 3. The center of the referential of the surface is also x=0 mm, y=0 mm.

Similarly, on a semi-finished lens blank, standard ISO 10322-2 requires micro-markings to be applied. The center of the aspherical surface of a semi-finished lens blank can therefore be determined as well as a referential as described above.

Moreover, a progressive multifocal lens may also be defined by optical characteristics, taking into consideration the situation of the person wearing the lenses.

Figure 6B:
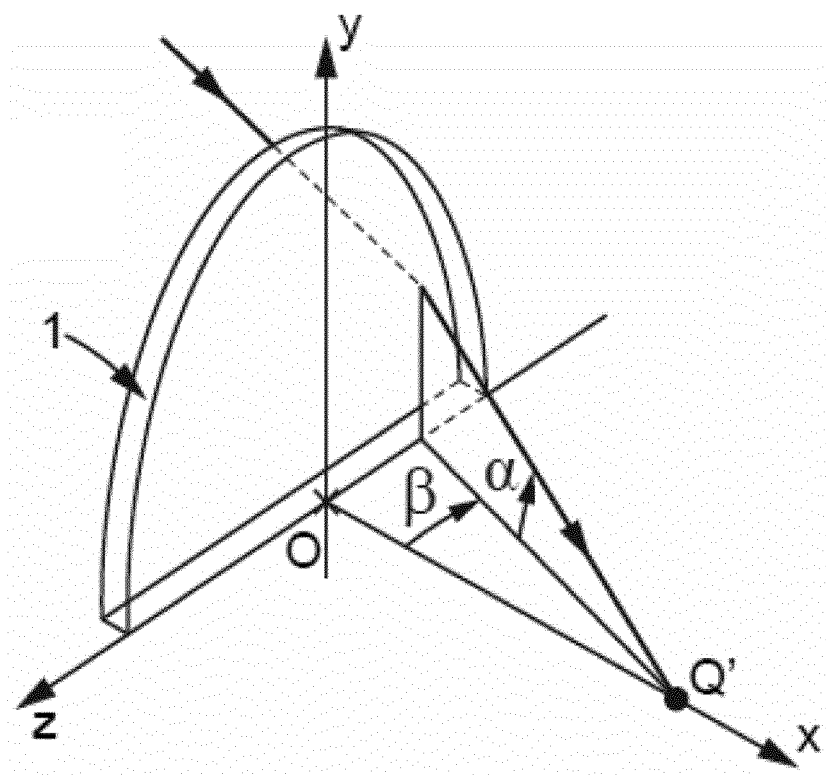
FIGS. 6b and 6c show, diagrammatically, optical systems of eye and lens.
Figure 6C:
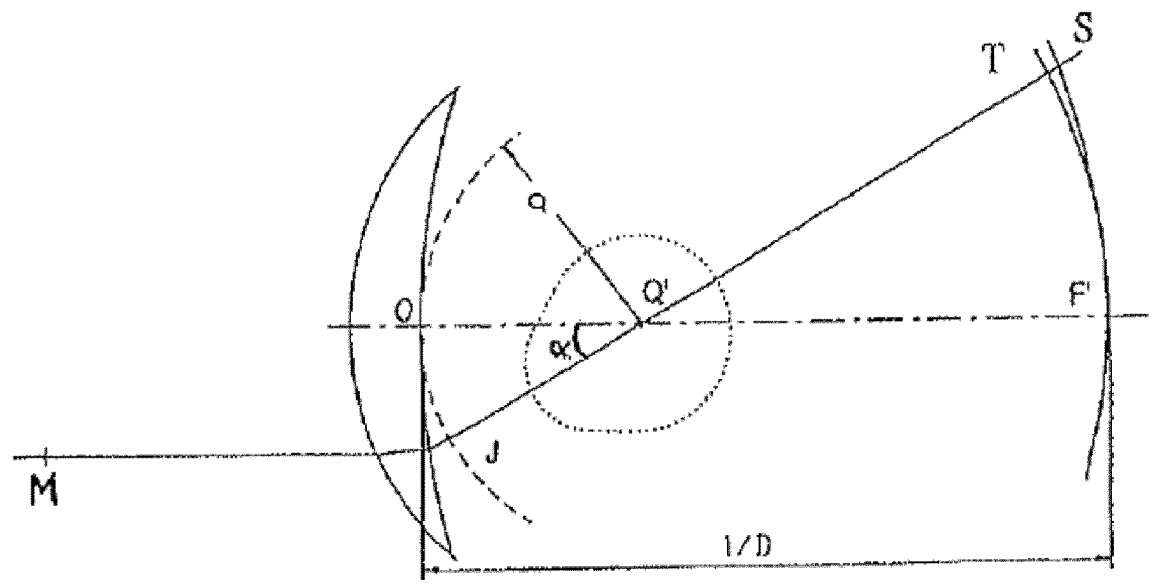

FIGS. 6b and 6c are diagrammatic illustrations of optical systems of eye and lens, thus showing the definitions used in the description. More precisely, FIG. 6b represents a perspective view of such a system illustrating parameters α and β used to define a gaze direction. FIG. 6c is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 6c in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

Figure 7:
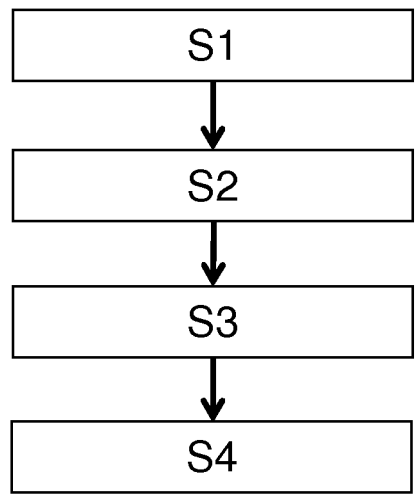
FIG. 7 is a flowchart of different steps of a method of modifying an dioptric function according to an embodiment of the invention.

A given gaze direction—represented by a solid line on FIG. 6b-corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 7. The angle α is the angle formed between the axis Q'J and the projection of the straight line Q'J on the horizontal plane comprising the axis Q'F'; this angle appears on the scheme on FIGS. 6b and 6c. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance is considered for a gaze direction (α,β). An object proximity ProxO is defined for the point M on the corresponding light ray in the object space as the inverse of the distance MJ between point M and point J of the apex sphere:

$$ProxO=1/MJ$$

This enables to calculate the object proximity within a thin lens approximation for all points of the apex sphere. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$Pr\,oxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui=ProxO+ProxI$$

With the same notations, an astigmatism Ast is defined for every gaze direction and for a given object proximity as:

$$Ast = \left| \frac{1}{JT} - \frac{1}{JS} \right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame $\{Q', x_m, y_m, z_m\}$ linked to the eye. It corresponds to the angle with which the image S or T is formed depending on the convention used with relation to the direction $z_m$ in the plane $\{Q', z_m, y_m\}$.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

Standard or usual wearing conditions are to be understood as the position of the lens with relation to the eye of a standard wearer, notably defined with the fitting cross intersecting the primary viewing direction, a distance between the center of rotation of the eye and the first major surface of the lens of 25.5 mm, a pantoscopic angle of 8° and a wrap angle of 0°.

The pantoscopic angle is the angle in the vertical plane between the optical axis of the spectacle lens and the visual axis of the eye in the primary position, usually taken to be the horizontal.

The wrap angle is the angle in the horizontal plane between the optical axis of the spectacle lens and the visual axis of the eye in the primary position, usually taken to be the horizontal.

Other conditions may be used. Wearing conditions may be calculated from a ray-tracing program, for a given lens. Further, the optical power and the astigmatism may be calculated so that the prescription is either fulfilled at the reference points (i.e control points in far vision) and for a wearer wearing his spectacles in the wearing conditions or measured by a frontofocometer.

Figure 6D:
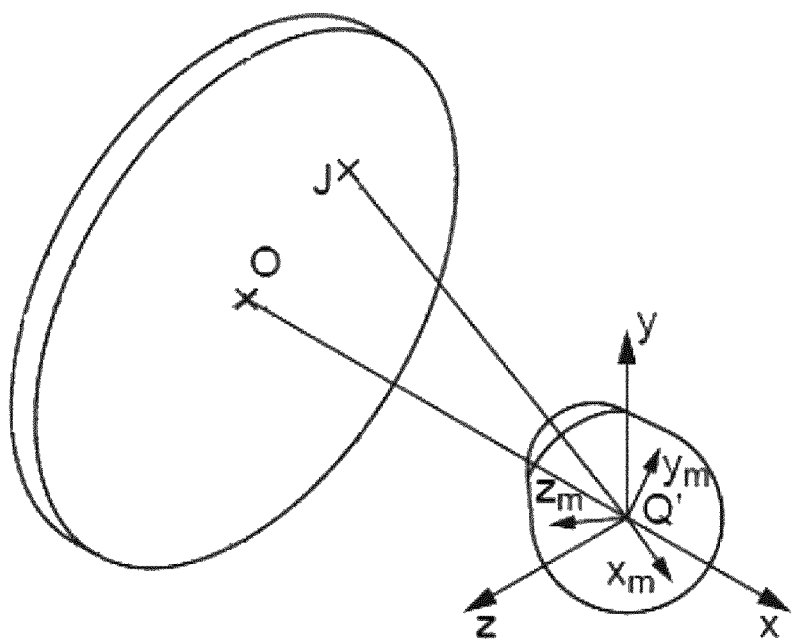
FIG. 6d shows a ray tracing from the center of rotation of the eye.

FIG. 6d represents a perspective view of a configuration wherein the parameters α and β are non zero. The effect of rotation of the eye can thus be illustrated by showing a fixed frame $\{x, y, z\}$ and a frame $\{x_m, y_m, z_m\}$ linked to the eye. Frame $\{x, y, z\}$ has its origin at the point Q'. The axis x is the axis Q'O and it is oriented from the lens toward the eye. The y axis is vertical and oriented upwardly. The z axis is such that the frame $\{x, y, z\}$ be orthonormal and direct. The frame $\{x_m, y_m, z_m\}$ is linked to the eye and its center is the point Q'. The $x_m$ axis corresponds to the gaze direction JQ'. Thus, for a primary gaze direction, the two frames $\{x, y, z\}$ and $\{x_m, y_m, z_m\}$ are the same. It is known that the properties for a lens may be expressed in several different ways and notably in surface and optically. A surface characterization is thus equivalent to an optical characterization. In the case of a blank, only a surface characterization may be used. It has to be understood that an optical characterization requires that the lens has been machined to the wearer's prescription. In contrast, in the case of an ophthalmic lens, the characterization may be of a surface or optical kind, both characterizations enabling to describe the same object from two different points of view. Whenever the characterization of the lens is of optical kind, it refers to an ergorama-eye-lens system. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 3, 5 and 6a.

The values in optic terms can be expressed for gaze directions. Gaze directions are usually given by their degree of lowering and azimuth in a frame whose origin is the center of rotation of the eye. When the lens is mounted in front of the eye, a point called the fitting cross is placed before the pupil or before the eye rotation center Q' of the eye for a primary gaze direction. The primary gaze direction corresponds to the situation where a wearer is looking straight ahead. In the chosen frame, the fitting cross corresponds thus to a lowering angle α of 0° and an azimuth angle β of 0° whatever surface of the lens the fitting cross is positioned—rear surface or front surface.

The above description made with reference to FIGS. 6b-6d was given for central vision. In peripheral vision, as the gaze direction is fixed, the center of the pupil is considered instead of center of rotation of the eye and peripheral ray directions are considered instead of gaze directions. When peripheral vision is considered, angle α and angle β correspond to ray directions instead of gaze directions.

In the remainder of the description, terms like <<up>>, <<bottom>>, <<horizontal>>, <<vertical>>, <<above>>, <<below>>, <<front>>, <<rear>> or other words indicating relative position may be used. These terms are to be understood in the wearing conditions of the lens.

Notably, the "upper" part of the lens corresponds to a negative lowering angle α<0° and the "lower" part of the lens corresponds to a positive lowering angle α>0° Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 3, 6a and 6b, and preferably to a value along the y axis inferior to the y_value at the fitting cross.

The invention relates to a method, for example implemented by computer means, of modifying an initial dioptric function of an initial ophthalmic lens surface, for manufacturing an ophthalmic lens.

As illustrated on FIG. 7, the method comprises at least:
an initial surface providing step S1,
a modifying surface selection step S2,
an orientation step S3, and
a combining step S4.

During the initial surface providing step S1, an initial surface Sini associated with a first coordinate system is provided. The initial surface Sini comprising a plurality of surface points P1, each surface point P1 having a mean sphere Sph(P1) and a cylinder Cyl(P1).

The initial surface Sini has an initial dioptric function.

The ophthalmic lens to be manufactured may be a single vision ophthalmic lens. When the ophthalmic lens to be manufactured is a single vision lens the origin of the first coordinate system is preferably located on the optical center of the lens.

According to further embodiments of the invention, the ophthalmic lens to be manufactured may be a multifocal ophthalmic lens or a progressive ophthalmic lens. When the ophthalmic lens to be manufactured is a multifocal ophthalmic lens, the origin of the first coordinate system is preferably located in the middle of the micro-engravings as illustrated on FIG. 5.

During the modifying surface selection step S2, a number n of nonzero modifying surfaces $Smod_1, \ldots, Smod_n$ is selected. The modifying surfaces $Smod_1, \ldots, Smod_n$ is associated with a second coordinate system.

Each modifying surface $Smod_i$ comprises a plurality of surface points $P_{i1}, \ldots P_{ij}, \ldots, P_{im_i}$, each surface point $P_{ij}$ having a mean sphere $Sph(P_{ij})$ and a cylinder $Cyl(P_{ij})$, n, i, j, $m_i$ being integers with $n \geq 1$, $1 \leq i \leq n$, $1 \leq j \leq m_i$ and $m_i \geq 1$.

For each of the modifying surface $Smod_i$, one may define a so called "normalized modifying surface" $SNmod_i$. The normalized modifying surface $SNmod_i$ corresponds to the modifying surface $Smod_i$ to which the best sphero-toric surface has been substrated.

In the sense of the invention, the "best sphero-toric surface" is the surface that bests fits the modifying surface at a control point. The control point of the surface is defined as the point of the surface that is to correspond to the control point of the optical lens that shall be obtained using said surface.

For an optical lens a control point is general a point at which the ophthalmic prescription of the wearer is to be guaranty, most of the time the far vision point or the near vision point.

According to an embodiment of the invention, the normalized modifying surface is calculated considering a 60 mm diameter disk centered on the origin of the first coordinate system associated with the initial surface provided during the initial surface providing step S1.

For each normalized modifying surface $SNmod_i$, one may define normalized sphere values $Sph'_{Smodi}$. The normalized sphere values $Sph'_{Smodi}$ at a point $P_{ij}$ of a $SNmod_i$ having the coordinate (x,y) is defined as:

$$Sph'_{S_{modi}}(x, y) = \frac{\lfloor SphN_{S\ mod_i}(x, y, z) - \min(SphN_{S\ mod_i}) \rfloor}{[\max(SphN_{S\ mod_i}) - \min(SphN_{S\ mod_i})]},$$

with $SphN_{Smod,i}(x,y)$ being the sphere over the normalized modifying surface $SNmod_i$, at the point of $SNmod_i$ having the coordinate (x,y), $\max(SphN_{Smod,i})$ being the greatest value of sphere over the normalized modifying surface $SNmod_i$, $\min(SphN_{Smod,i})$ being the smallest value of sphere over the normalized modifying surface $SN_{modi}$.

According to the invention, during the modifying selection step, for each of the selected modifying surface $Smod_i$ the normalized sphere standard deviation of the normalized sphere values $Sph'_{Smodi}$ of the normalized modifying surfaces $SNmod_i$ is smaller than or equal to 0.2, preferably smaller than or equal to 0.15.

Advantageously, selecting modifying surfaces that have the normalized sphere standard deviation of the normalized sphere values $Sph'_{Smodi}$ of the normalized modifying surfaces $SNmod_i$ is smaller than or equal to 0.2 ensures that the effect of the modifying surface when combined is limited to the desired additional function and does not change completely the dioptric function of the initial surface.

According to an embodiment of the invention, for each of the selected modifying surface $Smod_i$ the standard deviation of the normalized sphere values $Sph'_i$ along a central line of the normalized modifying surface is smaller than or equal to 0.3, preferably smaller than or equal to 0.2, for example smaller than or equal to 0.1.

Advantageously, having a small normalized sphere values $Sph'_i$ along a central line allows that the modifying surface affects the initial design homogeneously around the central line.

According to the embodiments of the invention where the ophthalmic lens to be manufactured has micro-engravings, the central line is defined as the bisector of the segment formed by the micro-engravings as illustrated on FIG. 5.

According to the embodiments of the invention where the ophthalmic lens to be manufactured is a single vision ophthalmic lens and has no micro-engravings, the central line is defined as the straight line contained in the vertical plane when the ophthalmic lens is worn by the wearer positioned in primary gaze direction, and passing through the optical center of the ophthalmic lens to be manufactured.

According to an embodiment of the invention, for each of the selected modifying surface $Smod_i$ the area of the normalized modifying surface $SNmod_i$ having normalized sphere values $Sph'_i$ smaller than 0.2 represents less than 25%, for example less than 15%, of the total surface area, for example a disk of 60 mm diameter centered on the origin of the initial coordinate system of the normalized modifying surface $SNmod_i$.

Advantageously, having a small area of the normalized modifying surface $SNmod_i$ having normalized sphere values $Sph'_i$ smaller than 0.2 allows limiting the effect of the modifying surface to a local area of the initial design.

For each normalized modifying surface $SNmod_i$, one may define normalized cylinder values $Cyl'_{Smodi}$. The normalized cylinder values over the normalized modifying surface at a point $P_{ij}$ of $Smod_i$ having the coordinate (x,y,z) may be defined as:

$$Cyl'_{S\ mod\ i}(x, y) = \frac{\lfloor CylN_{S\ mod_i}(x, y, z) - \min(CylN_{S\ mod_i}) \rfloor}{[\max(CylN_{S\ mod_i}) - \min(CylN_{S\ mod_i})]},$$

with $CylN_{Smod,i}(x,y,z)$ being the cylinder over the normalized modifying surface $SNmod_i$ at the point $SNmod_i$ having the coordinate (x,y), $\max(CylN_{Smod,i})$ being the greatest value of sphere over the normalized modifying surface $SNmod_i$, and $\min(CylN_{Smodi})$ being the smallest value of sphere over the normalized modifying surface $SNmod_i$.

According to an embodiment of the invention, for each of the selected modifying surface $Smod_i$ the average value of the normalized cylinder $Cyl'_{Smodi}$ over the normalized modifying surface $SNmod_i$ is smaller than or equal to 0.35, for example smaller than or equal to 0.3.

Having an average value of the normalized cylinder $Cyl'_{Smodi}$ over the normalized modifying surface $SNmod_i$ smaller than or equal to 0.35 allows having a local effect of the modifying surface.

According to an embodiment of the invention, for each of the selected modifying surface $Smod_i$ the area of the normalized modifying surface $SNmod_i$ having a normalized cylinder values $Cyl'_{Smodi}$ greater than 0.6 represent less than 25%, for example less than 15%, of the total surface area of the normalized modifying surface $SNmod_i$.

Advantageously, having a small area of the normalized modifying surface $SNmod_i$ having a normalized cylinder values Cyl'$_{Smodi}$ greater than 0.6 represent less than 25% allows limiting the effect of the modifying surface to a local area of the initial design.

During the orientation step S3, the relative position and orientation of the first coordinate system and the second coordinate system is determined. Such position and orientation may be done for example by positioning and orienting the first and second coordinate system in a third common coordinate system.

Alternatively, the position and orientation may be done by positioning and orienting one of the first and second coordinate system in the other. For example the first coordinate system is positioned and oriented in the second coordinate system or vice versa. During the combining step S4, the initial surface Sini and the n modifying surfaces are combined to obtain a functionalized ophthalmic lens surface according to the expression: Sfunc=Sini+ $\Sigma_{i=1}^{i=n}$alpha$_i$·Smod$_i$·alpha$_i$ being a nonzero weighting coefficient.

Advantageously, by combining the initial surface with at least one of the selected modifying surface, the dioptric function of the initial surface is modulated by adding the dioptric function of the at least one selected modifying surface.

When the orientation step S3 is done by using a third common coordinate system, the combination may be an addition along an axis of said third coordinate system.

When the orientation step S3 is whiteout the use of a third common coordinate system, the combination may be linking the first and second coordinate system by a main axis along which the addition is carried out and the correspondence of at least a point of the first coordinate system with a point of the second coordinate system.

According to an embodiment of the invention, during the combining step (S4), a sphero-toric surface (ST) is further added to the initial surface Sini to obtain the functionalized ophthalmic lens surface. According to an embodiment, the sphero-toric surface is added in the sense of an addition along the direction perpendicular to the initial surface.

The method of the invention may further comprises a weighting coefficient determining step prior to the combining step during which the value of the weighting coefficient alpha$_i$ is determined based on a wearer parameter of the ophthalmic lens, for example based on the prescription of the wearer.

For example, the relative amplitudes of movements of eyes and head executed by the wearer may be considered. A method for measuring such relative amplitudes is disclosed in U.S. Pat. No. 8,142,017.

For example if the wearer has a tendency to move mostly his eyes, the weight applied to the modifying surfaces that broaden the near and far vision zones are increased, whereas if the wearer has a tendency to move mostly his head, the weight applied to the modifying surfaces that broaden the near and far vision zones may be reduced.

The activities of the wearer may further be considered when determining the weighting coefficients alpha$_i$. For example, a list of activity are provided to the wearer. The wearer selects among the list of activity the ones he most frequently carries out when using the ophthalmic lens.

For each activity listed one may affect a predetermined weighting coefficients between the near and far vision. Examples of activity and weighting coefficients are listed below:

golf: far vision coefficient: 0.25; near vision coefficient: 0;
sewing: far vision coefficient: 0; near vision coefficient: 0.33;
driving: far vision coefficient: 0.5; near vision coefficient: 0;
use of a smartphone: far vision coefficient: 0; near vision coefficient: 0.25;
watching TV: far vision coefficient: 0.25; near vision coefficient: 0.12.

To determine the weighting coefficients of the modifying surfaces broadening near vision and far vision zones, each weighting coefficient of the selected activity are added.

Advantageously, adapting the weighting coefficient to the wearer allows adjusting the effect of the or the plurality of modifying surface(s) combined with the initial surface during the combination step S4. For example, if the wearer spends most of his time on outside activities, a high weighting coefficient may be applied to a modifying surface which broadens the far vision zone. If the addition of the wearer is low, then a lower weighting coefficient may be applied to the modifying surfaces so as that the impact of the modifying surfaces is proportional to the optical power variations of the optical design.

According to embodiments of the invention wherein the ophthalmic lens comprising a far vision control point (FV) and a near vision control point (NV), the Sigma=$\Sigma_{i=1}^{i=n}$alpha$_i$·Smod$_i$ forms a surface gathering a plurality of surface points P2$_1$, ..., P2$_q$, each surface point P2$_j$ having a mean sphere Sph(P2$_j$) and a cylinder Cyl(P2$_j$), with q, j being integers, and 1≤j≤q, wherein for any surface points (P3) of the surface Sigma located in a vicinity of the far vision control point (FVP), the mean sphere and the cylinder are such that Sph(P3)<0.12 and Cyl(P3)<0.12.

Advantageously, having the mean sphere and the cylinder such that Sph(P3)<0.12 and Cyl(P3)<0.12 allows limiting the effect of the modifying surface on the initial surface, in particular on the prescription of the modifying surface.

In the sense of the invention the vicinity is defined as points comprised within a circle centered on the control point having a diameter equal to 4 mm.

Furthermore, according to an embodiment, to any wherein for any surface points (P4) of the surface Sigma located in a vicinity of the near control point (NVP), the mean sphere and the cylinder are such that Sph(P3)<0.12 and Cyl(P3)<0.12.

Figure 8:
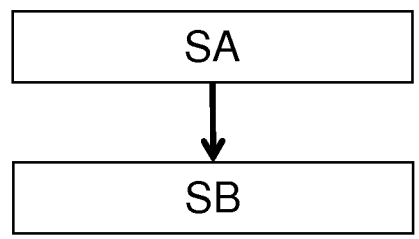
FIG. 8 is a flowchart of different steps of a method of manufacturing a ophthalmic lens according to an embodiment of the invention.

As illustrated on FIG. 8, the invention further relates to a method of manufacturing an ophthalmic lens comprising at least:

an ophthalmic lens determining step SA, and
a machining step SB.

During the ophthalmic lens determining step SA, the surfaces of the ophthalmic lens and relative positions of the ophthalmic lens are determined. The dioptric function of at least one of the ophthalmic lens surfaces is modified according to the method of the invention.

During the machining step SB the ophthalmic lens is manufactured. The ophthalmic lens may be manufactured using any known manufacturing technique.

Figure 9A:
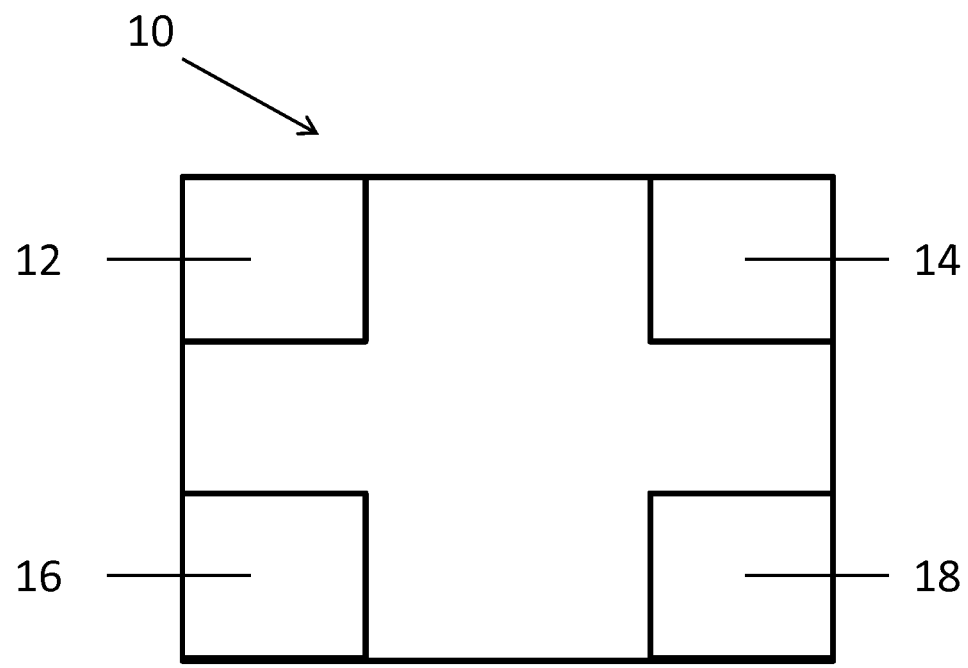
FIGS. 9a and 9b are schematic representations of calculating device according to an embodiment of the invention.

The invention further relates to an ophthalmic lens calculating device adapted to implement a method according to the invention. As illustrated on FIG. 9, the calculating device 10 comprises at least:

an order request receiving mean 12
an initial surface determining mean 14,
a modifying surface providing mean 16, and
a calculation mean 18.

The order request receiving mean 12 is adapted to receive an ophthalmic lens order request comprising at least the wearer's ophthalmic prescription and at least one additional function to add to said ophthalmic lens.

The additional function may be selected in the list consisting of:
broadening the optical design,
modifying the inset,
broadening near vision zone,
Softening the optical design,
Modifying (reducing or increasing) the length of progression,
broadening the far vision zone,
adapting the design to the spectacle frame design,
broadening intermediate vision, and
reducing the maximum of cylinder.

The initial surface determining mean 14 is adapted to determine the initial surface Sini and relative positions of an ophthalmic lens based on the order request.

The modifying surface providing mean 16 is adapted to provide at least one modifying surface Smod$_i$ and at least one nonzero weighting coefficient alpha$_i$ corresponding to the at least one desired additional function to add to said ophthalmic lens.

The calculation mean 18 is adapted to combine the initial surface Sini and the at least one modifying surface Smod$_i$.

The calculating mean 18 may also be adapted to determine the relative position and orientation of the first coordinate system associated with the initial surface and the second coordinate system associated with the at least one modifying surface.

Figure 9B:
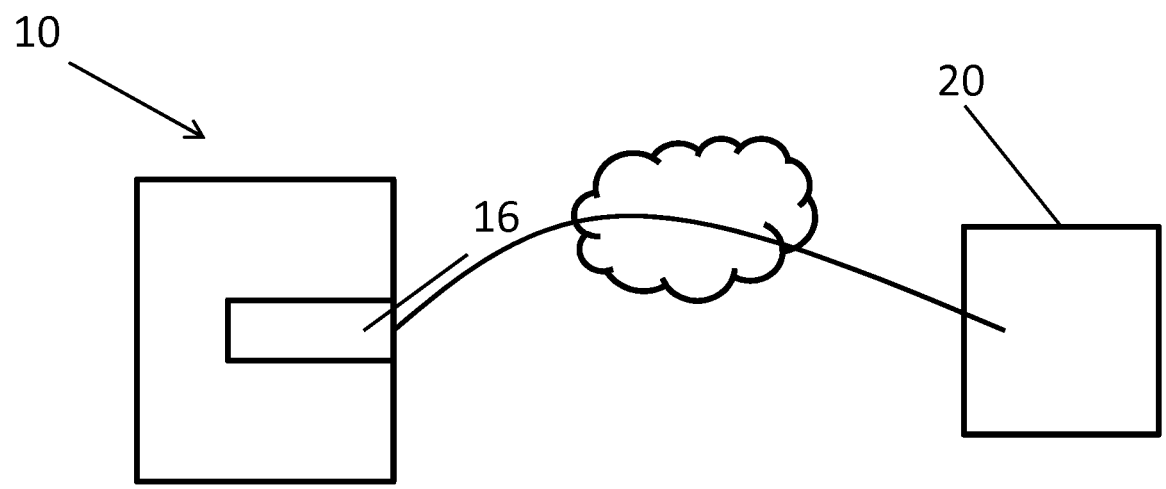

According to an embodiment of the invention illustrated on FIG. 9b, the calculating device 10 may further comprise communication mean 19 adapted to communicate with at least one distant entity 20, for example over an intranet or the internet, to provide the modifying surface Smod$_i$ and/or the corresponding weighting coefficient alpha$_i$.

The Examples that follow give several examples of modifying surfaces and the effect of the combination of the modifying surface on an initial surface.

Example 1: Lateralization

The modifying surface according to example 1, is intended to broaden the optical design on one side of the ophthalmic lens. Typically, the side of the optical lens used the most when reading is broaden. For a right-handed wearer, this means broadening the optical design on the nasal side of the left ophthalmic lens.

The inventors have developed a modifying surface to be applied to a left initial surface for a right-handed wearer.

Figure 10A:
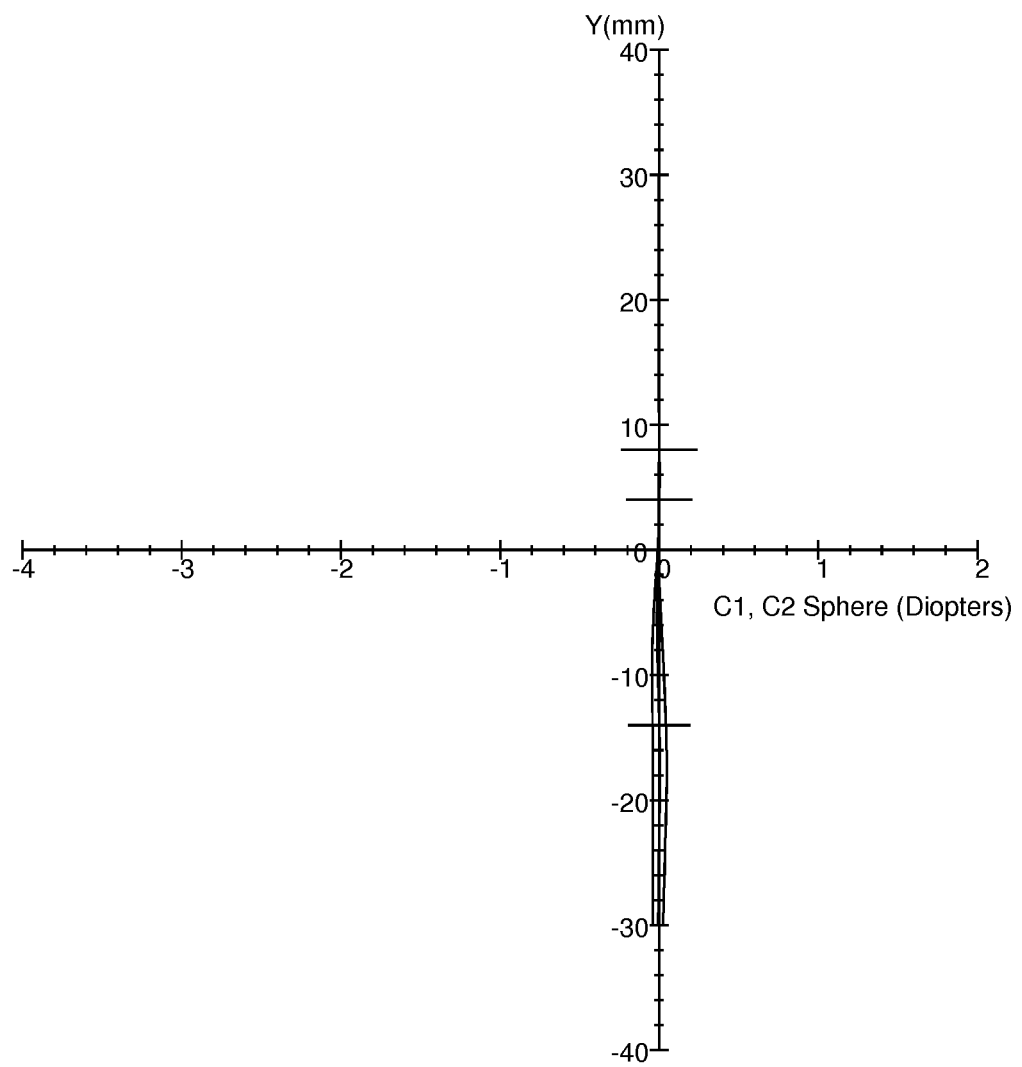
FIGS. 10 to 36 illustrate examples of implementation of the method according to an embodiment of the invention.
Figure 10B:
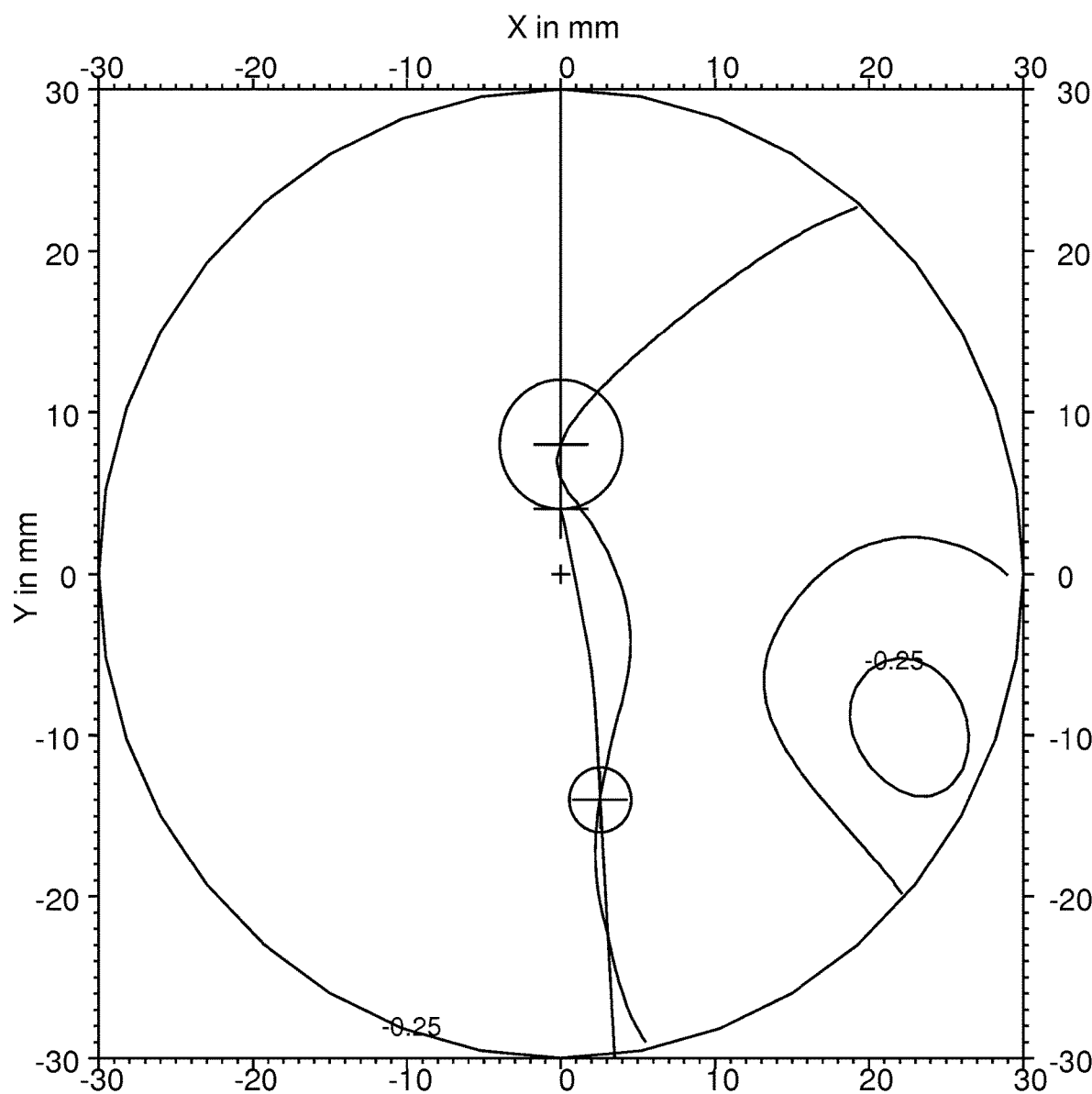
Figure 10C:
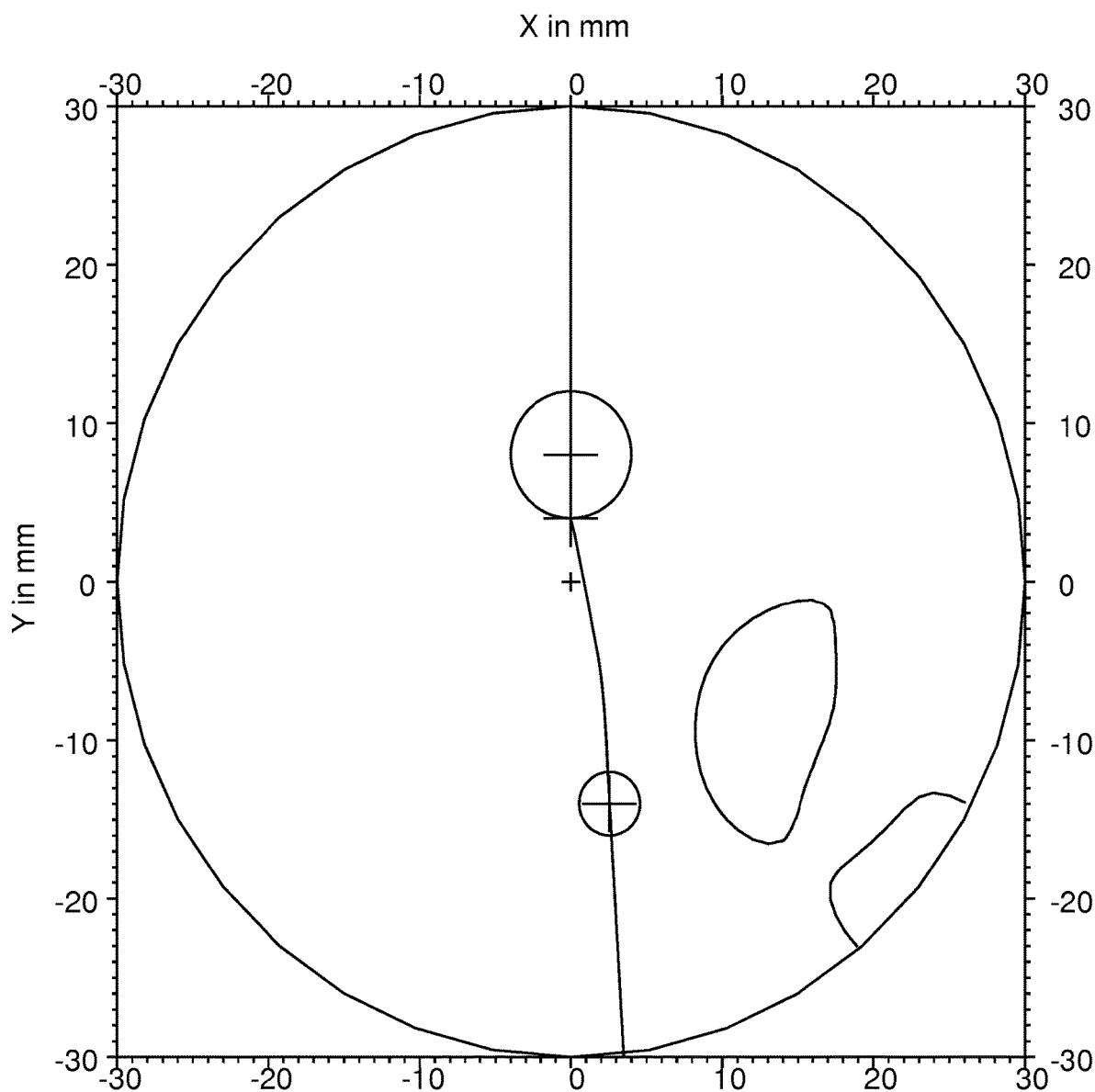

FIGS. 10a to 10c show features of the surfaces of such a modifying surface.

FIG. 10a shows mean sphere curve surrounded by minimum and maximum sphere curves, along the meridian. The x-axes are graduated in diopters, and the y-axes give the height, in mm, on the lens.

FIG. 10b shows lines of equal mean sphere, i.e. lines formed by points for which the mean sphere has an identical value. The x-axis and y-axis give the coordinates in mm.

FIG. 10c shows, using the same axes as for FIG. 10b, lines of equal cylinder.

Figure 10D:
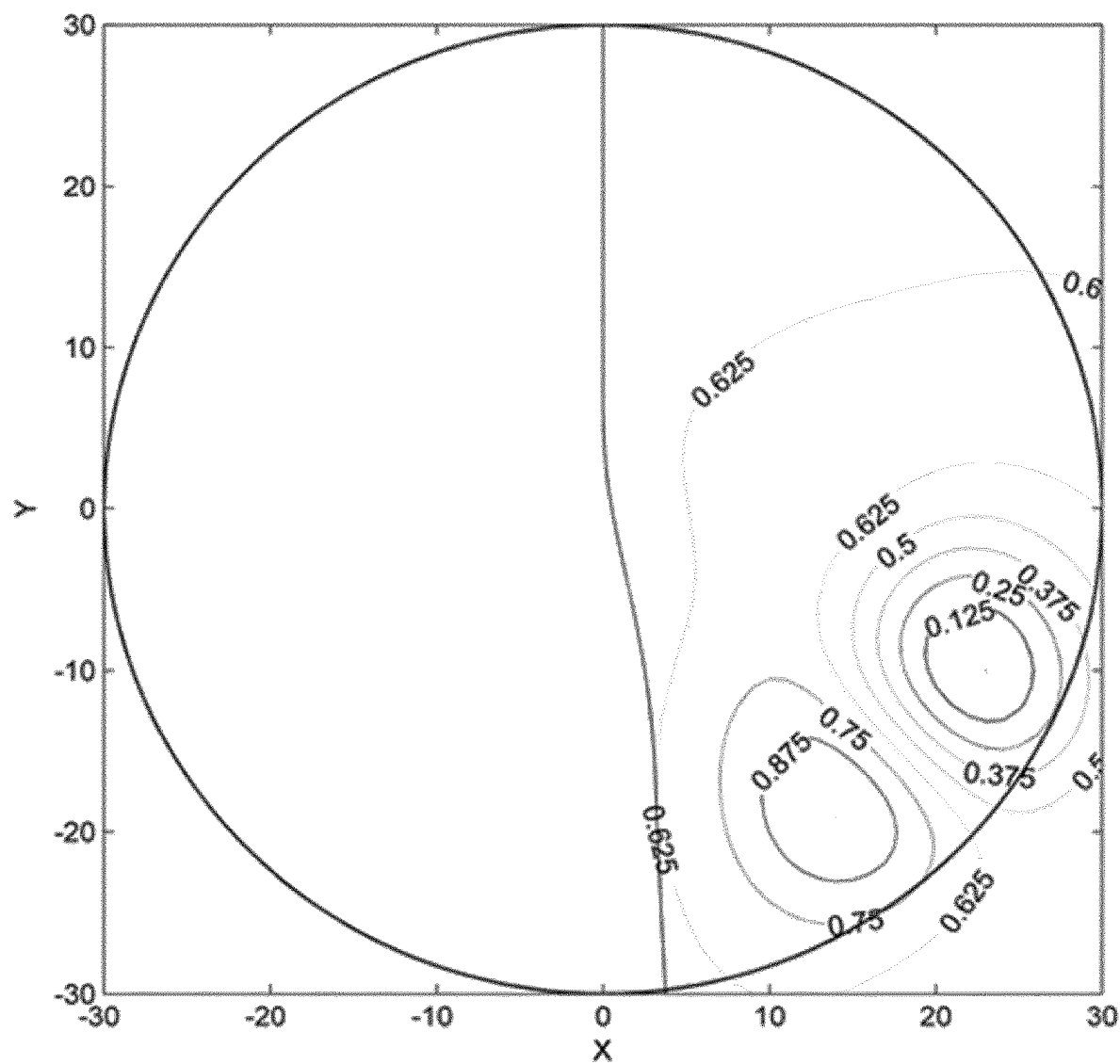
Figure 10E:
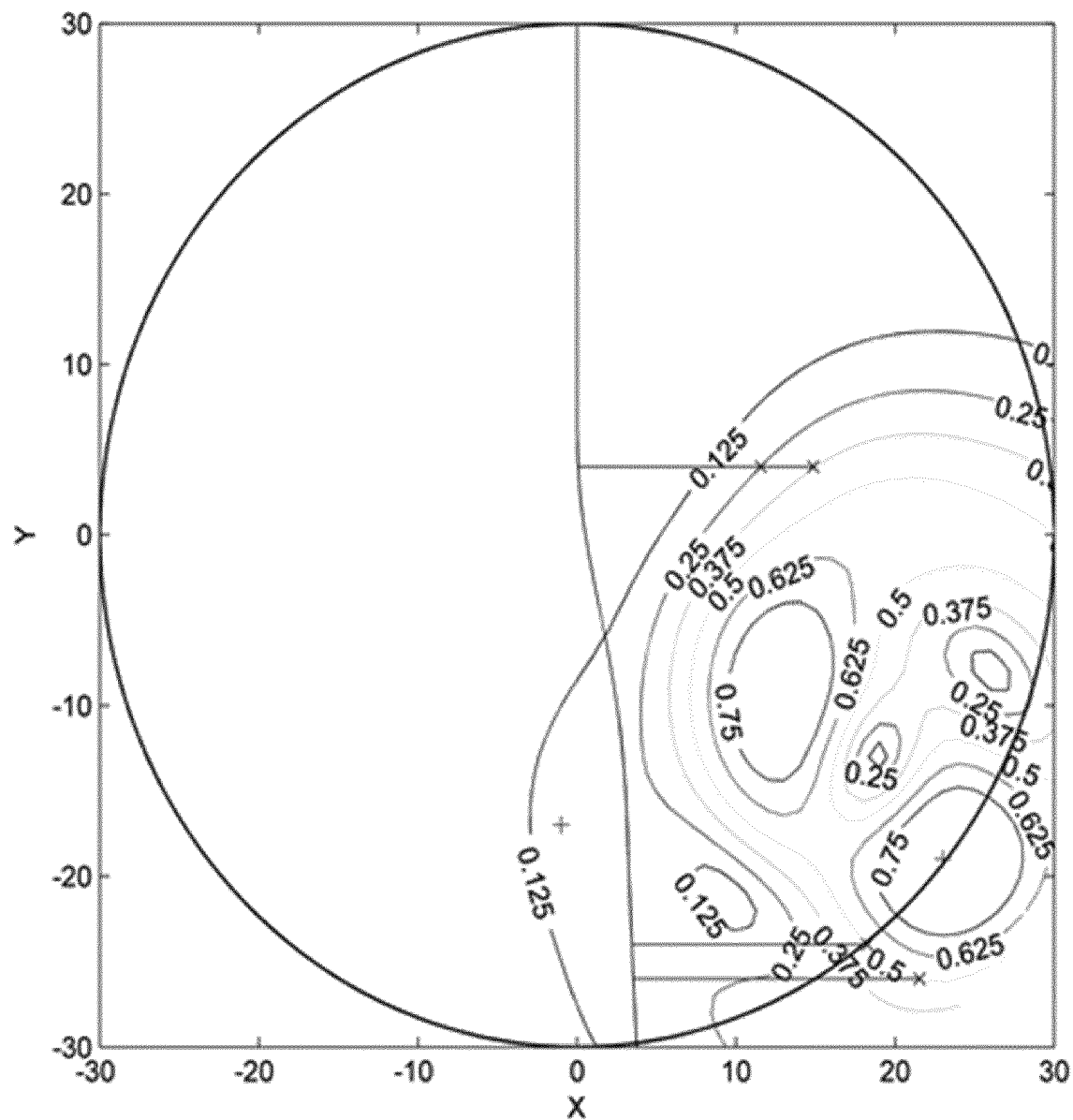

FIGS. 10d and 10e shows the normalized modifying surface SNmod corresponding to the modifying surface illustrated on FIGS. 10a to 10c.

FIG. 10d shows lines of equal mean sphere and FIG. 10e shows lines of equal cylinder, both using the same axes as for FIG. 10b.

Figure 11A:
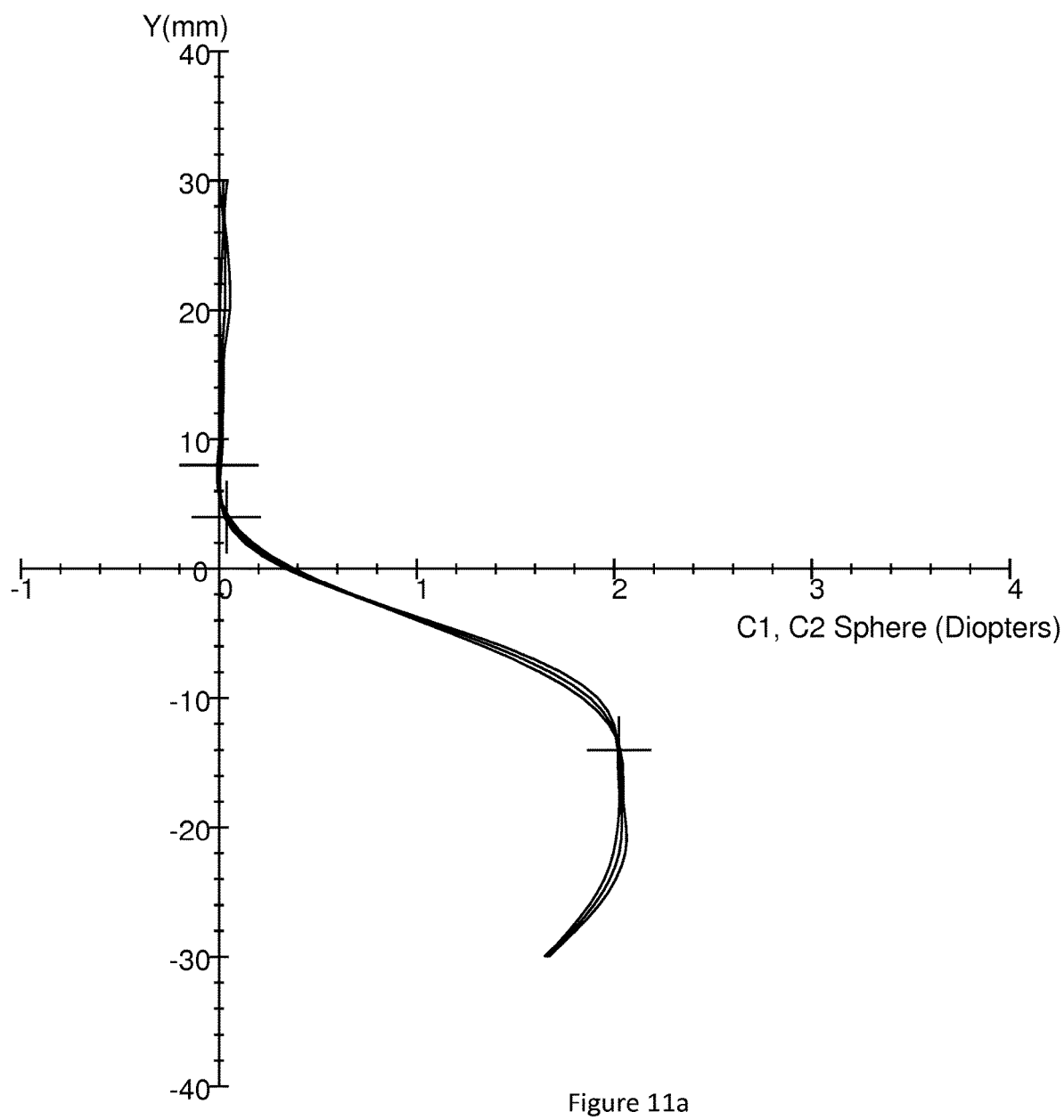
Figure 11B:
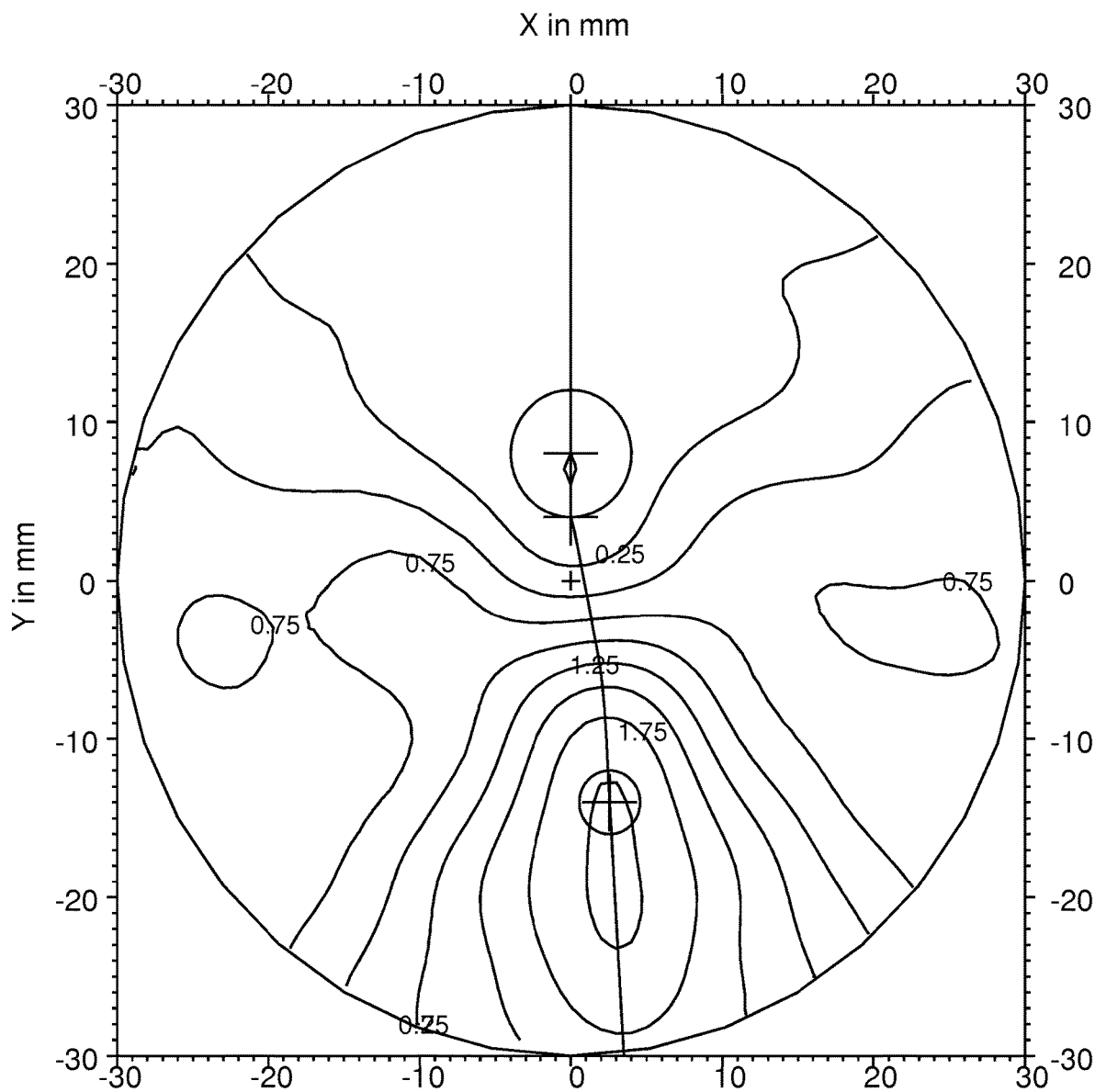
Figure 11C:
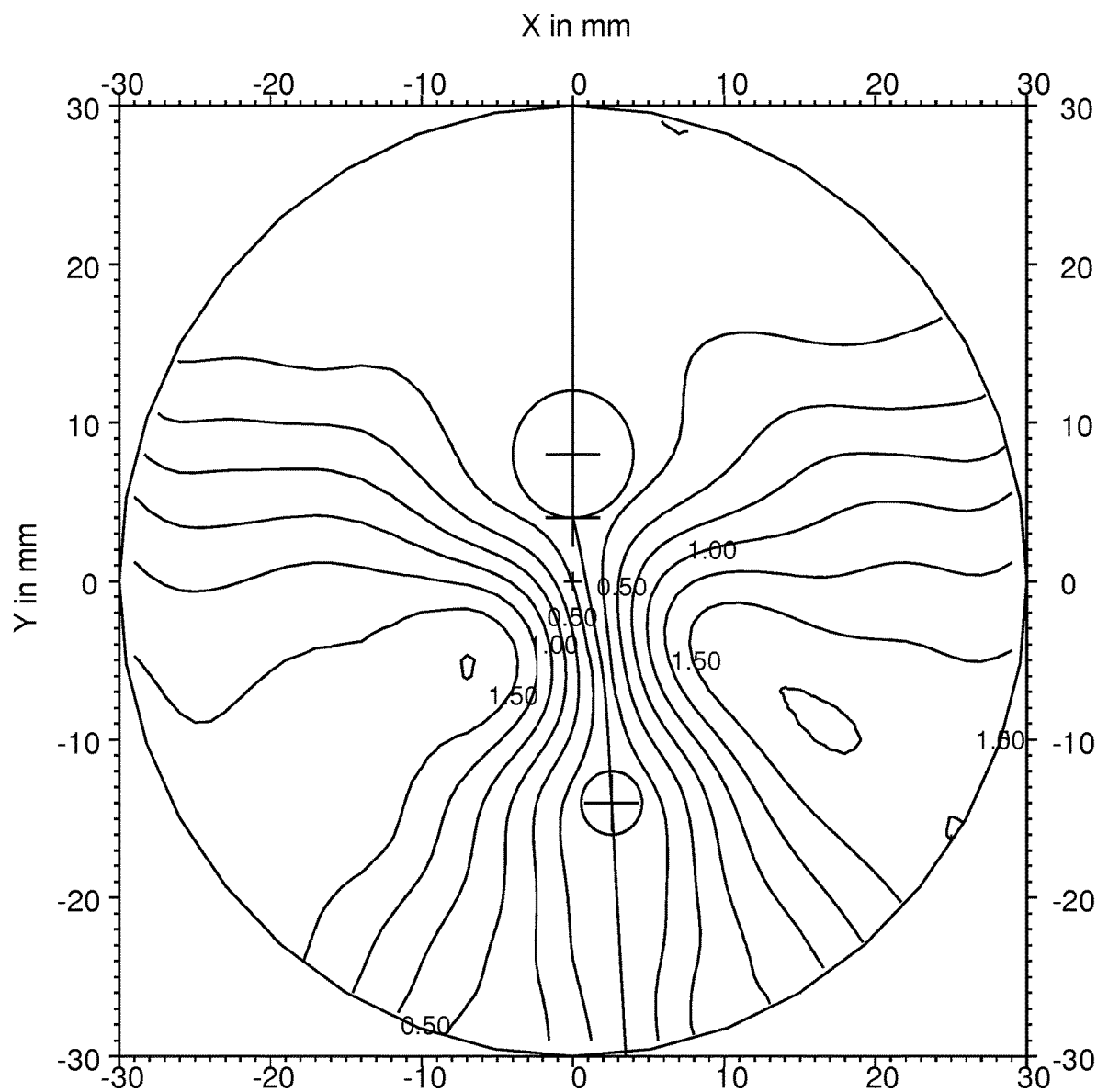

FIGS. 11a to 11c show the features of the surfaces of an initial surface of an progressive ophthalmic lens configured for a presbyopia wearer with an addition of 2 diopters.

FIG. 11a shows mean sphere curve surrounded by minimum and maximum sphere curves, along the meridian. The x-axes are graduated in diopters, and the y-axes give the height, in mm, on the lens.

FIG. 11b shows lines of equal mean sphere, i.e. lines formed by points for which the mean sphere has an identical value. The x-axis and y-axis give the height, in mm respectively along the horizontal and vertical directions.

FIG. 11c shows, using the same axes as for FIG. 11b, lines of equal cylinder.

Figure 12A:
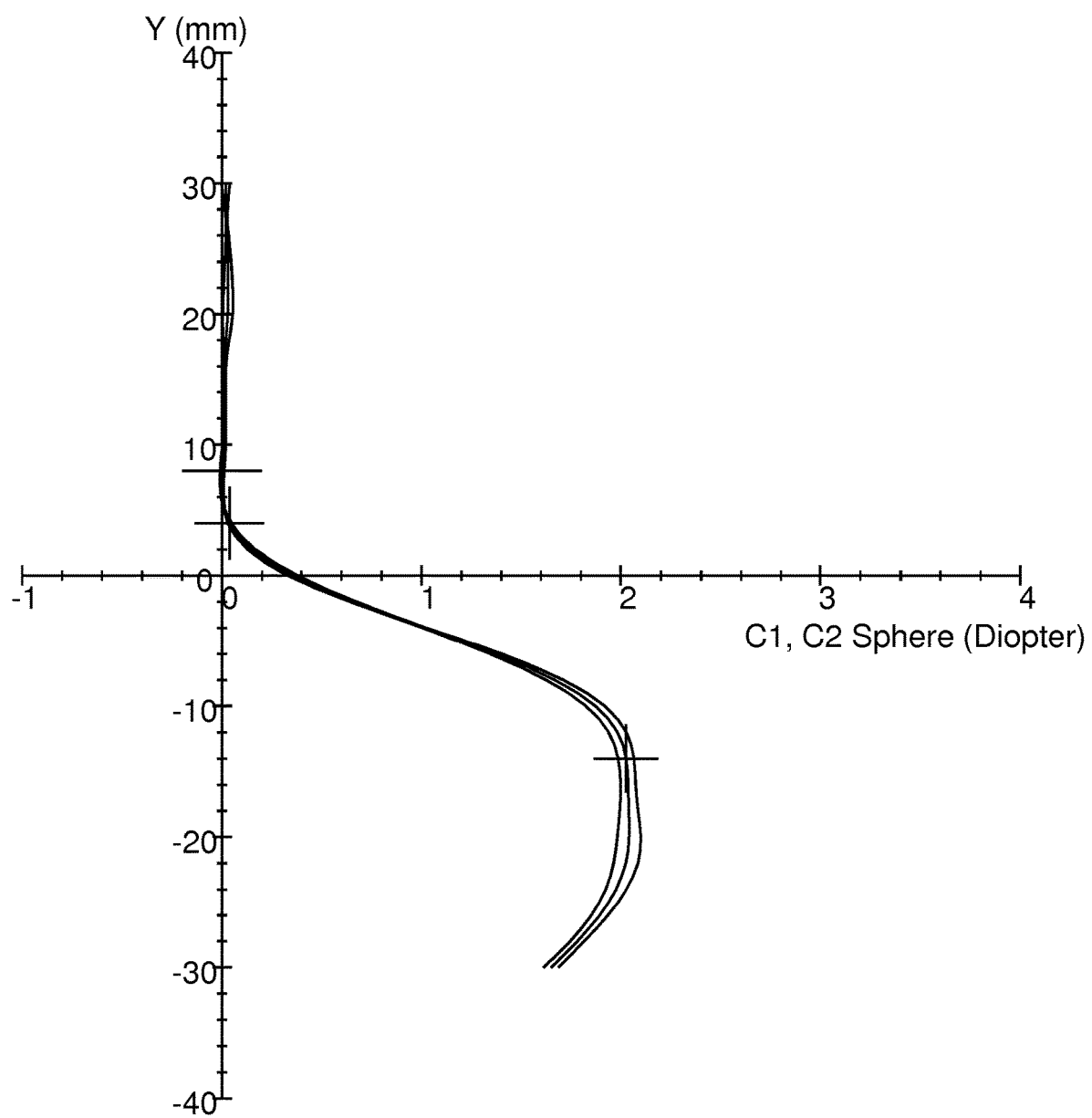
Figure 12B:
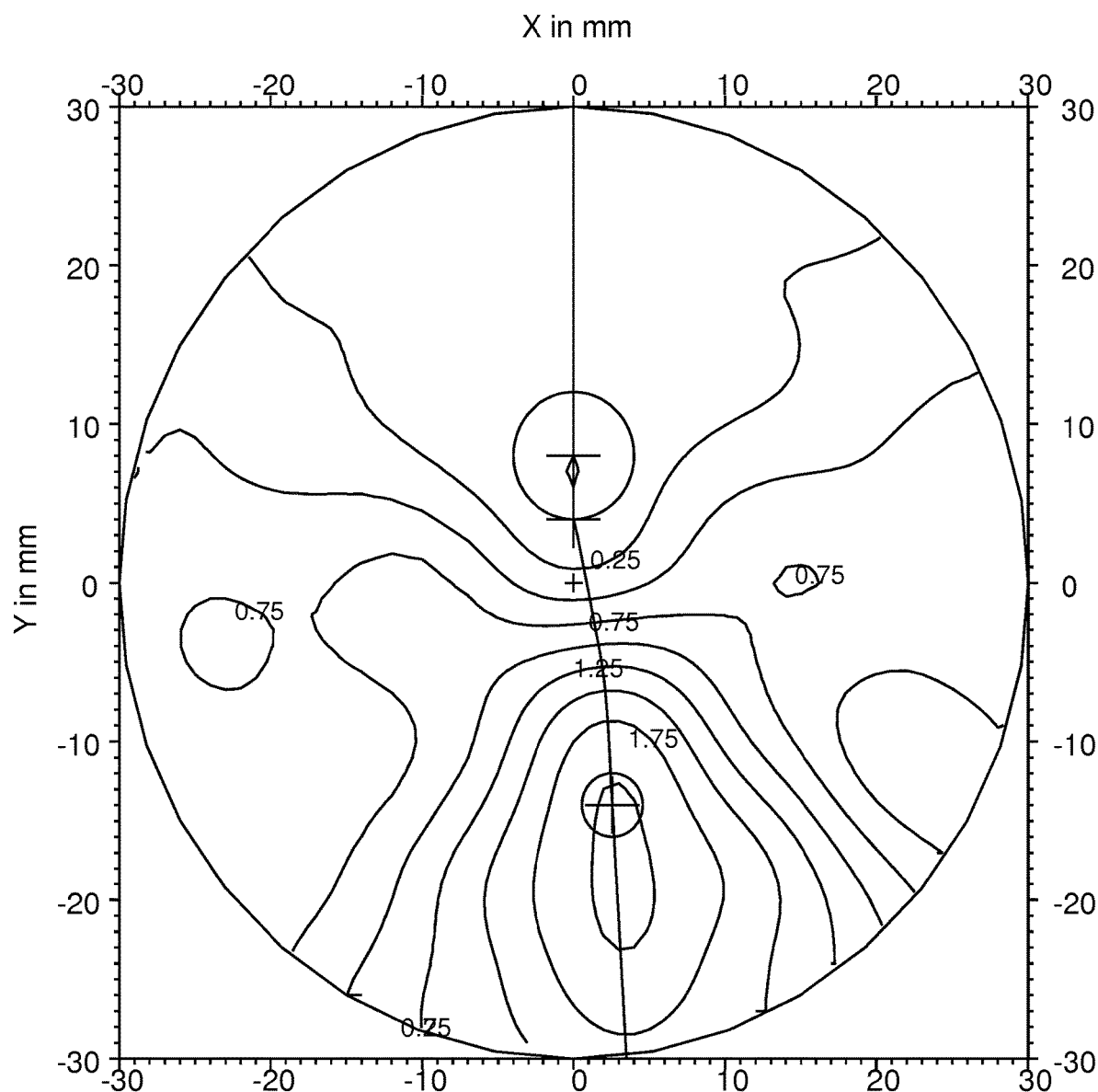
Figure 12C:
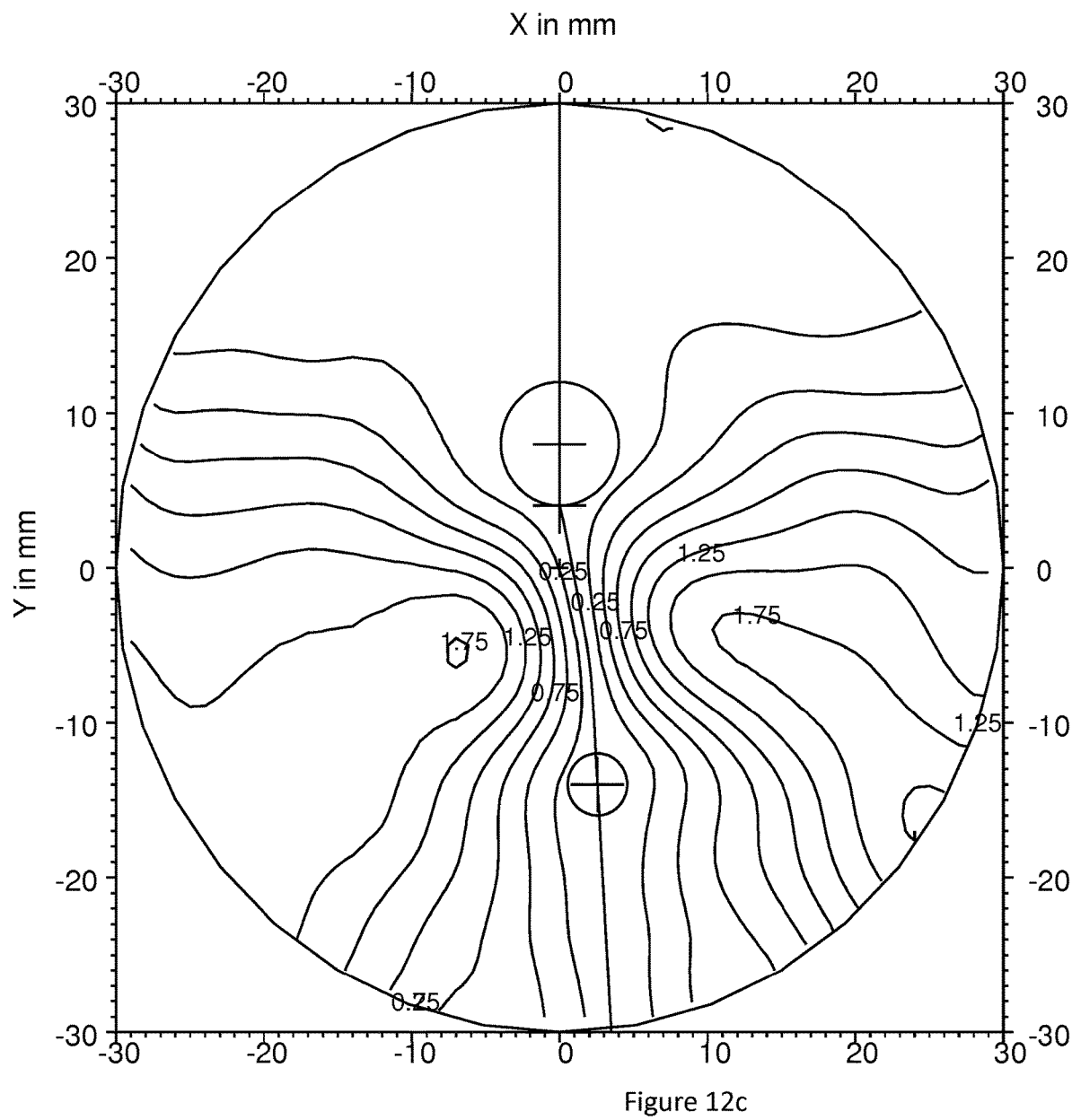

FIGS. 12a to 12c show the features of the surface of the optical surface obtained by combining the modifying surface shown on FIGS. 10a to 10c with the initial surface shown on FIGS. 11a to 11c.

FIG. 12a shows mean sphere curve surrounded by minimum and maximum sphere curves, along the meridian. The x-axes are graduated in diopters, and the y-axes give the height, in mm, on the lens.

FIG. 12b shows lines of equal mean sphere, i.e. lines formed by points for which the mean sphere has an identical value.

The x-axes are graduated in diopters, and the y-axes give the height, in mm, on the lens.

FIG. 12c shows, using the same axes as for FIG. 12b, lines of equal cylinder.

As observed when comparing the optical features of the initial surface and of the modified optical surface, the mean sphere and cylinder distribution has only been broaden in a region on the nasal side of the near vision control point without being changed in the other areas.

Thus by combining the modifying surface illustrated in FIGS. 10a to 10c with the initial surface, one may add a lateralization feature to the optical design of the initial surface without having to go through a new optical optimization.

Example 2: Inset

The modifying surface according to example 2, is intended to modify the inset of the initial optical design. The inventors have developed a modifying surface to be applied to the rear surface of an optimized multifocal ophthalmic lens so as to shift the design in near vision (near vision inset modification) without modifying the rest of the mean power and astigmatism distribution.

Figure 13A:
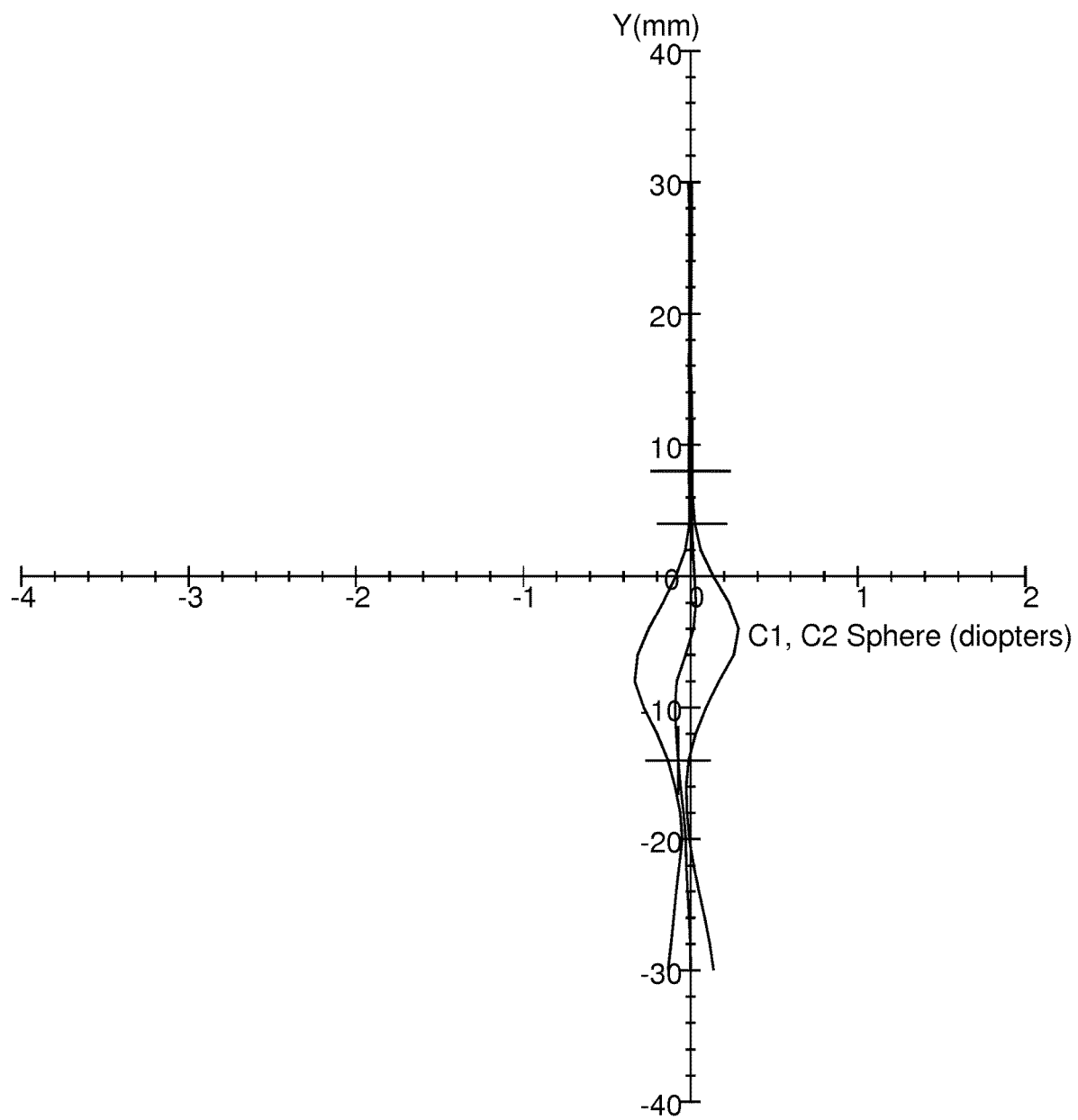
Figure 13B:
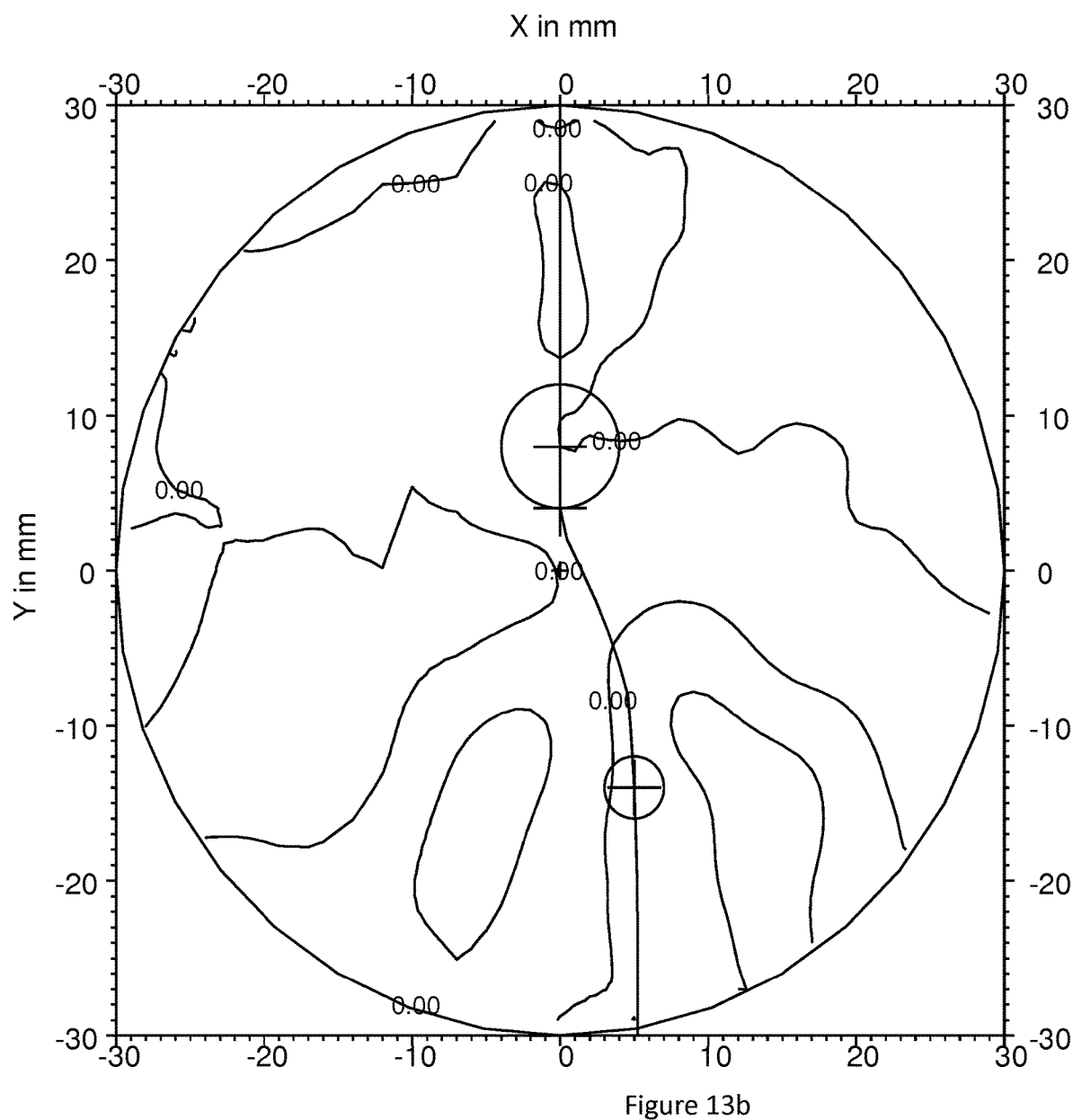
Figure 13C:
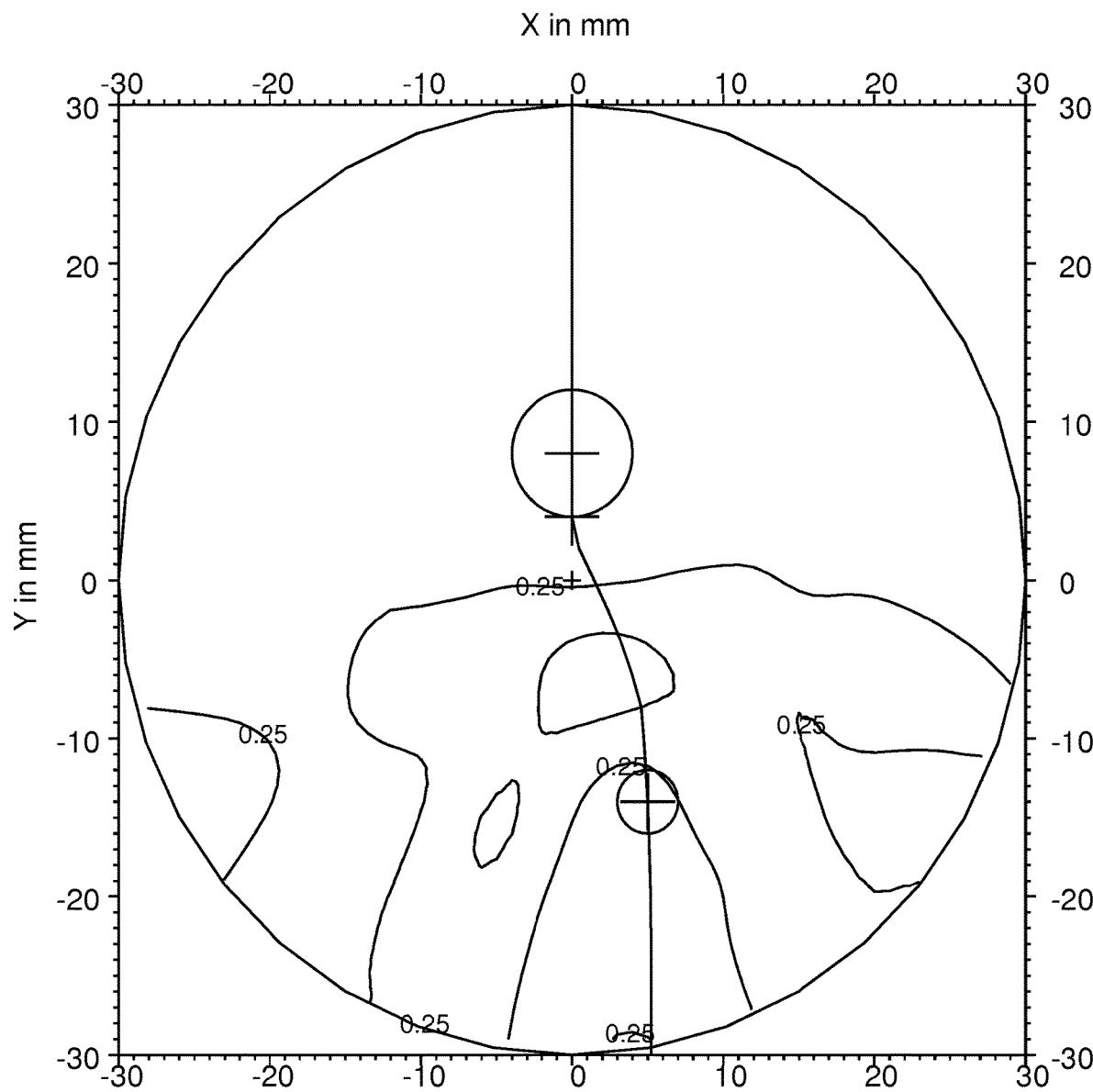

FIGS. 13a to 13c show features of the surface of such a modifying surface adapted to modify an inset from 2.5 mm to 5 mm.

FIG. 13a shows refractive power along the meridian. The x-axes are graduated in diopters, and the y-axes give the height, in degrees, on the lens.

FIG. 13b shows lines of equal mean sphere, i.e. lines formed by points for which the mean sphere has an identical value. The x-axis and y-axis give the height, in mm respectively along the horizontal and vertical directions. FIG. 13c shows, using the same axes as for FIG. 13b, lines of equal cylinder.

Figure 13D:
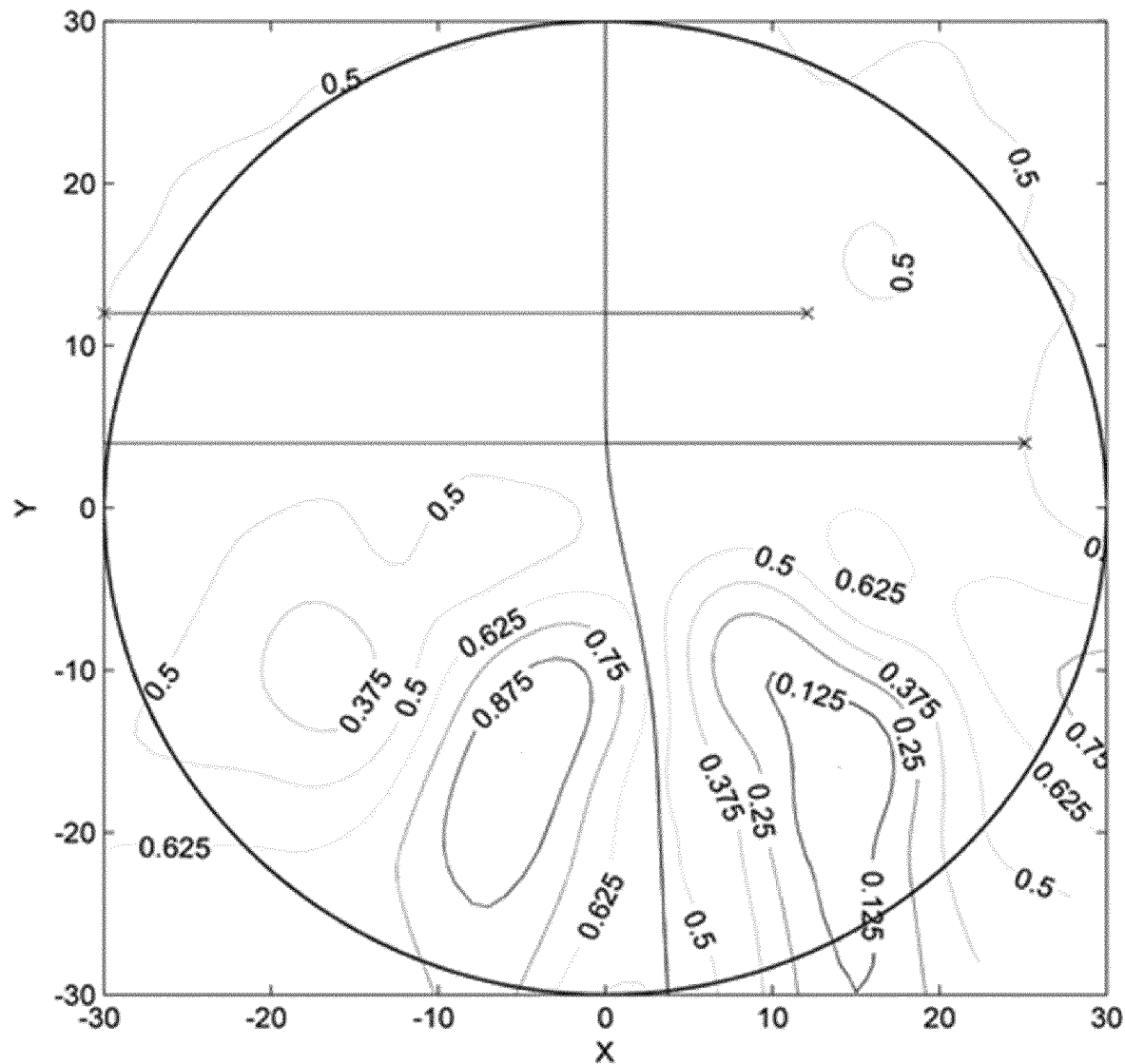
Figure 13E:
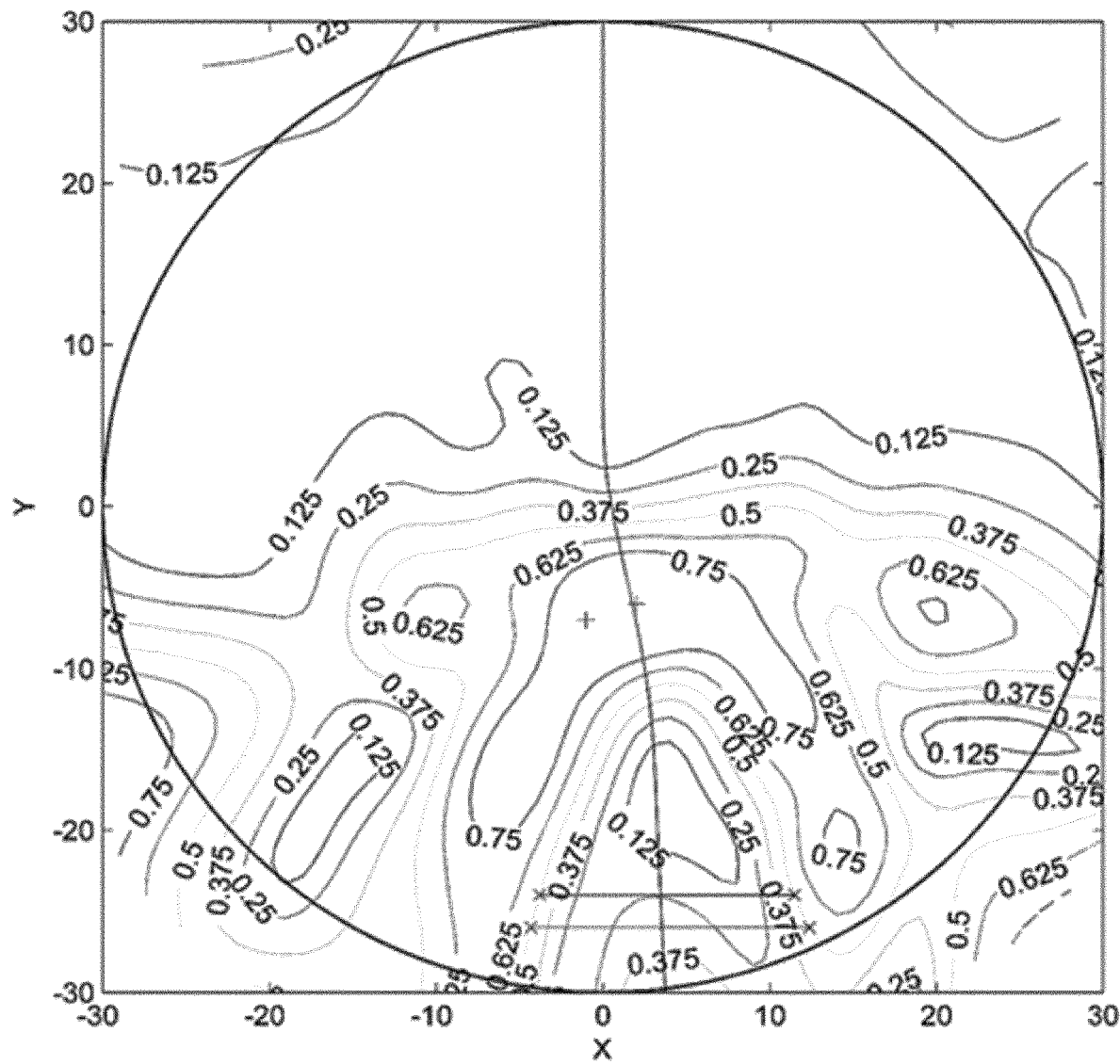

FIGS. 13d and 13e shows the normalized modifying surface SNmod corresponding to the modifying surface illustrated on FIGS. 13a to 13c. FIG. 13d shows lines of equal mean sphere and FIG. 13e shows lines of equal cylinder, both using the same axes as for FIG. 13b.

Figure 14A:
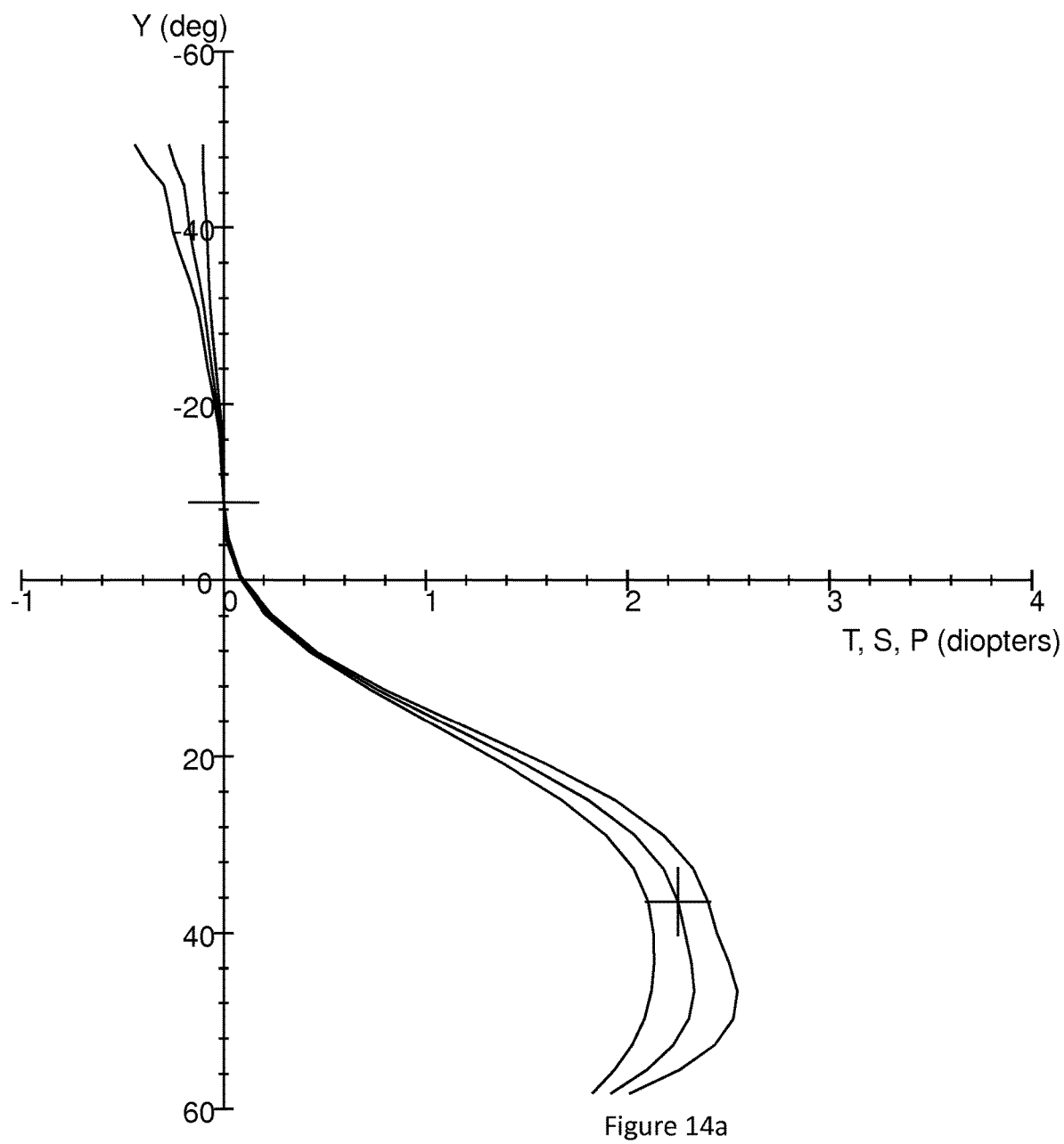
Figure 14B:
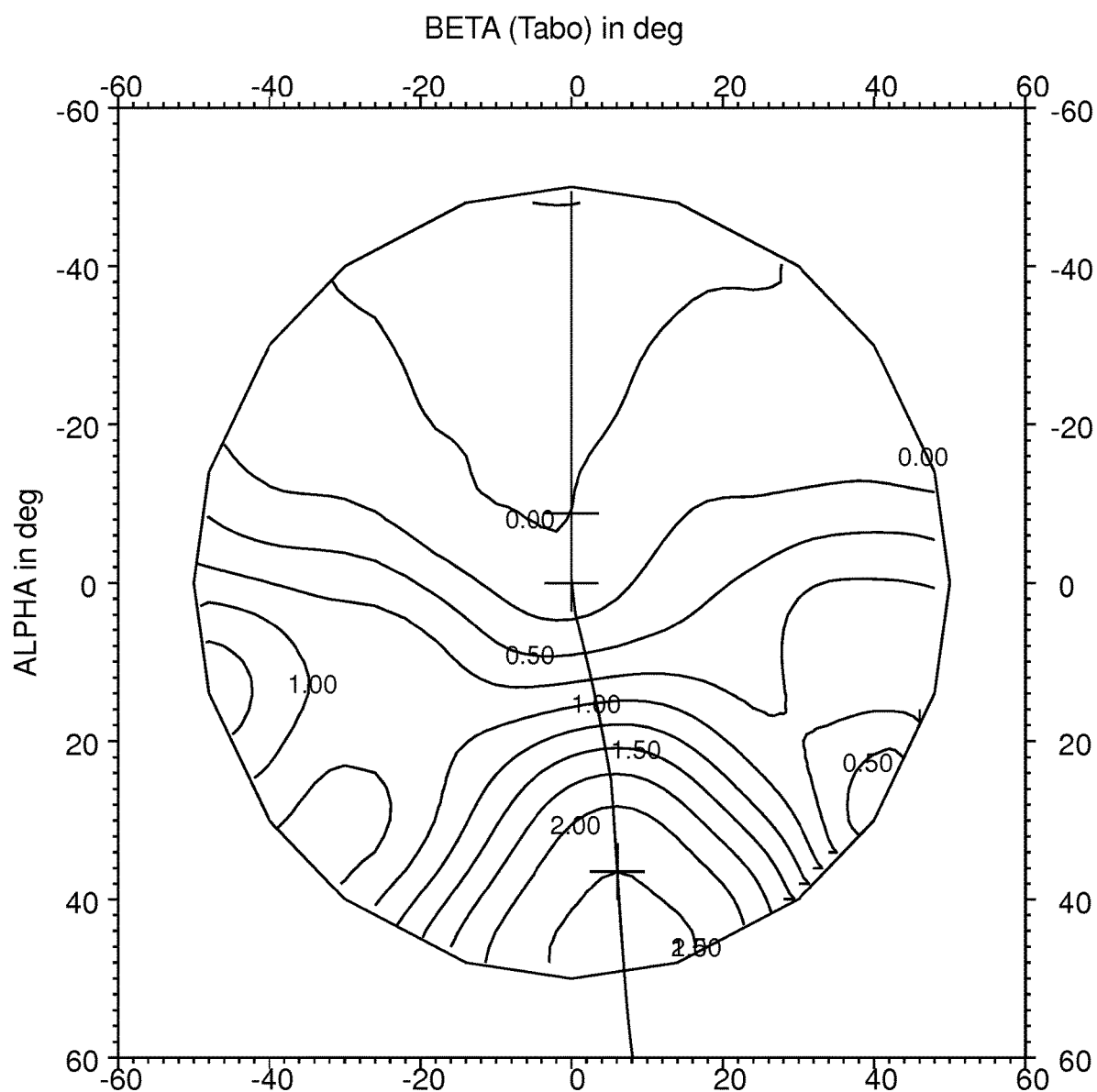
Figure 14C:
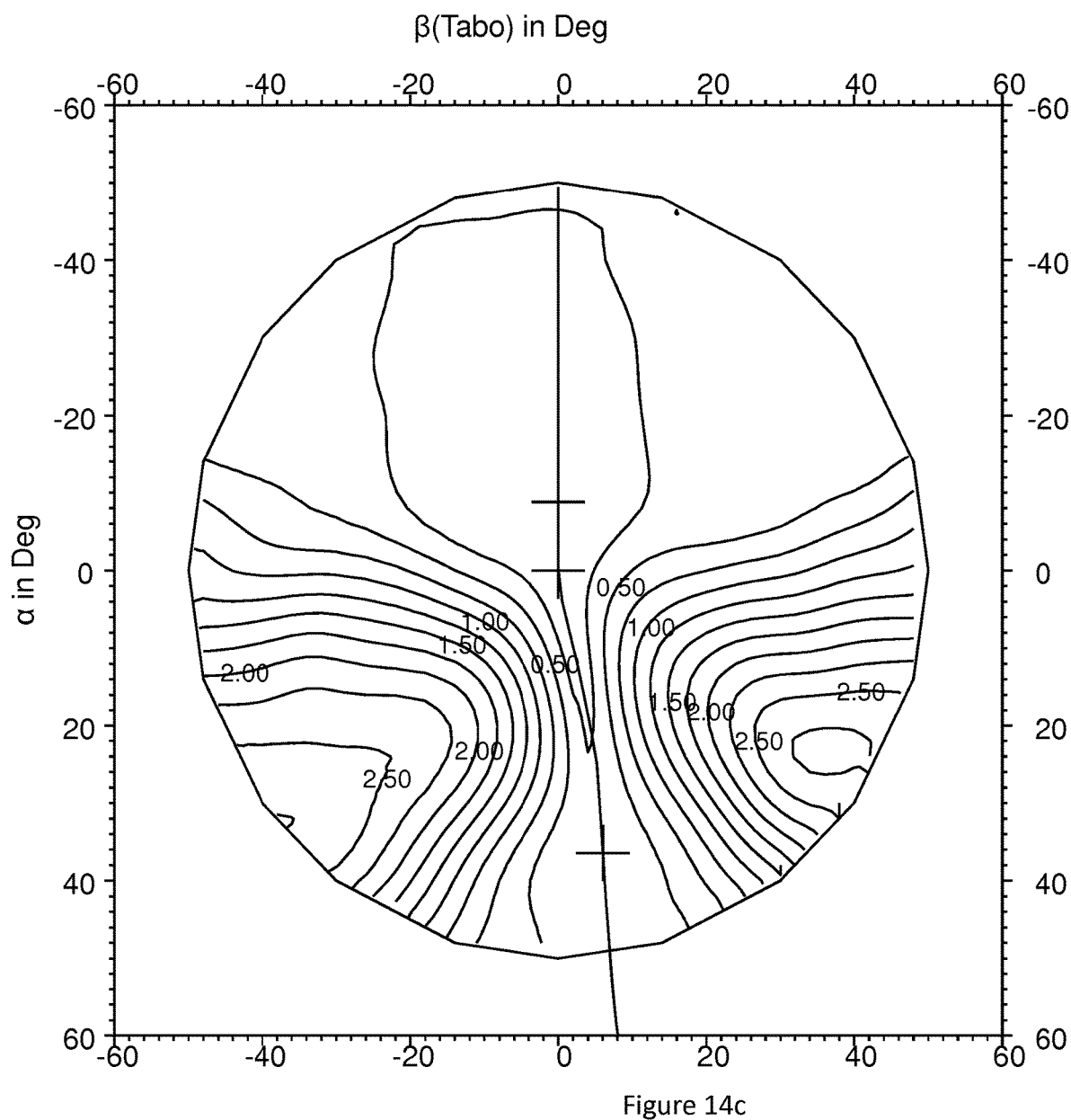

FIGS. 14a to 14c show the optical features of an initial progressive lens configured for a wearer having a plane prescription with an addition of 2 diopters with an inset of 2.5 mm, i.e. 5°.

FIG. 14a shows refractive power along the meridian. The x-axes are graduated in diopters, and the y-axes give the height, in degrees.

FIG. 14b shows lines of equal power, i.e. lines formed by points for which power has an identical value. The x-axis and y-axis respectively give the angles [α] and [β].

FIG. 14c shows, using the same axes, lines of equal astigmatism.

Figure 15A:
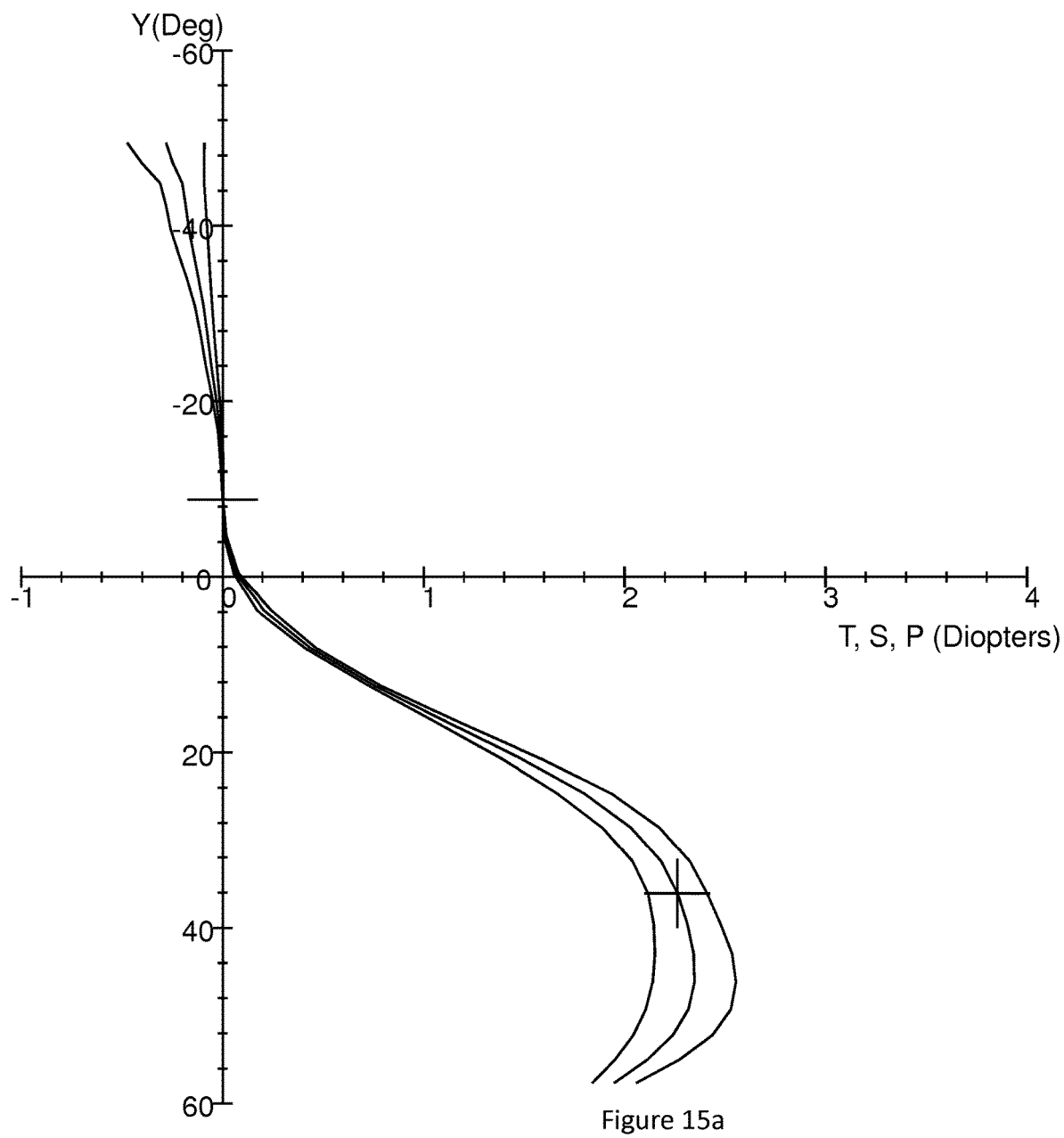
Figure 15B:
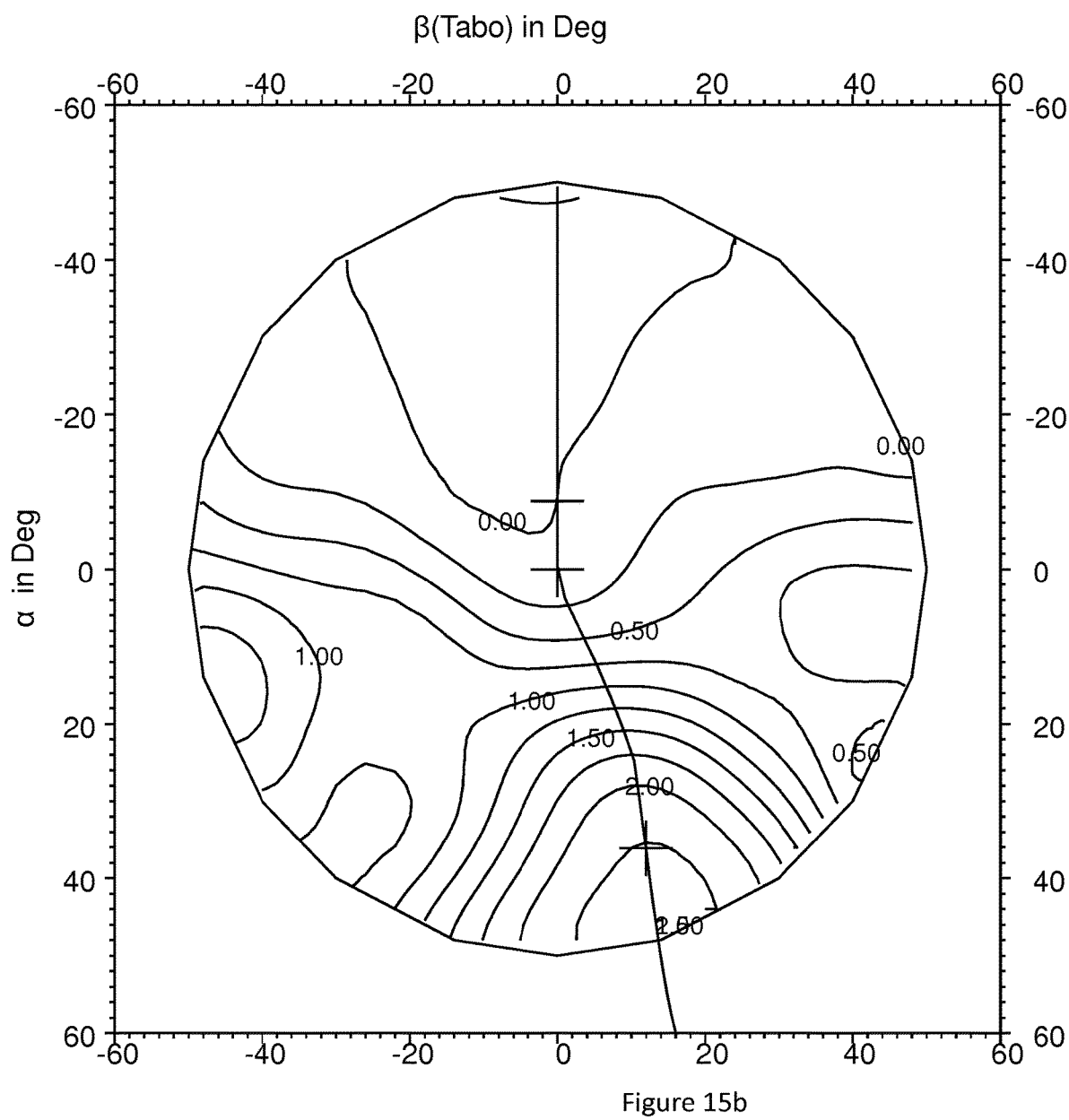
Figure 15C:
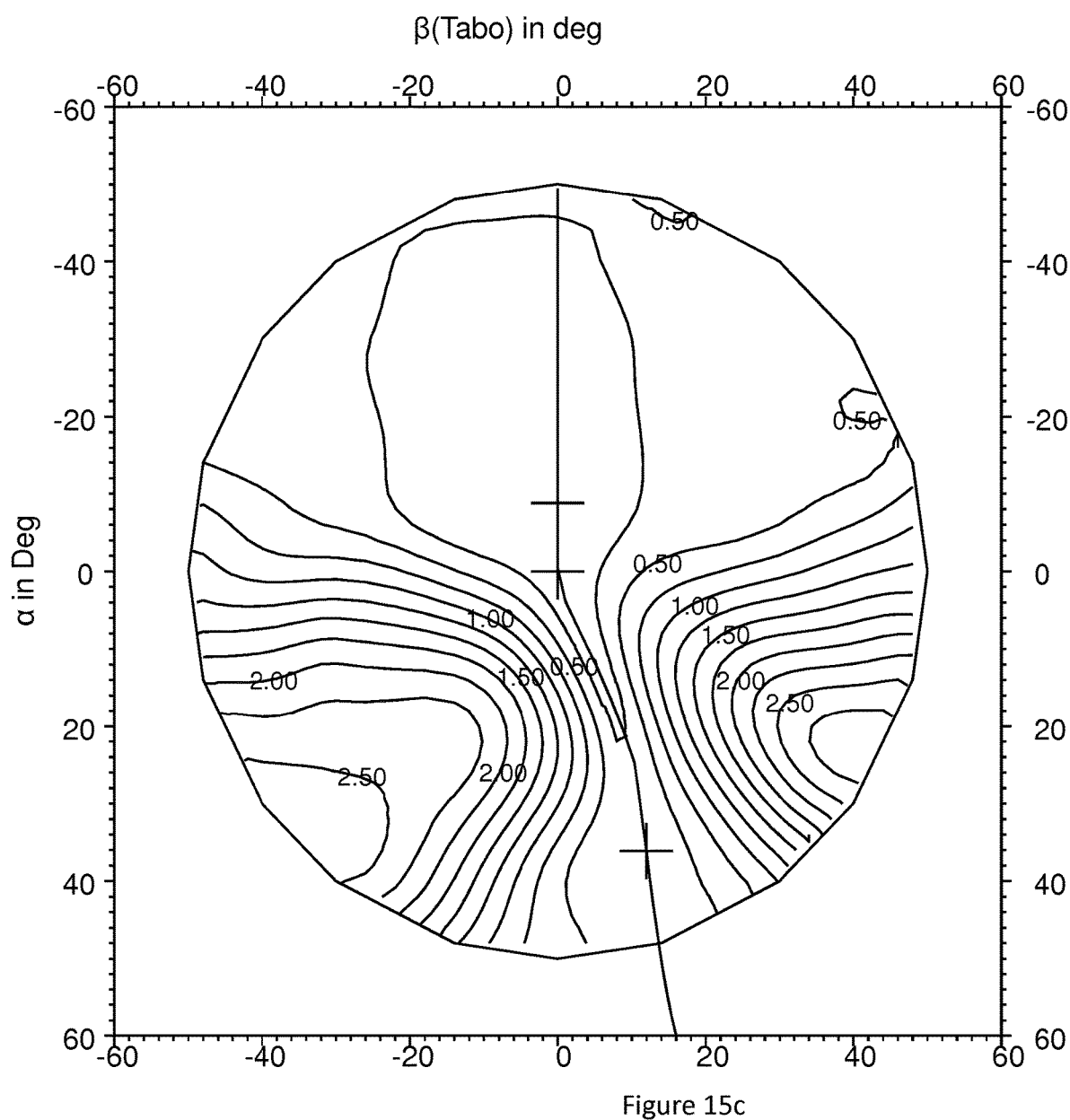

FIGS. 15a to 15c show the optical features of the optical lens obtained by combining the modifying surface shown on FIGS. 13a to 13c with the initial front surface of the lens shown on FIGS. 14a to 14c.

FIG. 15a shows refractive power along the meridian. The x-axes are graduated in diopters, and the y-axes give the height, in degrees, on the lens.

FIG. 15b shows lines of equal power, i.e. lines formed by points for which power has an identical value. The x-axis and y-axis respectively give the angles [α] and [β].

FIG. 15c shows, using the same axes, lines of equal astigmatism.

As illustrated on FIGS. 15a to 15c modified optical surface has an inset of 5 mm and a power and astigmatism distribution close to the one of the initial surface.

Example 3: Broadening Near Vision Zone

The modifying surface according to example 3, is intended to broaden the near vision zone of an initial multifocal ophthalmic lens design.

The inventors have developed a modifying surface to be applied to one of the surfaces of an optimized multifocal ophthalmic lens, for example the front face surface, so as to broaden the near vision zone without modifying the rest of the mean sphere and cylinder distribution.

Figure 16A:
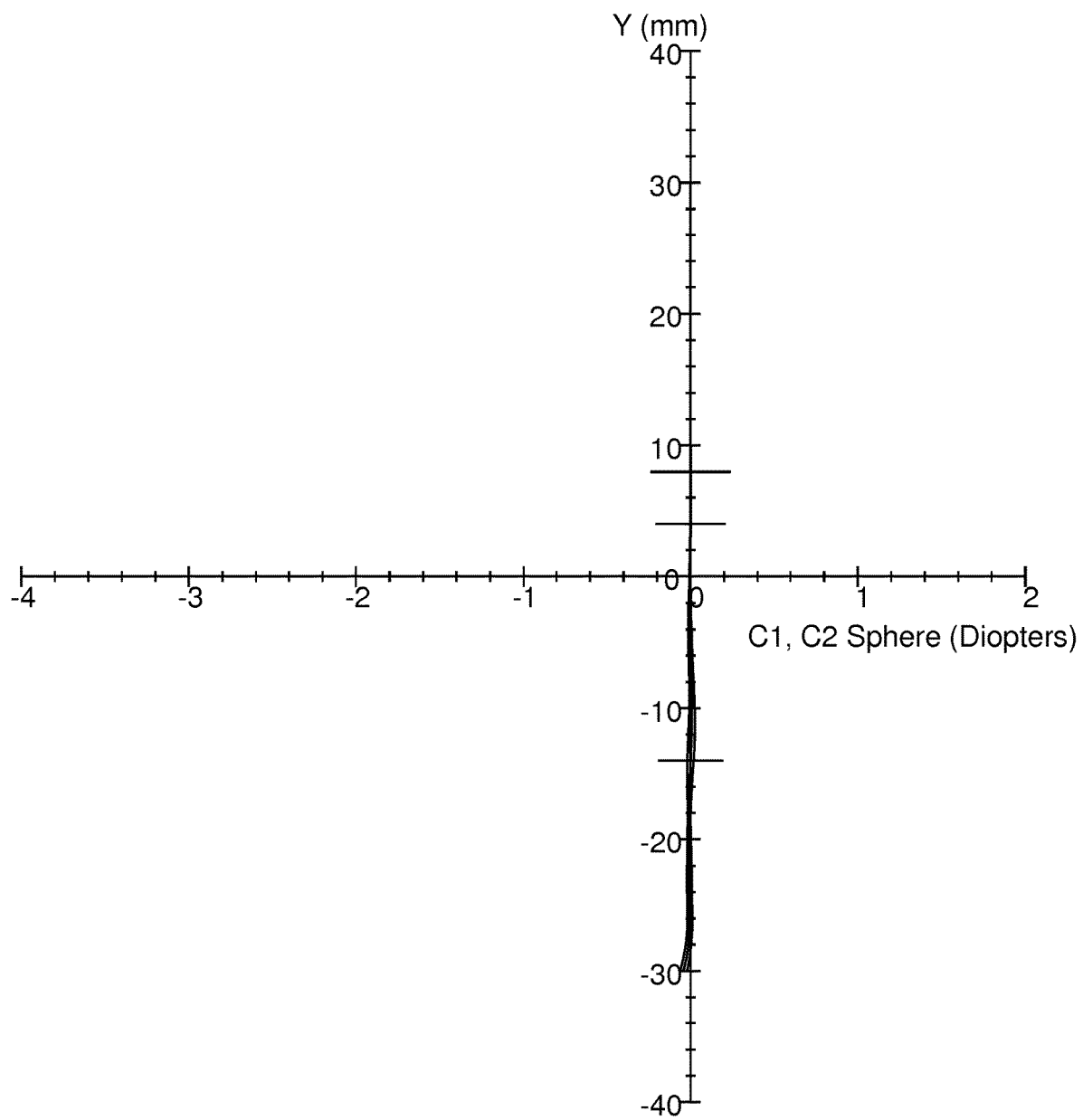
Figure 16B:
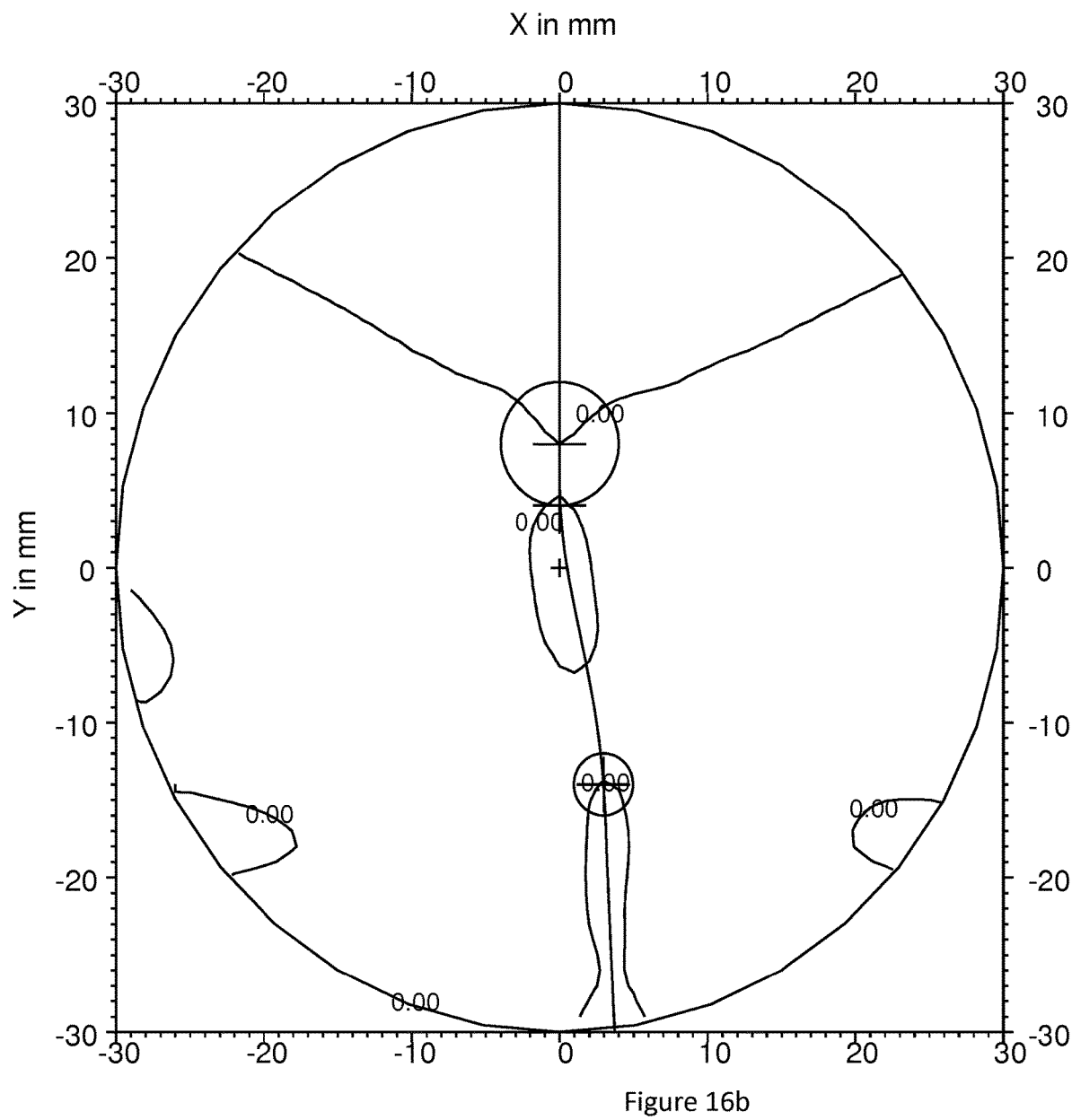
Figure 16C:
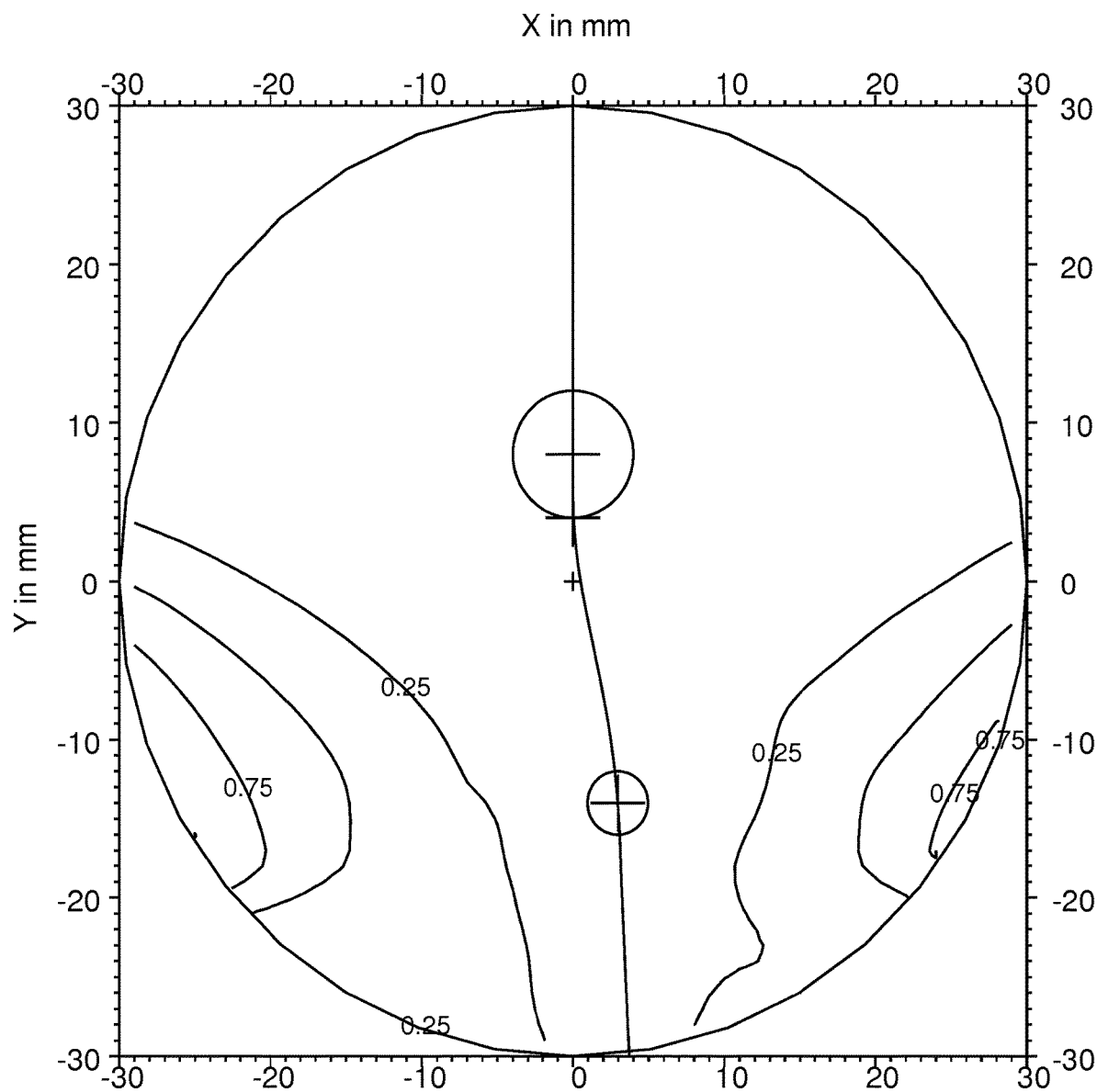

FIGS. 16a to 16c show features of the surfaces of such a modifying surface.

FIG. 16a shows mean sphere curve surrounded by minimum and maximum sphere curves, along the meridian. The x-axes are graduated in diopters, and the y-axes give the height, in mm, on the lens. FIG. 16b shows lines of equal mean sphere, i.e. lines formed by points for which the mean sphere has an identical value. The x-axis and y-axis give the height, in mm respectively along the horizontal and vertical directions.

FIG. 16c shows, using the same axes as for FIG. 16b, lines of equal cylinder.

Figure 16D:
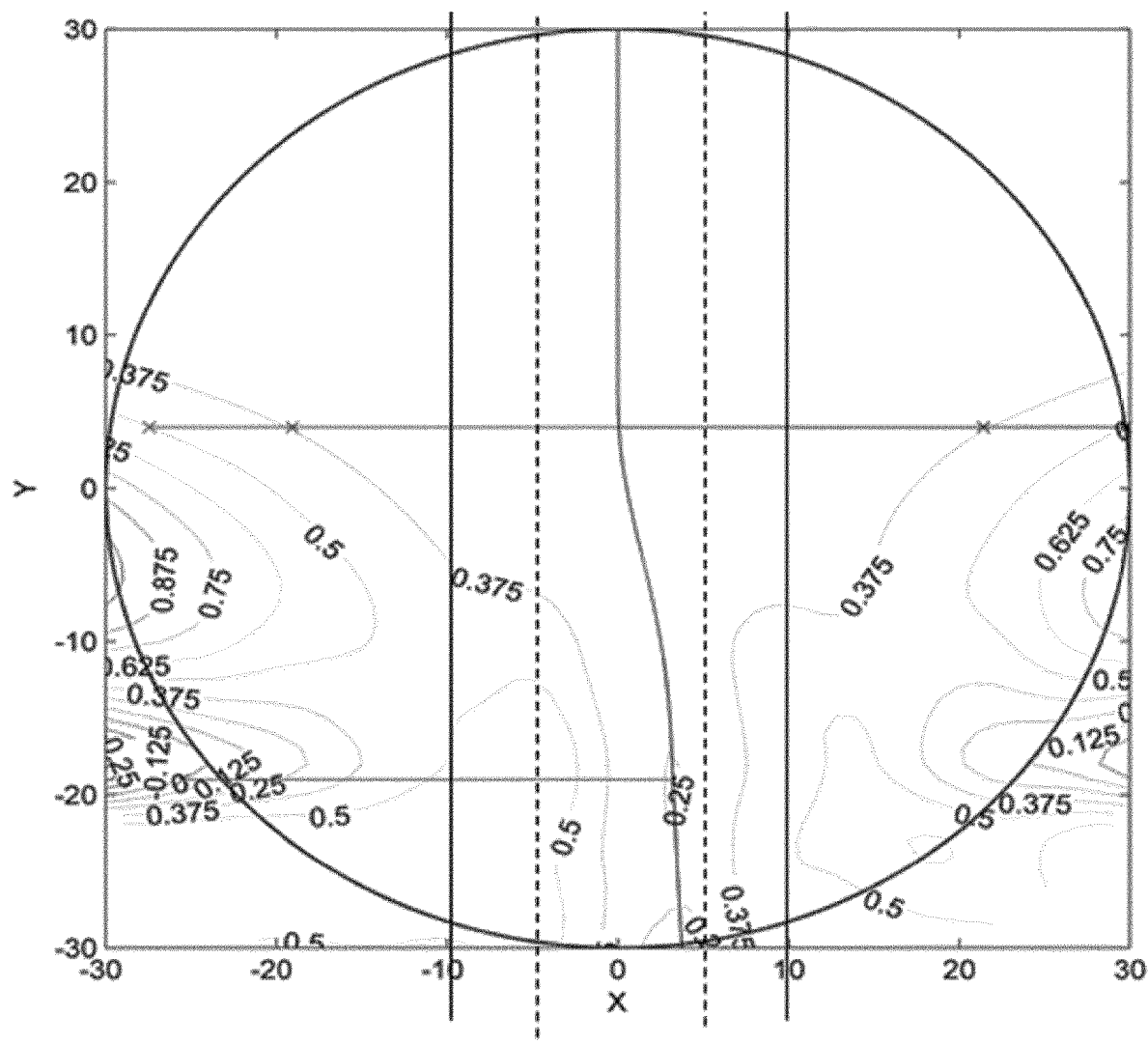
Figure 16E:
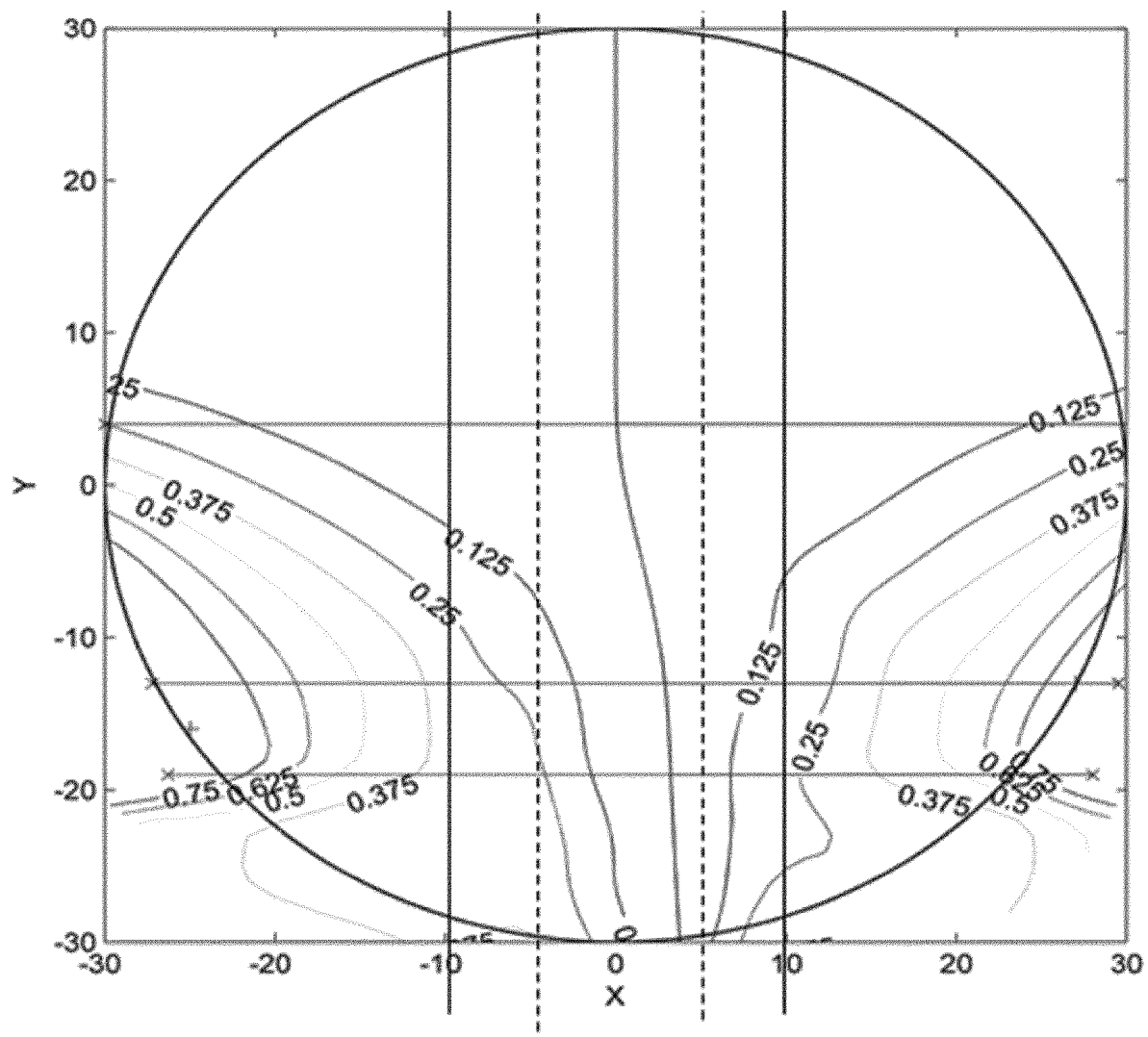

FIGS. 16d and 16e shows the normalized modifying surface SNmod corresponding to the modifying surface illustrated on FIGS. 16a to 16c. FIG. 16d shows lines of equal mean sphere and FIG. 16e shows lines of equal cylinder, both using the same axes as for FIG. 16b.

Figure 17A:
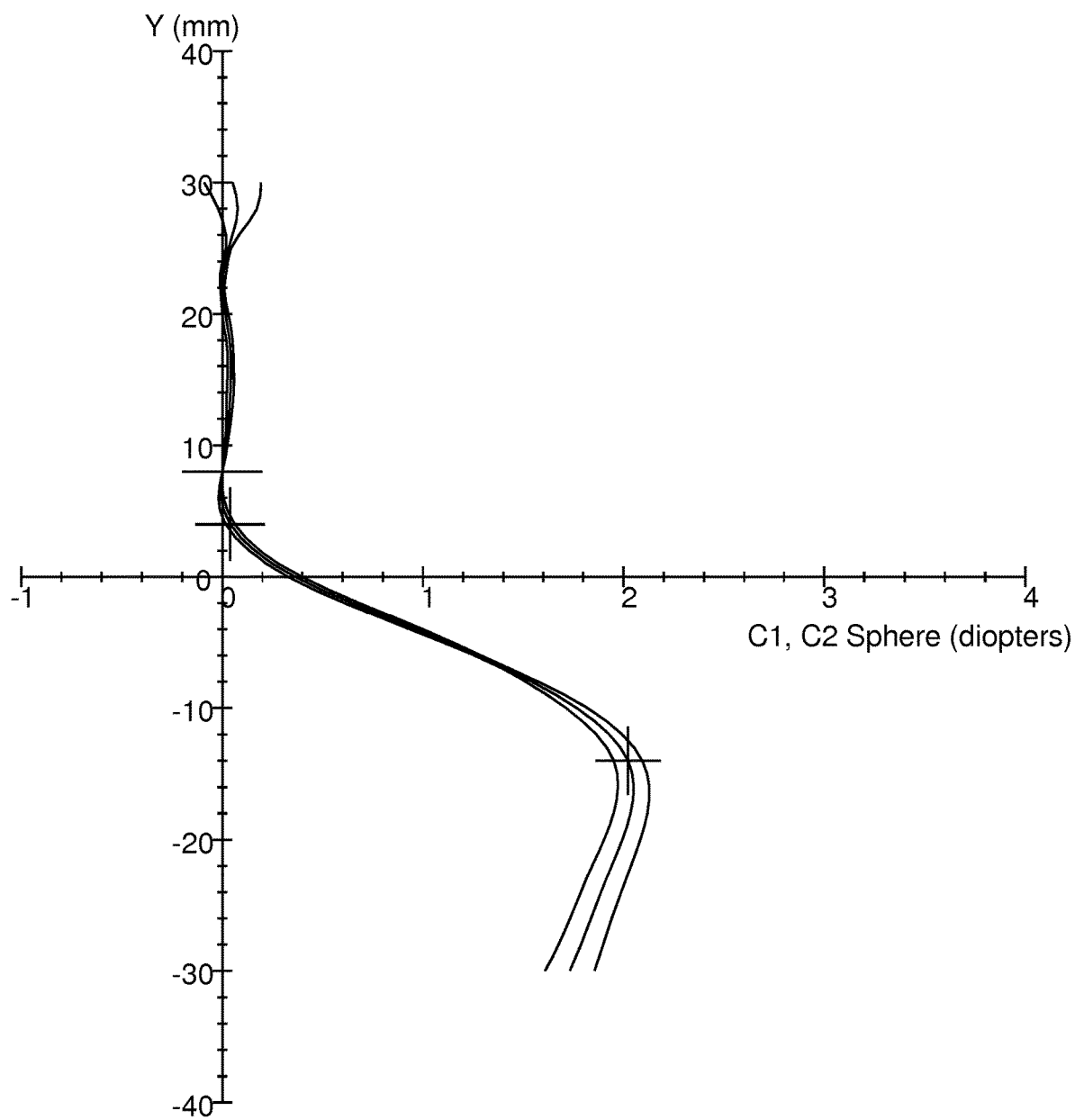
Figure 17B:
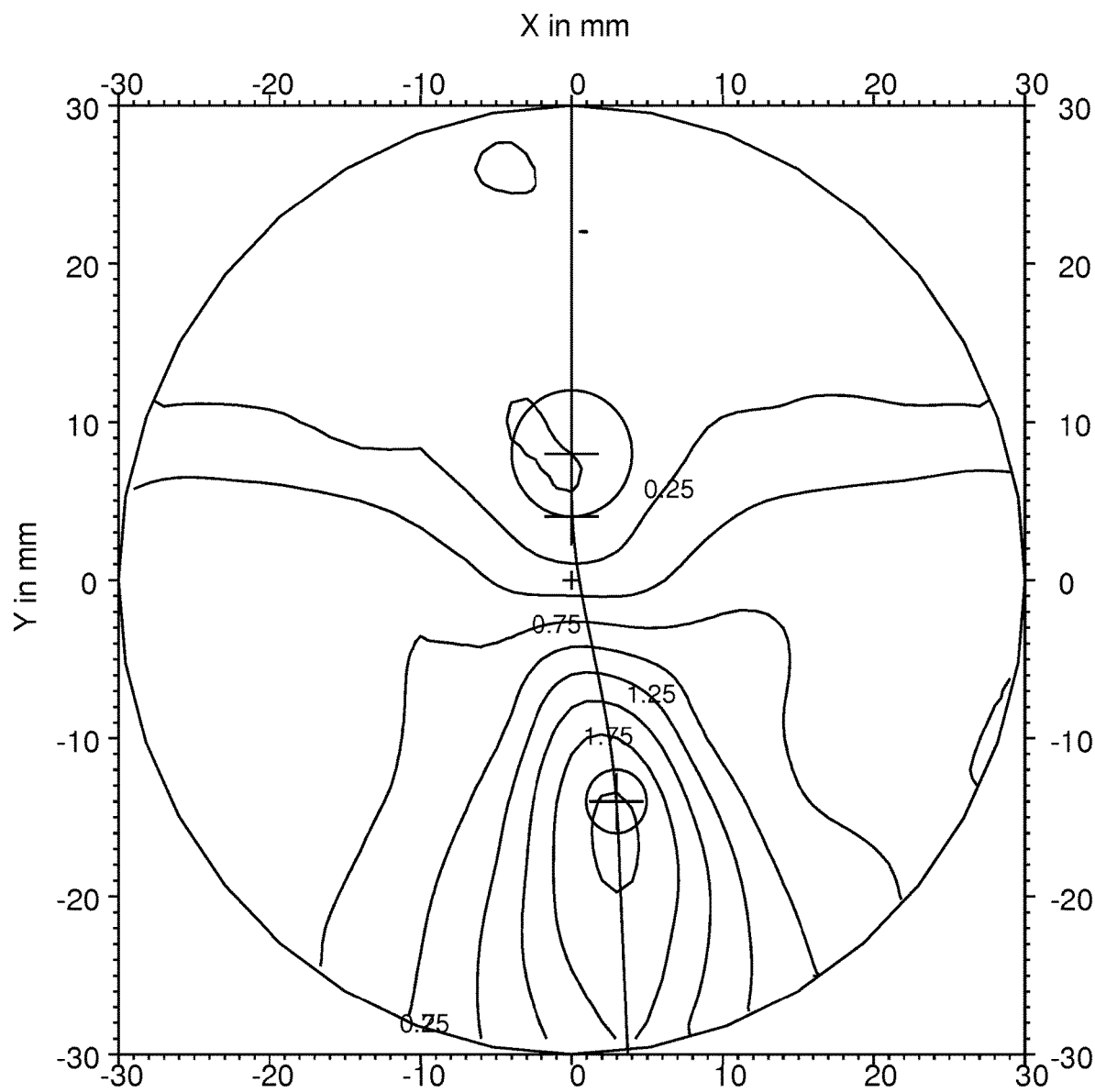
Figure 17C:
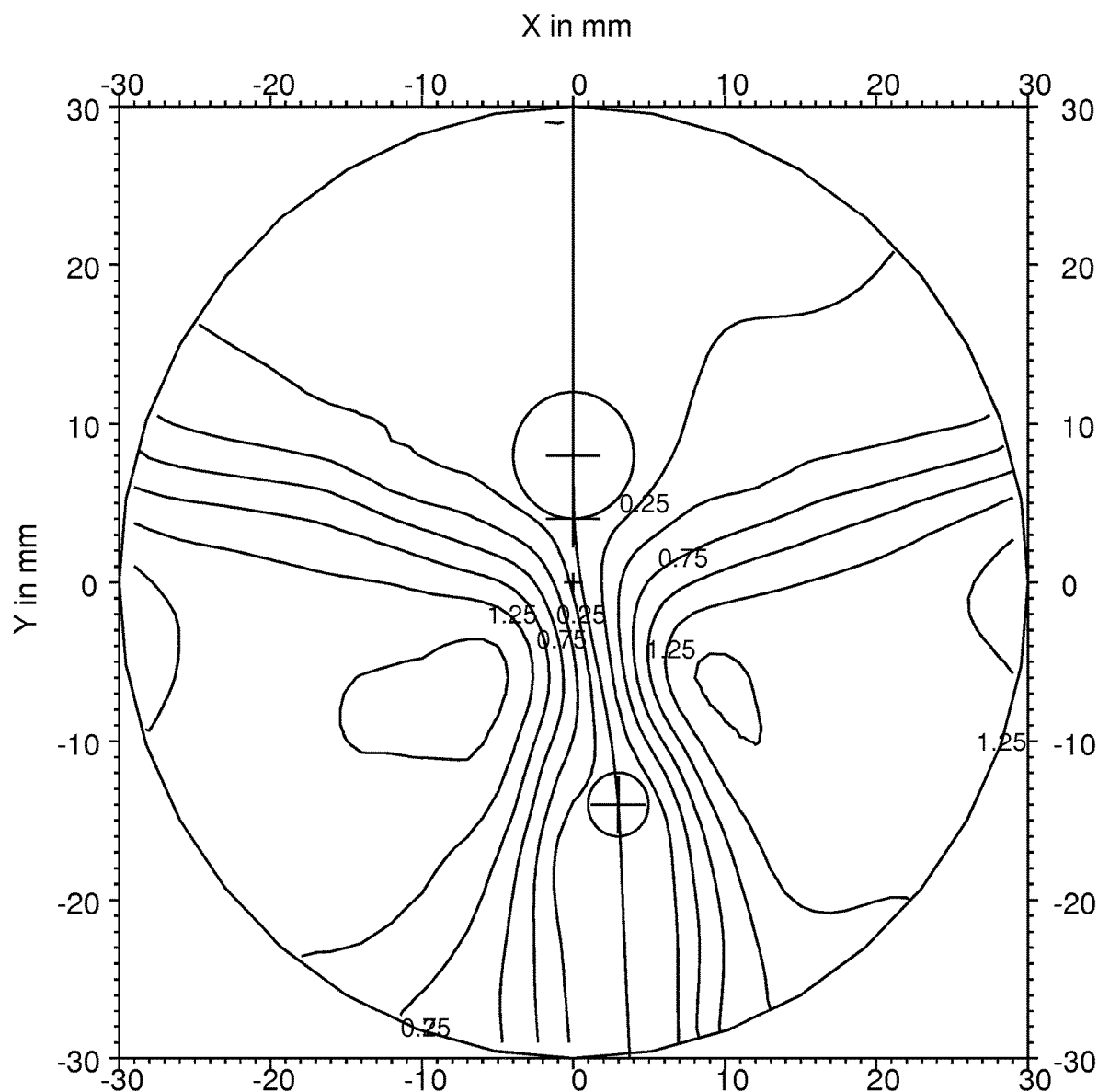

FIGS. 17a to 17c show the features of the surfaces of an initial surface of an progressive ophthalmic lens configured for a presbyopia wearer with an addition of 2 diopters.

FIG. 17a shows mean sphere curve surrounded by minimum and maximum sphere curves, along the meridian. The x-axes are graduated in diopters, and the y-axes give the height, in mm, on the lens.

FIG. 17b shows lines of equal mean sphere, i.e. lines formed by points for which the mean sphere has an identical value. The x-axis and y-axis give the height, in mm respectively along the horizontal and vertical directions. FIG. 17c shows, using the same axes as for FIG. 17b, lines of equal cylinder.

Figure 18A:
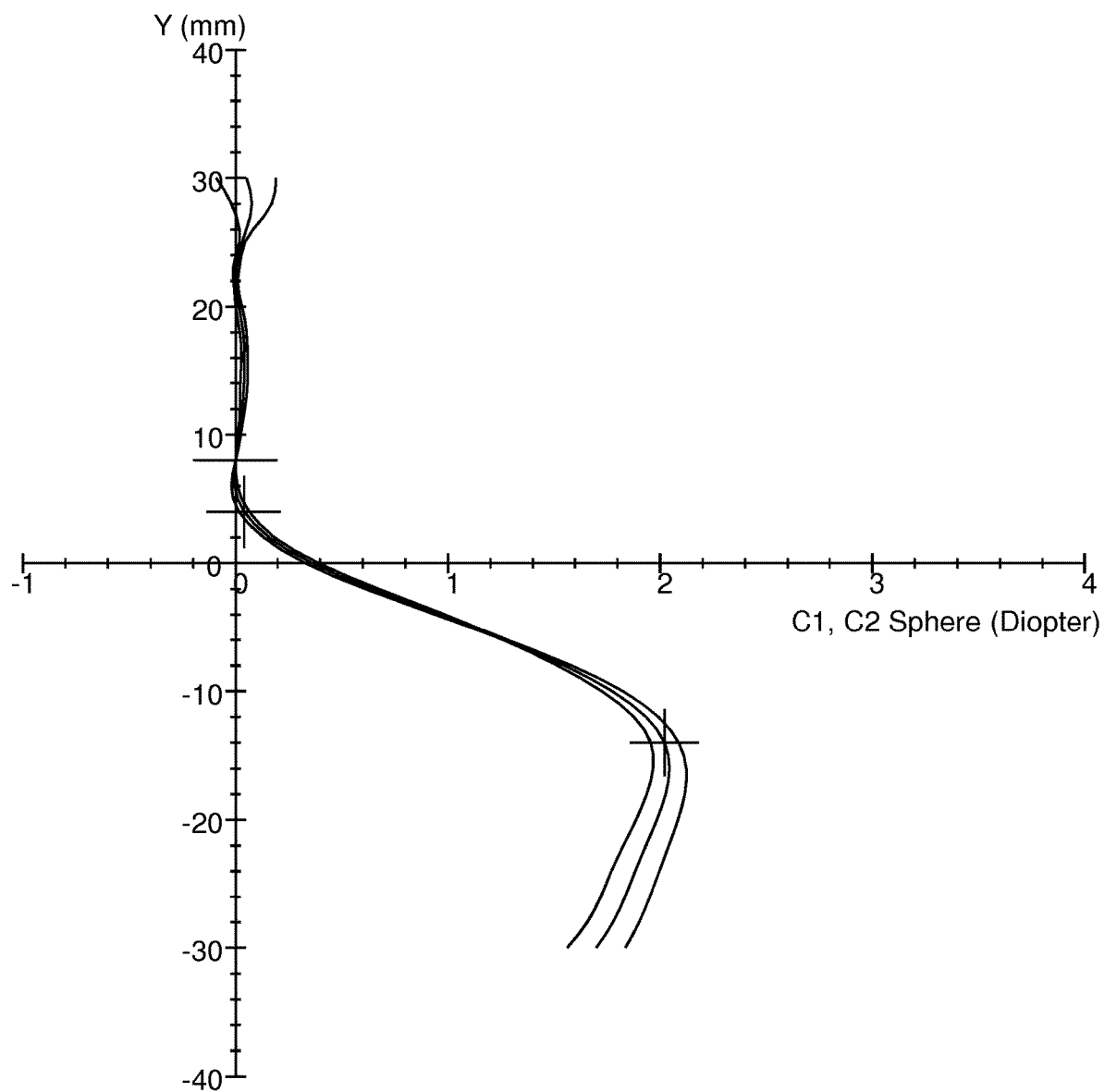
Figure 18B:
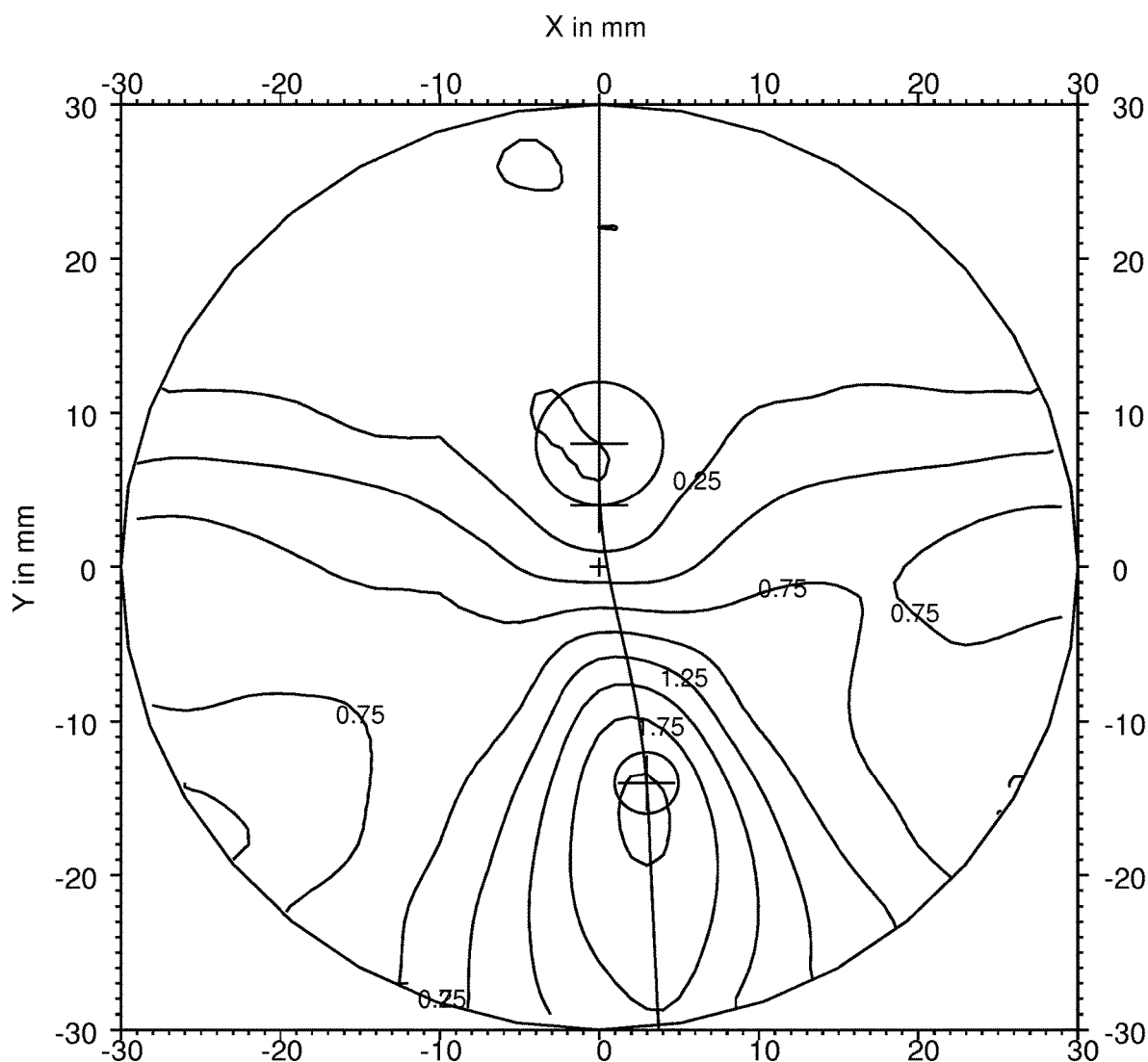
Figure 18C:
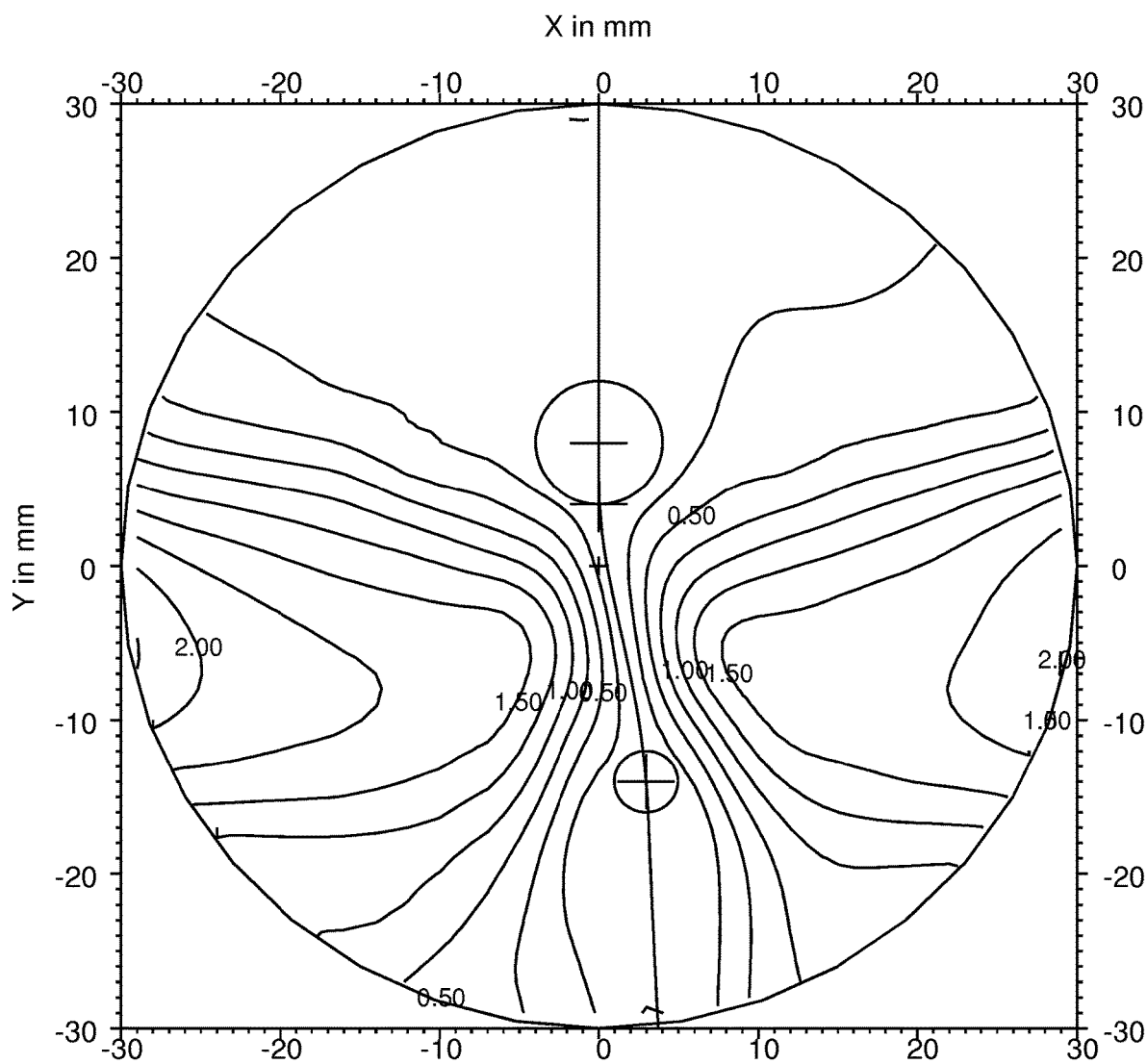

FIGS. 18a to 18c show the features of the surfaces of the optical surface obtained by combining the modifying surface shown on FIGS. 16a to 16c with the initial surface shown on FIGS. 17a to 17c.

FIG. 18a shows mean sphere curve surrounded by minimum and maximum sphere curves, along the meridian. The x-axes are graduated in diopters, and the y-axes give the height, in mm, on the lens.

FIG. 18b shows lines of equal mean sphere, i.e. lines formed by points for which the mean sphere has an identical value. The x-axis and y-axis give the height, in mm respectively along the horizontal and vertical directions. FIG. 18c shows, using the same axes as for FIG. 18b, lines of equal cylinder.

As observed when comparing the optical features of the initial surface and of the modified optical surface, the mean sphere and cylinder distribution has only be broaden in near vision zone without being changed in the other areas.

Thus by combining the modifying surface illustrated in FIGS. 16a to 16c with the initial surface, one may add a lateralization feature to the optical design of the initial surface without having to go through a new optical optimization.

Example 4: Softening

The modifying surface according to example 4, is intended to soften an initial multifocal ophthalmic lens design.

The inventors have developed a modifying surface to be applied to one of the surfaces of an optimized multifocal ophthalmic lens, for example the front face surface, so as to soften the initial multifocal ophthalmic lens design without modifying the rest of the mean sphere and cylinder distributions.

Figure 19A:
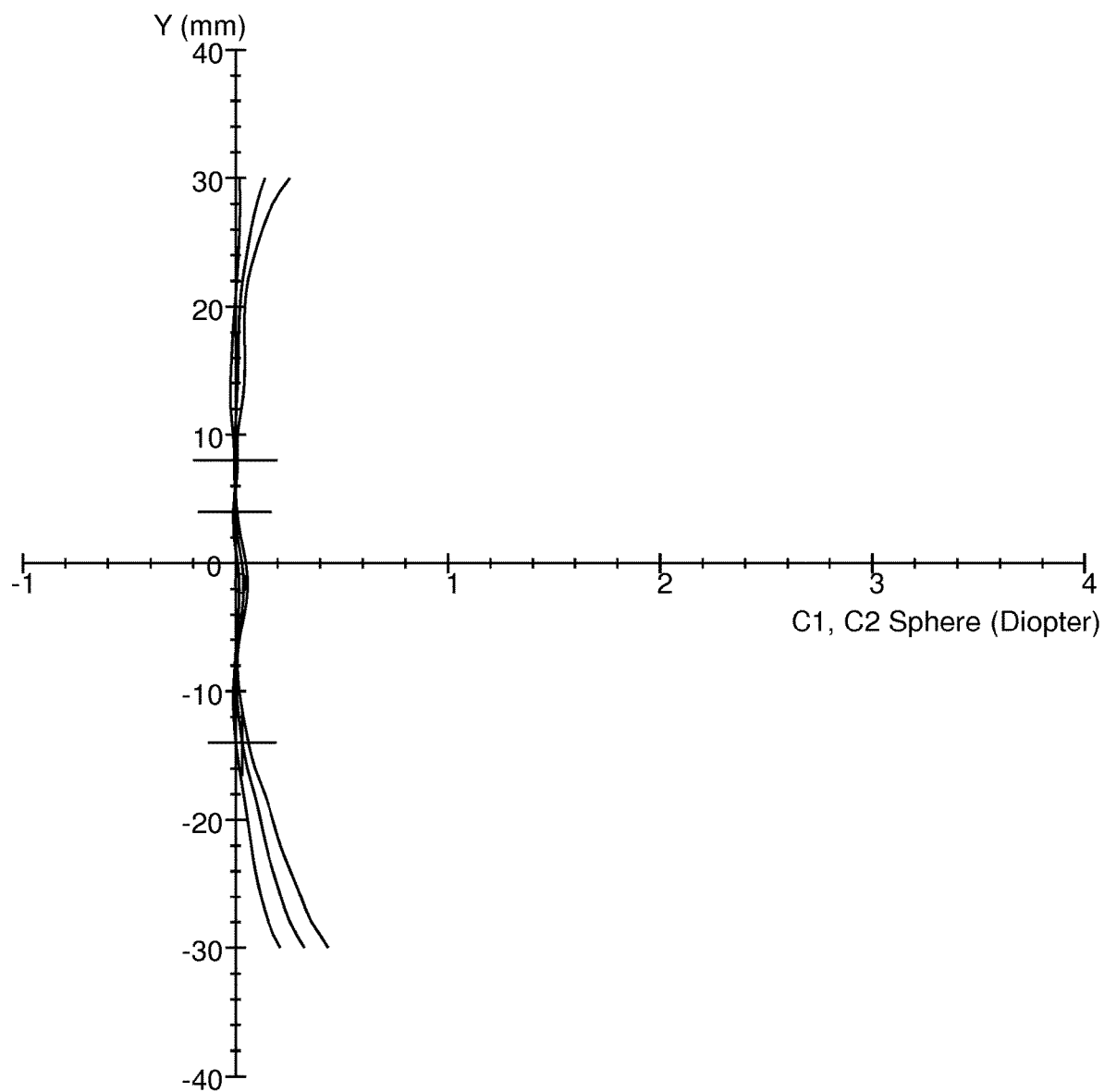
Figure 19B:
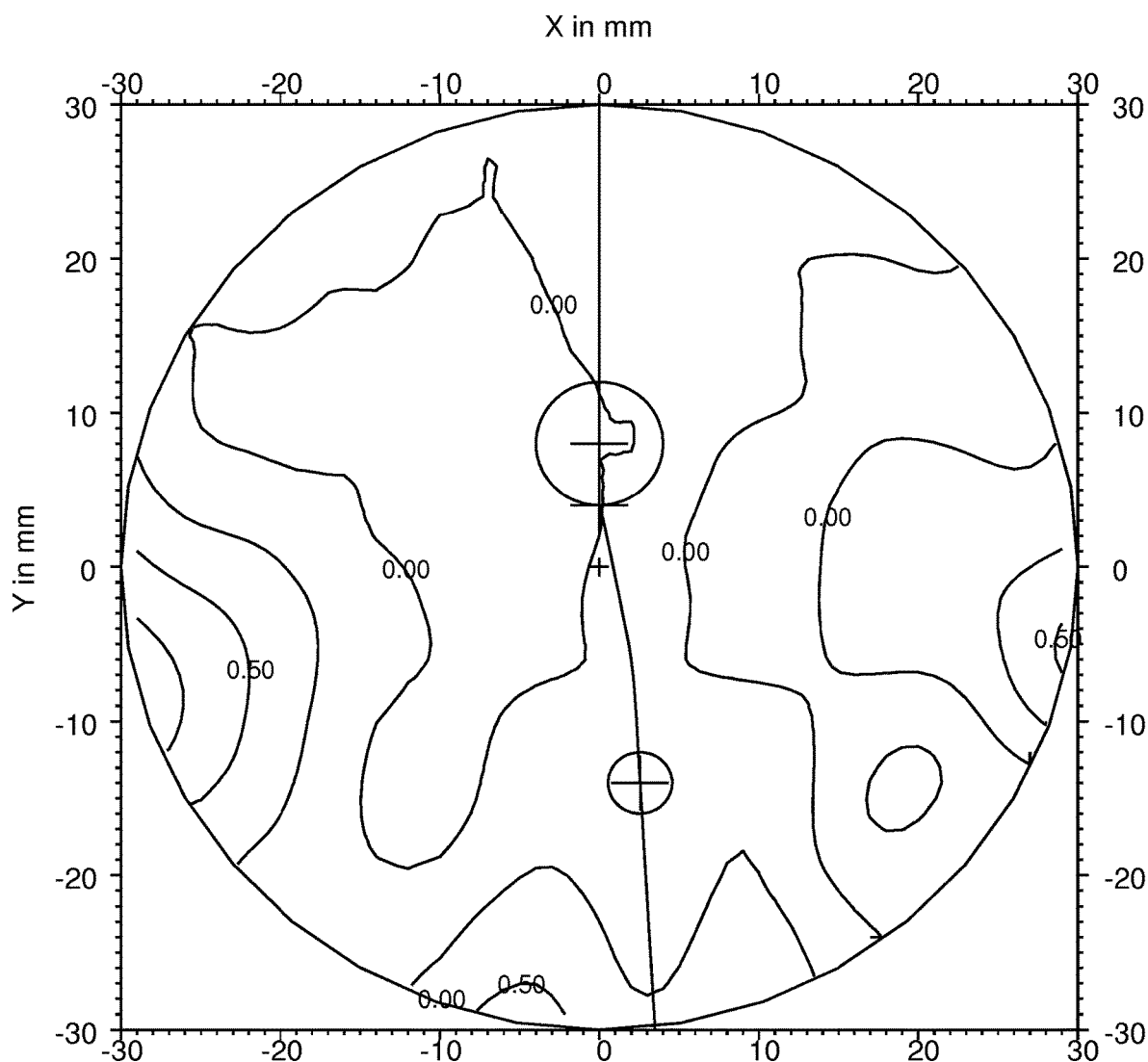
Figure 19C:
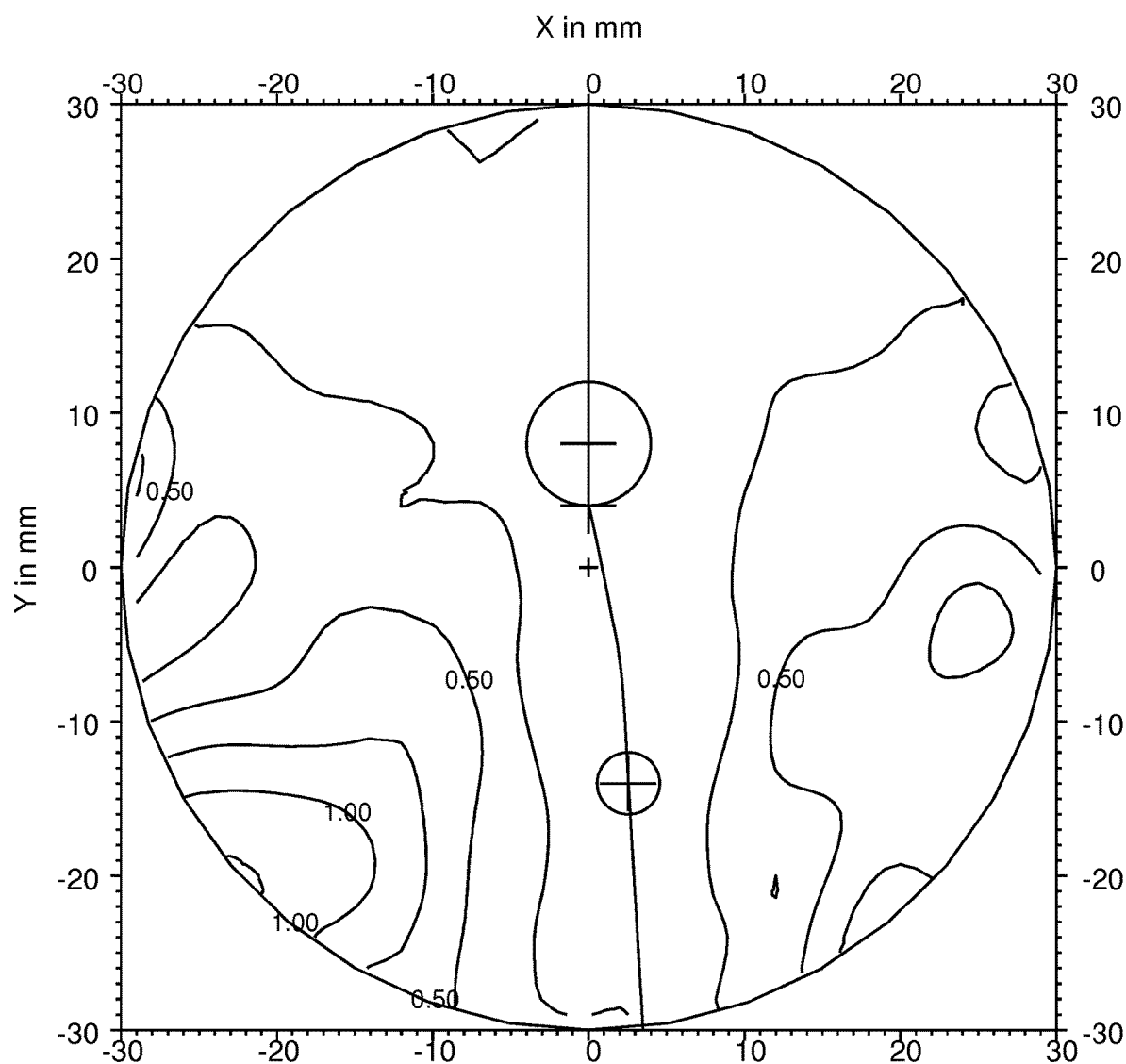

FIGS. 19a to 19c show features of the surfaces of such a modifying surface.

FIG. 19a shows mean sphere curve surrounded by minimum and maximum sphere curves, along the meridian. The x-axes are graduated in diopters, and the y-axes give the height, in mm, on the lens.

FIG. 19b shows lines of equal mean sphere, i.e. lines formed by points for which the mean sphere has an identical value. The x-axis and y-axis give the height, in mm respectively along the horizontal and vertical directions. FIG. 19c shows, using the same axes as for FIG. 19b, lines of equal cylinder.

Figure 19D:
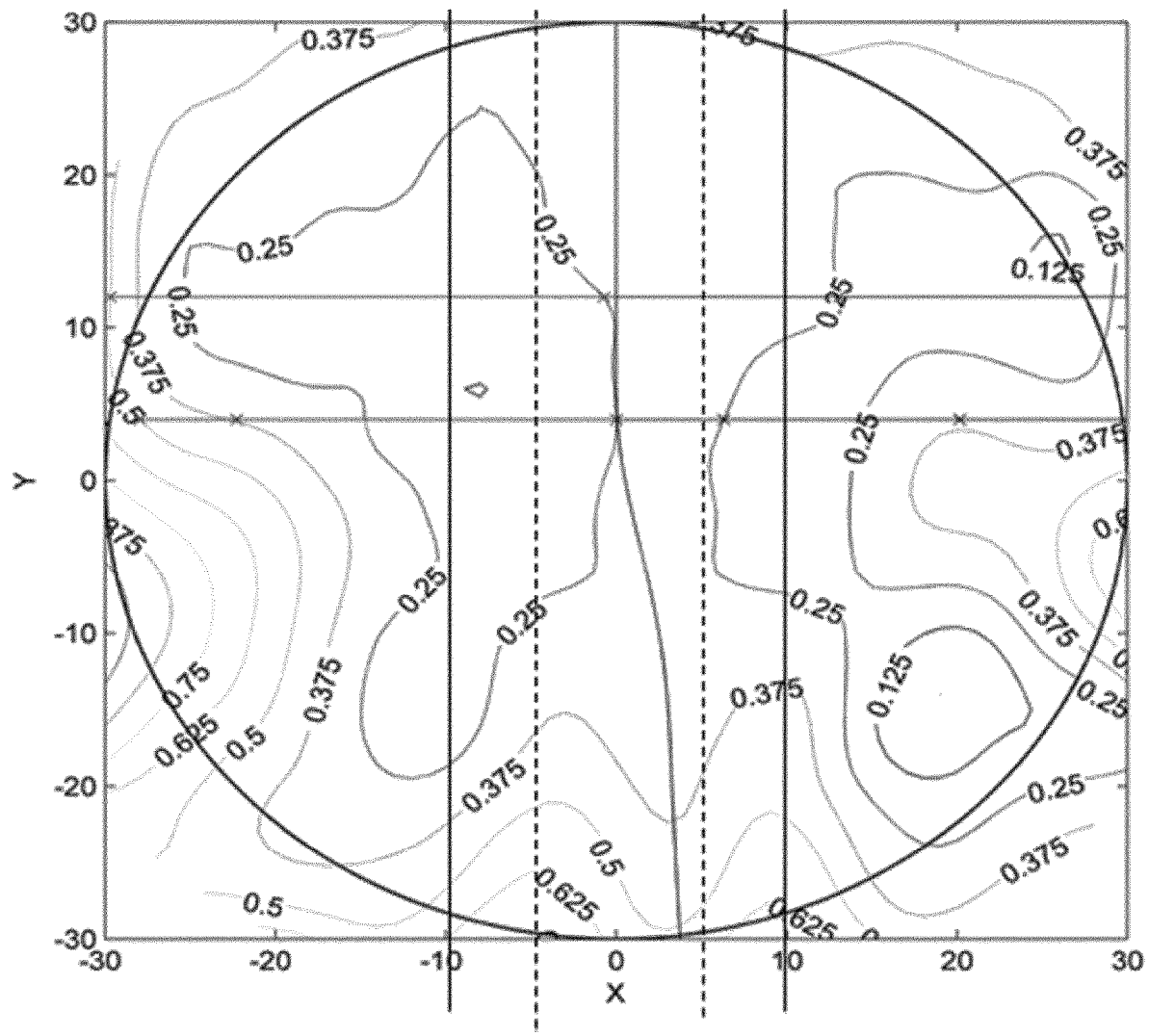
Figure 19E:
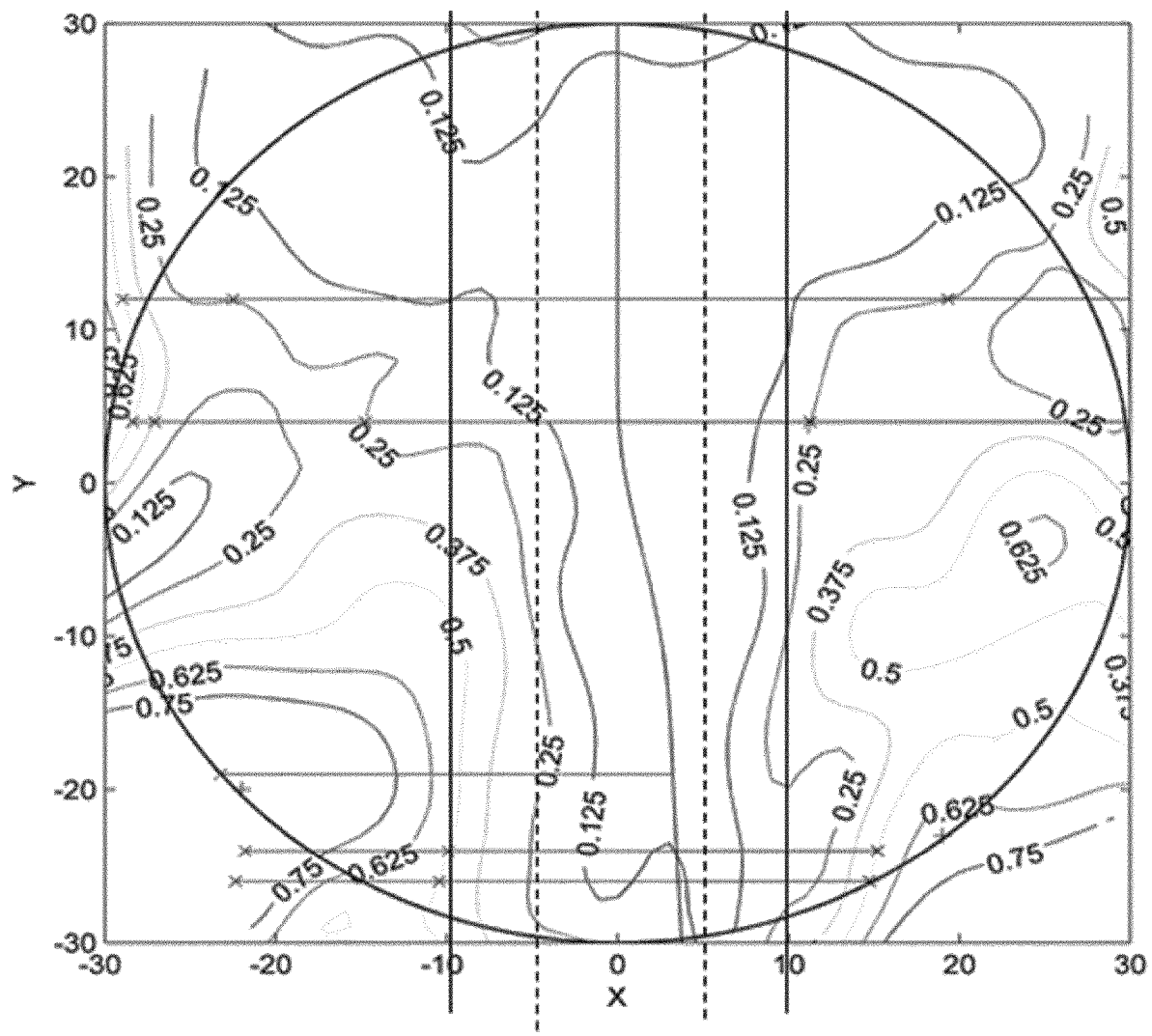

FIGS. 19d and 19e shows the normalized modifying surface SNmod corresponding to the modifying surface illustrated on FIGS. 19a to 19c. FIG. 19d shows lines of equal mean sphere and FIG. 19e shows lines of equal cylinder, both using the same axes as for FIG. 19b.

Figure 20A:
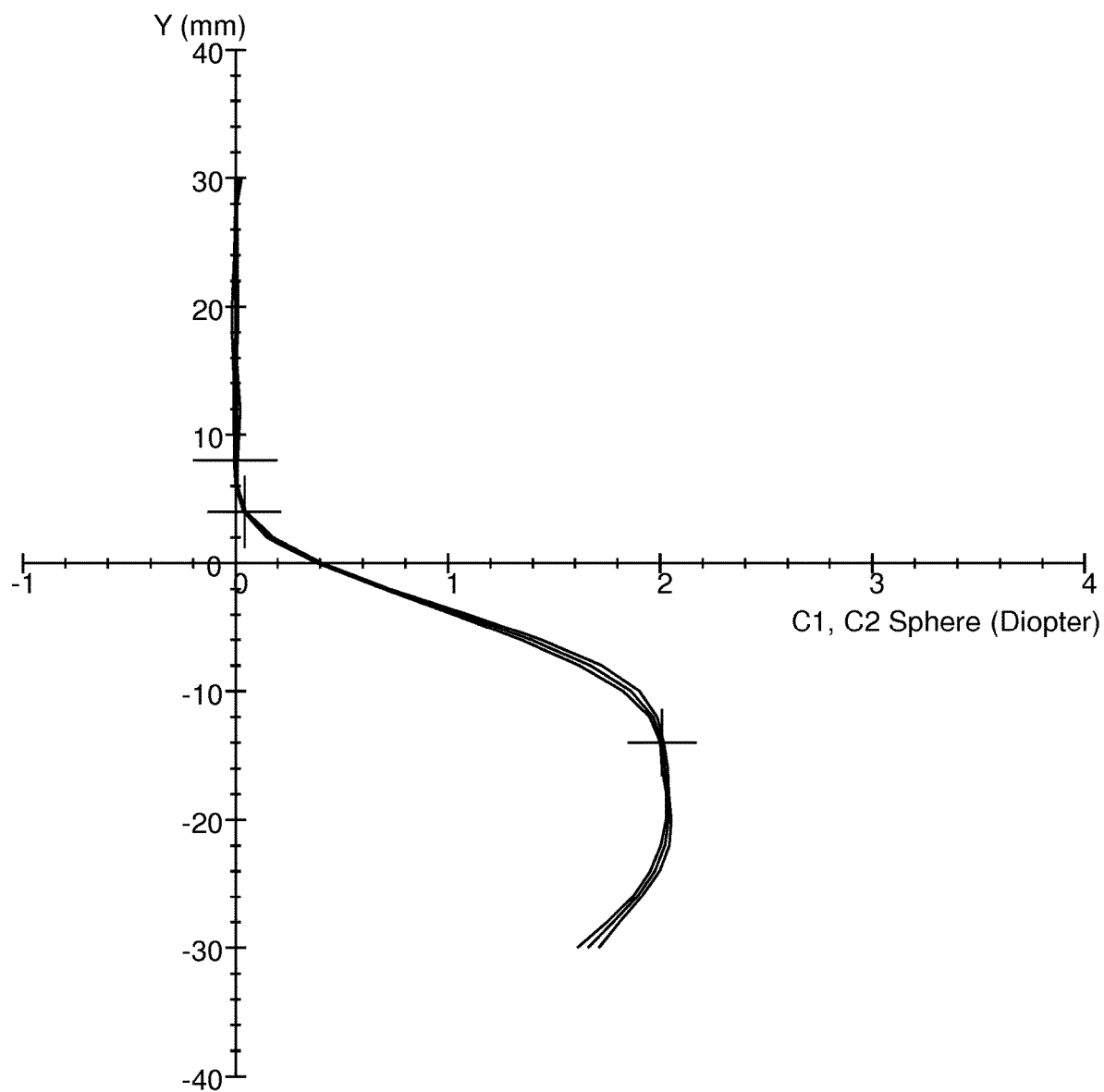
Figure 20B:
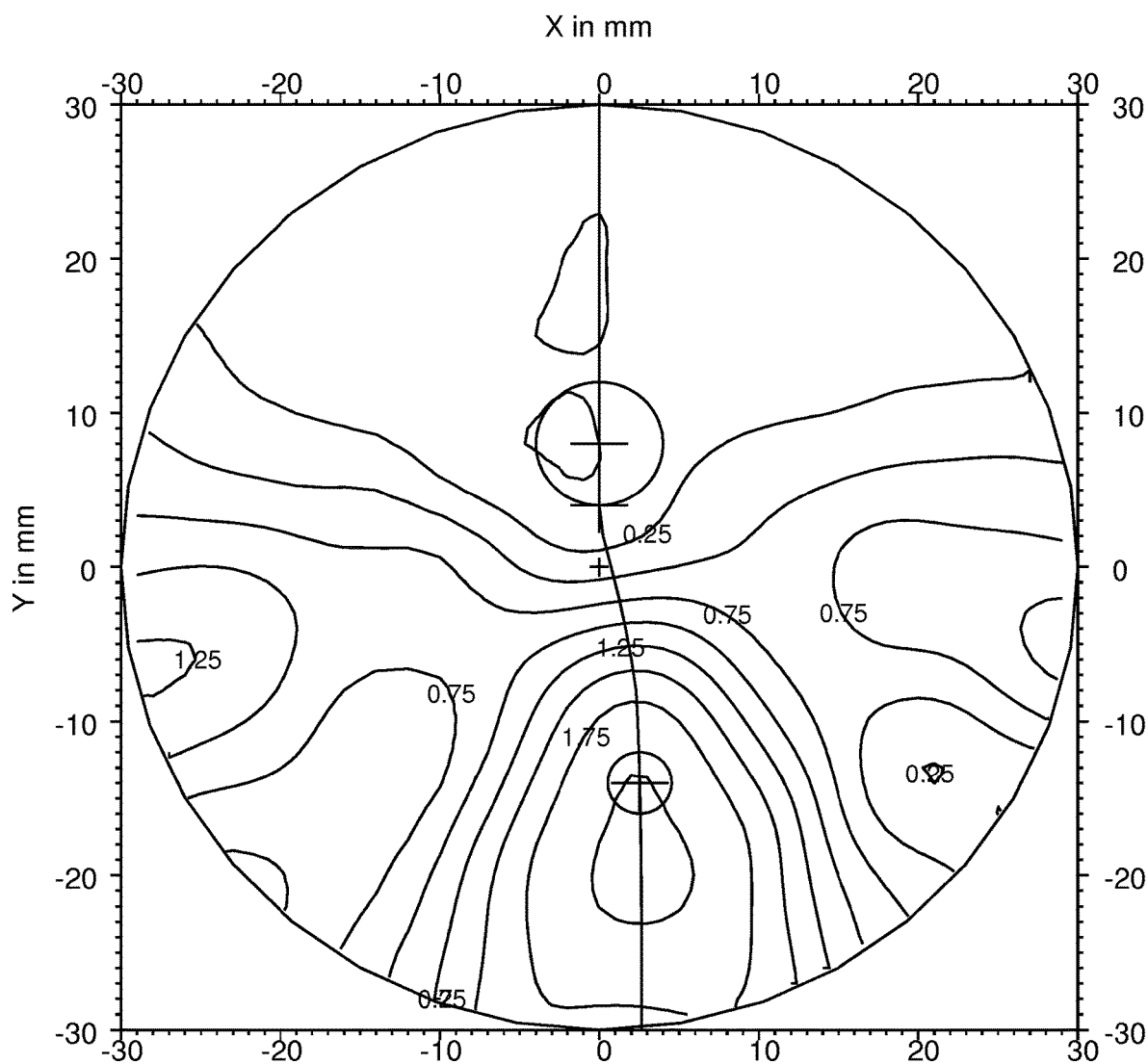
Figure 20C:
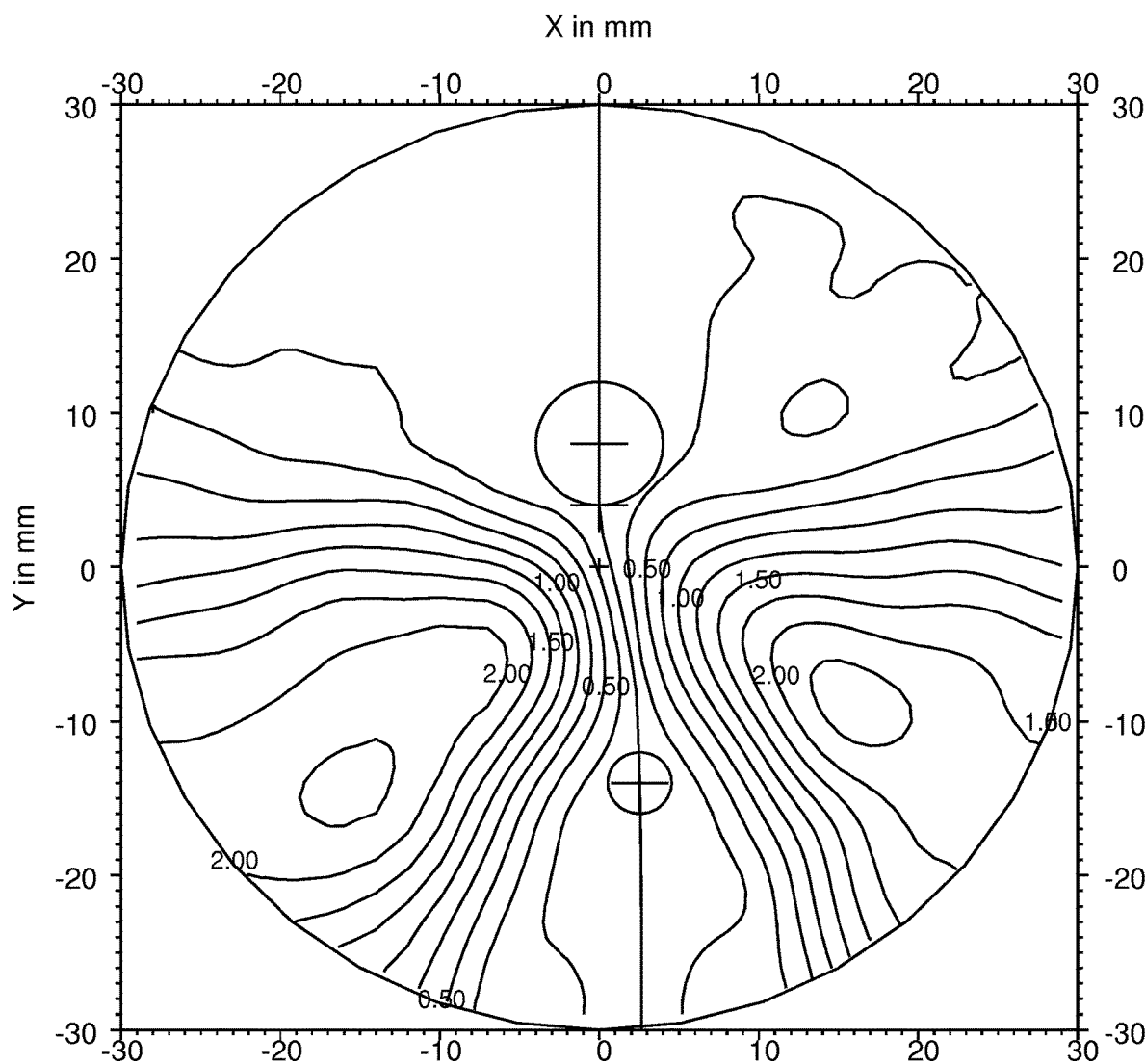

FIGS. 20a to 20c show the features of the surfaces of an initial surface of an progressive ophthalmic lens configured for a presbyopia wearer with an addition of 2 diopters.

FIG. 20a shows mean sphere curve surrounded by minimum and maximum sphere curves, along the meridian. The x-axes are graduated in diopters, and the y-axes give the height, in mm, on the lens. FIG. 20b shows lines of equal mean sphere, i.e. lines formed by points for which the mean sphere has an identical value. The x-axis and y-axis give the height, in mm respectively along the horizontal and vertical directions. FIG. 20c shows, using the same axes as for FIG. 20b, lines of equal cylinder.

Figure 21A:
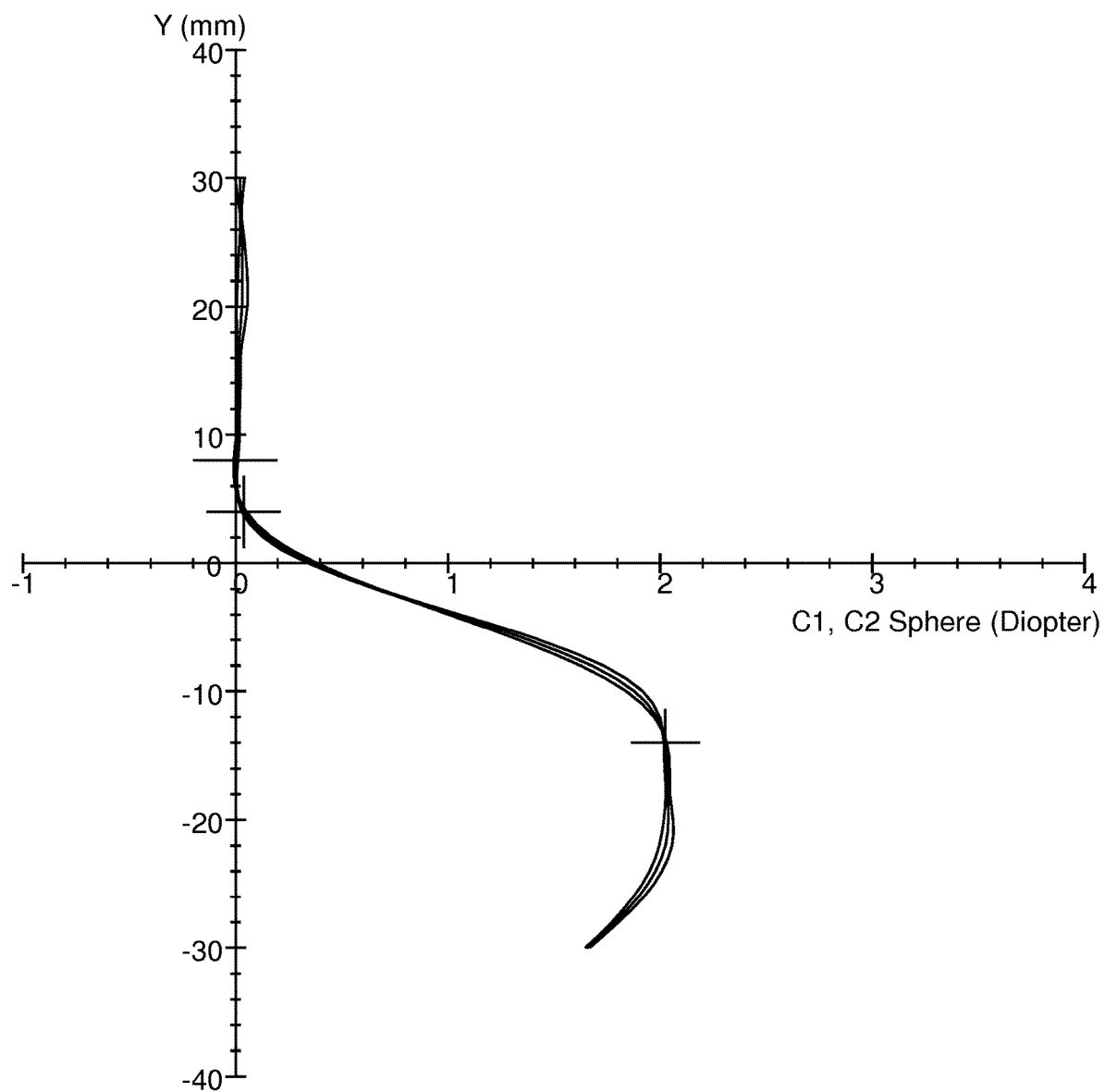
Figure 21B:
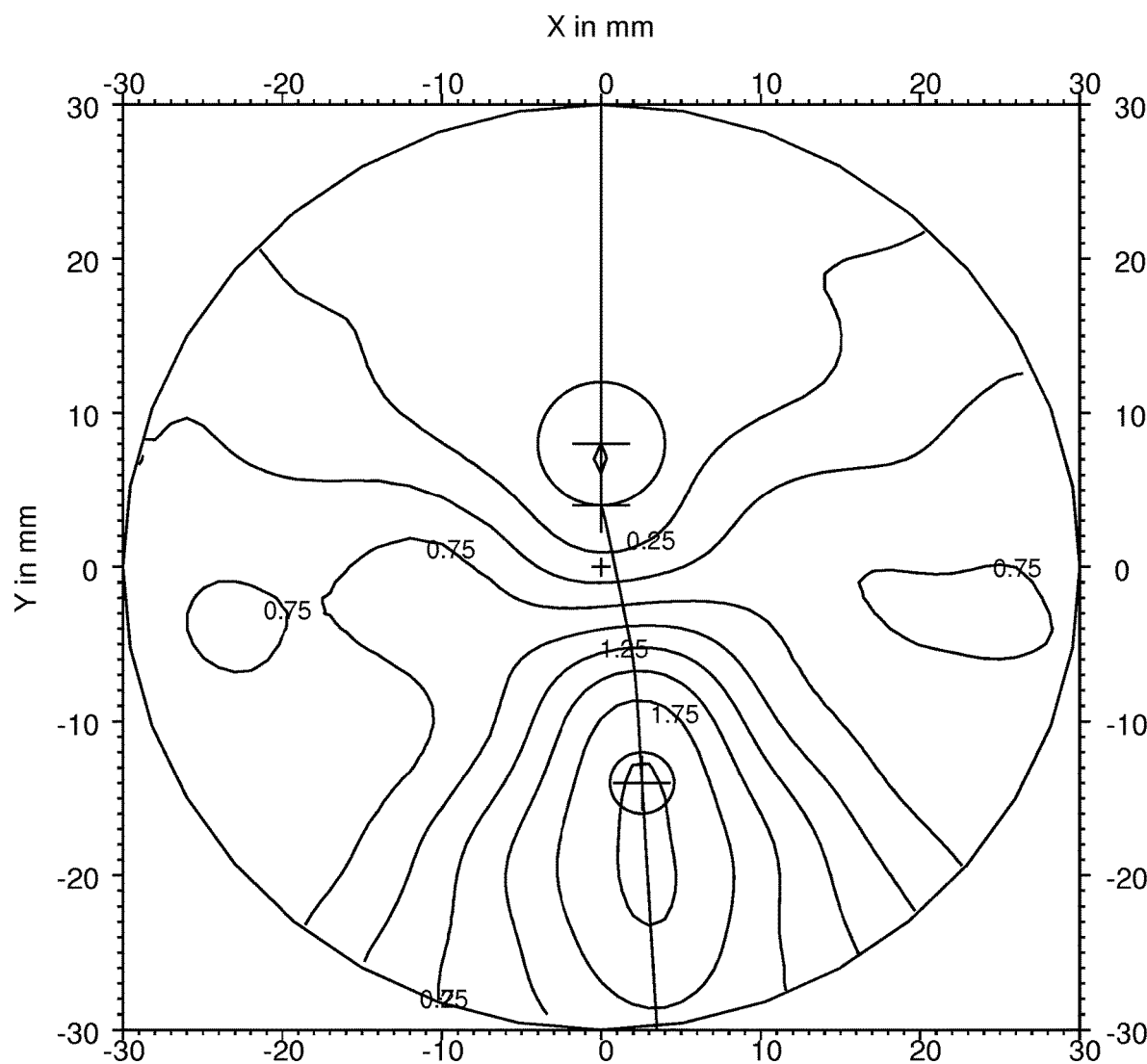
Figure 21C:
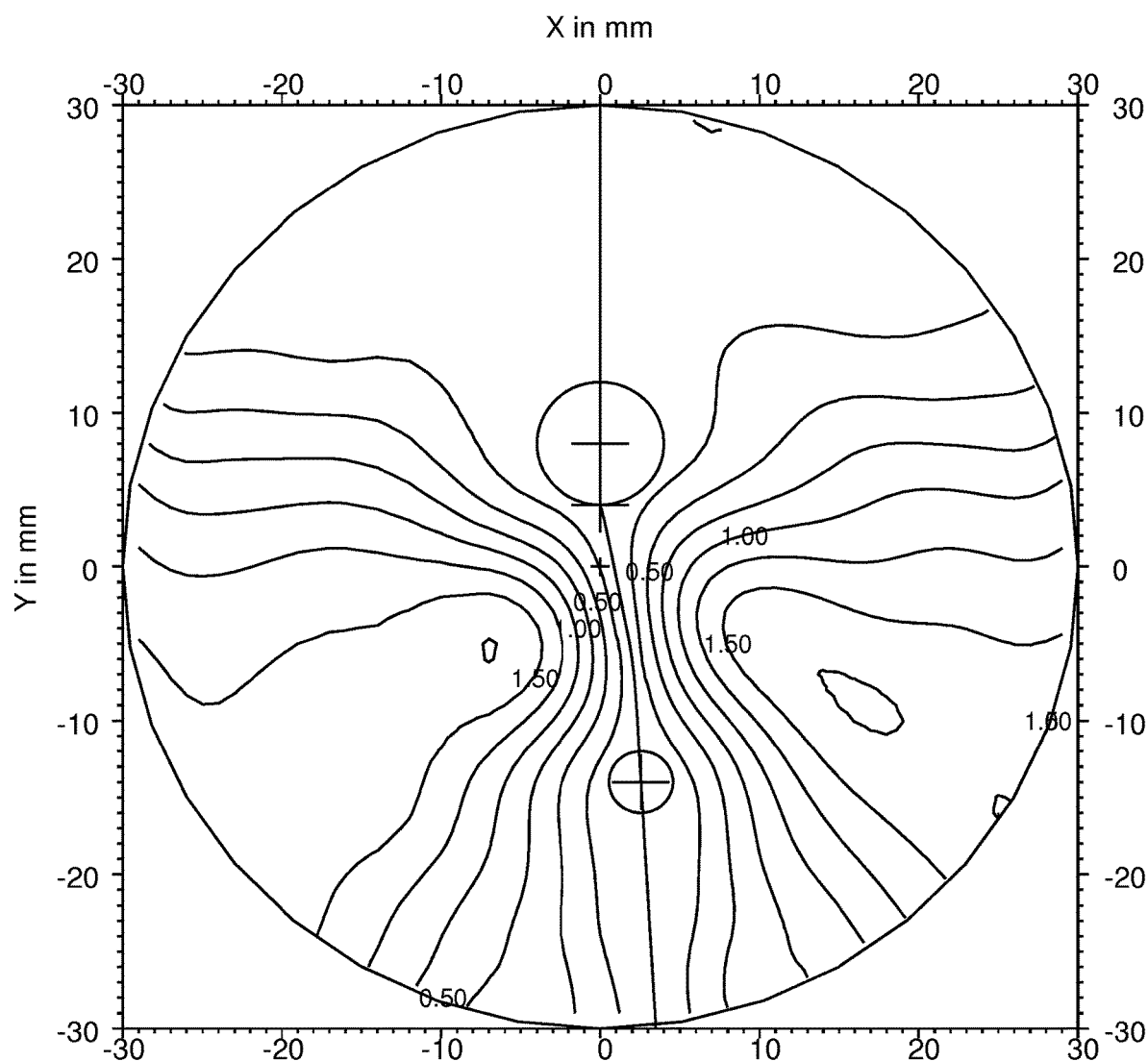

FIGS. 21a to 21c show the features of the surfaces of the optical surface obtained by combining the modifying surface shown on FIGS. 19a to 19c with the initial surface shown on FIGS. 20a to 20c.

FIG. 21a shows mean sphere curve surrounded by minimum and maximum sphere curves, along the meridian. The x-axes are graduated in diopters, and the y-axes give the height, in mm, on the lens. FIG. 21b shows lines of equal mean sphere, i.e. lines formed by points for which the mean sphere has an identical value. The x-axis and y-axis give the height, in mm respectively along the horizontal and vertical directions. FIG. 21c shows, using the same axes as for FIG. 21b, lines of equal cylinder.

As observed when comparing the optical features of the initial surface and of the modified optical surface, the mean sphere and cylinder distribution has only be broaden in near vision zone without being changed in the other areas.

Thus by combining the modifying surface illustrated in FIGS. 19a to 19c with the initial surface, one may soften the optical design of the initial surface without having to go through a new optical optimization.

Example 5: Reducing the Length of Progression

The modifying surface according to example 5, is intended to reduce the length of progression of a progressive ophthalmic lens design. The skilled person could adapt the example to increase the length of progression, for example using the same modifying surface multiplied by a negative coefficient.

The inventors have developed a modifying surface to be applied to one of the surfaces of an optimized multifocal ophthalmic lens, for example the front face surface, so as to shorten the initial multifocal ophthalmic lens design without disturbing a lot the mean sphere and cylinder distributions.

Figure 22A:
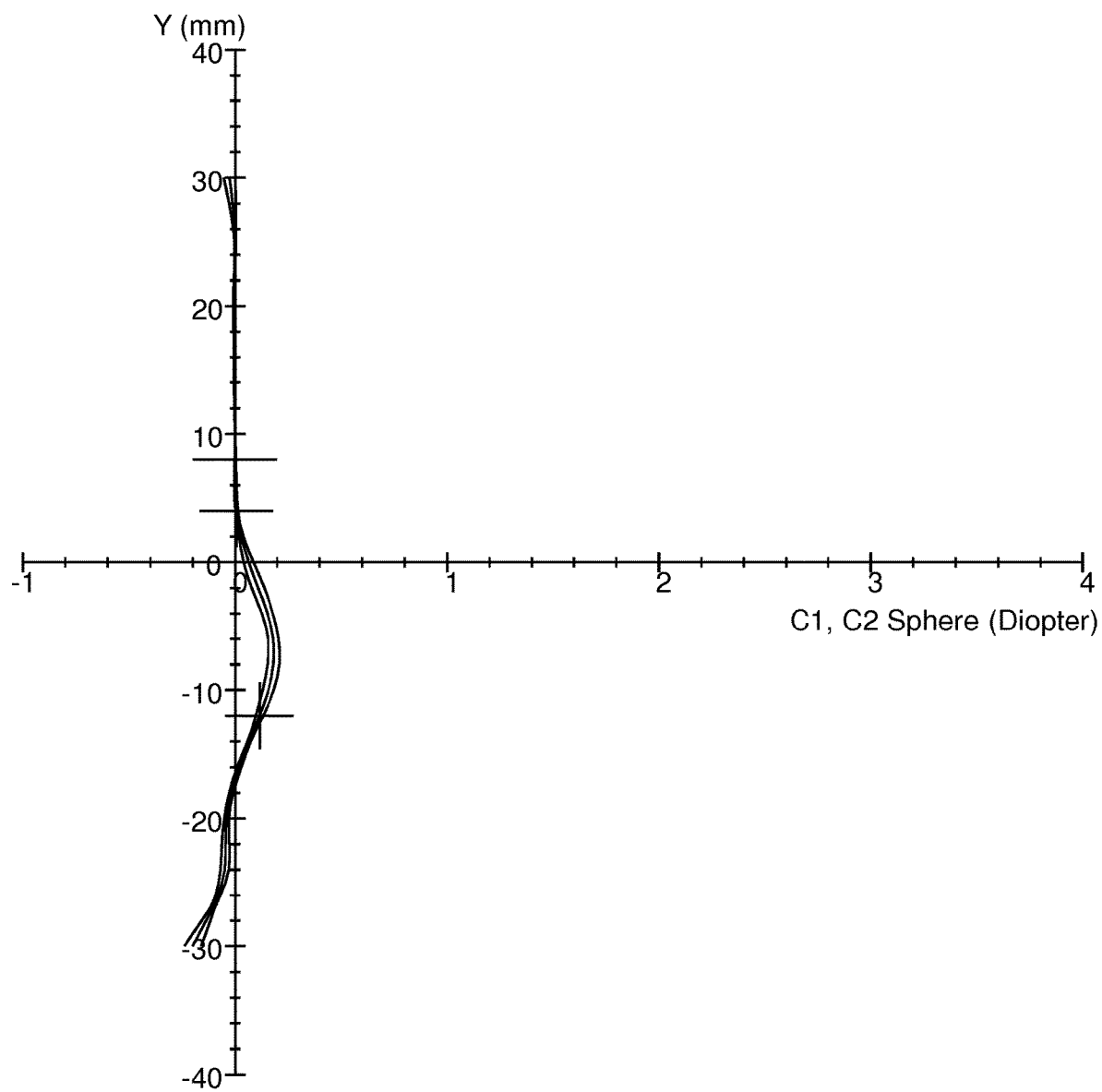
Figure 22B:
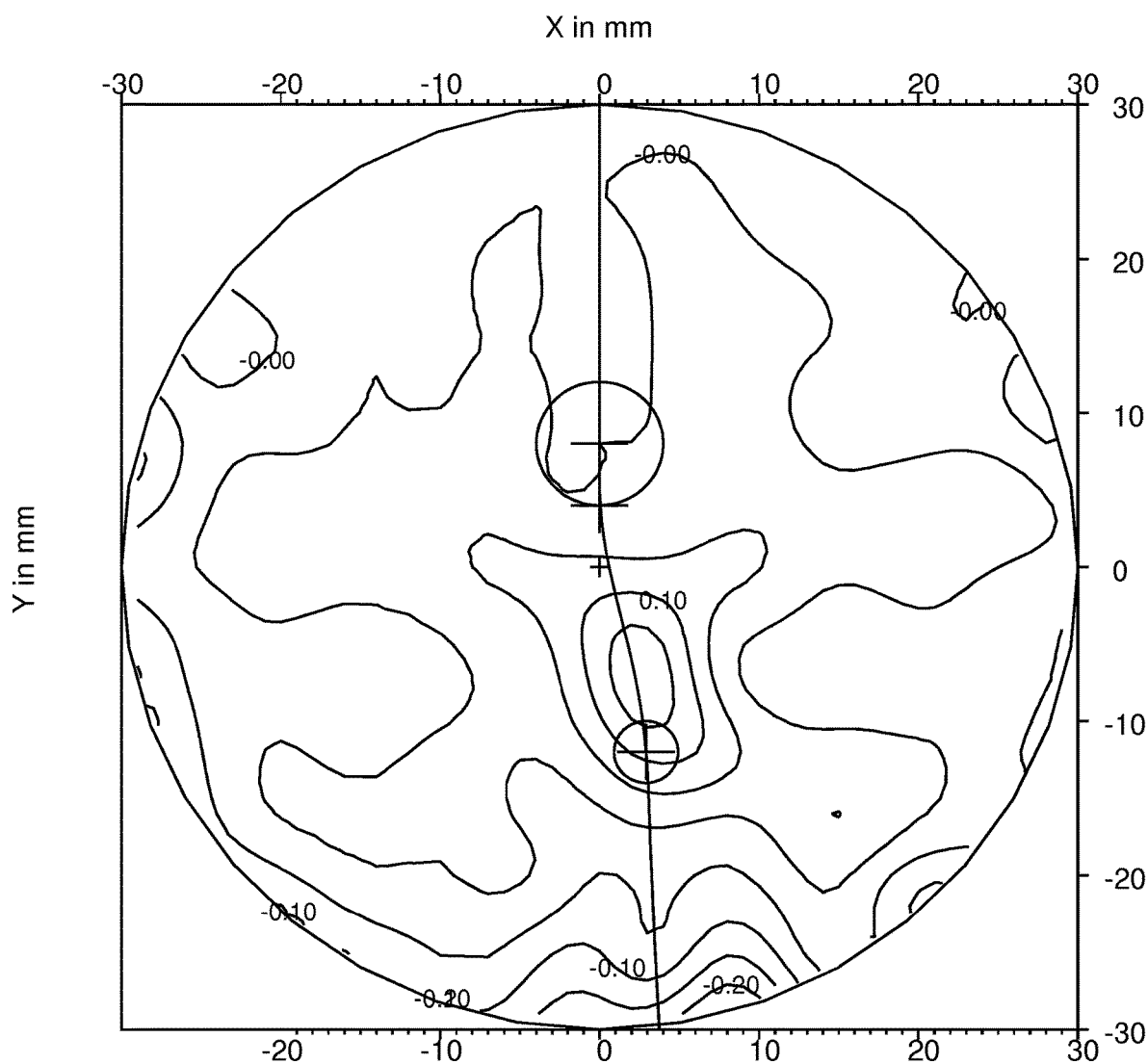
Figure 22C:
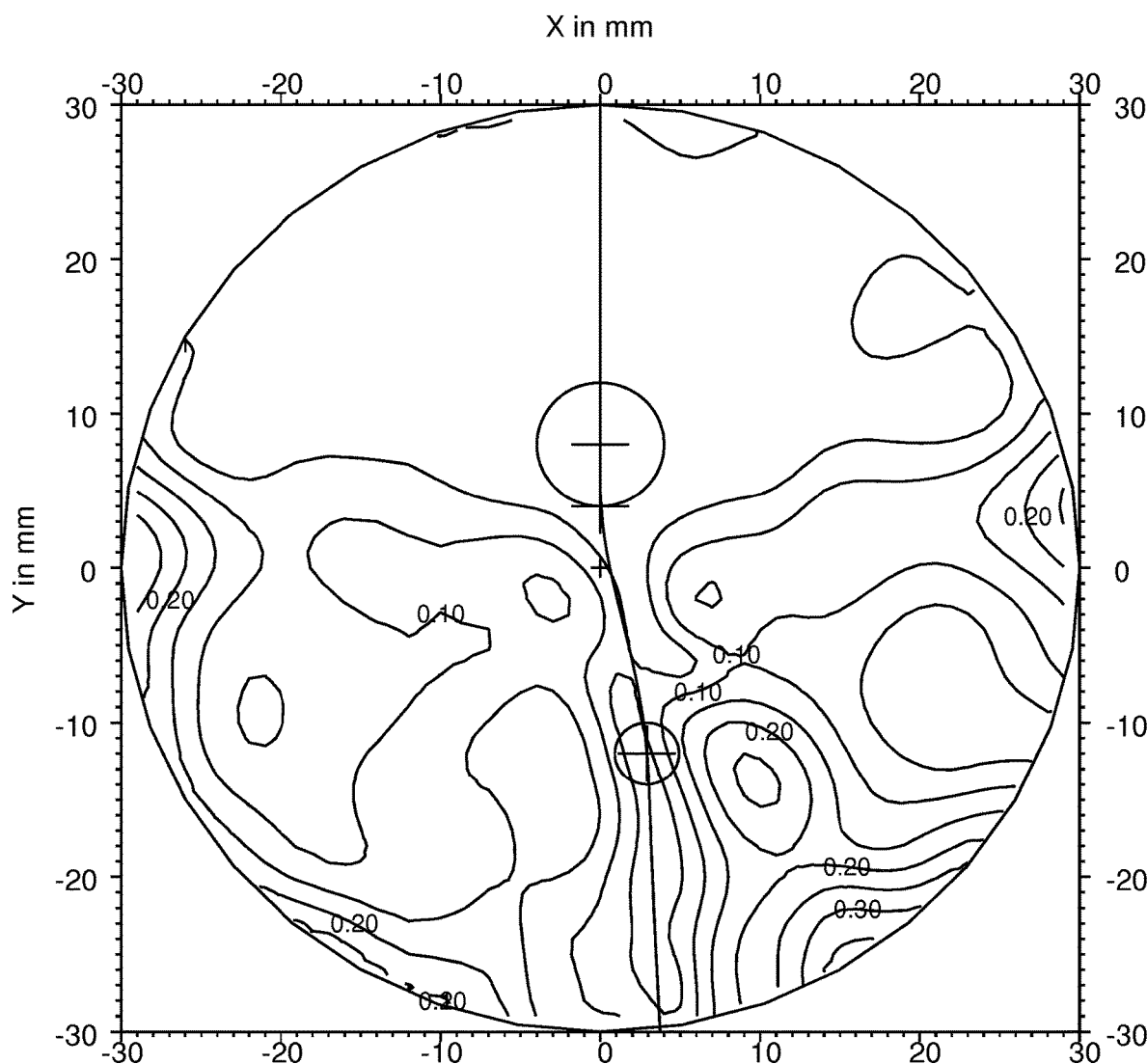

FIGS. 22a to 22c show features of the surfaces of such a modifying surface.

FIG. 22a shows mean sphere curve surrounded by minimum and maximum sphere curves, along the meridian. The x-axes are graduated in diopters, and the y-axes give the height, in mm, on the lens. FIG. 22b shows lines of equal mean sphere, i.e. lines formed by points for which the mean sphere has an identical value. The x-axis and y-axis give the height, in mm respectively along the horizontal and vertical directions.

FIG. 22c shows, using the same axes as for FIG. 22b, lines of equal cylinder.

Figure 22D:
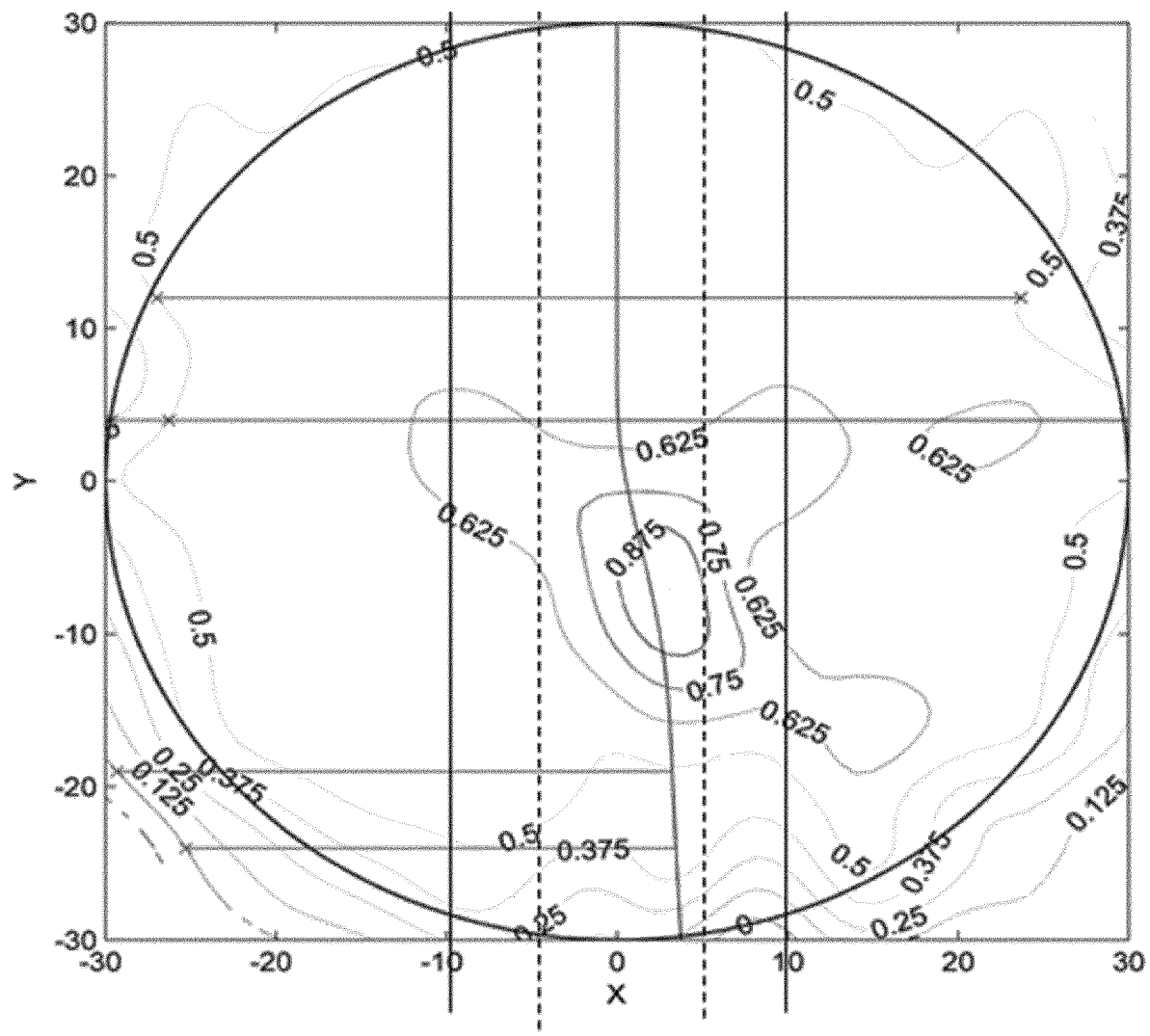
Figure 22E:
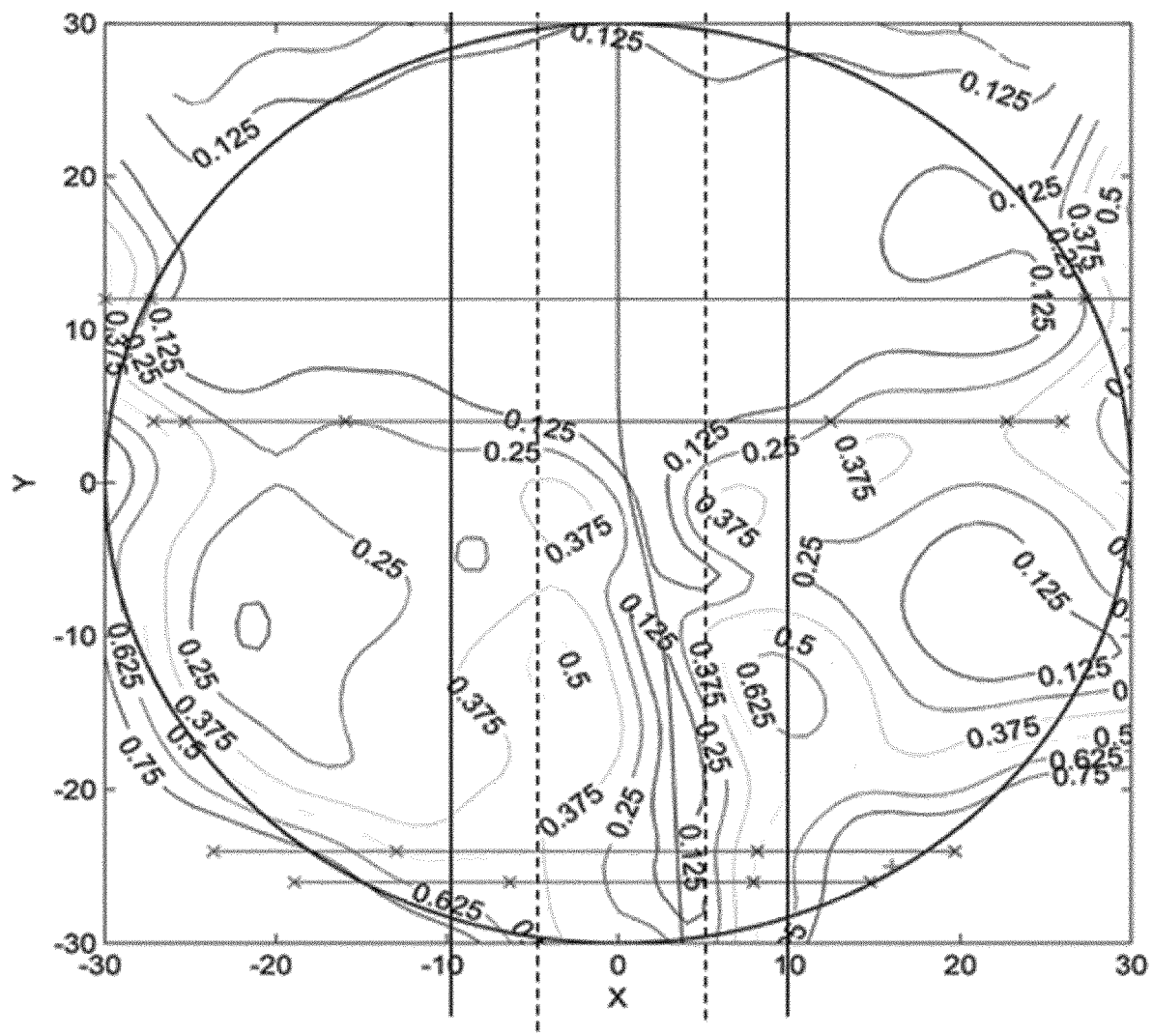

FIGS. 22d and 22e shows the normalized modifying surface SNmod corresponding to the modifying surface illustrated on FIGS. 22a to 22c, i.e. the modifying surface to which the best sphero-toric surface has been subtracted. FIG. 22d shows lines of equal mean sphere and FIG. 22e shows lines of equal cylinder, both using the same axes as for FIG. 22b.

Figure 23A:
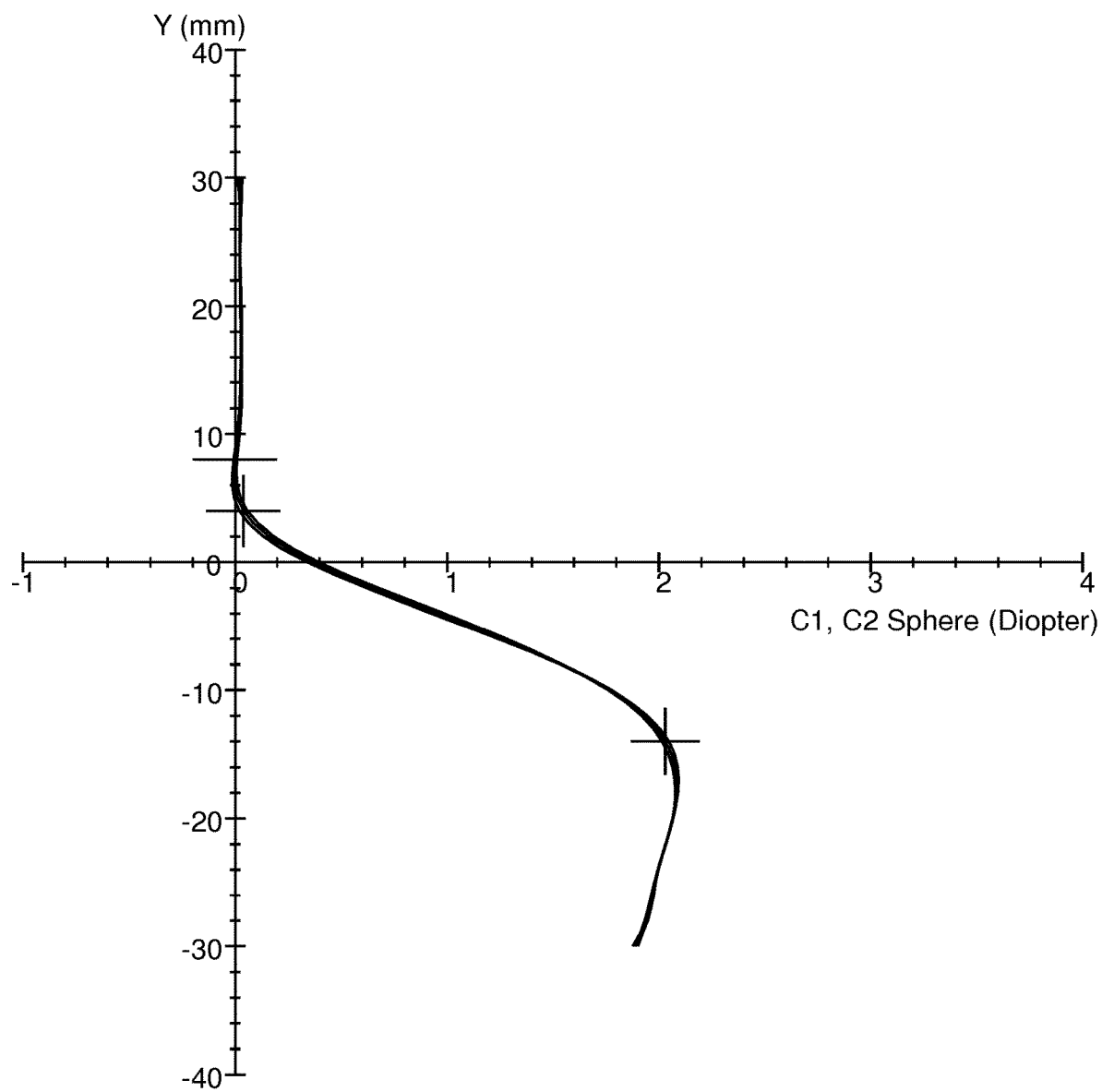
Figure 23B:
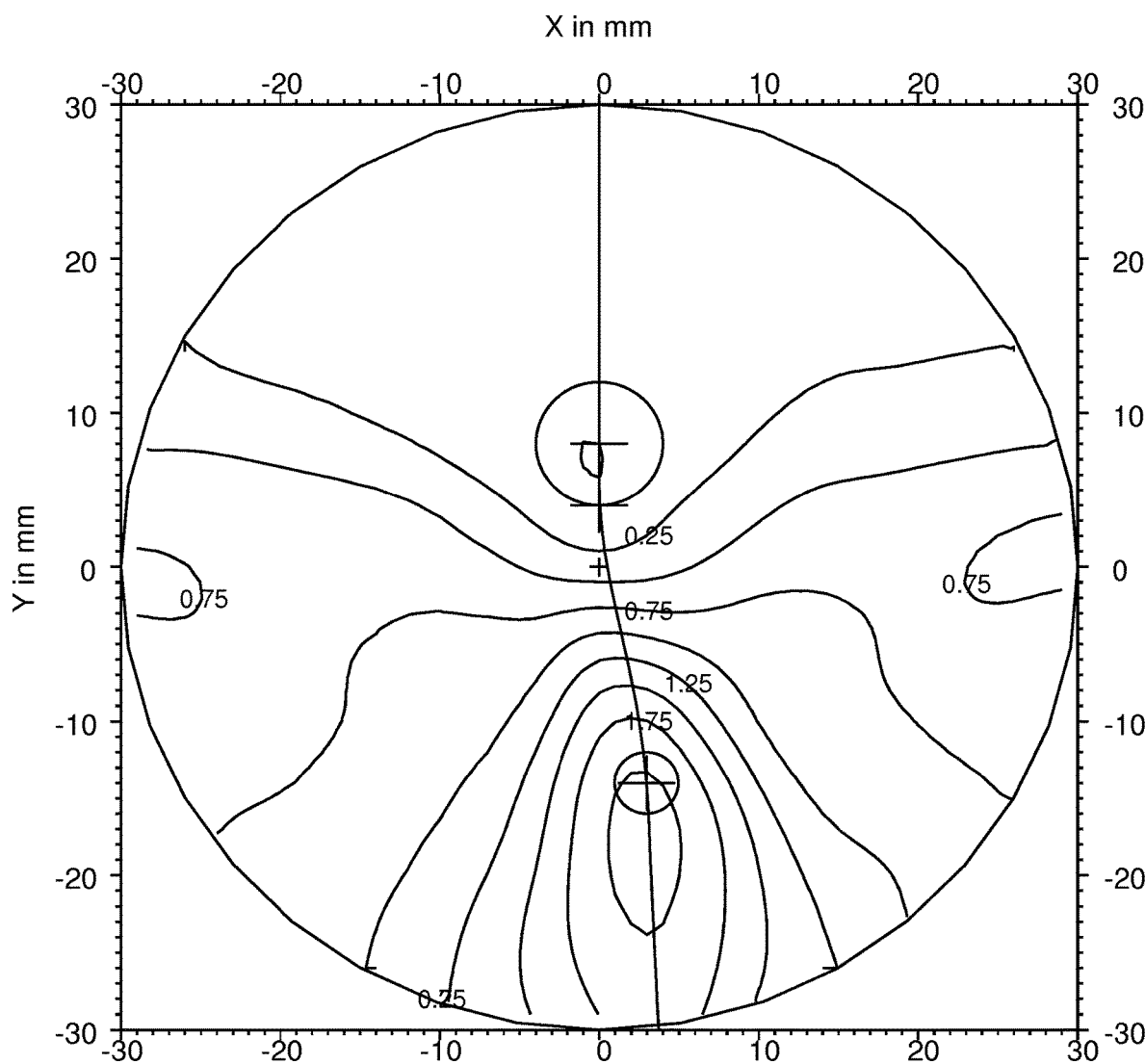
Figure 23C:
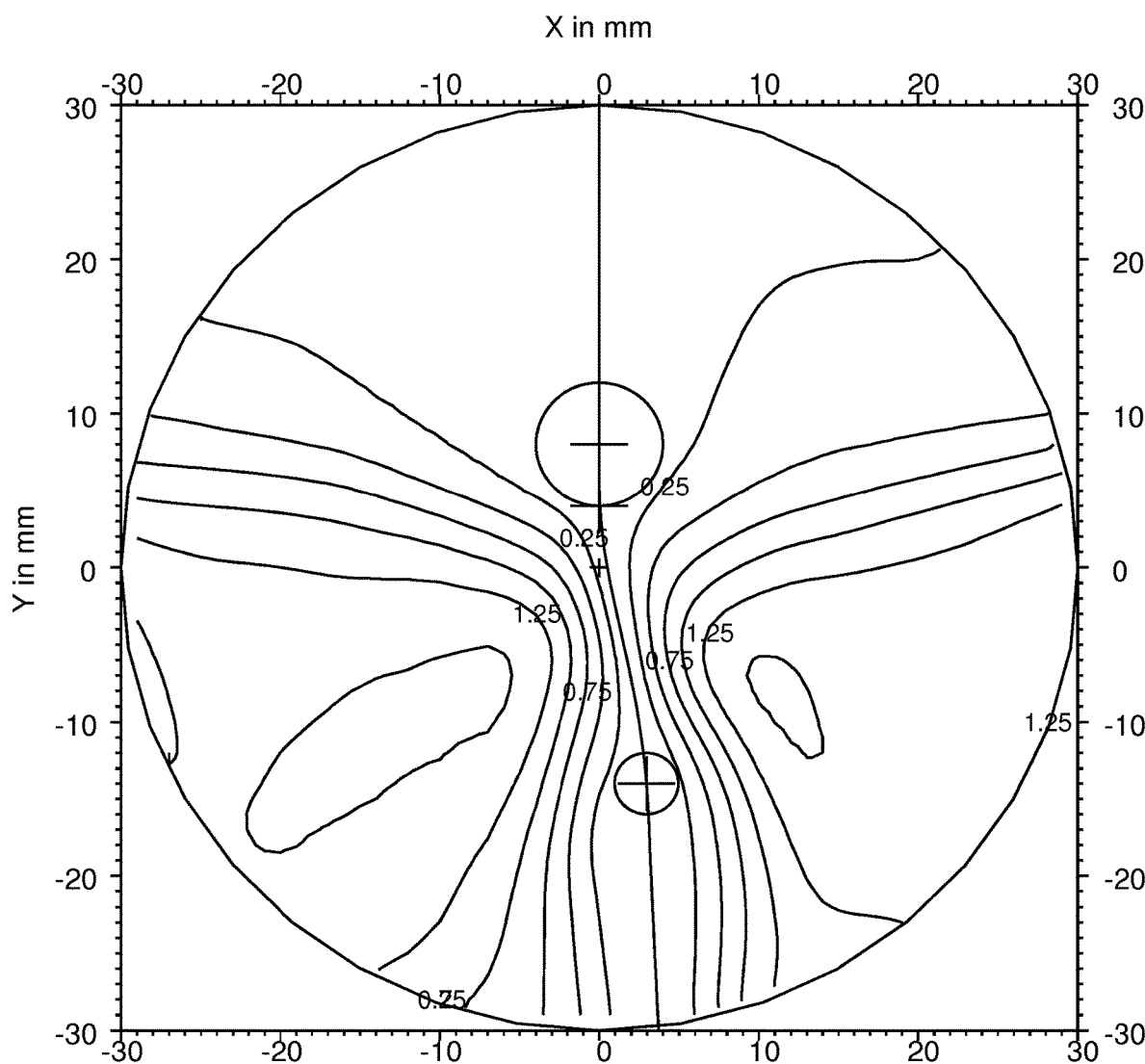

FIGS. 23a to 23c show the features of the surfaces of an initial surface of an progressive ophthalmic lens configured for a presbyopia wearer with an addition of 2 diopters.

FIG. 23a shows mean sphere curve surrounded by minimum and maximum sphere curves, along the meridian. The x-axes are graduated in diopters, and the y-axes give the height, in mm, on the lens. FIG. 23b shows lines of equal mean sphere, i.e. lines formed by points for which the mean sphere has an identical value. The x-axis and y-axis give the height, in mm respectively along the horizontal and vertical directions. FIG. 23c shows, using the same axes as for FIG. 23b, lines of equal cylinder.

Figure 24A:
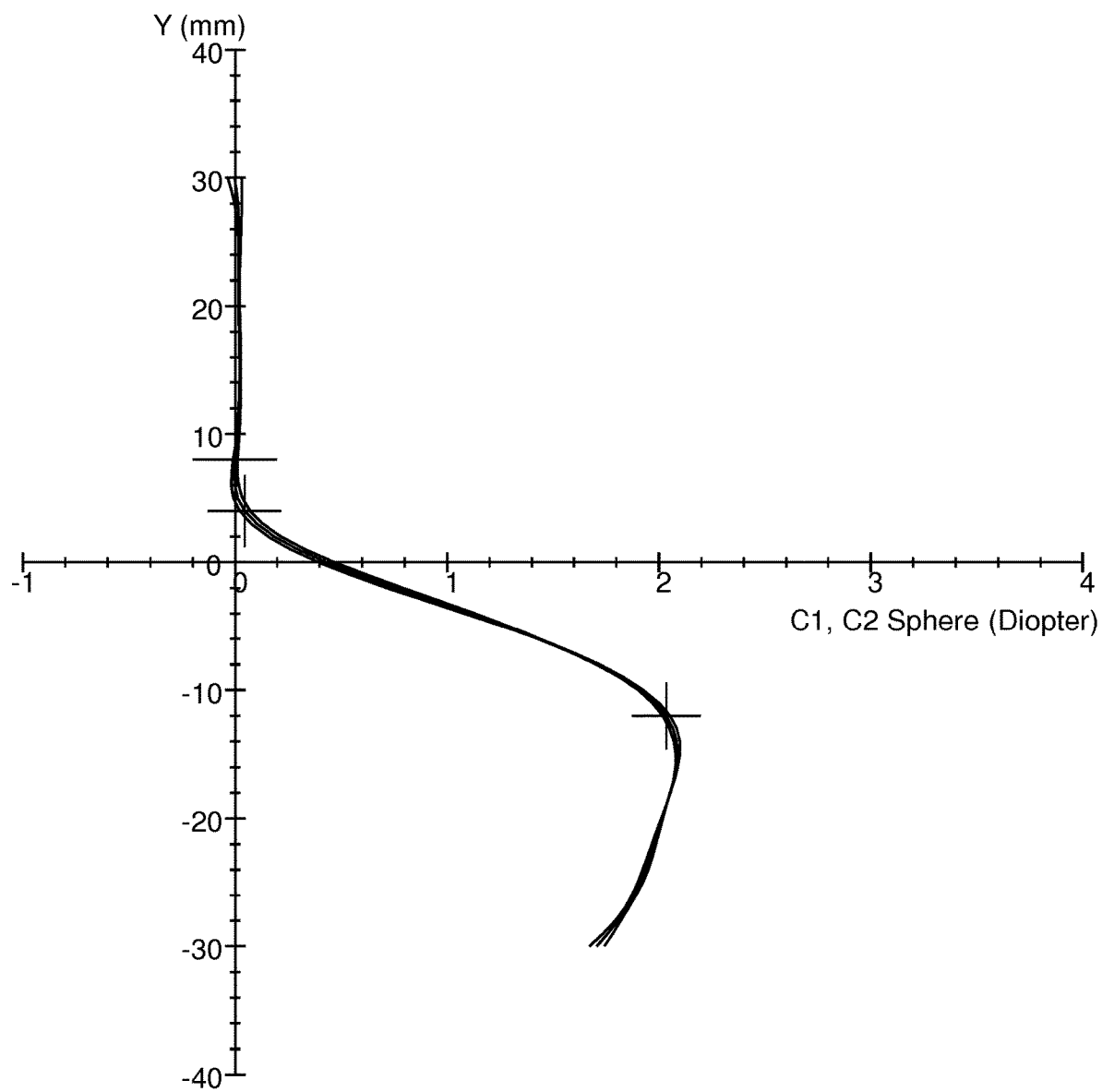
Figure 24B:
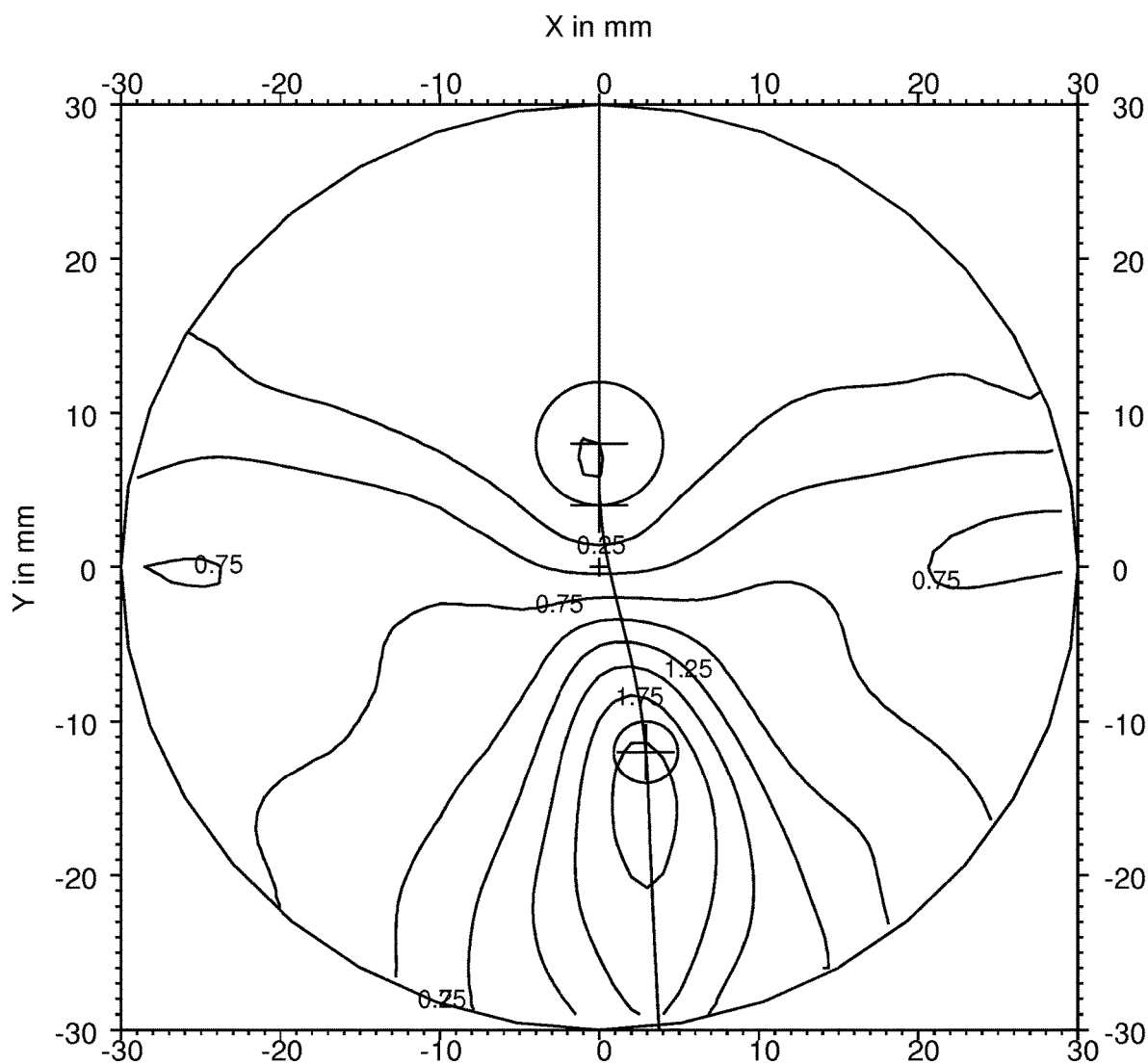
Figure 24C:
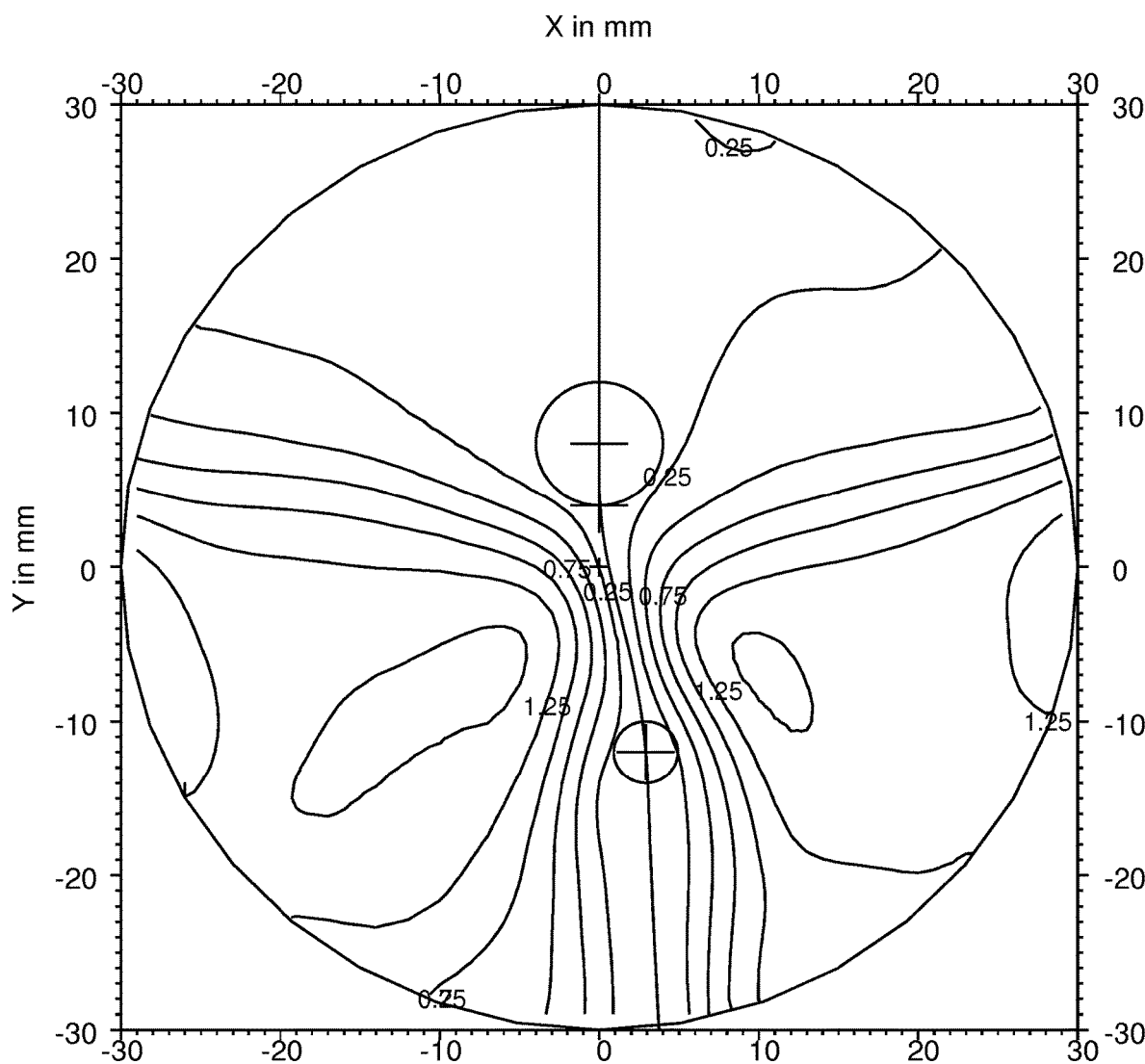

FIGS. 24a to 24c show the features of the surfaces of the optical surface obtained by combining the modifying surface shown on FIGS. 22a to 22c with the initial surface shown on FIGS. 23a to 23c.

FIG. 24a shows mean sphere curve surrounded by minimum and maximum sphere curves, along the meridian. The x-axes are graduated in diopters, and the y-axes give the height, in mm, on the lens.

FIG. 24b shows lines of equal mean sphere, i.e. lines formed by points for which the mean sphere has an identical value. The x-axis and y-axis give the height, in mm respectively along the horizontal and vertical directions. FIG. 24c shows, using the same axes as for FIG. 24b, lines of equal cylinder.

As observed when comparing the optical features of the initial surface and of the modified optical surface, the length of progression has been reduce from 17 mm to 14 mm without being changed in the other areas.

Thus by combining the modifying surface illustrated in FIGS. 23a to 23c with the initial surface, one may reduce the length of progression of the optical design of the initial surface without having to go through a new optical optimization.

Example 6: Broadening Far Vision Zone

The modifying surface according to example 6, is intended to broaden the far vision zone of an initial multifocal ophthalmic lens design.

The inventors have developed a modifying surface to be applied to one of the surfaces of an optimized multifocal ophthalmic lens, for example the front face surface, so as to broaden the far vision zone without modifying the rest of the mean power and astigmatism distribution.

Figure 25A:
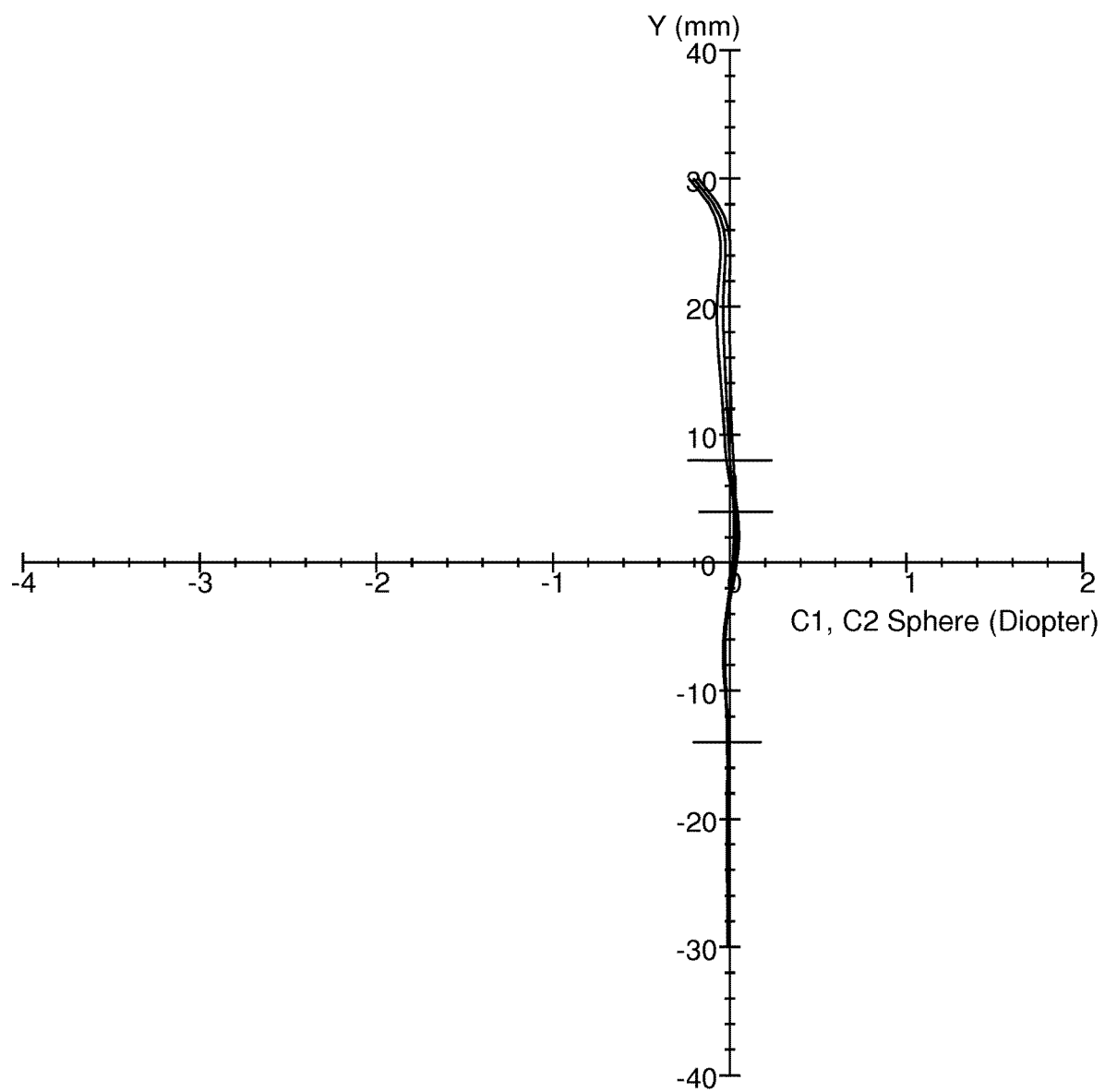
Figure 25B:
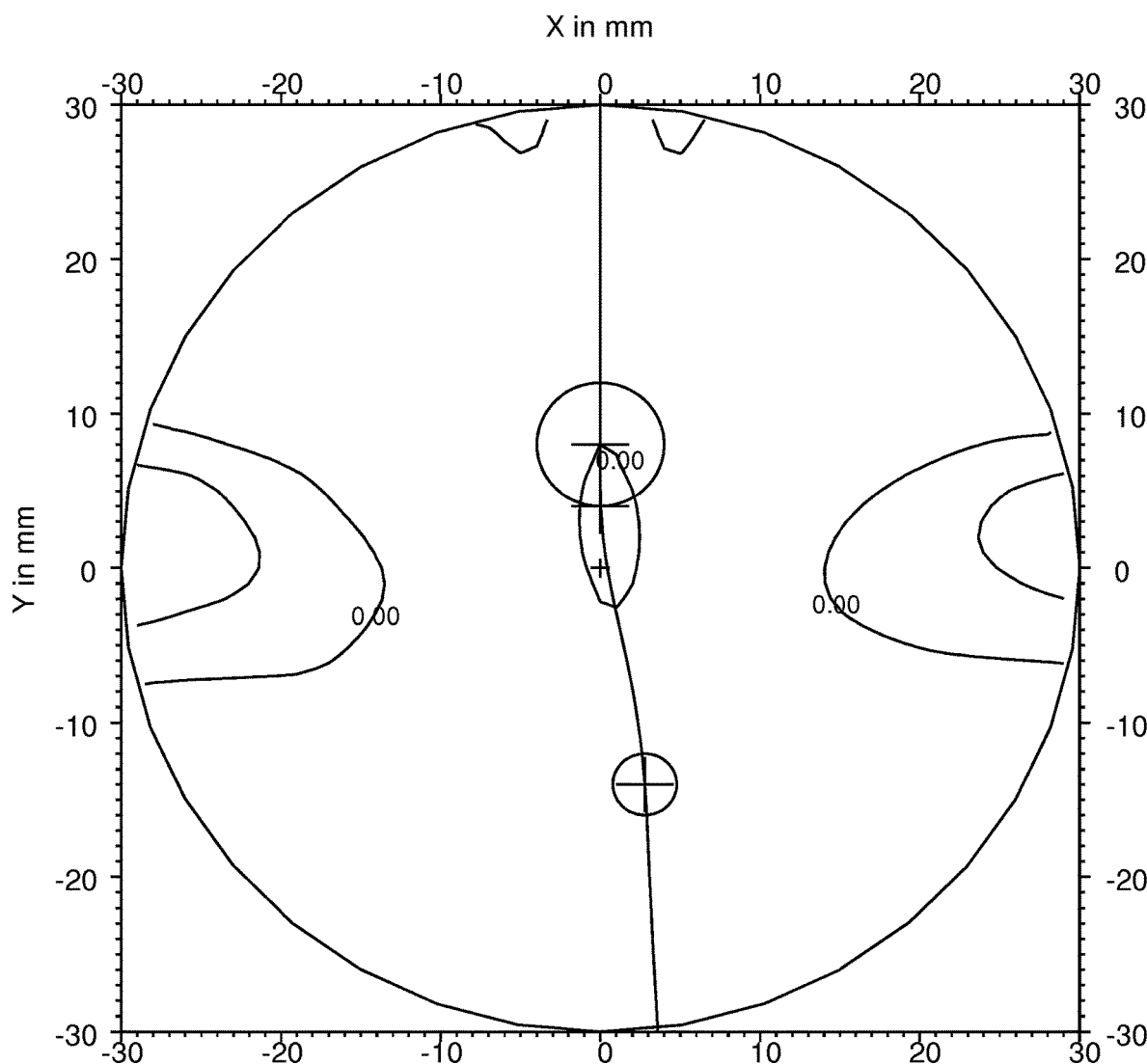
Figure 25C:
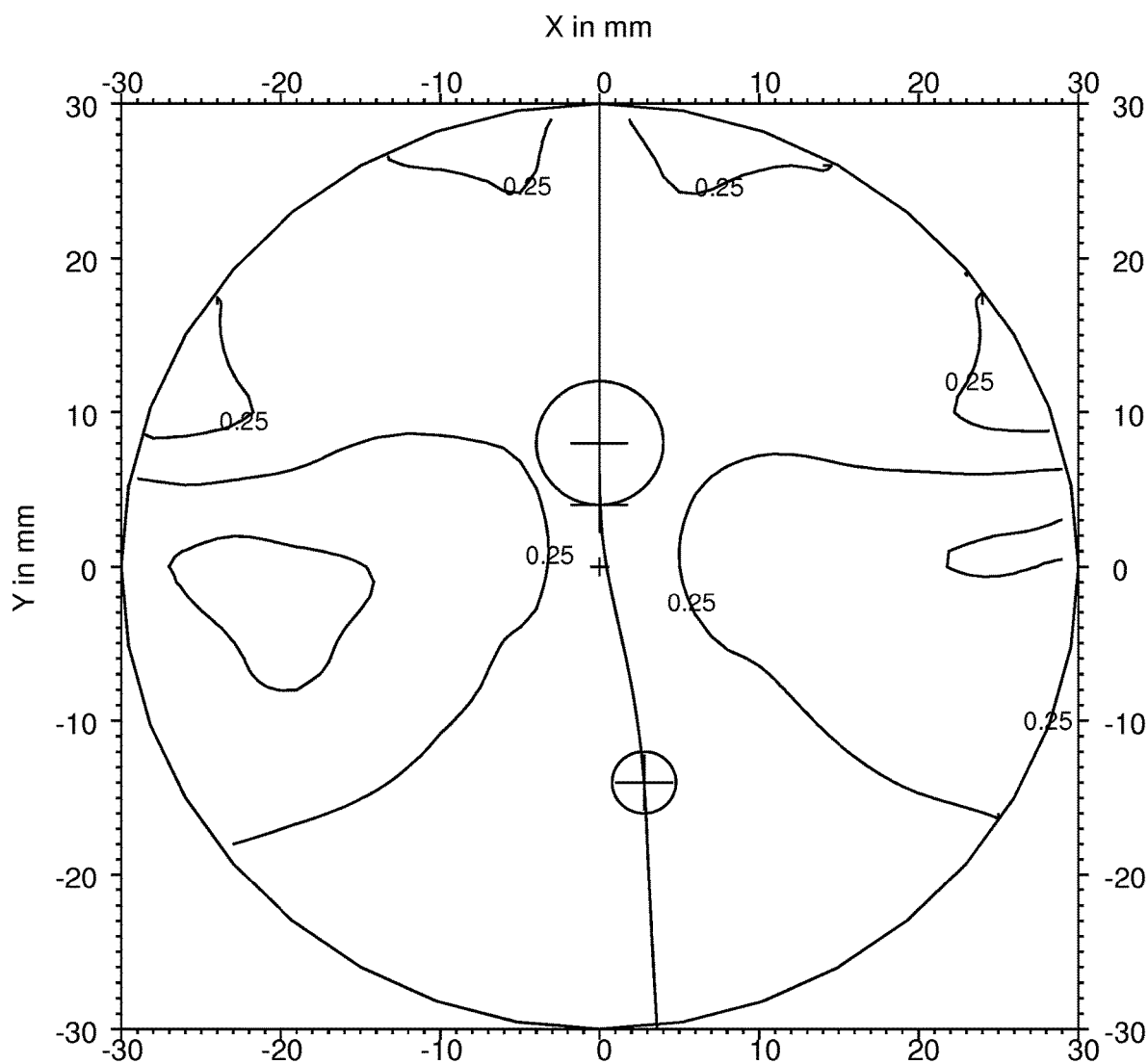

FIGS. 25a to 25c show features of the surfaces of such a modifying surface.

FIG. 25a shows mean sphere curve surrounded by minimum and maximum sphere curves, along the meridian. The x-axes are graduated in diopters, and the y-axes give the height, in mm, on the lens. FIG. 25b shows lines of equal mean sphere, i.e. lines formed by points for which the mean sphere has an identical value. The x-axis and y-axis give the height, in mm respectively along the horizontal and vertical directions.

FIG. 25c shows, using the same axes as for FIG. 25b, lines of equal cylinder.

Figure 25D:
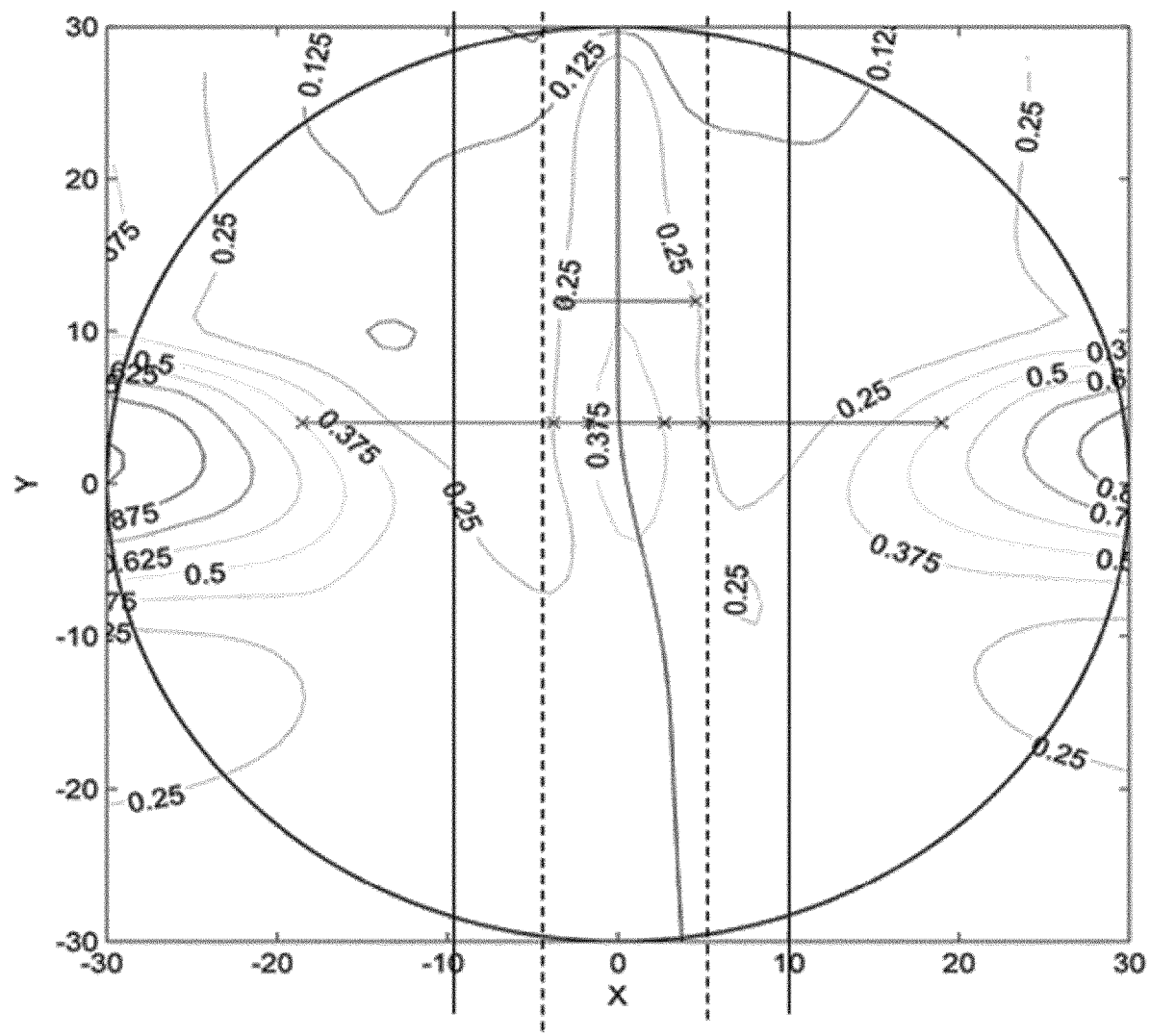
Figure 25E:
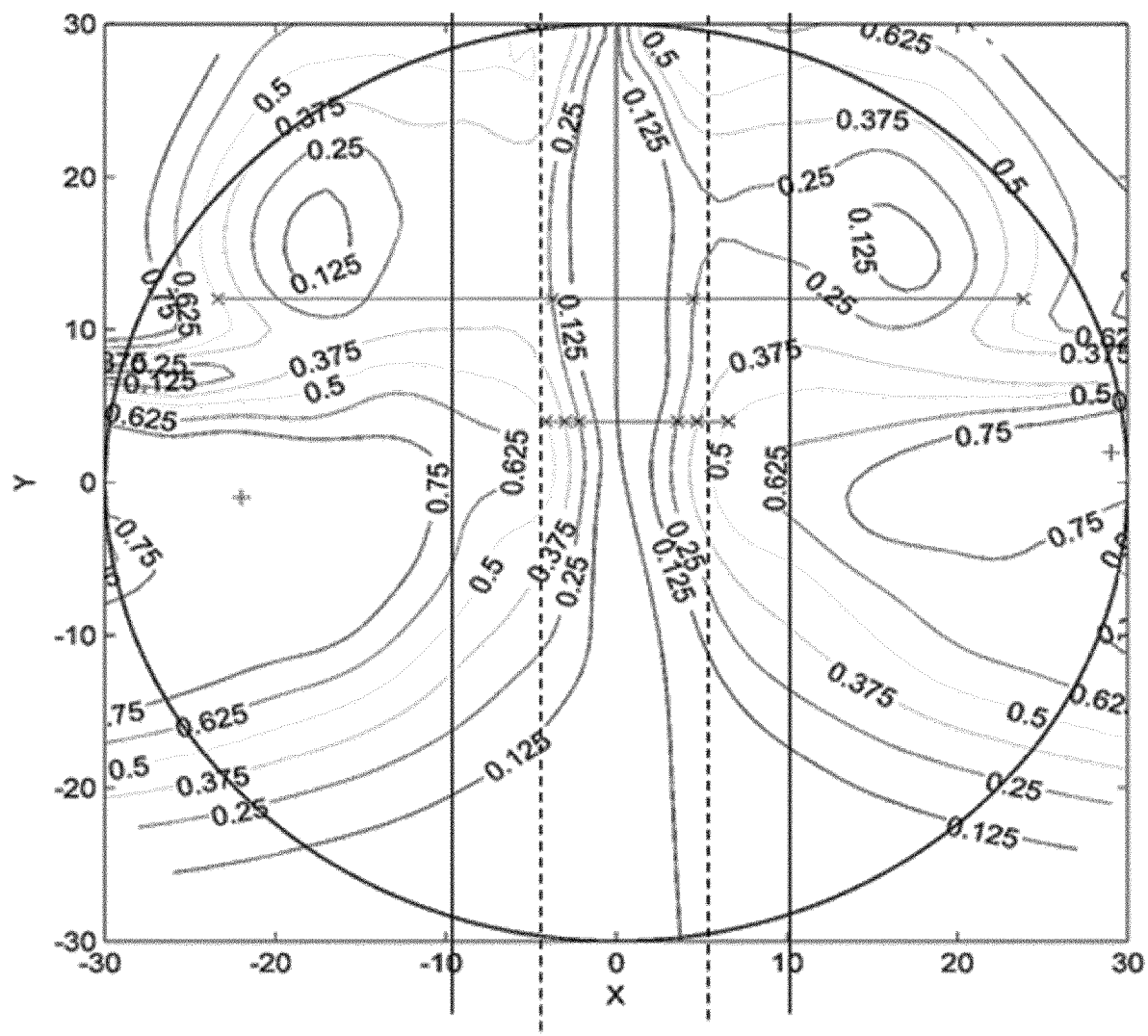

FIGS. 25d and 25e shows the normalized modifying surface SNmod corresponding to the modifying surface illustrated on FIGS. 25a to 25c. FIG. 25d shows lines of equal mean sphere and FIG. 13e shows lines of equal cylinder, both using the same axes as for FIG. 25b.

Figure 26A:
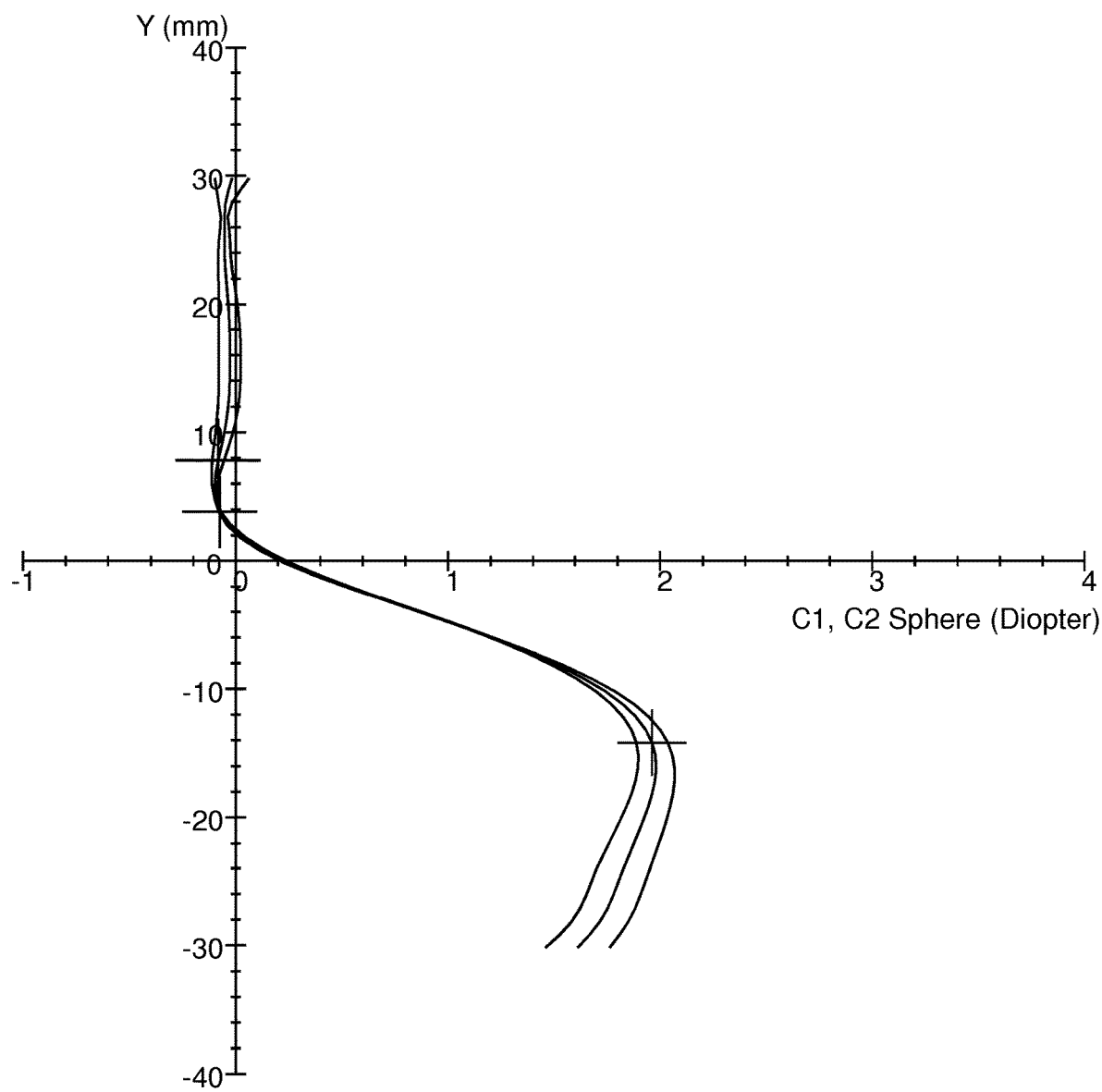
Figure 26B:
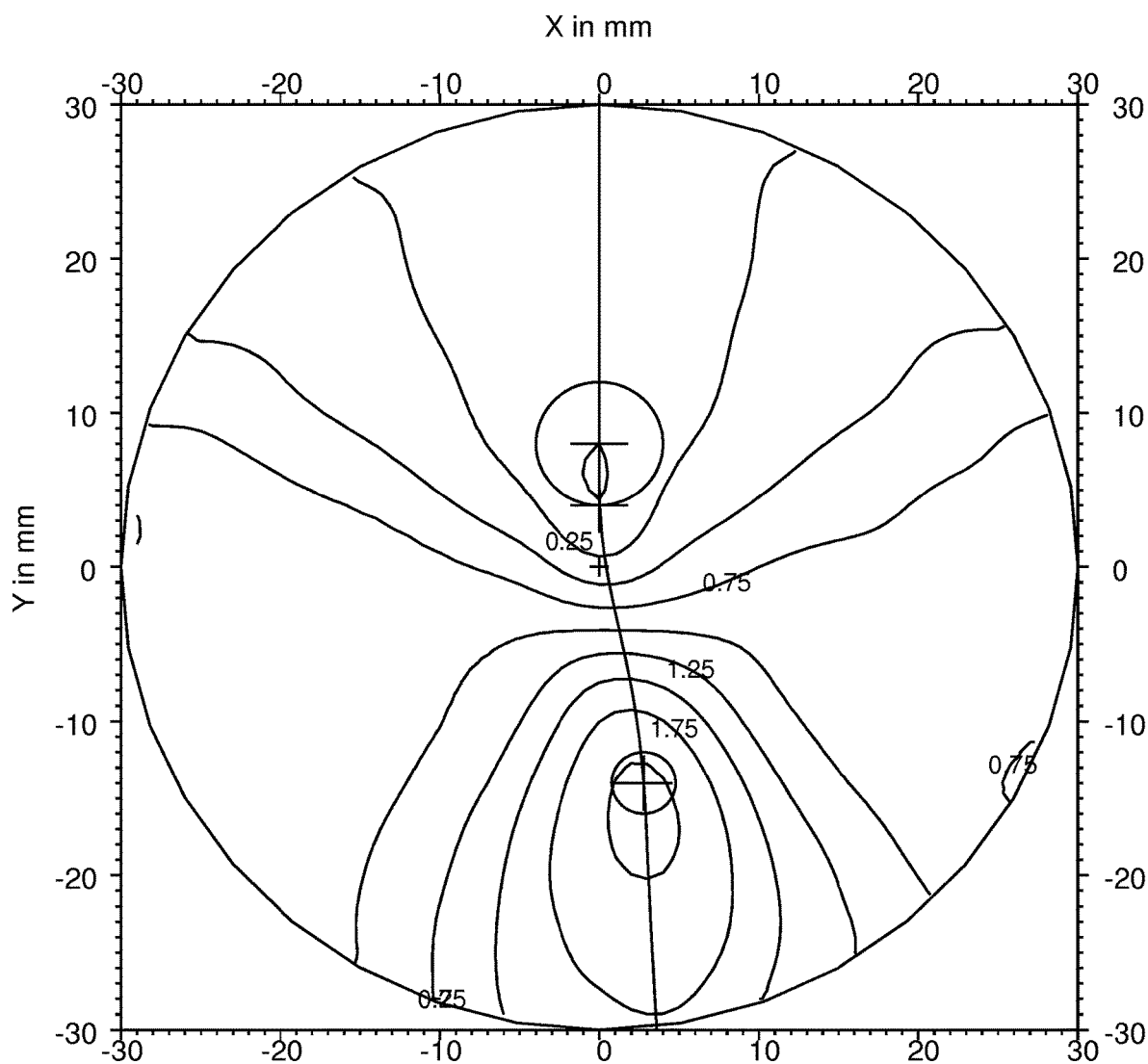
Figure 26C:
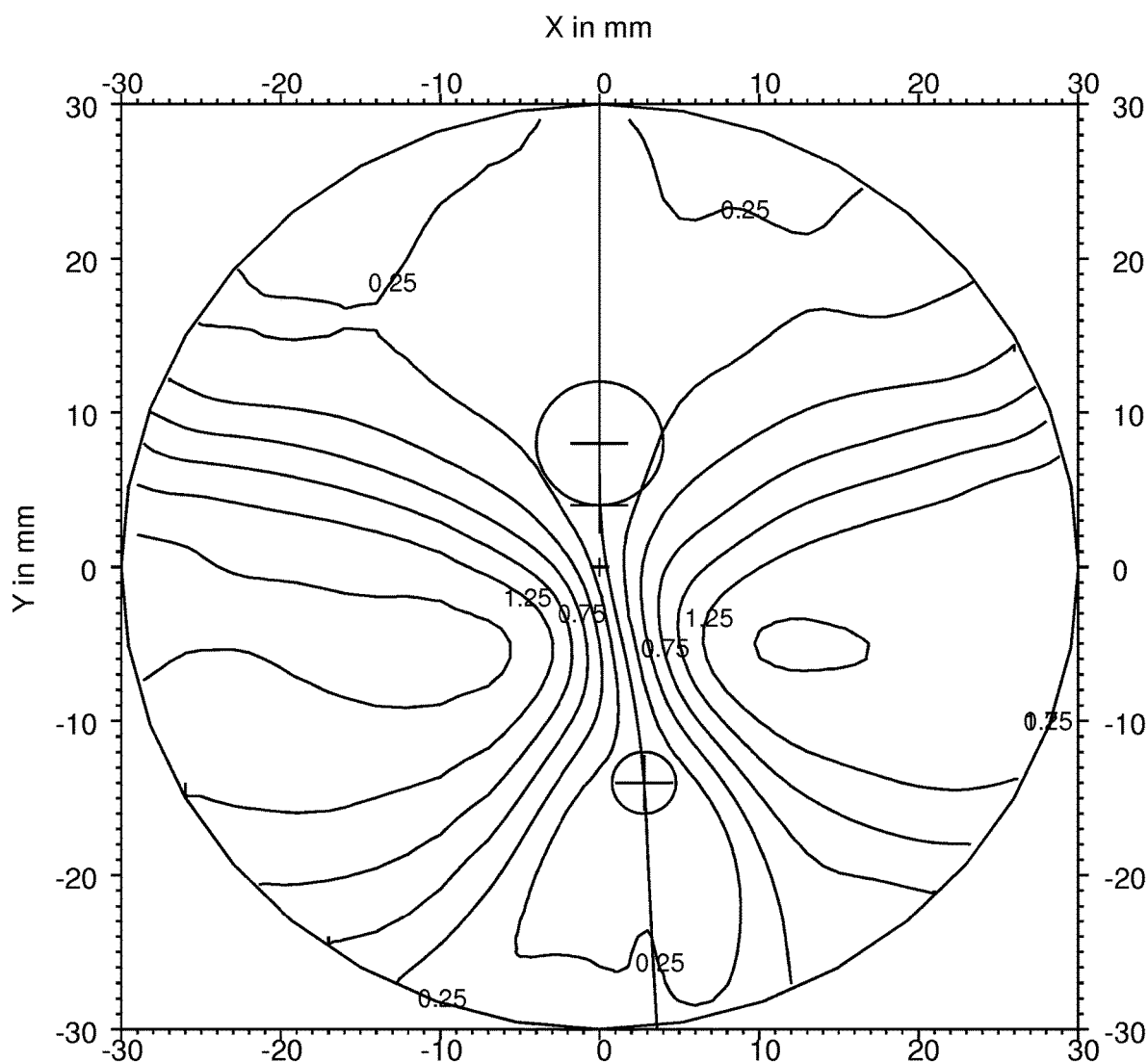

FIGS. 26a to 26c show the features of the surfaces of an initial surface of an progressive ophthalmic lens configured for a presbyopia wearer with an addition of 2 diopters.

FIG. 26a shows mean sphere curve surrounded by minimum and maximum sphere curves, along the meridian. The x-axes are graduated in diopters, and the y-axes give the height, in mm, on the lens. FIG. 26b shows lines of equal mean sphere, i.e. lines formed by points for which the mean sphere has an identical value. The x-axis and y-axis give the height, in mm respectively along the horizontal and vertical directions. FIG. 26c shows, using the same axes as for FIG. 26b, lines of equal cylinder.

Figure 27A:
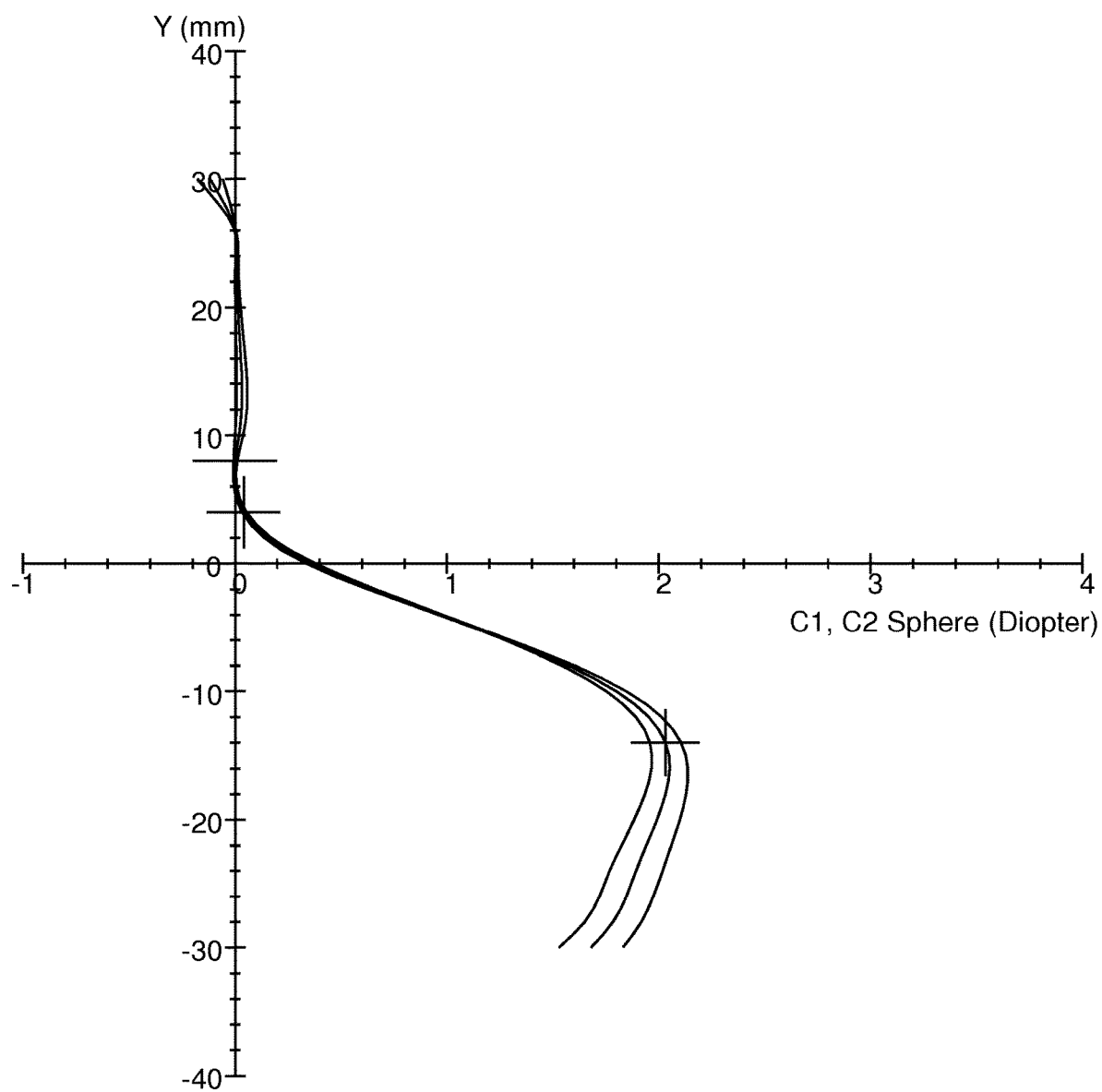
Figure 27B:
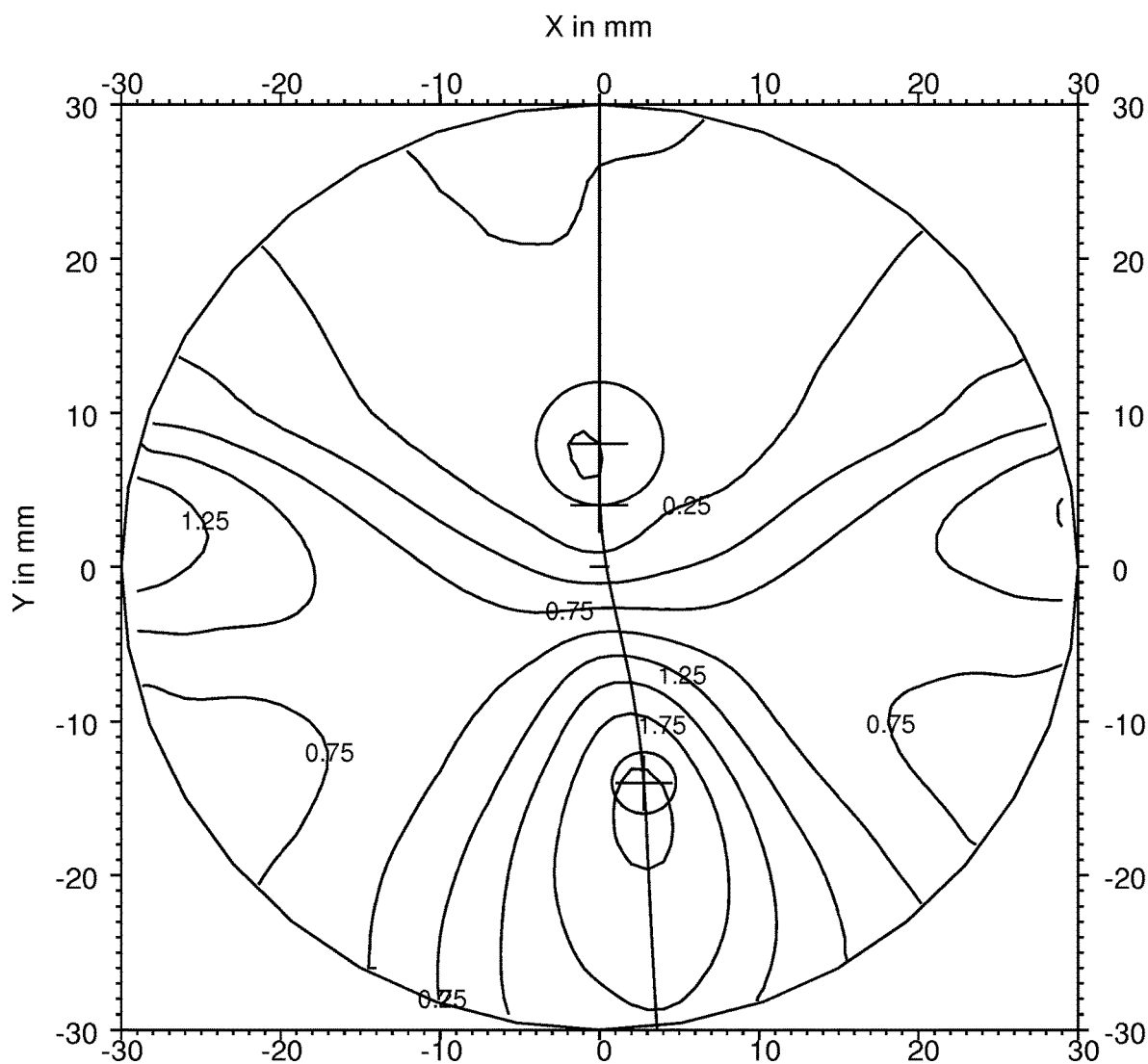
Figure 27C:
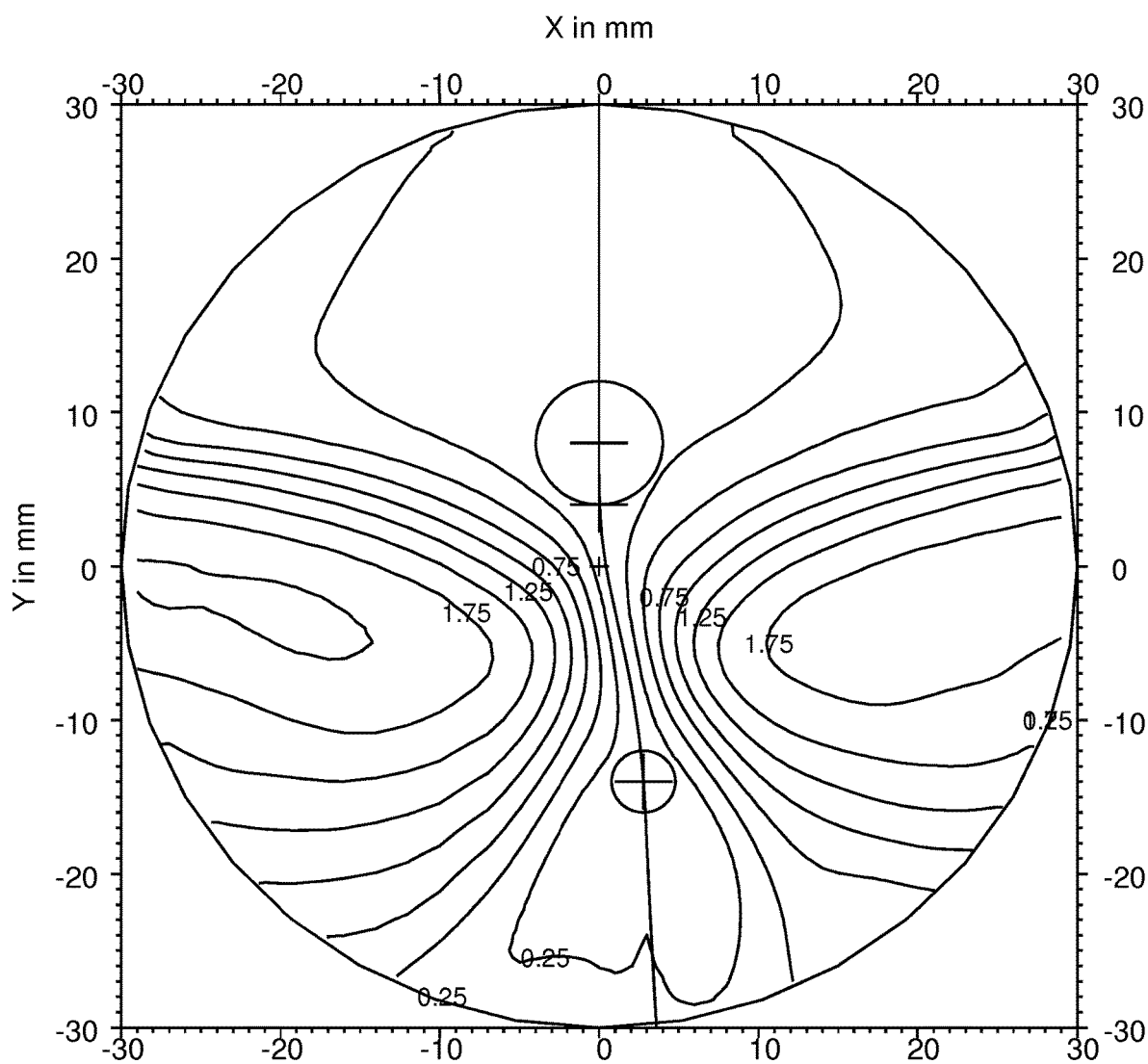

FIGS. 27a to 27c show the features of the surfaces of the optical surface obtained by combining the modifying surface shown on FIGS. 25a to 25c with the initial surface shown on FIGS. 26a to 26c.

FIG. 27a shows mean sphere curve surrounded by minimum and maximum sphere curves, along the meridian. The x-axes are graduated in diopters, and the y-axes give the height, in mm, on the lens.

FIG. 27b shows lines of equal mean sphere, i.e. lines formed by points for which the mean sphere has an identical value. The x-axis and y-axis give the height, in mm respectively along the horizontal and vertical directions. FIG. 27c shows, using the same axes as for FIG. 27b, lines of equal cylinder.

As observed when comparing the optical features of the initial surface and of the modified optical surface, the mean sphere and cylinder distribution has only be broaden in the far vision zone without being changed in the other areas.

Thus by combining the modifying surface illustrated in FIGS. 25a to 25c with the initial surface, one may broaden the far vision zone of the optical design of the initial surface without having to go through a new optical optimization.

Example 7: Considering the Mounting Parameters

The modifying surface according to example 7, is intended to adapt an initial multifocal ophthalmic lens design to mounting parameters of the ophthalmic lens in a chosen spectacle frame. The mounting parameters that may be considered comprise the wrap angle, the pantoscopic angle and the eye to lens distance.

The modifying surface according to example 7, is intended to consider the wrap angle. The inventors have developed a modifying surface to be applied to the rear surface of an optimized multifocal ophthalmic lens intended to be mounted with a wrap angle of 15° so as to obtain the same optical effect as if the optimized multifocal ophthalmic lens was mounted with a wrap angle of 0°.

Figure 28A:
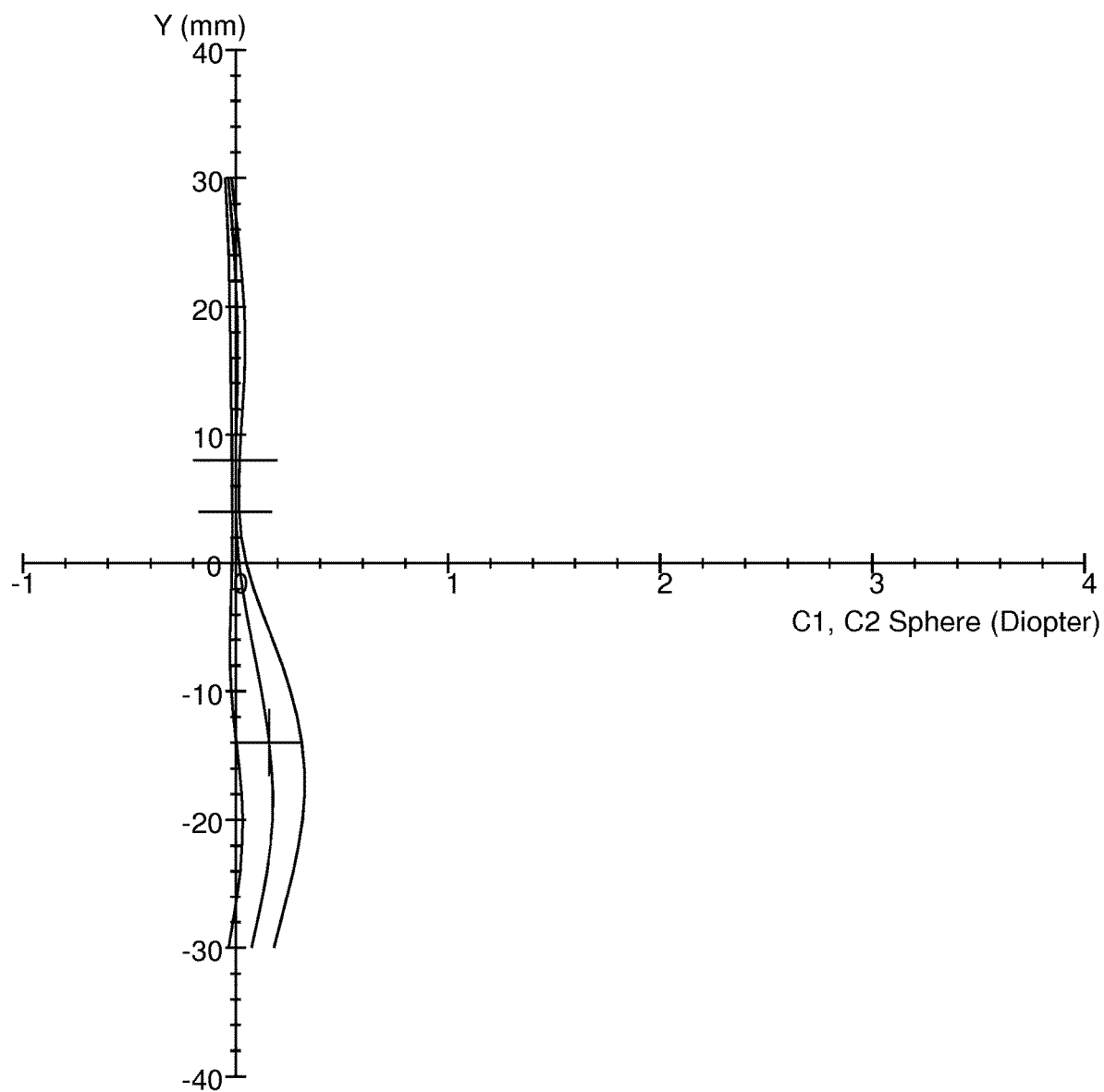
Figure 28B:
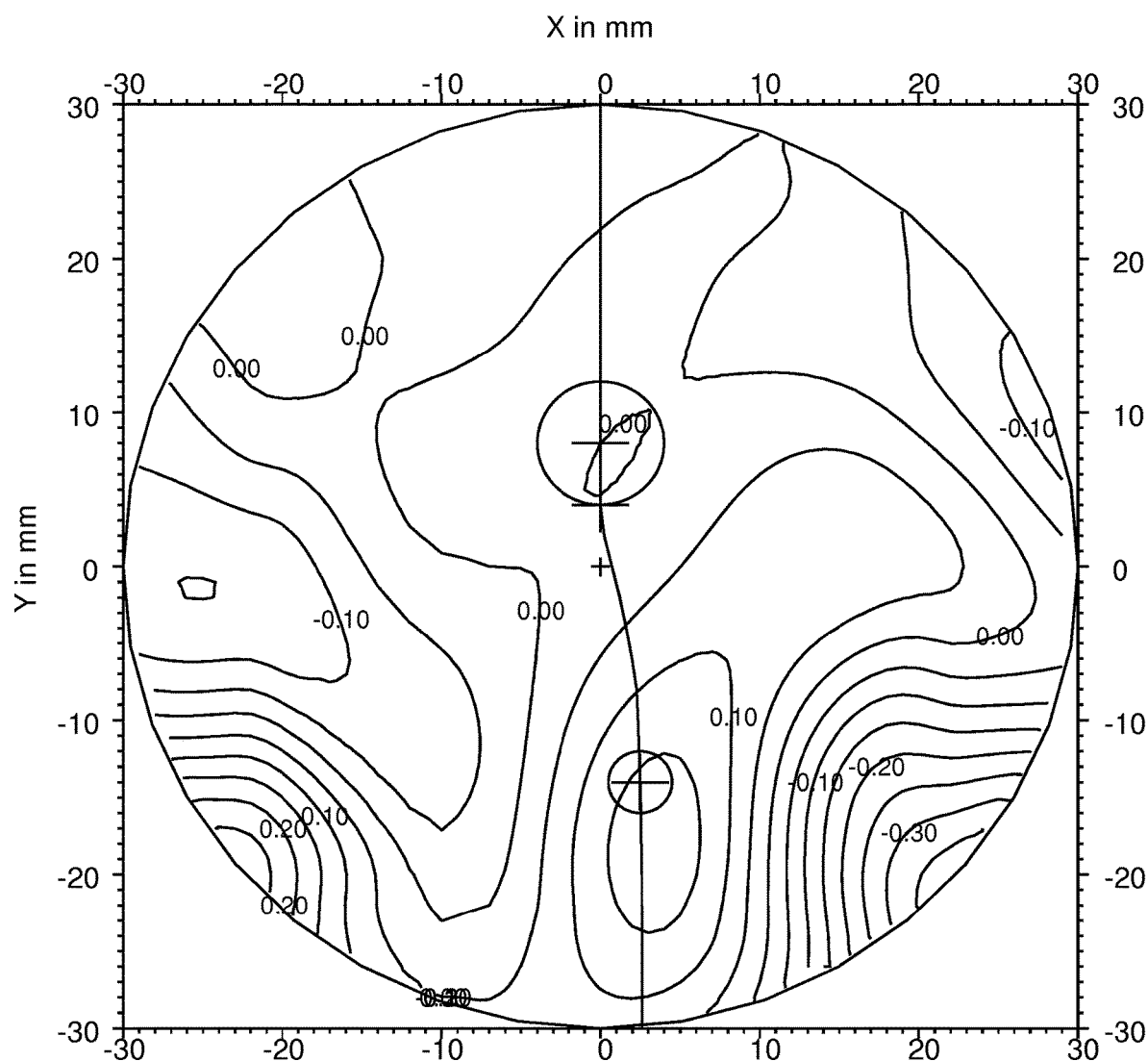
Figure 28C:
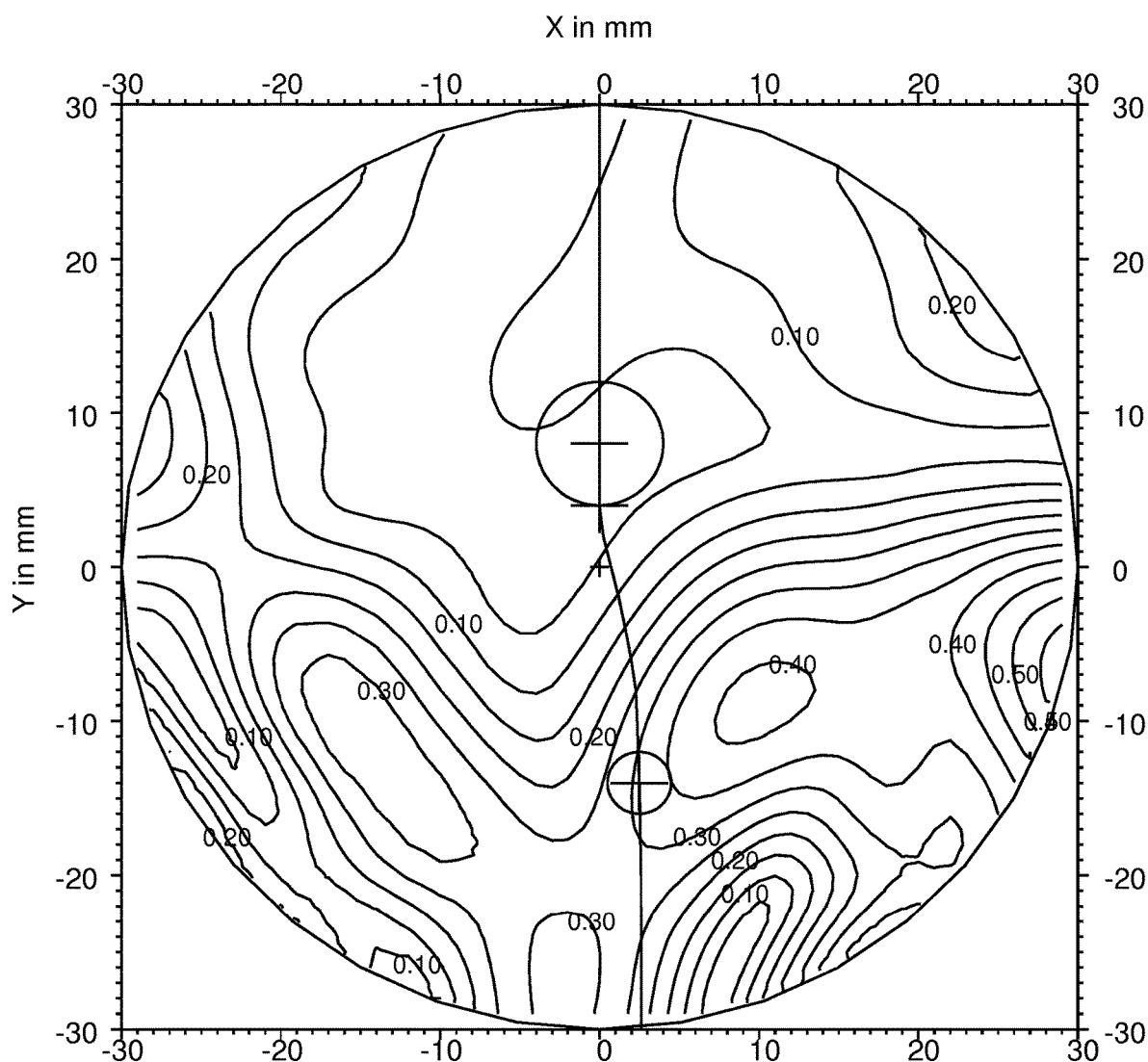

FIGS. 28a to 28c show features of the surface of such a modifying surface adapted to compensate a wrap angle of 15°.

FIG. 28a shows mean sphere curve surrounded by minimum and maximum sphere curves, along the meridian. The x-axes are graduated in diopters, and the y-axes give the height, in mm, on the lens.

FIG. 28b shows lines of equal mean sphere, i.e. lines formed by points for which the mean sphere has an identical value. The x-axis and y-axis give the height, in mm respectively along the horizontal and vertical directions.

FIG. 28c shows, using the same axes as for FIG. 28b, lines of equal cylinder.

Figure 28D:
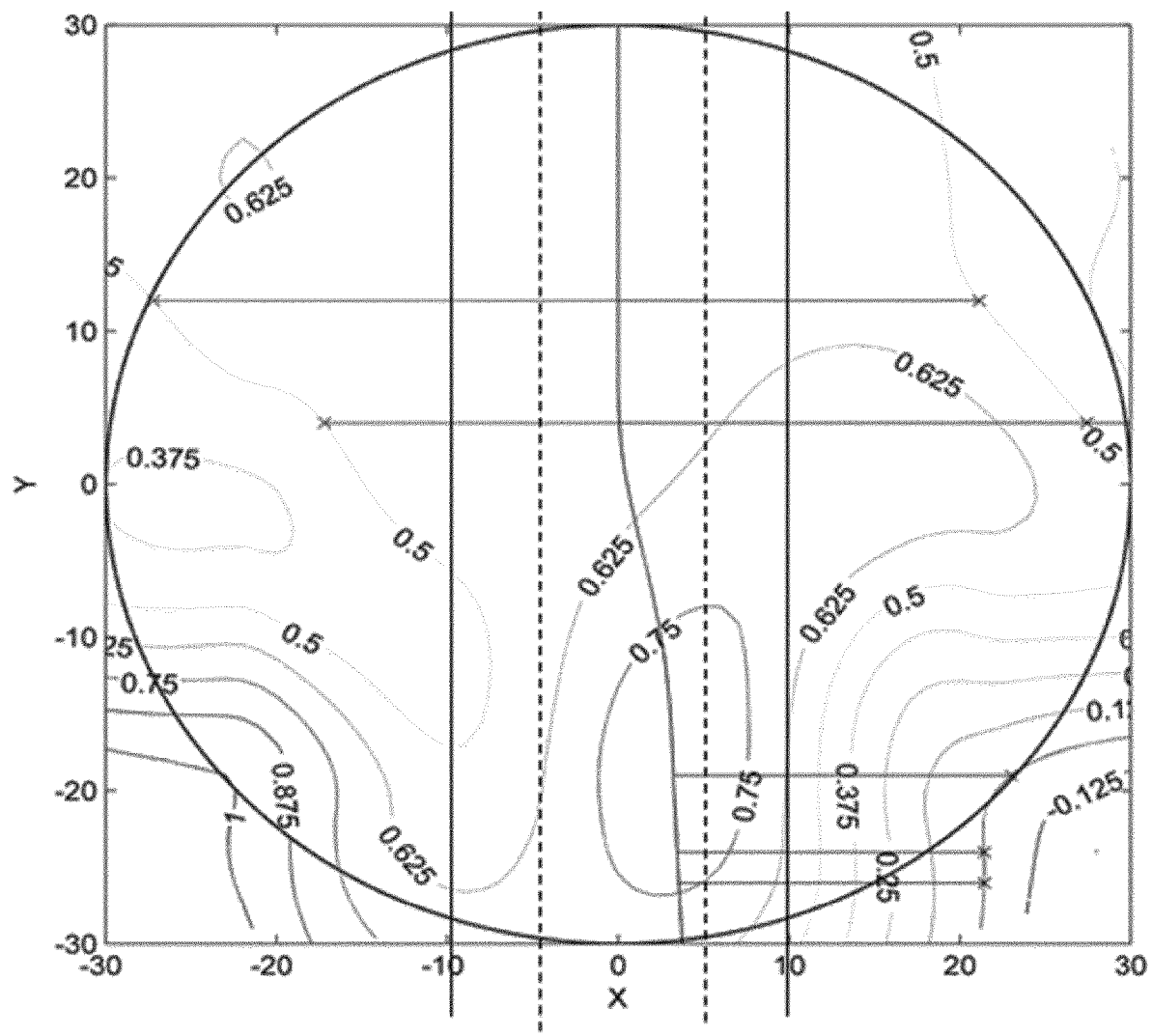
Figure 28E:
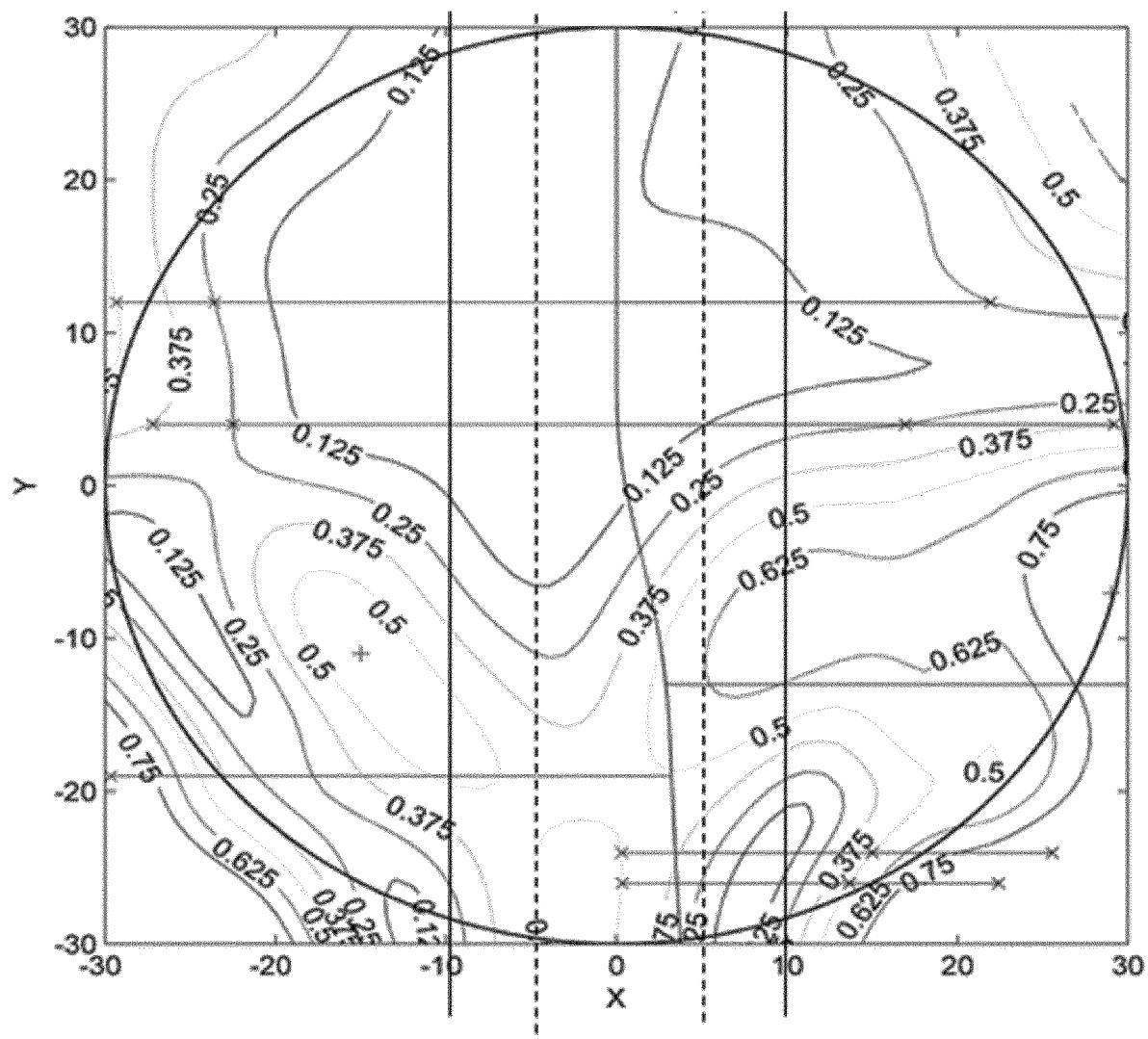

FIGS. 28d and 28e shows the normalized modifying surface SNmod corresponding to the modifying surface illustrated on FIGS. 28a to 28c. FIG. 28d shows lines of equal mean sphere and FIG. 28e shows lines of equal cylinder, both using the same axes as for FIG. 28b.

Figure 29A:
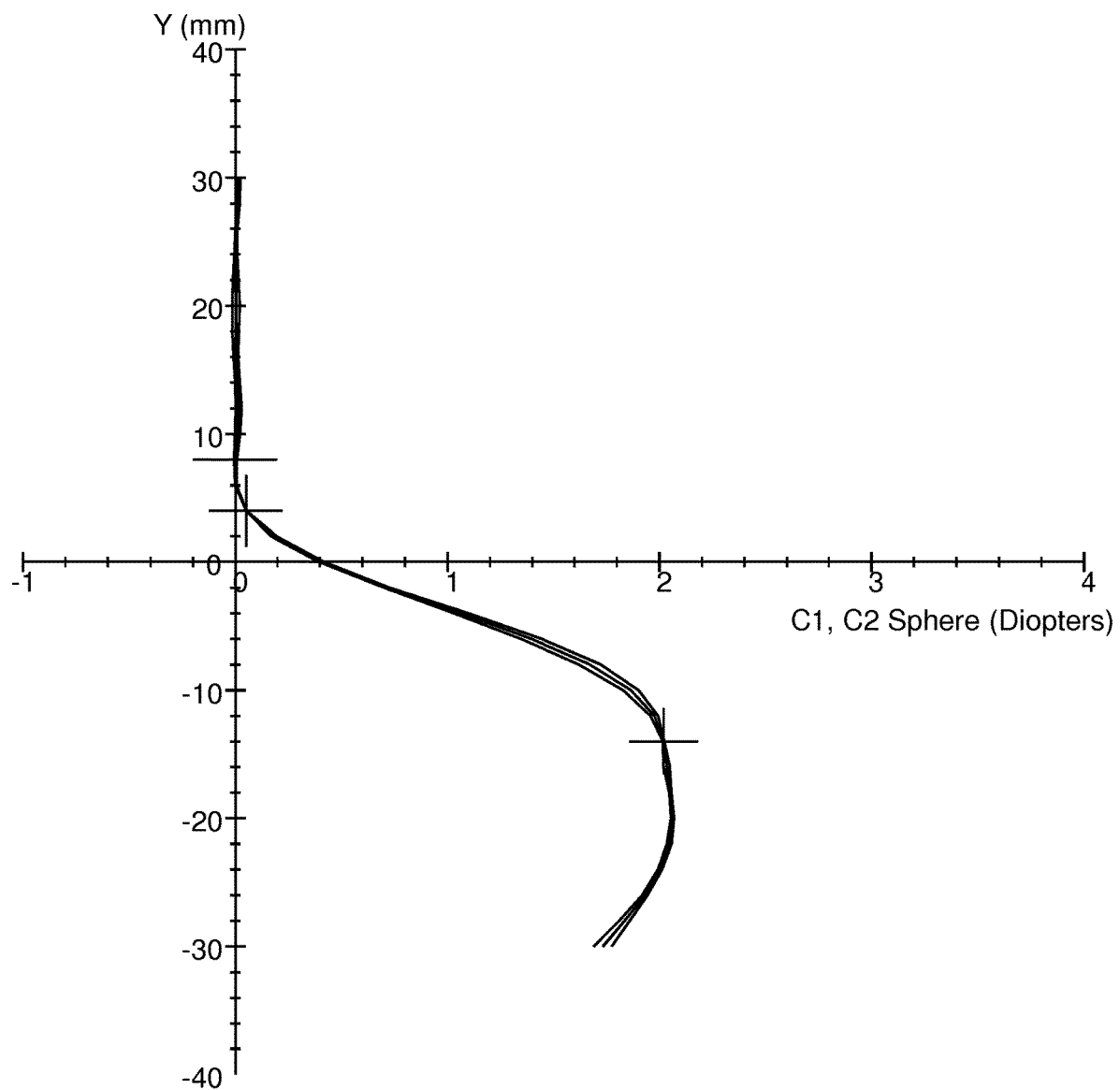
Figure 29B:
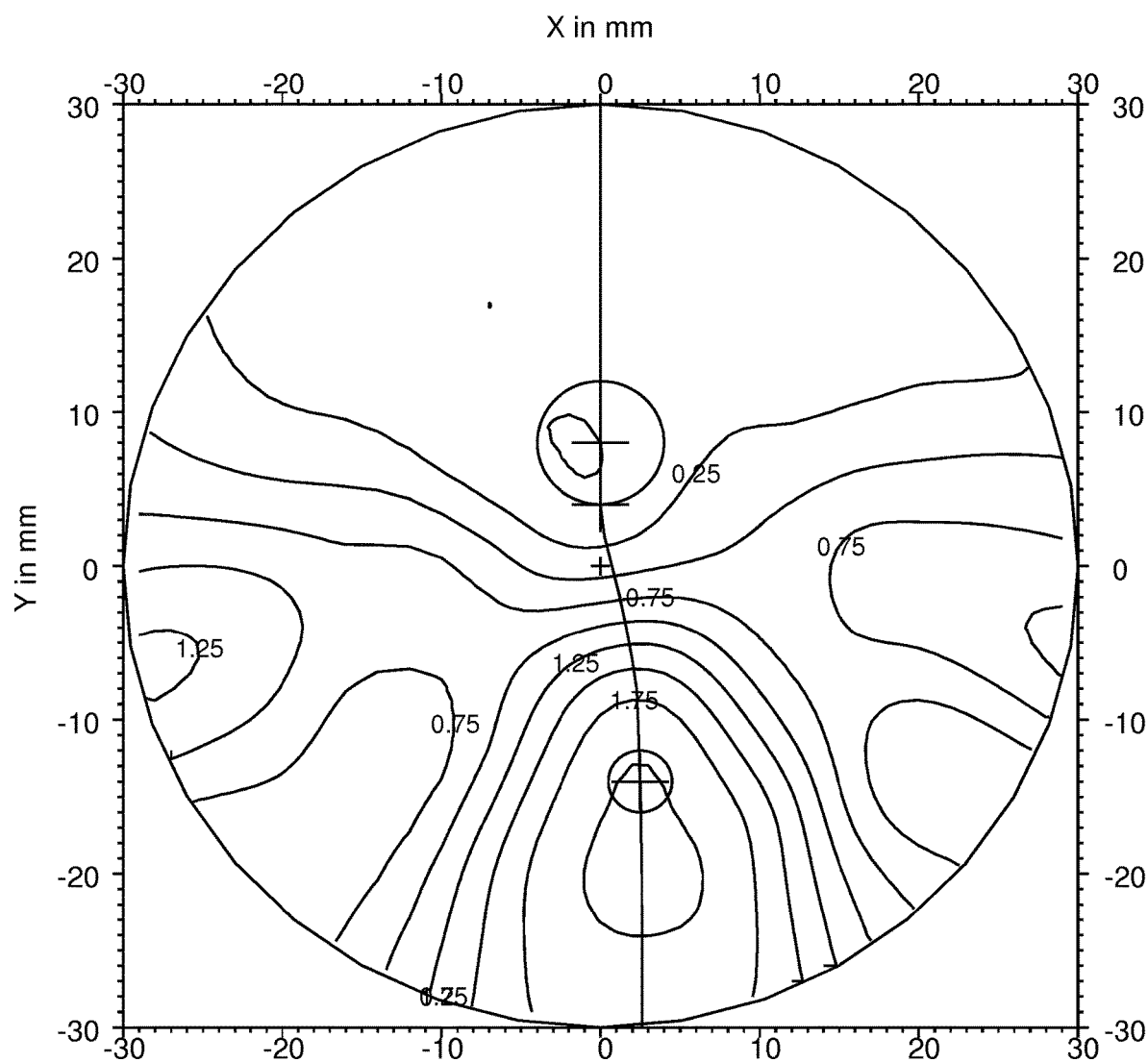
Figure 29C:
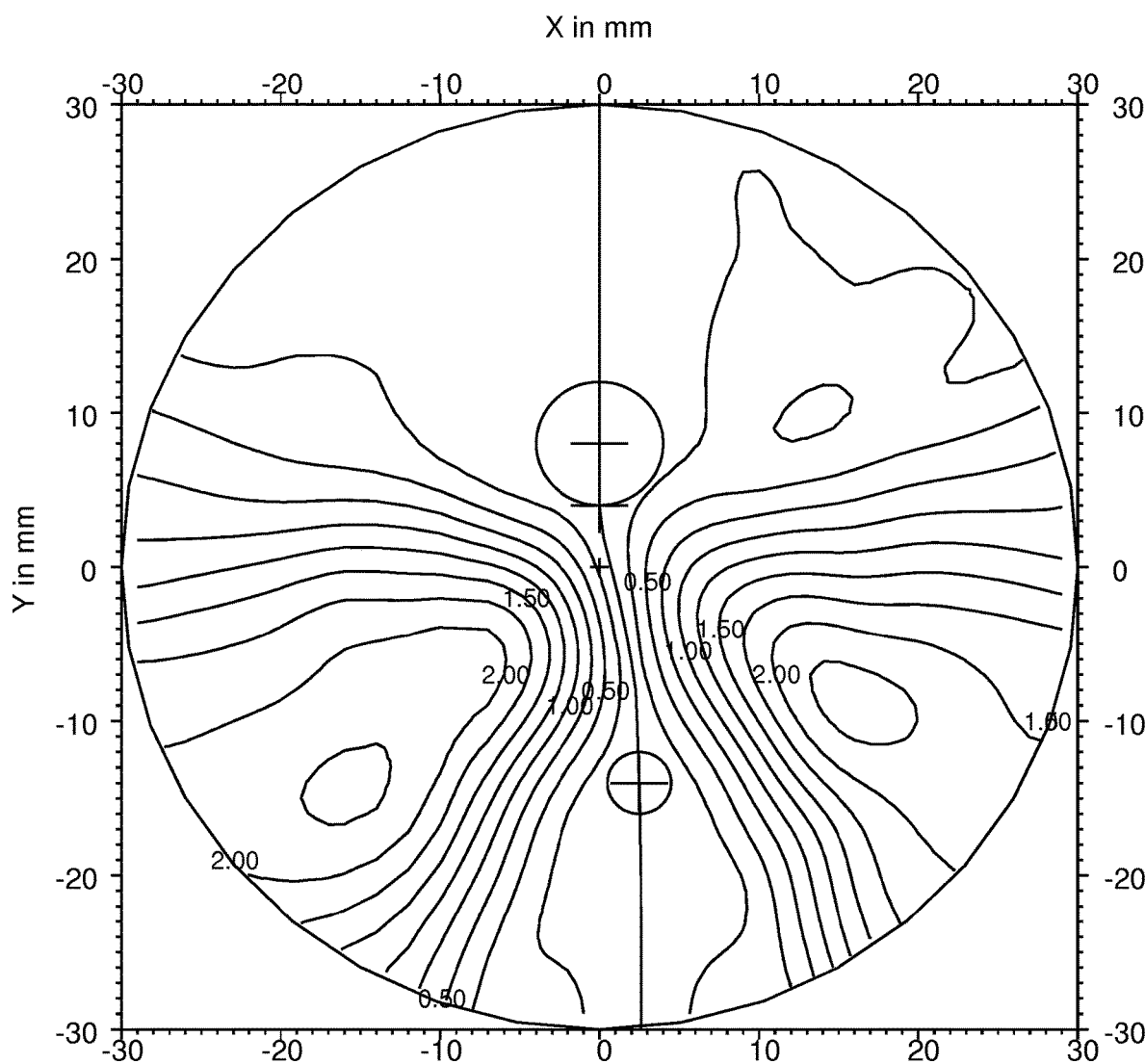

FIGS. 29a to 29c show the features of the surfaces of an initial surface of an progressive ophthalmic lens configured for a presbyopia wearer with an addition of 2 diopters.

FIG. 29a shows mean sphere curve surrounded by minimum and maximum sphere curves, along the meridian. The x-axes are graduated in diopters, and the y-axes give the height, in mm, on the lens. FIG. 29b shows lines of equal mean sphere, i.e. lines formed by points for which the mean sphere has an identical value. The x-axes are graduated in diopters, and the y-axes give the height, in mm, on the lens.

FIG. 29c shows, using the same axes as for FIG. 29b, lines of equal cylinder.

Figure 29D:
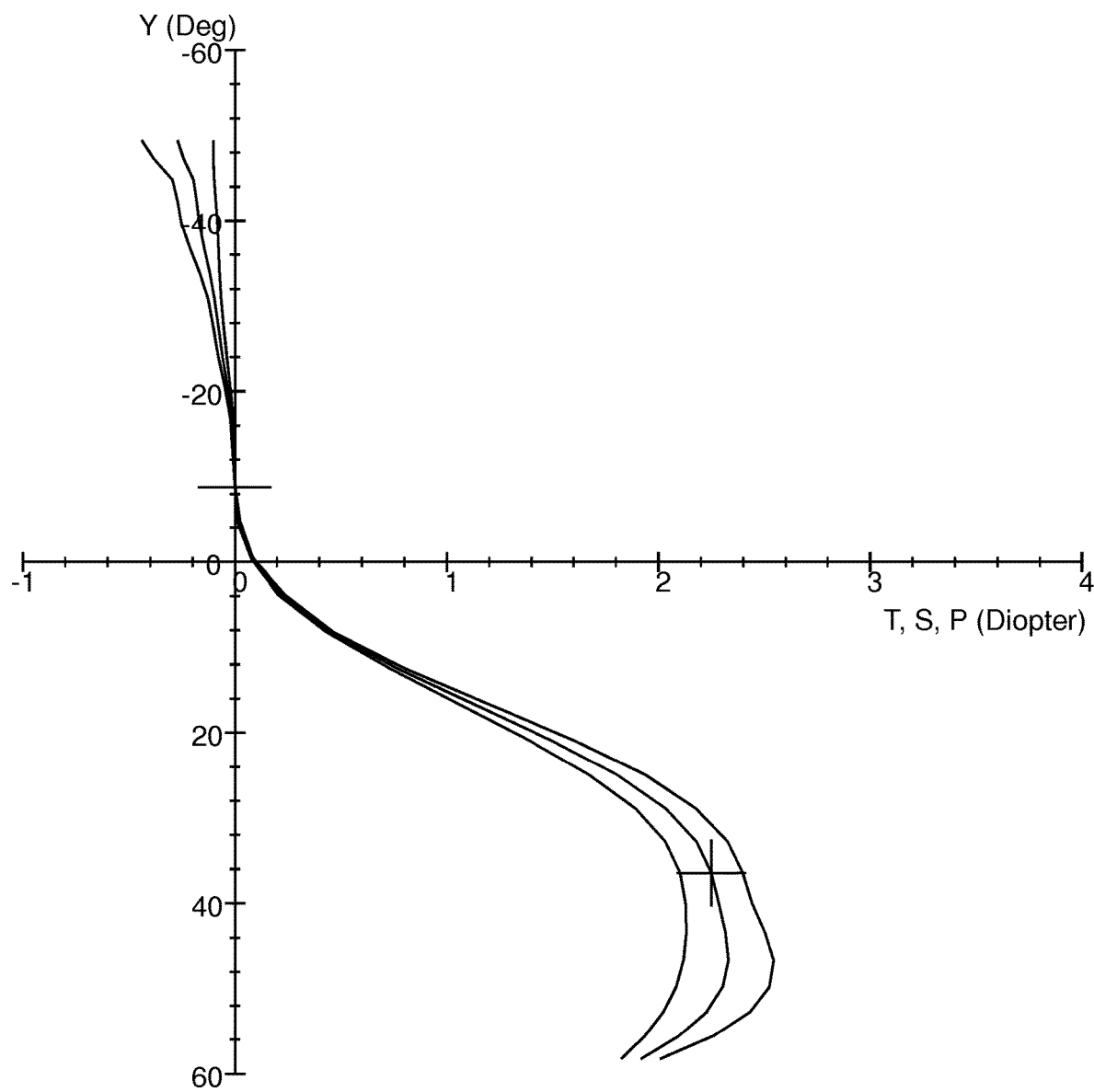
Figure 29E:
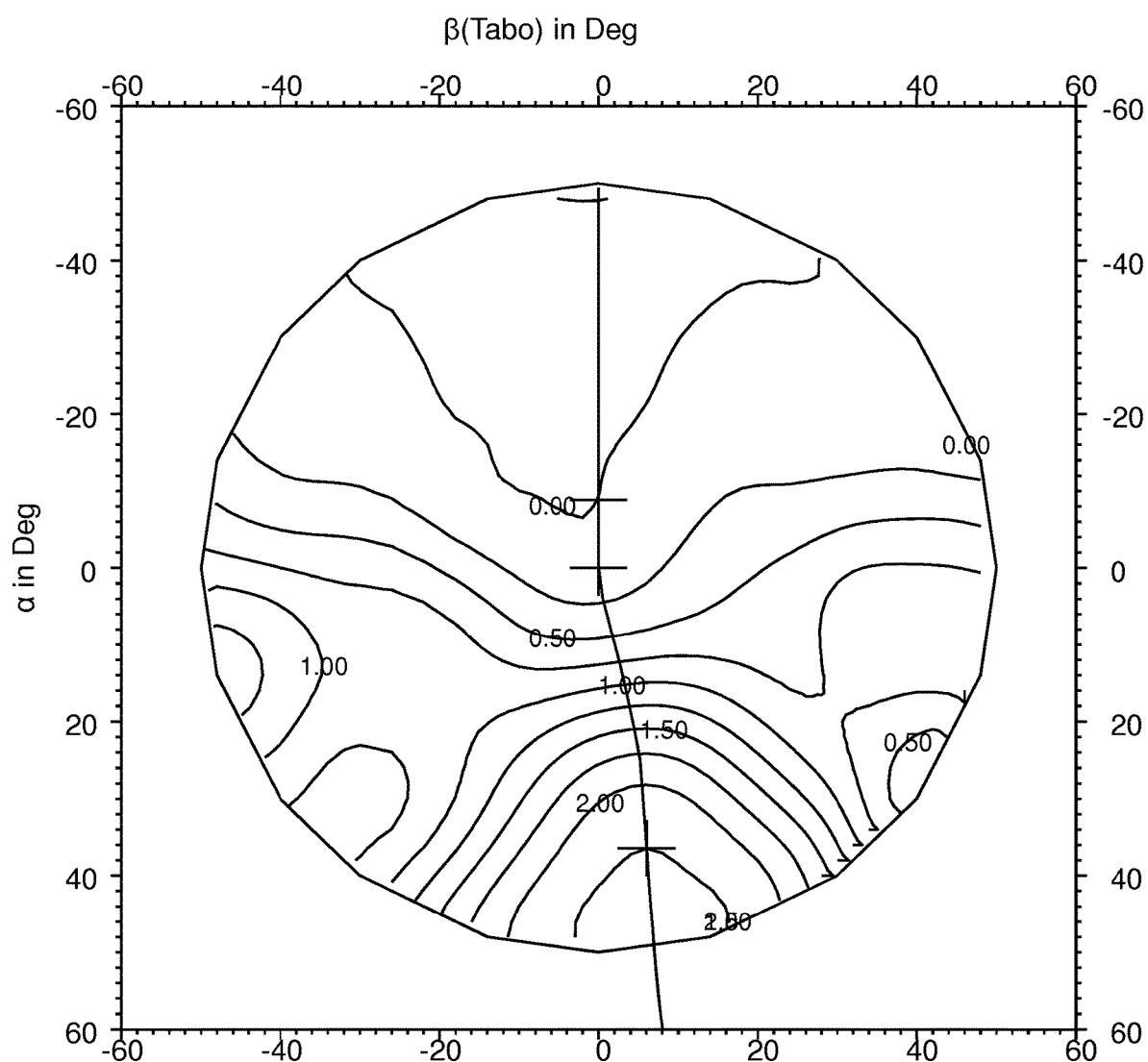
Figure 29F:
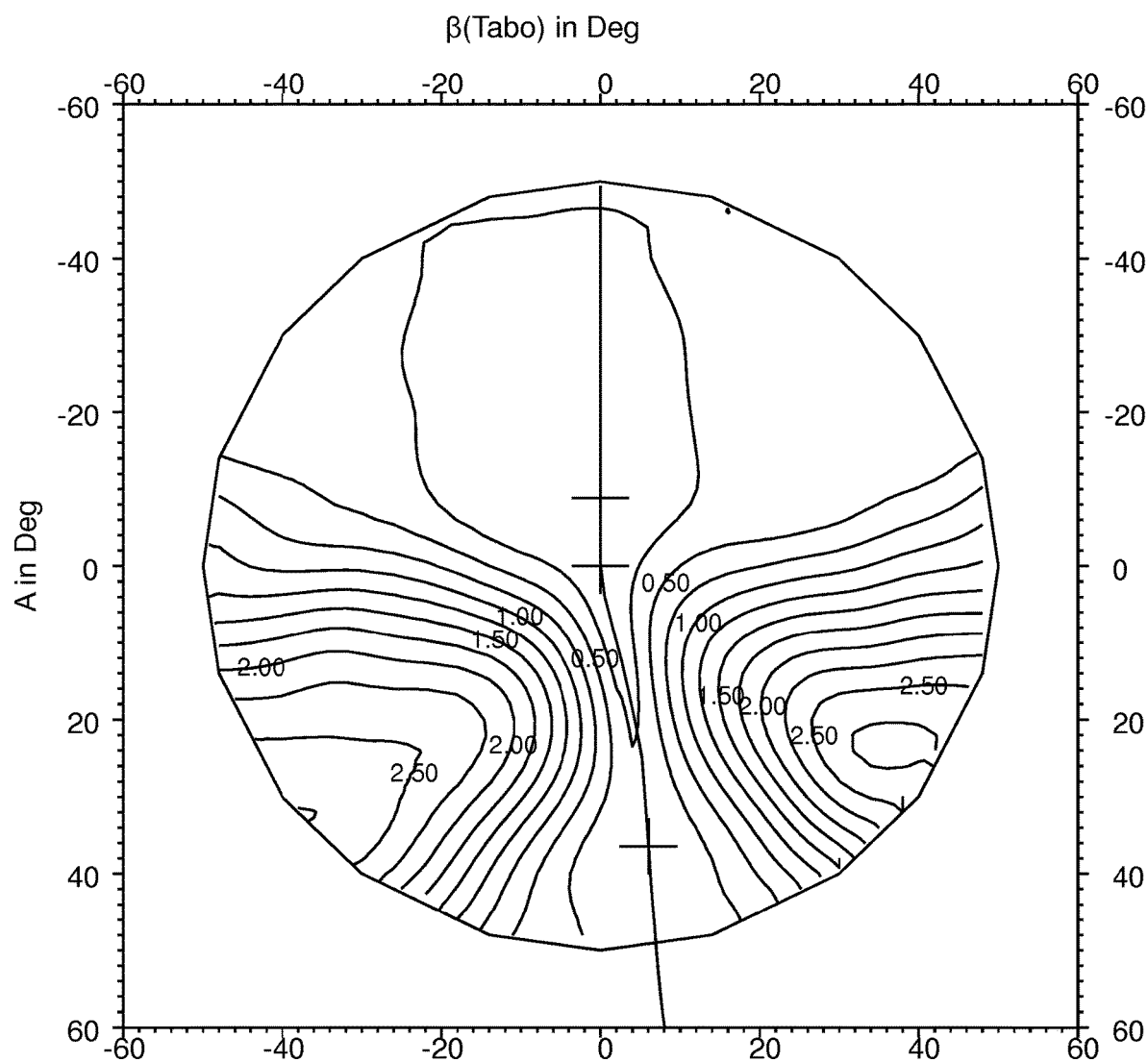

FIGS. 29d to 29f show the optical features of an initial progressive lens configured for a wearer having a plane prescription with an addition of 2 diopters with a wrap angle of 0°.

FIG. 29d shows refractive power along the meridian. The x-axes are graduated in diopters, and the y-axes give the height, in degrees.

FIG. 29e shows lines of equal power, i.e. lines formed by points for which power has an identical value. The x-axis and y-axis respectively give the angles [α] and [β].

FIG. 29f shows, using the same axes, lines of equal astigmatism.

Figure 30A:
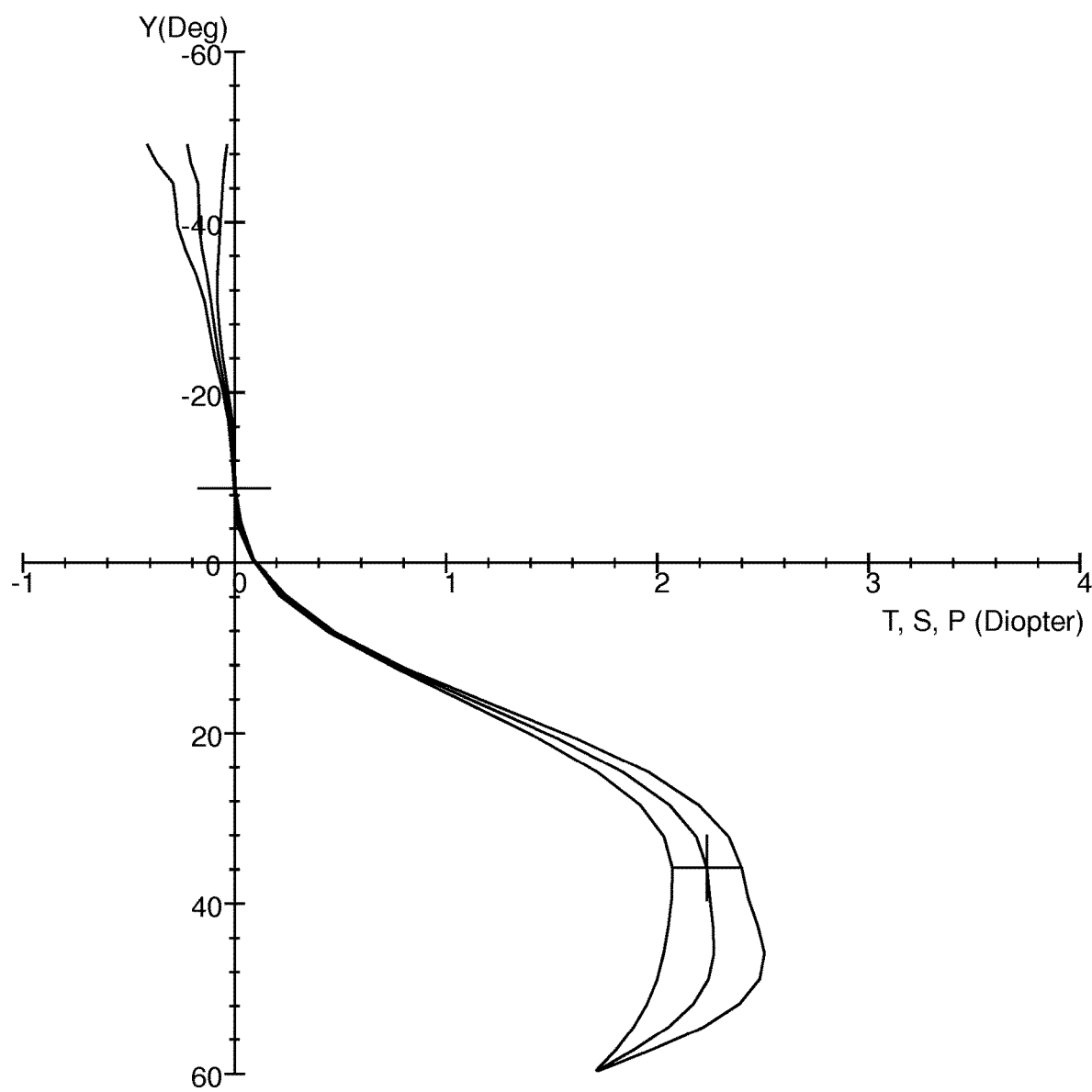
Figure 30B:
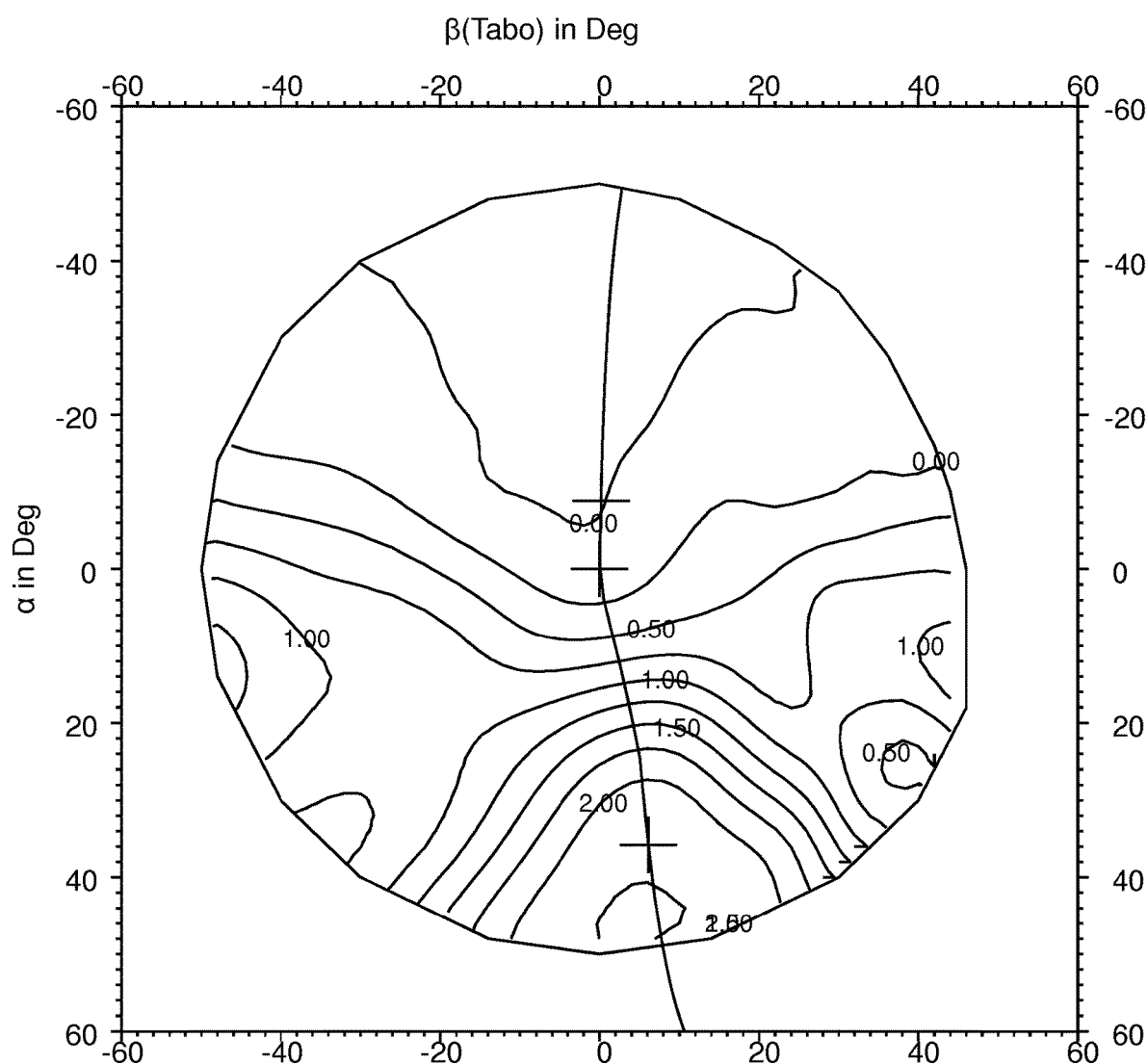
Figure 30C:
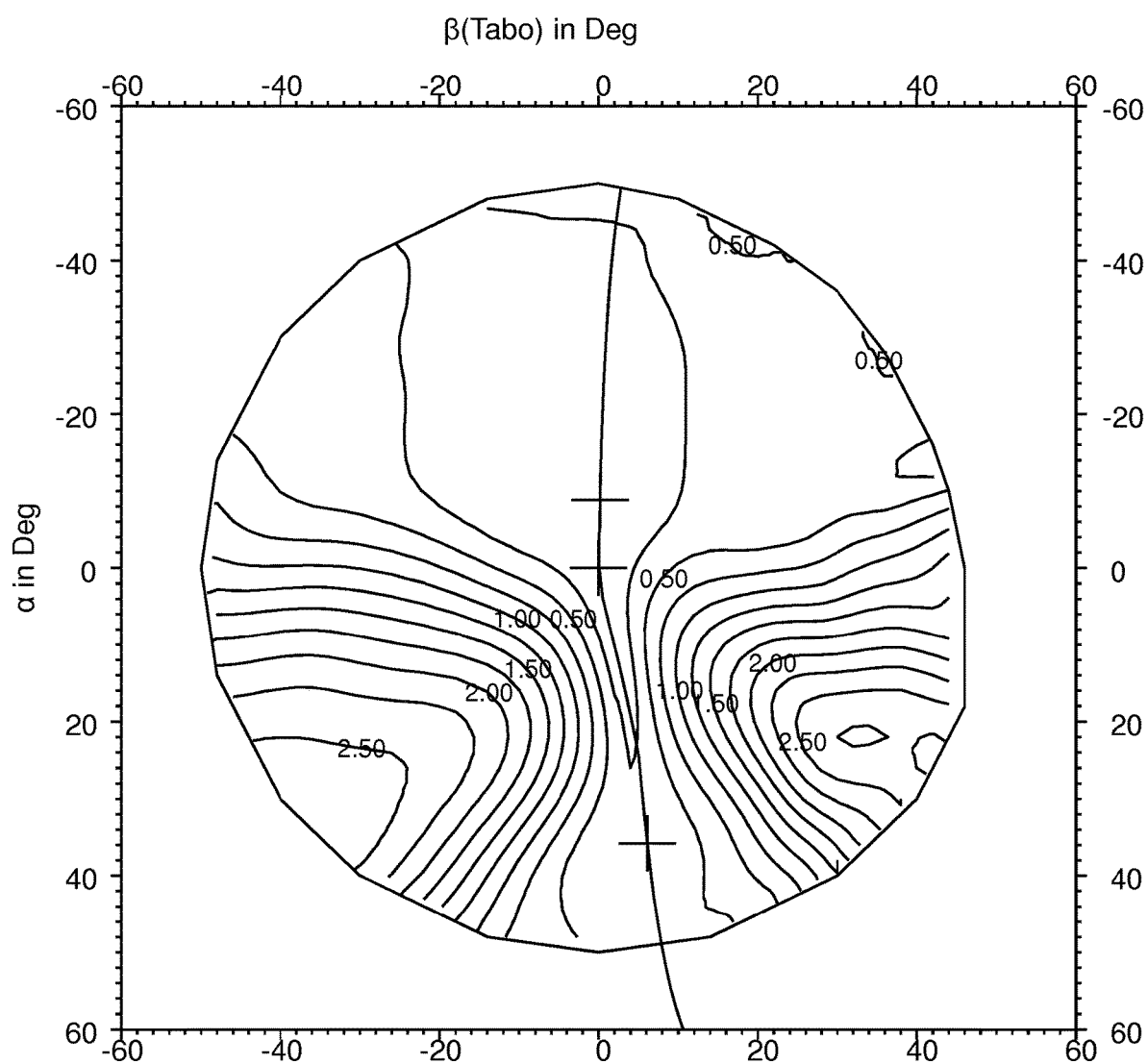

FIGS. 30a to 30c show the optical features of the optical lens obtained by combining the modifying surface shown on FIGS. 28a to 28c with the initial front surface of the lens shown on FIGS. 29a to 29c. The optical features illustrated on FIGS. 30a to 30c are obtain with a wrap angle of 15°.

FIG. 30a shows refractive power along the meridian. The x-axes are graduated in diopters, and the y-axes give the height, in degrees, on the lens.

FIG. 30b shows lines of equal power, i.e. lines formed by points for which power has an identical value. The x-axis and y-axis respectively give the angles [α] and [β].

FIG. 30c shows, using the same axes, lines of equal astigmatism.

As observed when comparing the optical features of the initial progressive lens illustrated on FIGS. 29d to 29f corresponding to the initial surface with a wrap angle of 0°, with the optical features of the initial progressive lens illustrated on FIGS. 30a to 30c corresponding to the modified surface with a wrap angle of 15°, both optical features are very similar although the wrap angle is different.

Therefore, by combining the initial surface of FIGS. 29a to 29c with the modifying surface of FIGS. 28a to 28c, one may obtain similar optical feature when mounting the optical lens with an wrap angle of 15° than with the optical lens obtained with the initial surface (not combined with the modifying surface) and mounted with a wrap angle of 0°.

Example 8: Broadening Intermediate Vision Zone

The modifying surface according to example 8, is intended to broaden the intermediate vision zone of an initial multifocal ophthalmic lens design.

The inventors have developed a modifying surface to be applied to one of the surfaces of an optimized multifocal ophthalmic lens, for example the front face surface, so as to broaden the intermediate vision zone without modifying the rest of the mean power and astigmatism distribution.

Figure 31A:
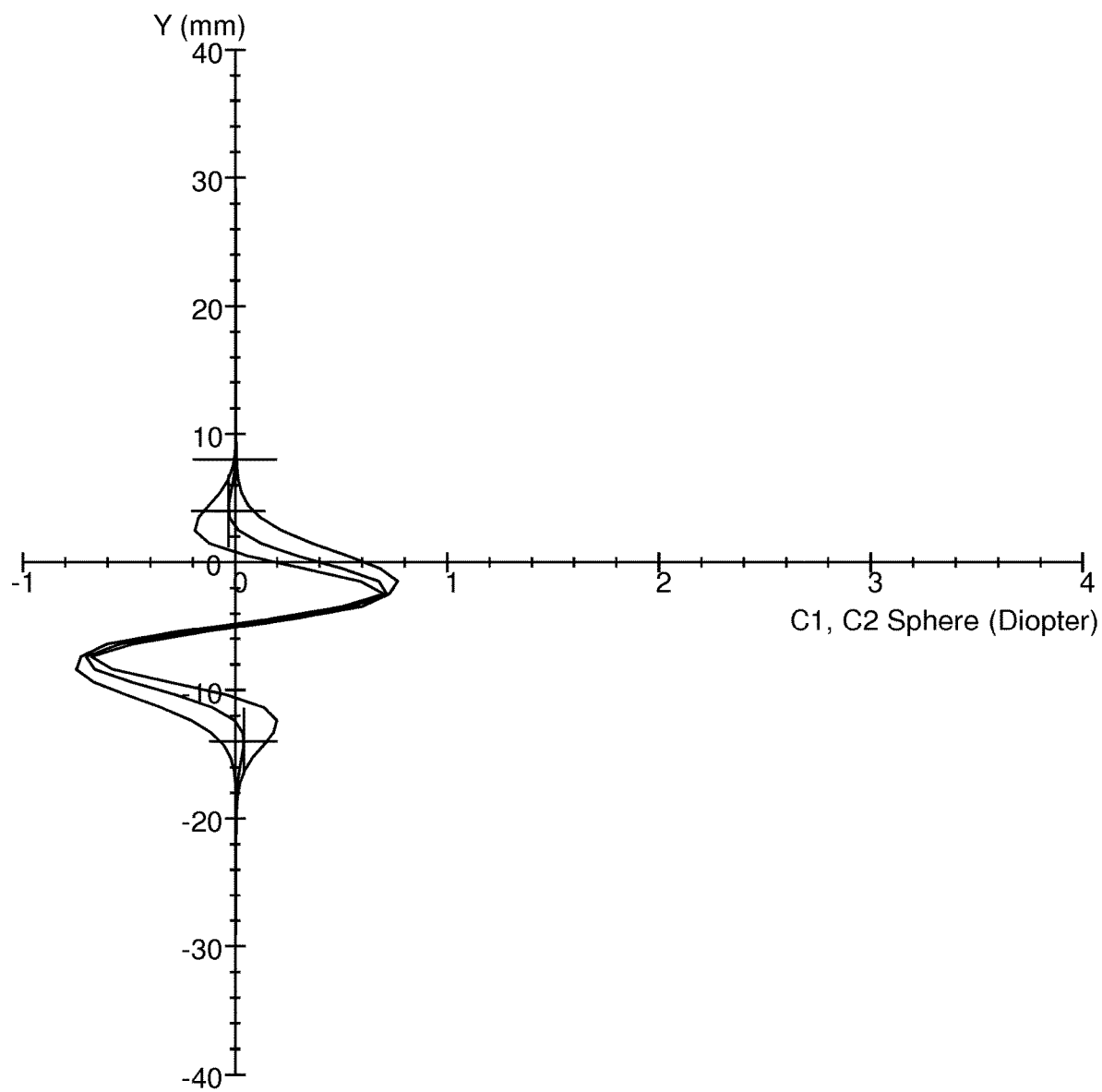
Figure 31B:
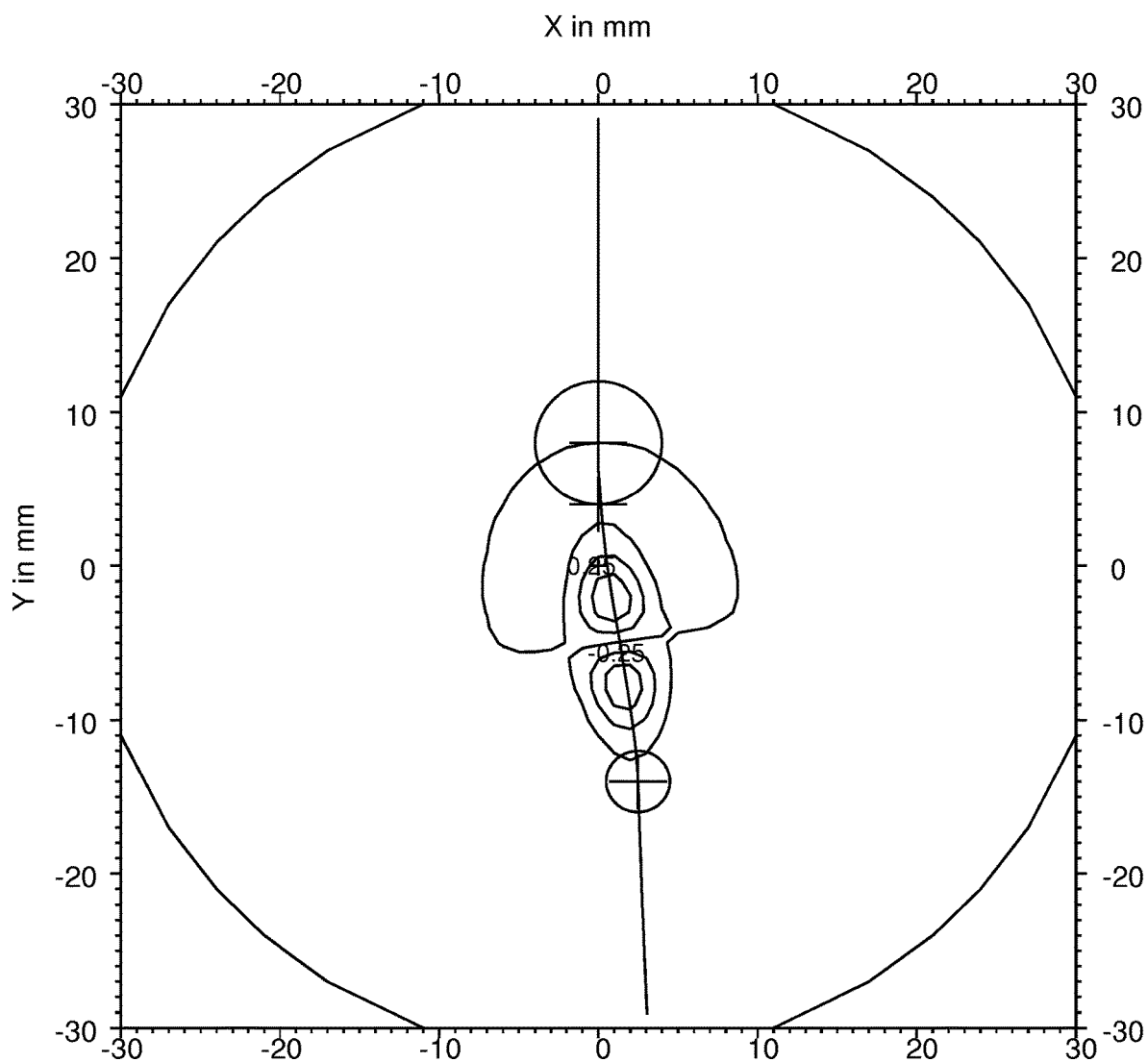
Figure 31C:
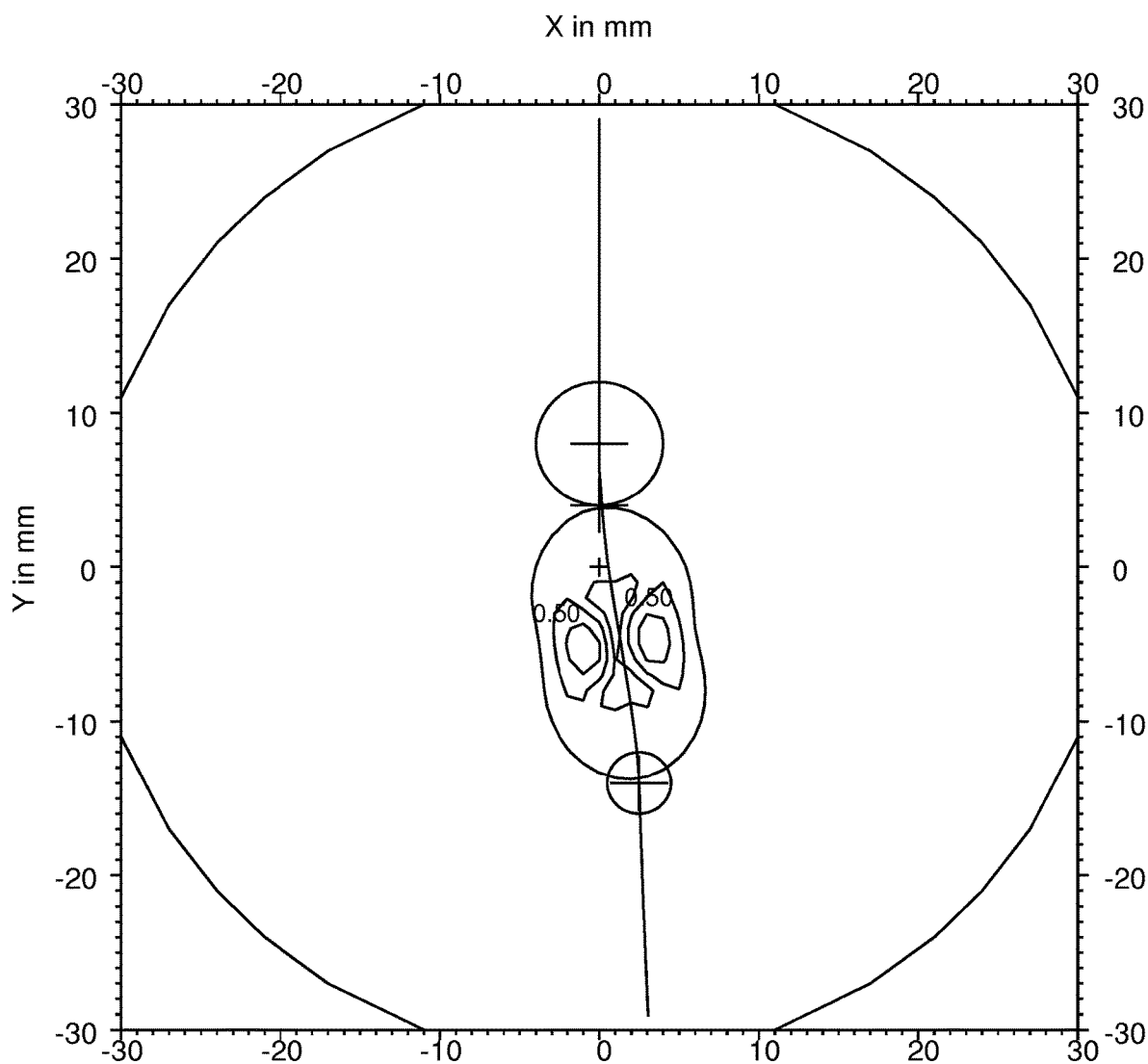

FIGS. 31a to 31c show features of the surfaces of such a modifying surface.

FIG. 31a shows mean sphere curve surrounded by minimum and maximum sphere curves, along the meridian. The x-axes are graduated in diopters, and the y-axes give the height, in mm, on the lens.

FIG. 31b shows lines of equal mean sphere, i.e. lines formed by points for which the mean sphere has an identical value. The x-axis and y-axis give the height, in mm respectively along the horizontal and vertical directions.

FIG. 31c shows, using the same axes as for FIG. 31b, lines of equal cylinder.

Figure 31D:
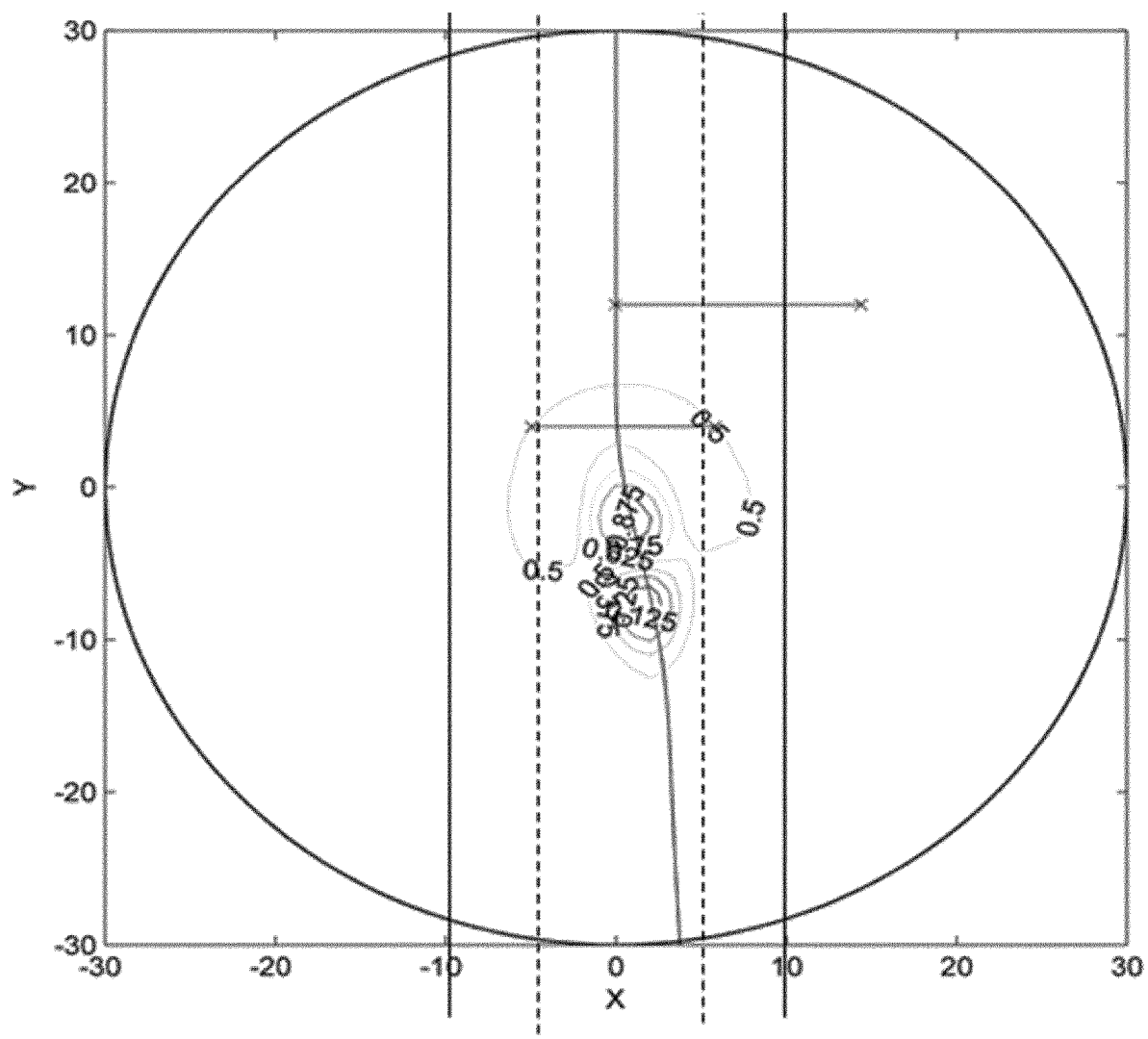
Figure 31E:
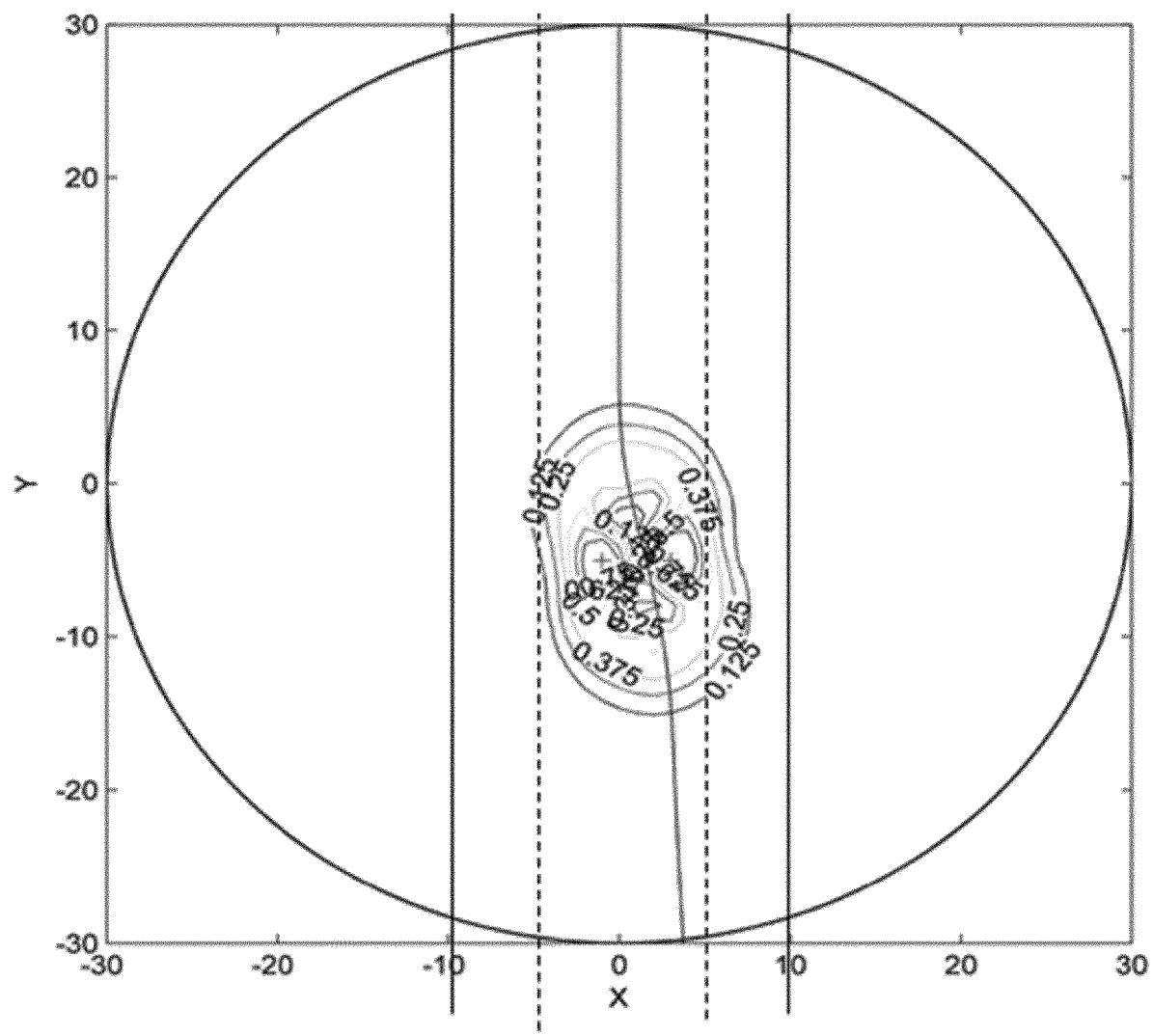

FIGS. 31d and 31e shows the normalized modifying surface SNmod corresponding to the modifying surface illustrated on FIGS. 31a to 31c. FIG. 31d shows lines of equal mean sphere and FIG. 31e shows lines of equal cylinder, both using the same axes as for FIG. 31b.

Figure 32A:
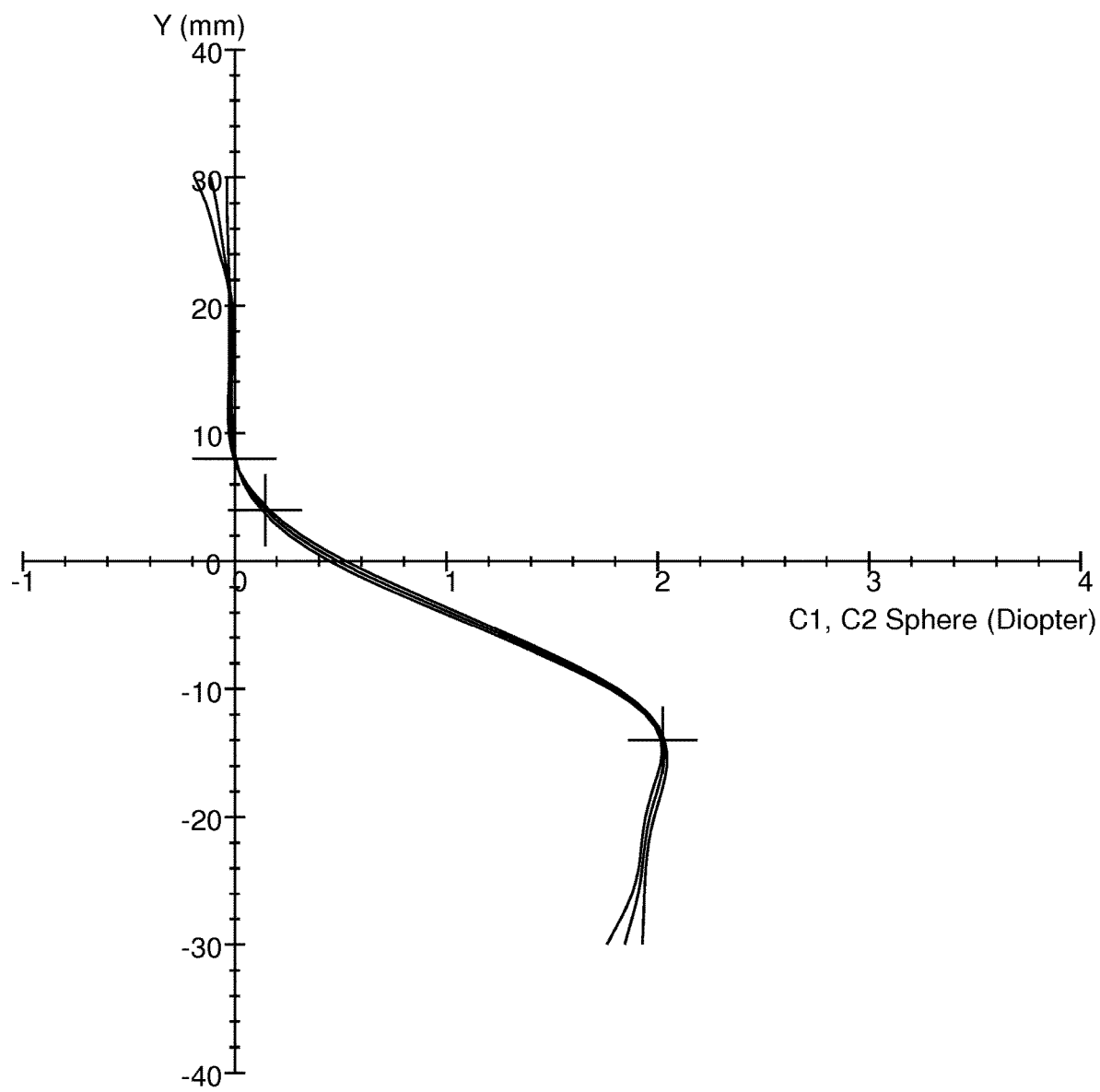
Figure 32B:
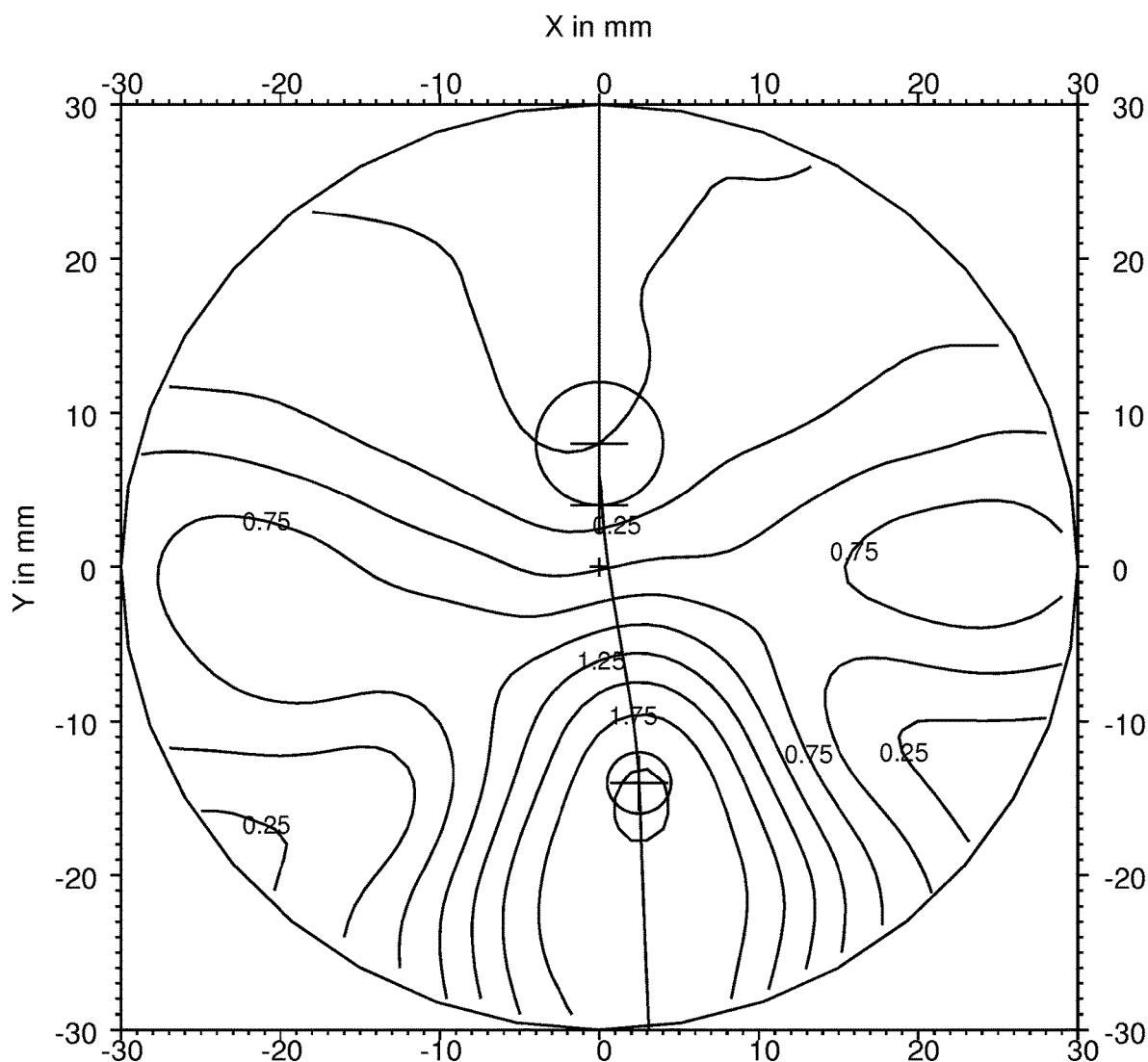
Figure 32C:
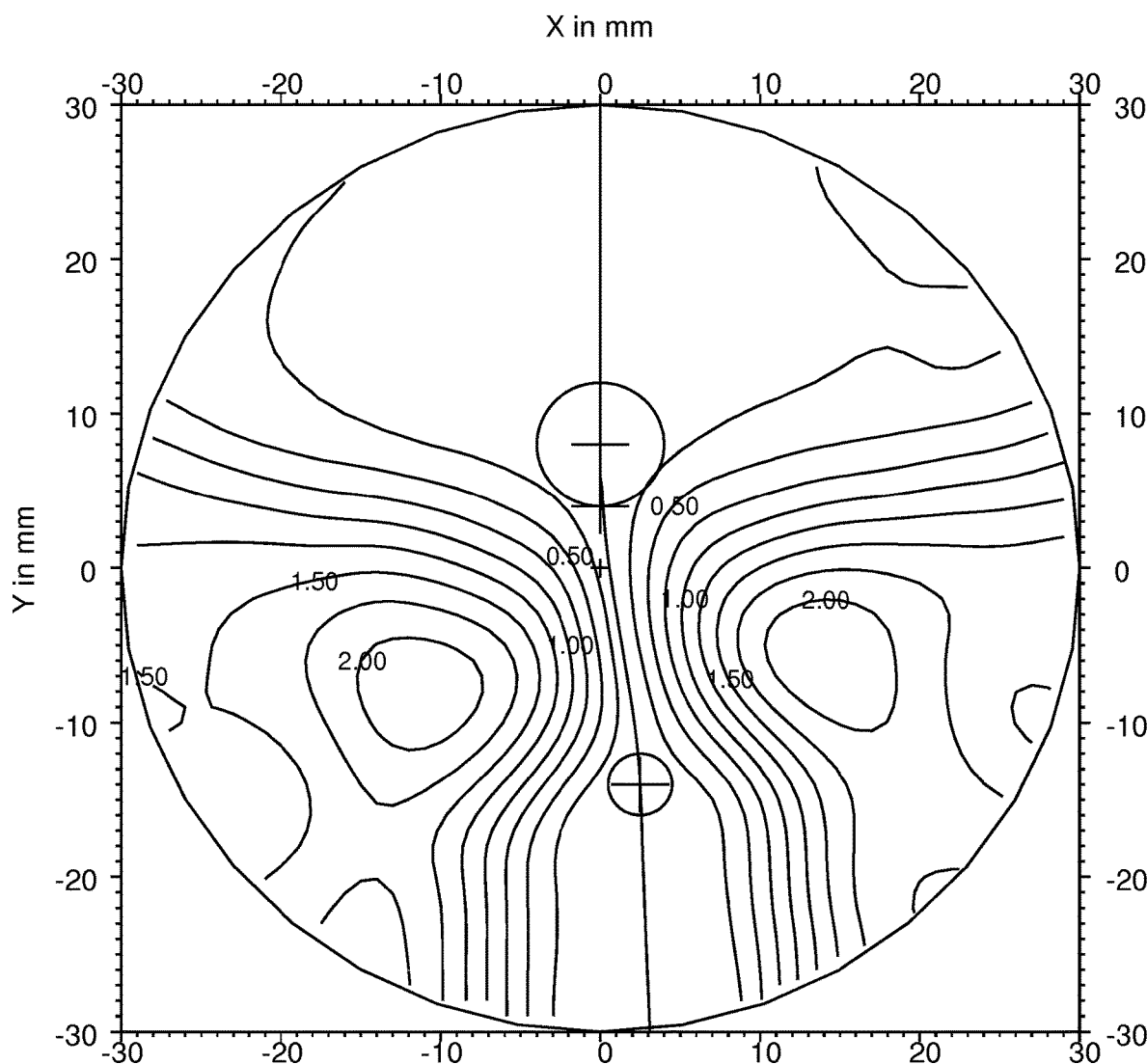

FIGS. 32a to 32c show the features of the surfaces of an initial surface of an progressive ophthalmic lens configured for a presbyopia wearer with an addition of 2 diopters.

FIG. 32a shows mean sphere curve surrounded by minimum and maximum sphere curves, along the meridian. The x-axes are graduated in diopters, and the y-axes give the height, in mm, on the lens. FIG. 32b shows lines of equal mean sphere, i.e. lines formed by points for which the mean sphere has an identical value. The x-axis and y-axis give the height, in mm respectively along the horizontal and vertical directions. FIG. 32c shows, using the same axes as for FIG. 32b, lines of equal cylinder.

Figure 33A:
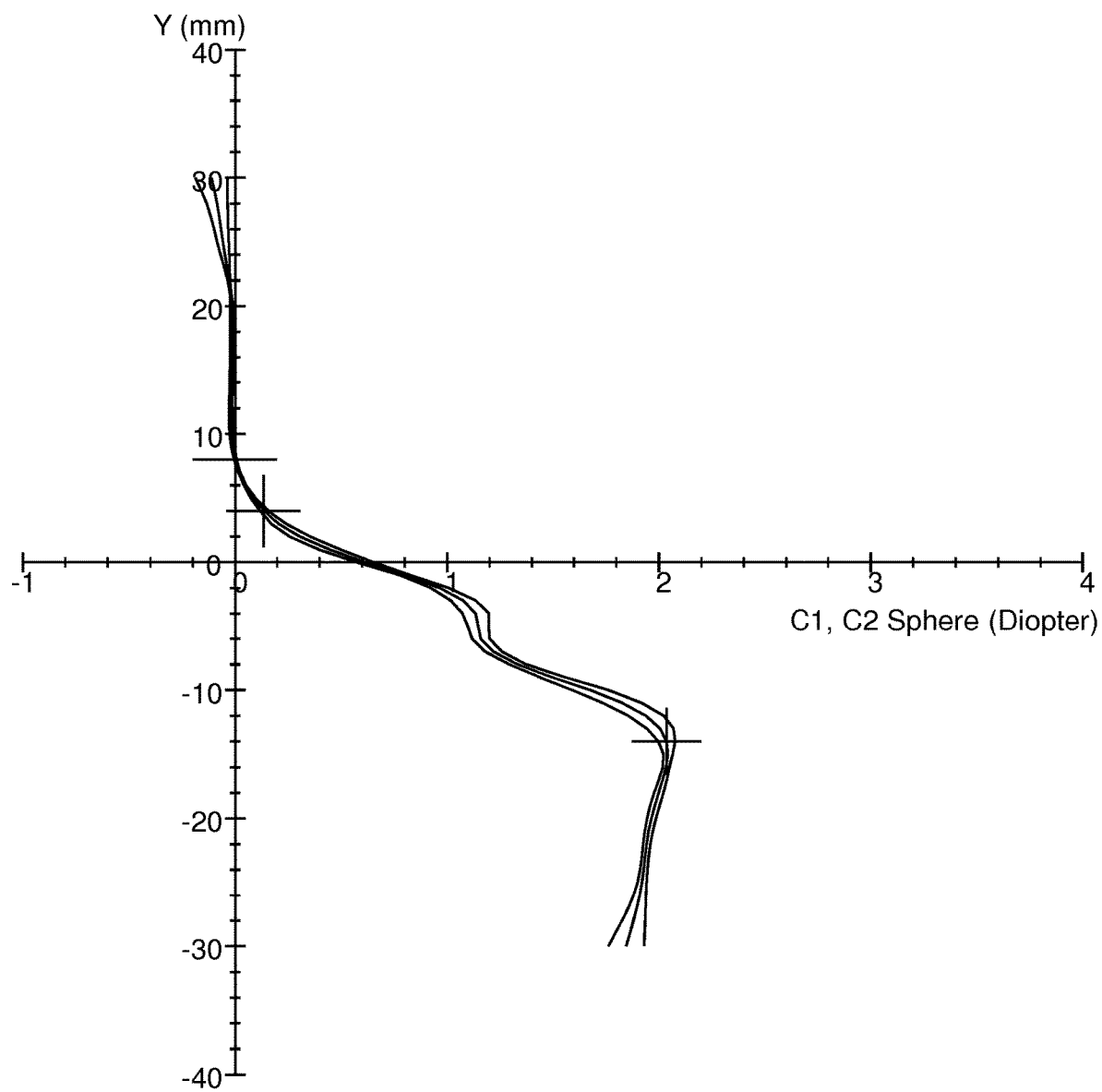
Figure 33B:
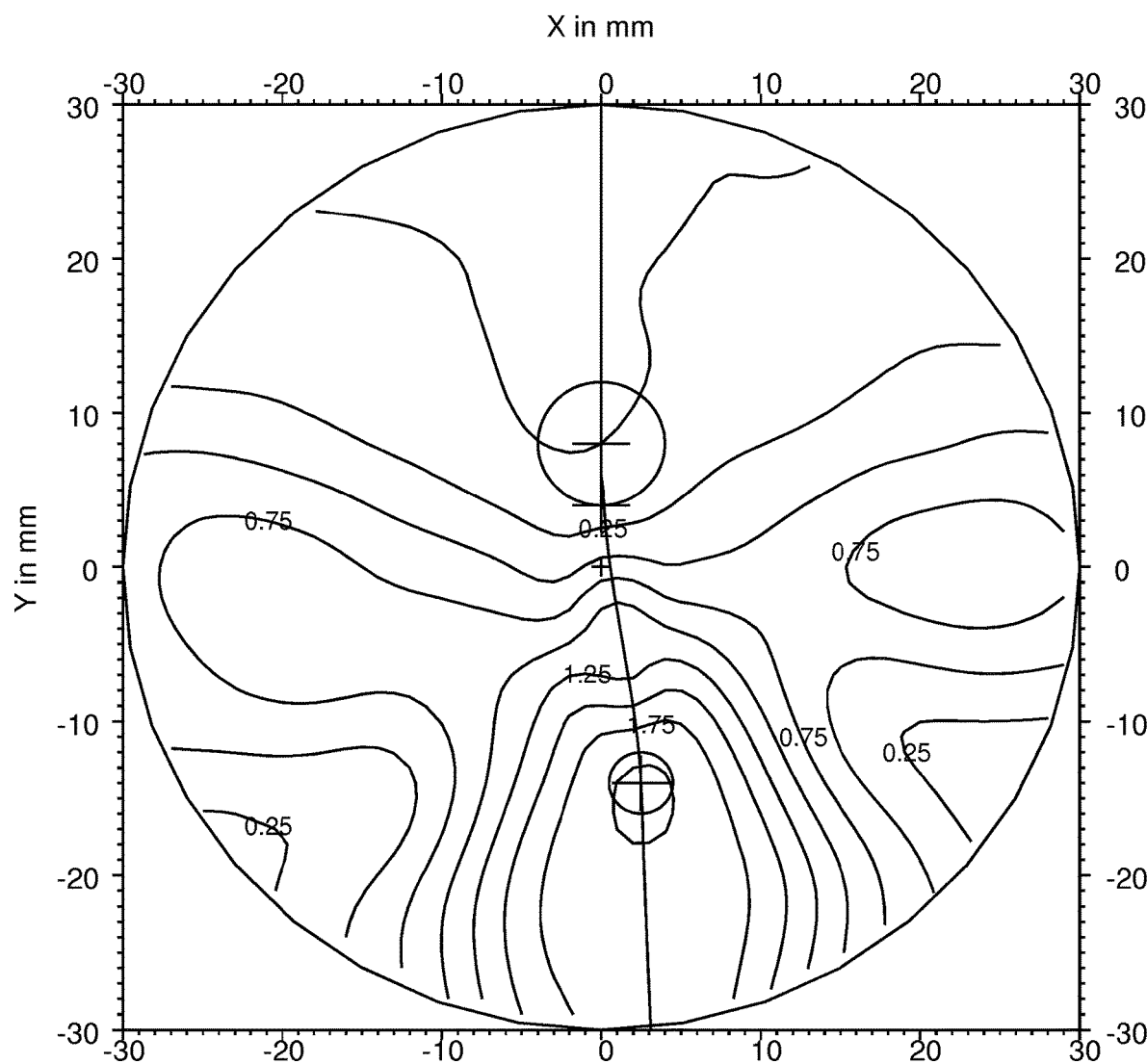
Figure 33C:
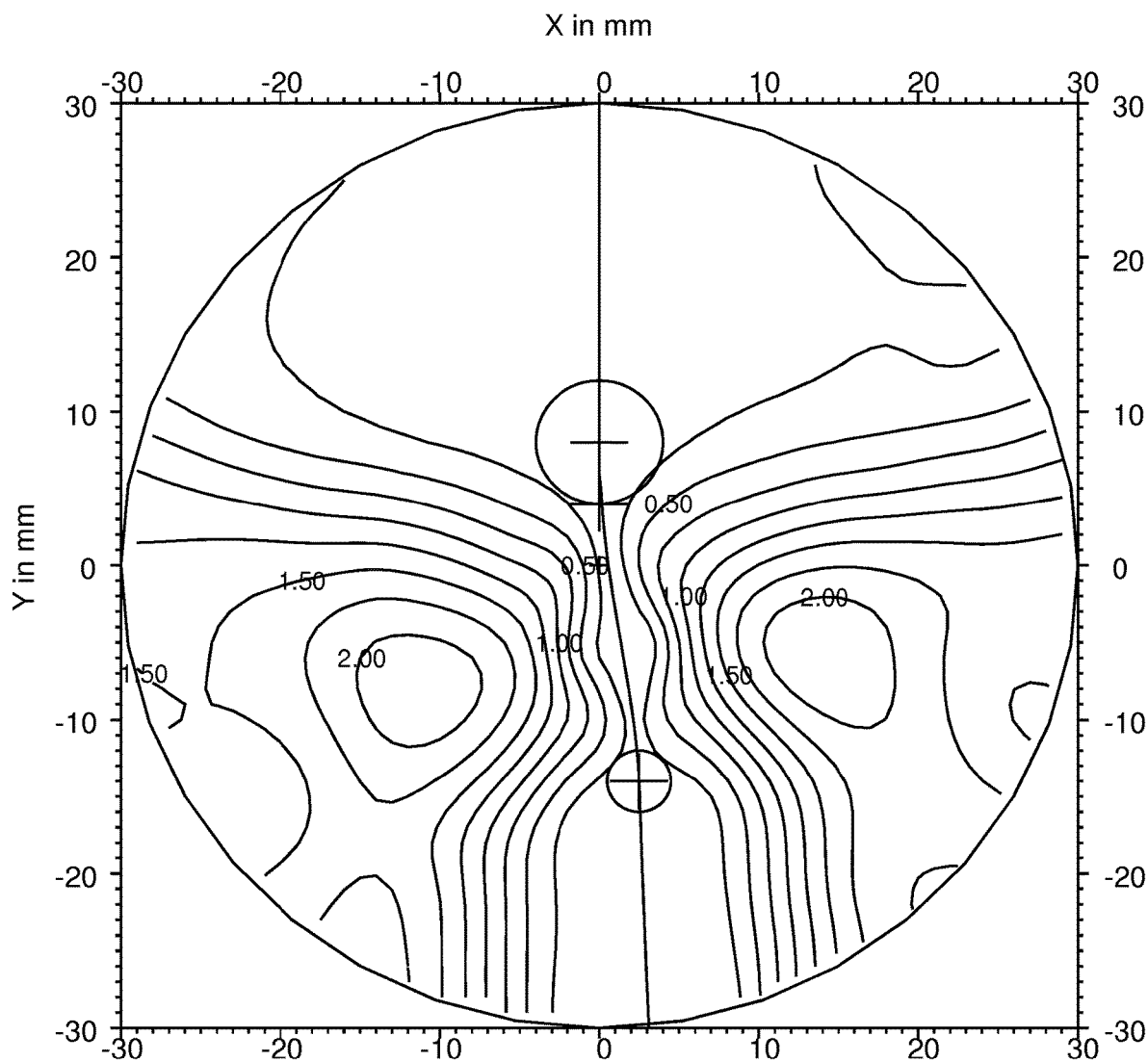

FIGS. 33a to 33c show the features of the surfaces of the optical surface obtained by combining the modifying surface shown on FIGS. 31a to 31c with the initial surface shown on FIGS. 32a to 32c.

FIG. 33a shows mean sphere curve surrounded by minimum and maximum sphere curves, along the meridian. The x-axes are graduated in diopters, and the y-axes give the height, in mm, on the lens. FIG. 33b shows lines of equal mean sphere, i.e. lines formed by points for which the mean sphere has an identical value. The x-axis and y-axis give the height, in mm respectively along the horizontal and vertical directions. FIG. 33c shows, using the same axes as for FIG. 33b, lines of equal cylinder.

As observed when comparing the optical features of the initial surface and of the modified optical surface, the mean sphere and cylinder distribution has only be broaden in the intermediate vision zone without being changed in the other areas.

Thus by combining the modifying surface illustrated in FIGS. 31a to 31c with the initial surface, one may broaden the intermediate vision zone of the optical design of the initial surface without having to go through a new optical optimization.

Example 9: Reducing the Maximum of Cylinder

The modifying surface according to example 9, is intended to reduce the maximum of cylinder of an initial multifocal ophthalmic lens design.

The inventors have developed a modifying surface to be applied to one of the surfaces of an optimized multifocal ophthalmic lens, for example the front face surface, so as to reduce the maximum of cylinder without modifying the rest of the mean power and astigmatism distribution.

Figure 34A:
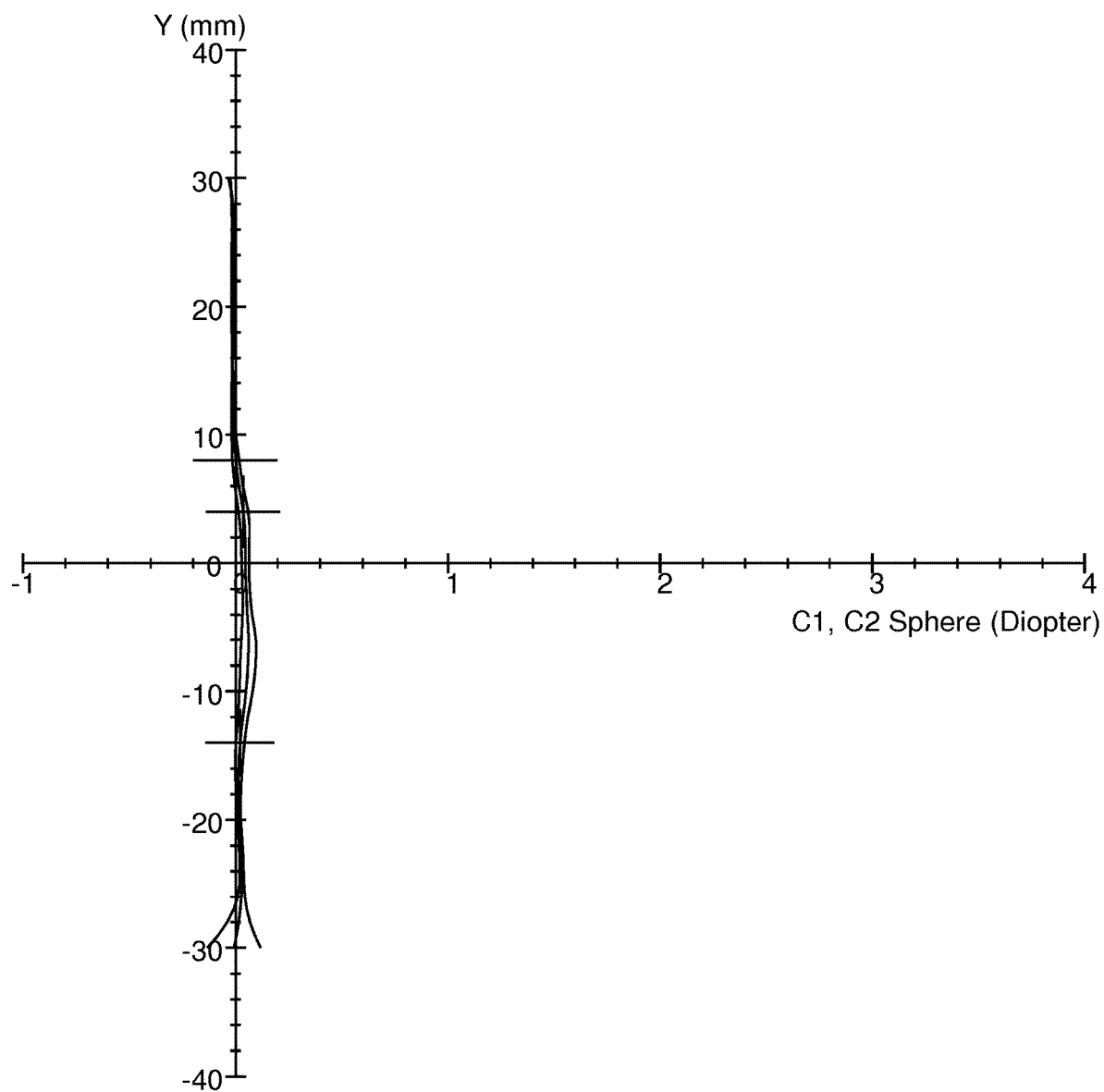
Figure 34B:
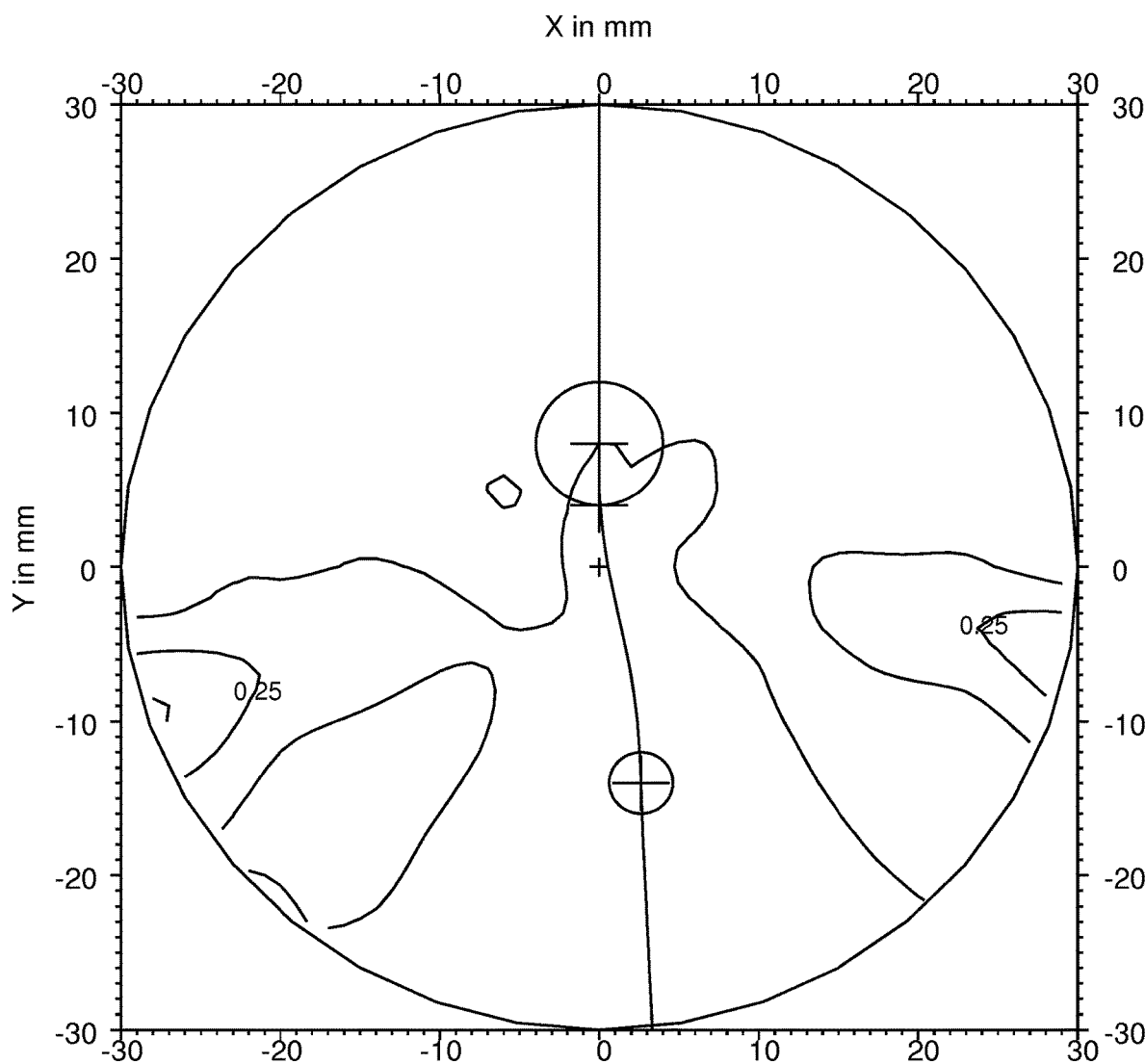
Figure 34C:
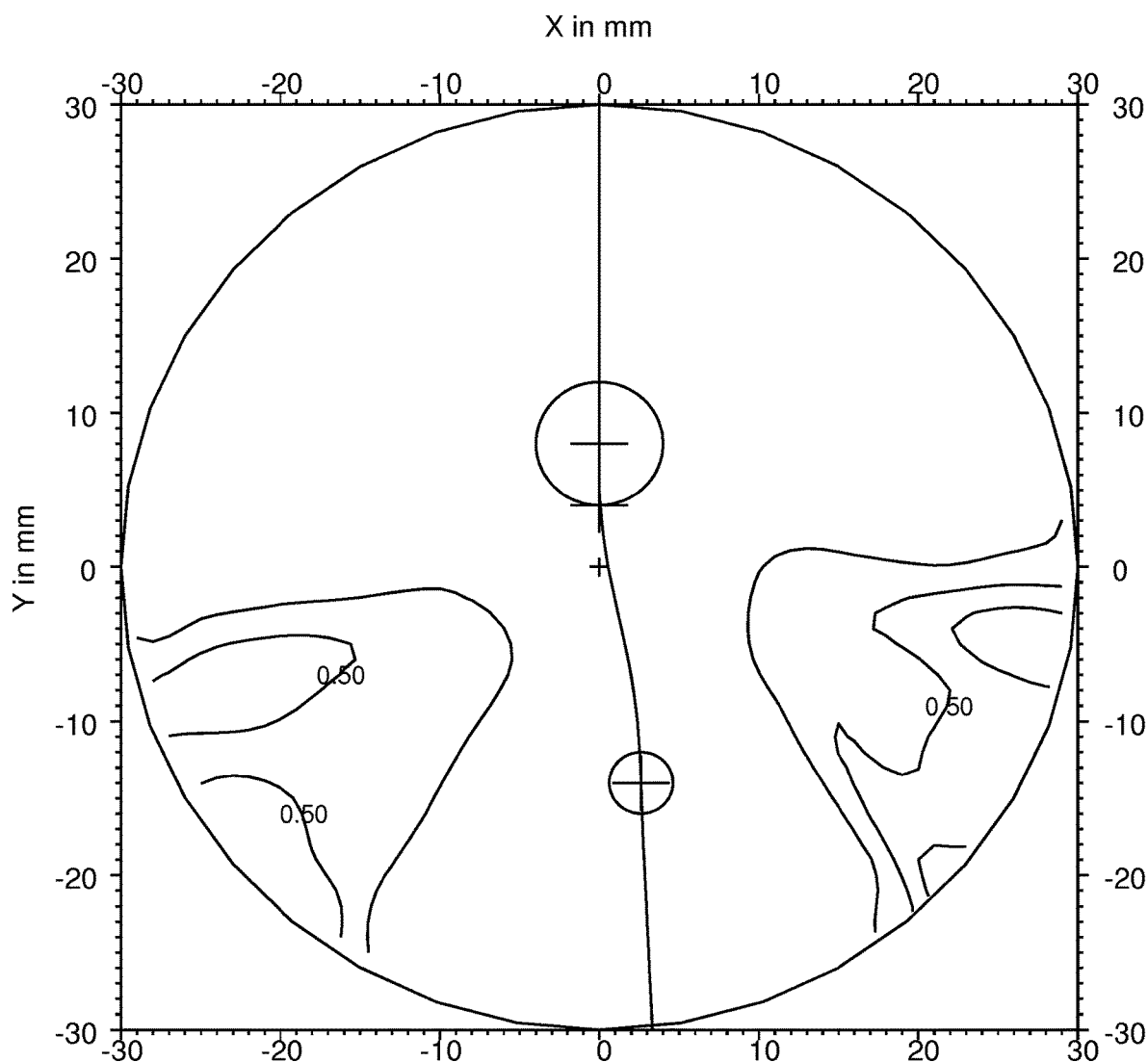

FIGS. 34a to 34c show features of the surfaces of such a modifying surface.

FIG. 34a shows mean sphere curve surrounded by minimum and maximum sphere curves, along the meridian. The x-axes are graduated in diopters, and the y-axes give the height, in mm, on the lens.

FIG. 34b shows lines of equal mean sphere, i.e. lines formed by points for which the mean sphere has an identical value. The x-axis and y-axis give the height, in mm respectively along the horizontal and vertical directions.

FIG. 34c shows, using the same axes as for FIG. 34b, lines of equal cylinder.

Figure 34D:
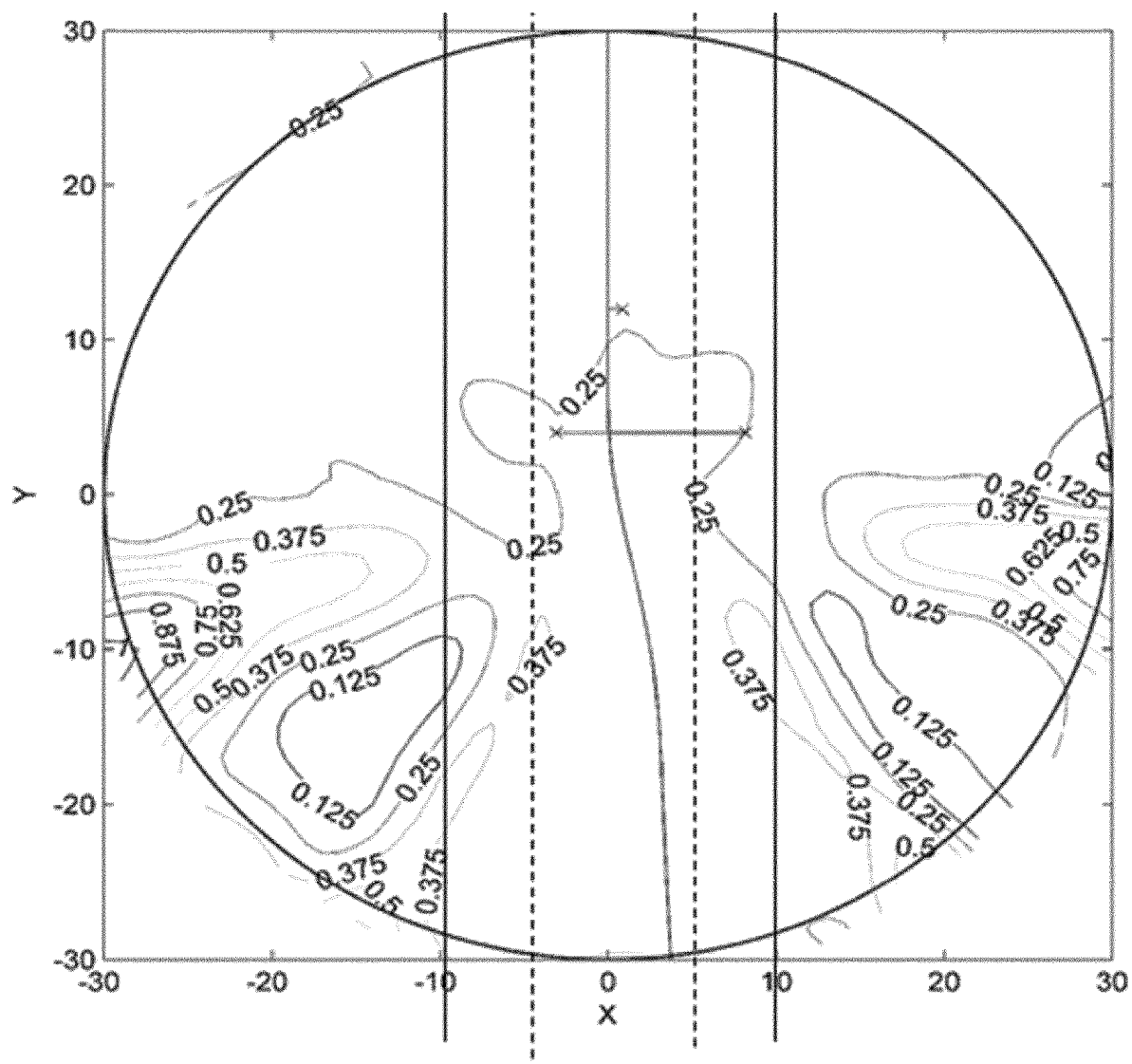
Figure 34E:
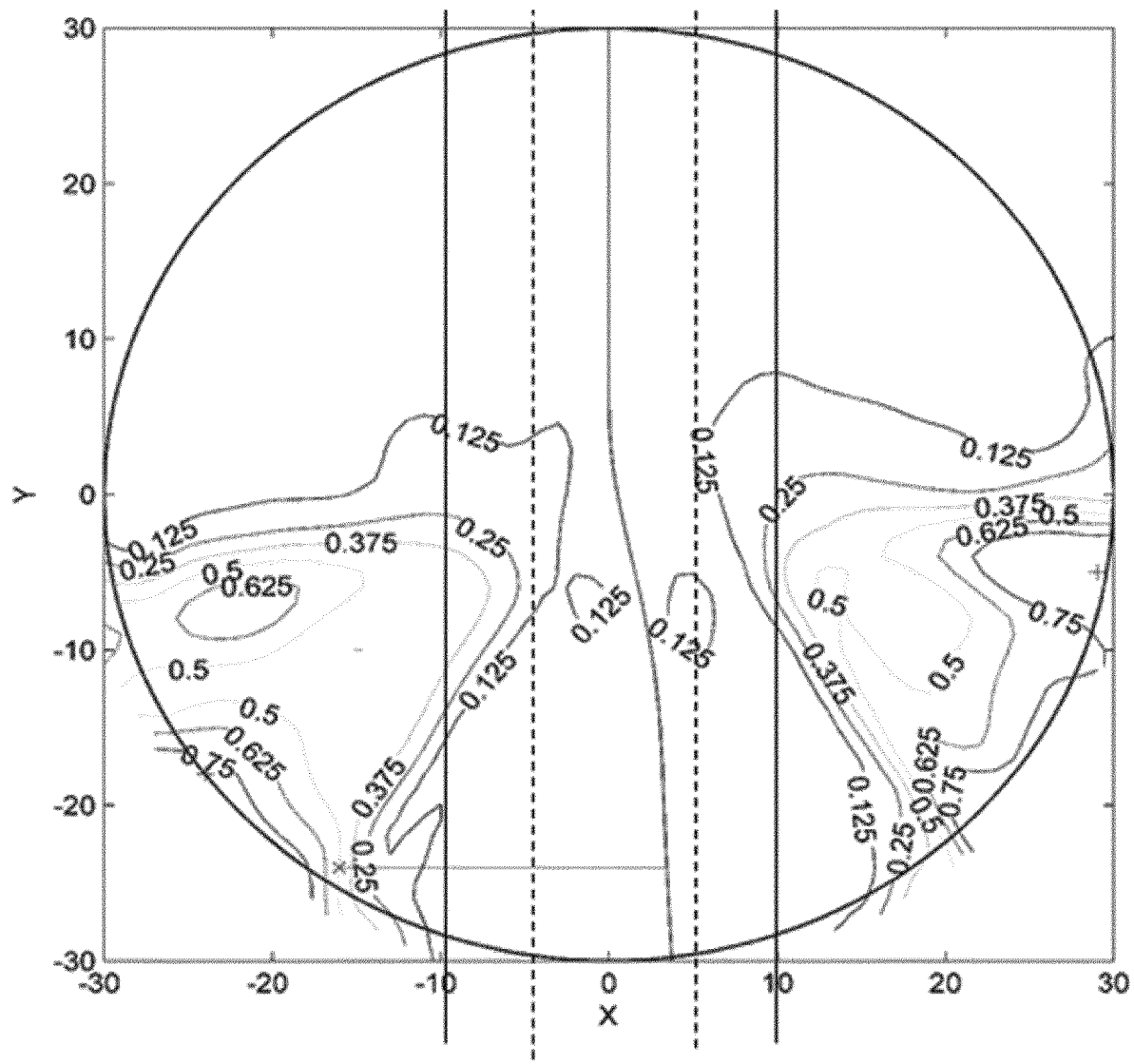

FIGS. 34d and 34e shows the normalized modifying surface SNmod corresponding to the modifying surface illustrated on FIGS. 34a to 34c. FIG. 34d shows lines of equal mean sphere and FIG. 34e shows lines of equal cylinder, both using the same axes as for FIG. 34b.

Figure 35A:
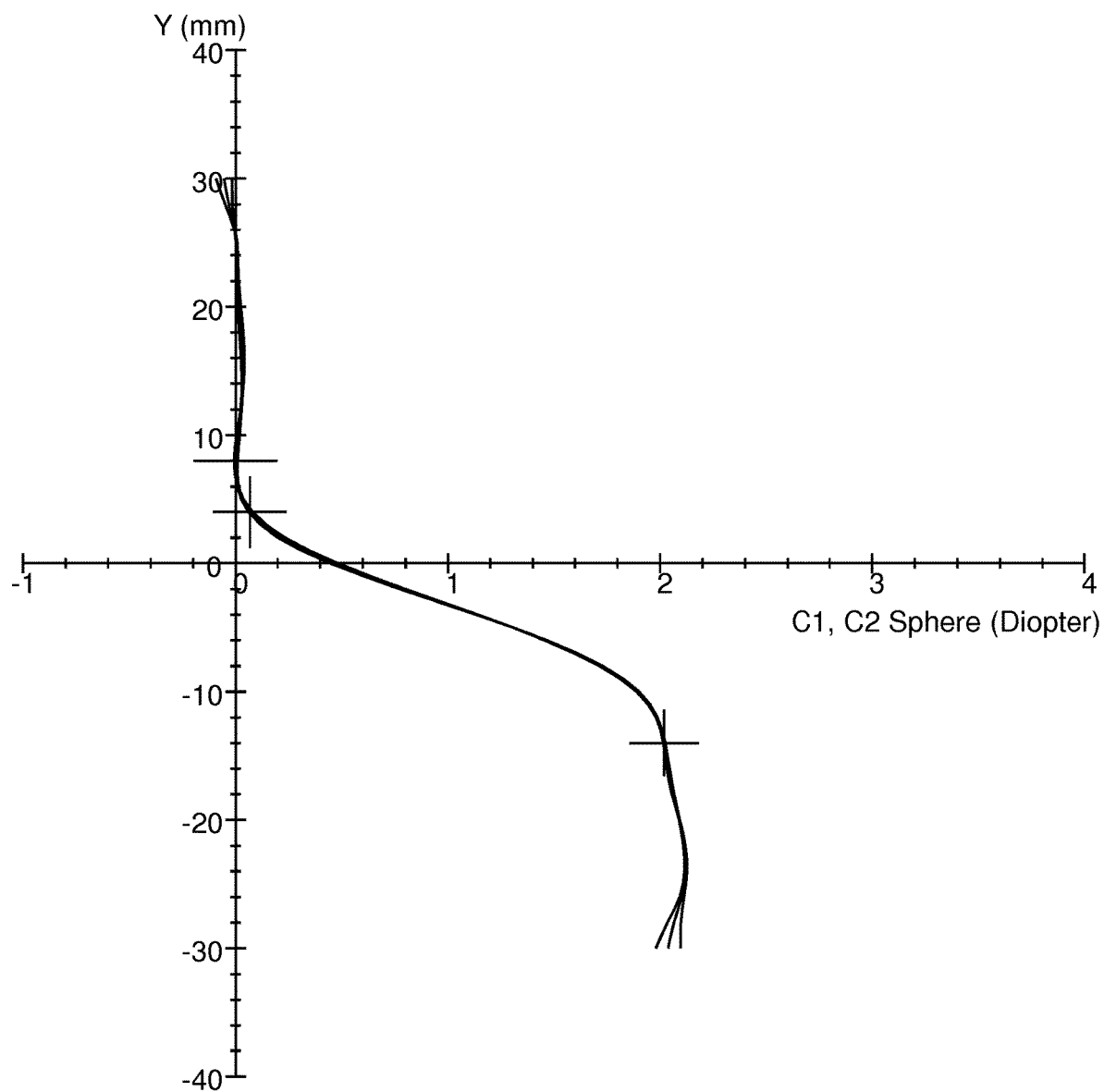
Figure 35B:
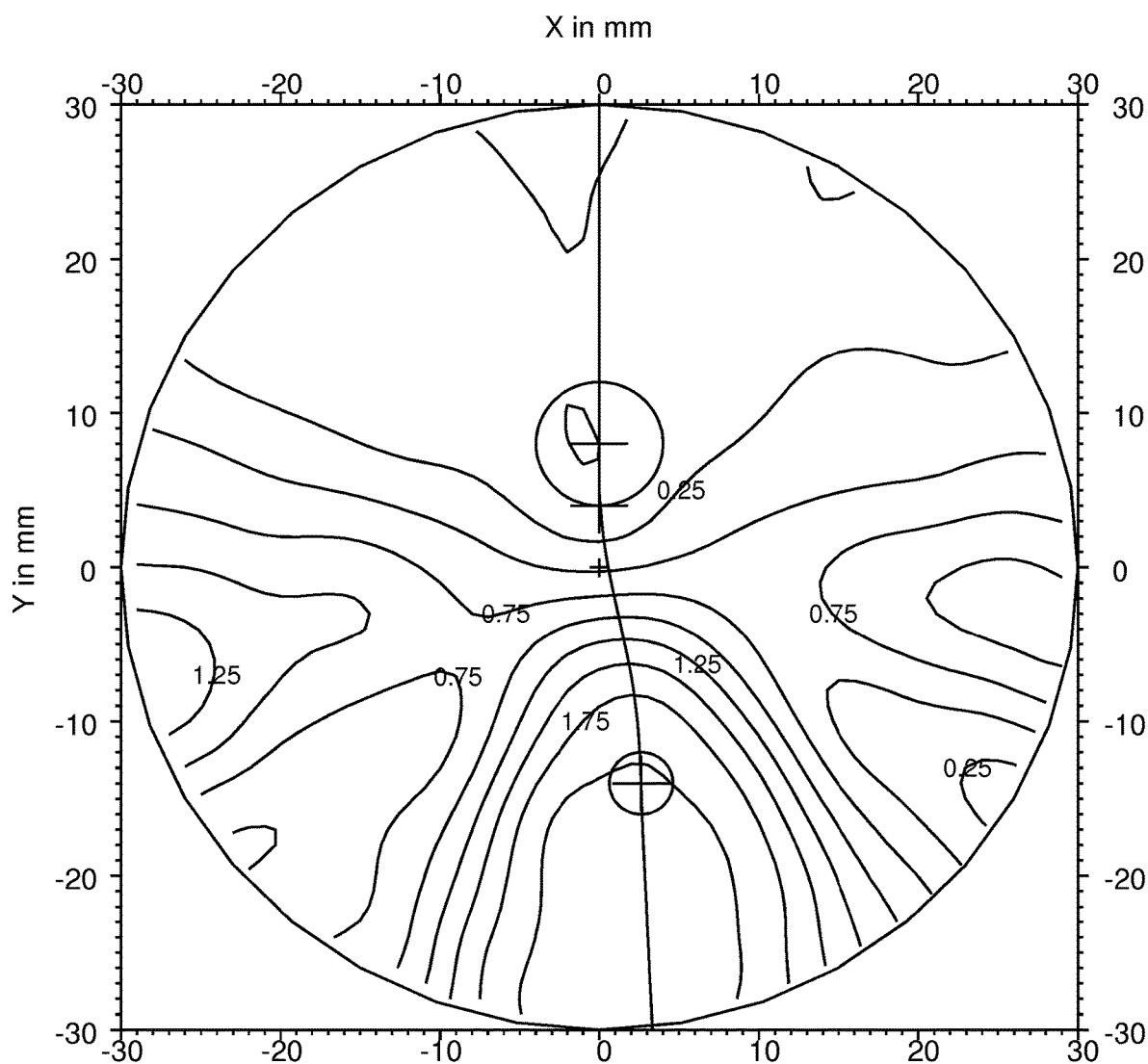
Figure 35C:
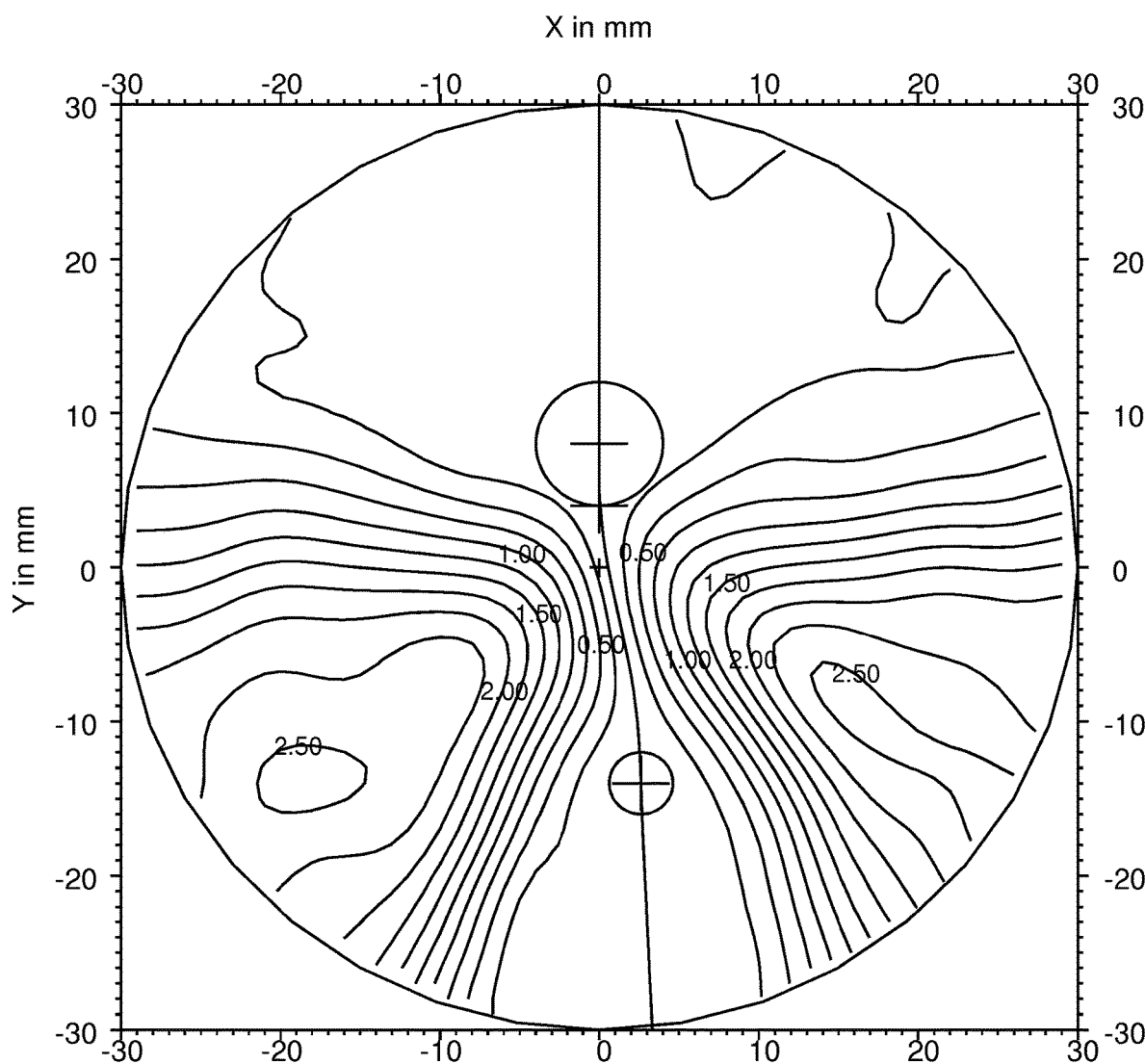

FIGS. 35a to 35c show the features of the surfaces of an initial surface of an progressive ophthalmic lens configured for a presbyopia wearer with an addition of 2 diopters.

FIG. 35a shows mean sphere curve surrounded by minimum and maximum sphere curves, along the meridian. The x-axes are graduated in diopters, and the y-axes give the height, in mm, on the lens. FIG. 35b shows lines of equal mean sphere, i.e. lines formed by points for which the mean sphere has an identical value. The x-axis and y-axis give the height, in mm respectively along the horizontal and vertical directions. FIG. 35c shows, using the same axes as for FIG. 35b, lines of equal cylinder.

Figure 36A:
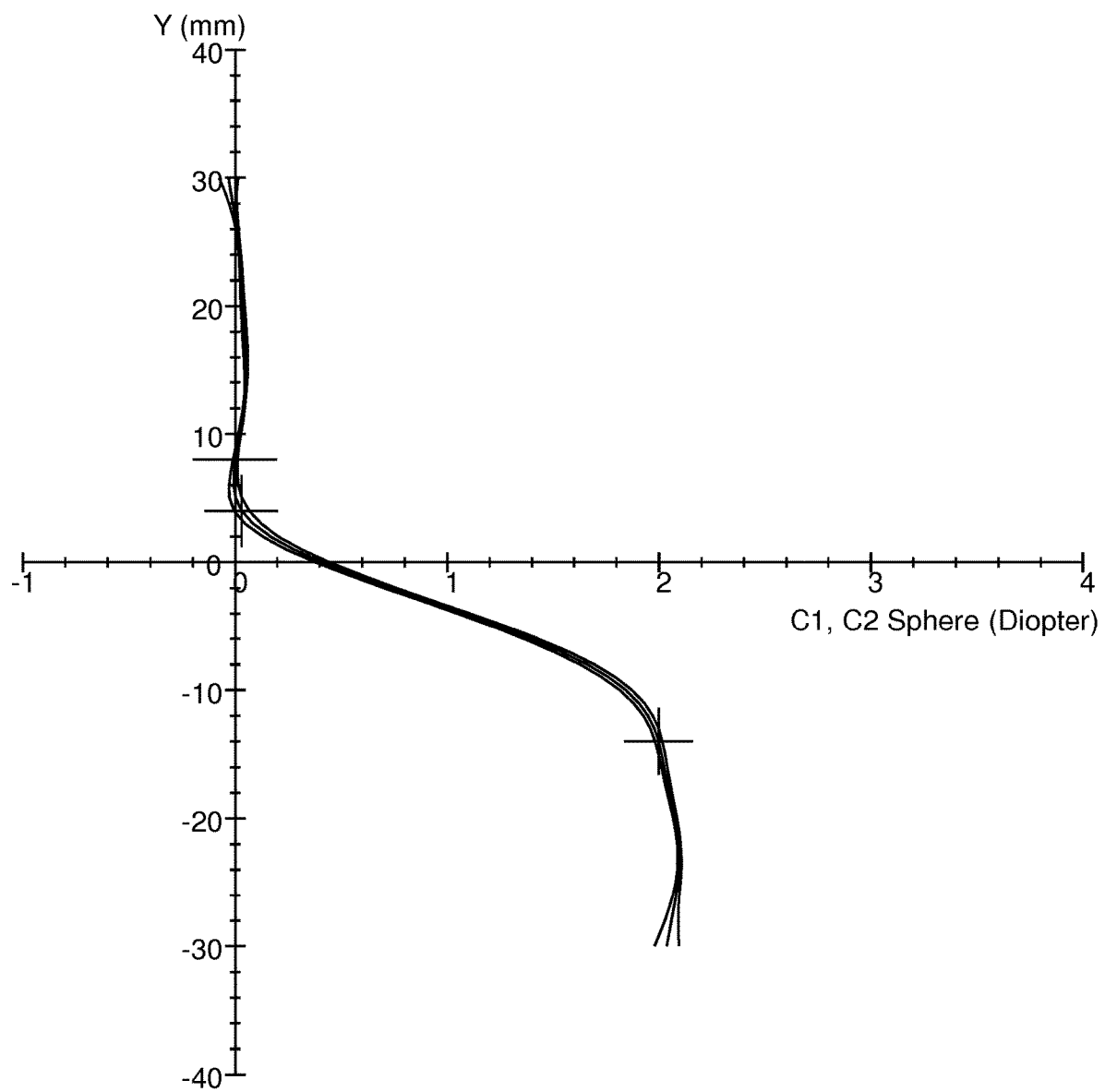
Figure 36B:
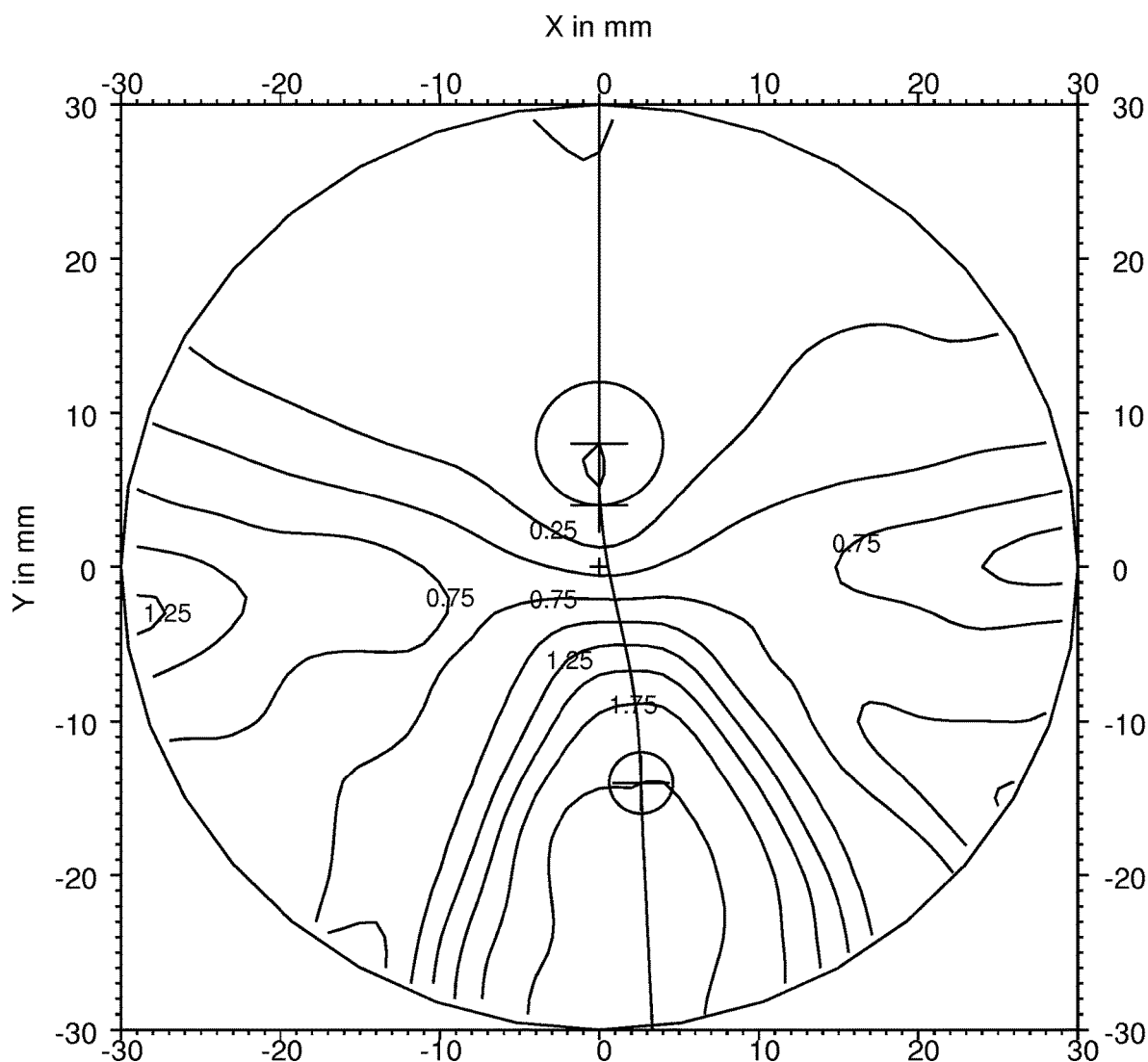
Figure 36C:
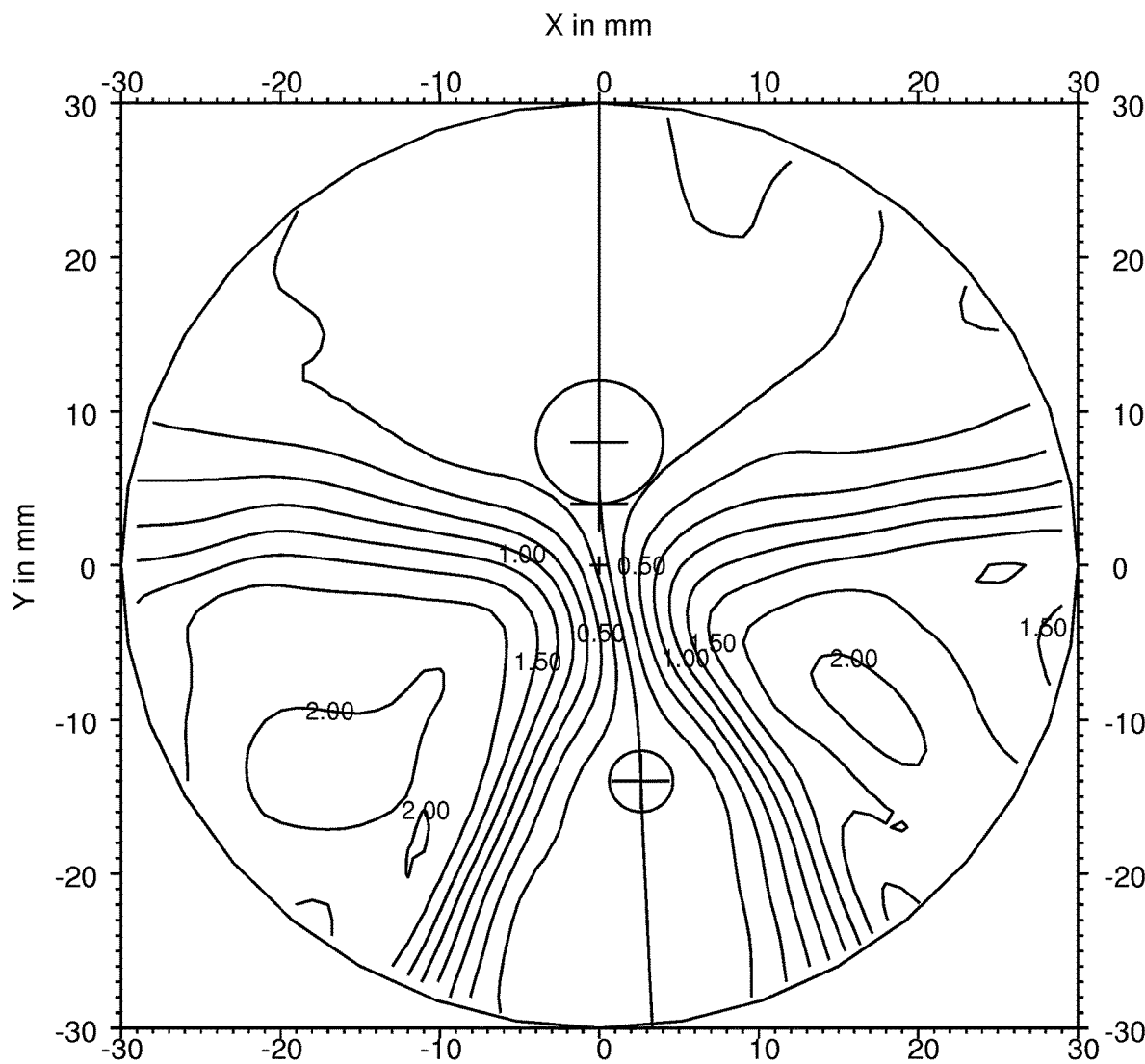

FIGS. 36a to 36c show the features of the surfaces of the optical surface obtained by combining the modifying surface shown on FIGS. 34a to 34c with the initial surface shown on FIGS. 35a to 35c.

FIG. 36a shows mean sphere curve surrounded by minimum and maximum sphere curves, along the meridian. The x-axes are graduated in diopters, and the y-axes give the height, in mm, on the lens. FIG. 36b shows lines of equal mean sphere, i.e. lines formed by points for which the mean sphere has an identical value. The x-axis and y-axis give the height, in mm respectively along the horizontal and vertical directions. FIG. 36c shows, using the same axes as for FIG. 36b, lines of equal cylinder.

As observed when comparing the optical features of the initial surface and of the modified optical surface, the maximum of cylinder has been reduced without changing substantially the cylinder and means sphere distribution.

Thus by combining the modifying surface illustrated in FIGS. 33a to 33c with the initial surface, one may reduce the maximum of cylinder without having to go through a new optical optimization.

Table 1 reports the mean cylinder over the normalize surface, the normalized sphere standard deviation of the normalized modifying surface, the area of the normalized modifying surface $SNmod_i$ having a normalized cylinder values $Cyl'_{Smodi}$ greater than 0.6, and the area of the normalized modifying surface $SNmod_i$ having normalized sphere values $Sph'_i$ smaller than 0.2.

TABLE 1

| Examples | Mean Cyl | Std SPH | Area norm. CYL >0.6 | Area norm. SPH <0.2 |
|---|---|---|---|---|
| Prior art 1 | 0.380956 | 0.25604 | 33.0733 | 38.2134 |
| Prior art 2 | 0.466782 | 0.241068 | 35.23568 | 28.0752 |
| Prior art 3 | 0.280961 | 0.223185 | 9.21659 | 55.4413 |
| Example 1 | 0.142702 | 0.111678 | 5.60085 | 2.16235 |
| Example 5 | 0.228309 | 0.102975 | 4.891882 | 0.921659 |
| Example 2 | 0.269256 | 0.14927 | 15.42007 | 4.57285 |
| Example 4 | 0.255397 | 0.142957 | 7.19603 | 13.0096 |
| Example 7 | 0.289013 | 0.133788 | 9.25204 | 2.16235 |
| Example 6 | 0.386398 | 0.161895 | 24.60121 | 24.5658 |
| Example 3 | 0.167761 | 0.135991 | 6.02623 | 0.815314 |
| Example 8 | 0.0290219 | 0.0401359 | 0.744417 | 0.248139 |

As indicated in Table 1, all the modifying surfaces of example 1 to 9 may be selected during the modifying surface selection step S2 of the method according to the invention.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention as defined in the set of claims.

The invention claimed is:

1. A method implemented by a computer of modifying an initial dioptric function of an initial ophthalmic lens surface, for manufacturing an ophthalmic lens, the method comprising:
   obtaining information of an initial surface Sini associated with a first coordinate system, said initial surface Sini comprising a plurality of surface points P1, each surface point P1 having a mean sphere Sph(P1) and a cylinder Cyl(P1), said initial surface Sini providing said initial dioptric function;
   selecting a number n of nonzero modifying surfaces $Smod_1, \ldots, Smod_n$, said modifying surfaces $Smod_1, \ldots, Smod_n$ being associated with a second coordinate system, the modifying surface $Smod_i$ comprising a plurality of surface points $P_{i1}, \ldots P_{ij}, \ldots, P_{im_i}$, each surface point $P_{ij}$ having a mean sphere $Sph(P_{ij})$ and a cylinder $Cyl(P_{ij})$, n, i, j, $m_i$ being integers with $n \geq 1$, $1 \leq i \leq n$, $1 \leq j \leq m_i$ and $m_i \geq 1$;
   determining a relative position and orientation of the first coordinate system and the second coordinate system, the determining of the position and the orientation being achieved by positioning and orienting the first coordinate system and the second coordinate system in a third common coordinate system; and
   combining the initial surface Sini and the n modifying surfaces, in association with the third coordinate system, to obtain a functionalized ophthalmic lens surface according to the expression:

$Sfunc = Sini + \sum_{i=1}^{i=n} alpha_i \cdot Smod_i$ wherein a normalized sphere standard deviation of normalized sphere values $Sph'_{smodi}$ of a normalized modifying surface $SNmod_i$ is smaller than or equal to 0.2, with:
   the normalized modifying surface $SNmod_i$ corresponding to the modifying surface $Smod_i$ to which a best sphero-toric surface has been subtracted, and
   the normalized sphere values over the normalized modifying surface $SNmod_i$ at a point $P_{ij}$ of $Smod_i$ having the coordinate (x,y,z) being:

$$Sph'_{S_{modi}}(x, y) = \frac{\lfloor SphN_{S\ mod_i}(x, y, z) - \min(SphN_{S\ mod_i}) \rfloor}{[\max(SphN_{S\ mod_i}) - \min(SphN_{S\ mod_i})]}$$

$SphN_{Smod,i}(x,y)$ being the sphere over the normalized modifying surface $SNmod_i$, at the point of $SNmod_i$ having the coordinate (x,y),
   $\max(SphN_{Smod,i})$ being the greatest value of sphere over the normalized modifying surface $SNmod_i$,
   $\min(SphN_{Smod,i})$ being the smallest value of sphere over the normalized modifying surface $SN_{modi}$, and
   $alpha_i$ being a nonzero weighting coefficient.

2. The method according to claim 1, wherein the standard deviation of the normalized sphere values $Sph'_i$ along a central line of the normalized modifying surface is smaller than or equal to 0.3.

3. The method according to claim 1, wherein an area of the normalized modifying surface $SNmod_i$ having normalized sphere values $Sph'_i$ smaller than 0.2 represents less than 25% of a total surface area of the normalized modifying surface $SNmod_i$.

4. The method according to claim 1, wherein an area of the normalized modifying surface $SNmod_i$ having a normalized cylinder values $Cyl'_{Smodi}$ greater than 0.6 represent less than 25% of a total surface area of the normalized modifying surface $SNmod_i$, with the normalized cylinder values over the normalized modifying surface at a point $P_{ij}$ of $Smod_i$ having the coordinate (x,y,z) being:

$$Cyl'_{S\ mod\ i}(x, y) = \frac{\lfloor CylN_{S\ mod_i}(x, y, z) - \min(CylN_{S\ mod_i}) \rfloor}{[\max(CylN_{S\ mod_i}) - \min(CylN_{S\ mod_i})]}$$

$CylN_{Smod,i}(x,y,z)$ being the cylinder over the normalized modifying surface $SNmod_i$ at the point $SNmod_i$ having the coordinate (x,y),
$\max(CylN_{Smod,i})$ being the greatest value of sphere over the normalized modifying surface $SNmod_i$, and
$\min(CylN_{Smodi})$ being the smallest value of sphere over the normalized modifying surface $SNmod_i$.

5. The method according to claim 4, wherein an average value of the normalized cylinder $Cyl'_{Smodi}$ over the normalized modifying surface $SNmod_i$ is smaller than or equal to 0.35.

6. The method according to claim 1, wherein said first coordinate system comprising an origin, wherein the normalized modifying surface $SNmod_i$ is calculated considering a disk of 60 mm diameter centered on the origin of the first coordinate system.

7. The method according to claim 6, wherein the origin of the first coordinate system is located on the optical center of the lens when the ophthalmic lens is a single vision lens, or is located in the middle of the micro-engravings when the ophthalmic lens is a multifocal lens.

8. The method according to claim 1, wherein during the combining, a sphero-toric surface (ST) is further added to the initial surface Sini to obtain the functionalized ophthalmic lens surface.

9. The method according to claim 1, further comprising determining the value of the weighting coefficient $alpha_i$ based on a wearer parameter of the ophthalmic lens.

10. The method according to claim 1, wherein said ophthalmic lens comprises a far vision control point (FVP) and a near vision control point (NVP), wherein $Sigma = \sum_{i=1}^{i=n} alpha_i \cdot Smod_i$ forms a surface gathering a plurality of surface points $P2_1, \ldots, P2_q$, each surface point $P2_j$ having a mean sphere $Sph(P2_j)$ and a cylinder $Cyl(P2_j)$, with q, j being integers, and $1 \leq j \leq q$, wherein for any surface points (P3) of the surface Sigma located in a vicinity of the far vision control point (FVP), the mean sphere and the cylinder are such that $Sph(P3) < 0.12$ and $Cyl(P3) < 0.12$.

11. The method according to claim 10, wherein for any surface points (P4) of the surface Sigma located in a vicinity of the far near control point (NVP), the mean sphere and the cylinder are such that $Sph(P3) < 0.12$ and $Cyl(P3) < 0.12$.

12. A method of manufacturing an ophthalmic lens comprising:
   determining the surfaces of the ophthalmic lens and relative positions of the front and rear surfaces of the ophthalmic lens; and
   manufacturing the ophthalmic lens,
   wherein during the determining, the dioptric function of at least one of the ophthalmic lens surfaces is modified according to the method of claim 1.

13. An ophthalmic lens calculating device comprising:
processing circuitry configured to
- receive an ophthalmic lens order request comprising at least a wearer's ophthalmic prescription and at least one additional function to add to said ophthalmic lens,
- determine an initial surface Sini, associated with a first coordinate system, and relative positions of an ophthalmic lens based on the order request,
- determine at least one modifying surface $Smod_i$, associated with a second coordinate system, and at least one nonzero weighting coefficient $alpha_i$ corresponding to the at least one desired additional function to add to said ophthalmic lens, and
- combine the initial surface Sini and the at least one modifying surface $Smod_i$, in a third coordinate system, wherein position and orientation of the first coordinate system and the second coordinate system are determined by positioning and orienting the first coordinate system and the second coordinate system in a third common coordinate system.

14. The ophthalmic lens determining device according to claim 13, wherein the processing circuitry is configured to communicate with at least one distant entity to provide the modifying surface $Smod_i$ and/or the corresponding weighting coefficient $alpha_i$.

* * * * *